US009697556B2

(12) United States Patent
Mazed et al.

(10) Patent No.: US 9,697,556 B2
(45) Date of Patent: Jul. 4, 2017

(54) SYSTEM AND METHOD OF MACHINE LEARNING BASED USER APPLICATIONS

(76) Inventors: Mohammad A. Mazed, Yorba Linda, CA (US); Sayeeda Mazed, Yorba Linda, CA (US)

( * ) Notice: Subject to any disclaimer, the term of this patent is extended or adjusted under 35 U.S.C. 154(b) by 1203 days.

(21) Appl. No.: 13/448,378

(22) Filed: Apr. 16, 2012

(65) Prior Publication Data

US 2012/0265596 A1 Oct. 18, 2012

Related U.S. Application Data

(63) Continuation-in-part of application No. 12/931,384, filed on Jan. 31, 2011, now Pat. No. 8,548,334, and a continuation-in-part of application No. 12/238,286, filed on Sep. 25, 2008, now abandoned, and a continuation-in-part of application No. 11/952,001, filed on Dec. 6, 2007, now Pat. No. 8,073,331.

(60) Provisional application No. 61/404,504, filed on Oct. 5, 2010, provisional application No. 60/970,487, filed on Sep. 6, 2007, provisional application No. 61/517,204, filed on Apr. 15, 2011.

(51) Int. Cl.
*G06Q 30/00* (2012.01)
*G06Q 30/06* (2012.01)
*G06Q 30/02* (2012.01)
*G06Q 20/12* (2012.01)
*G06Q 20/20* (2012.01)
*G06Q 20/32* (2012.01)

(52) U.S. Cl.
CPC ......... *G06Q 30/0631* (2013.01); *G06Q 20/12* (2013.01); *G06Q 20/20* (2013.01); *G06Q 20/3278* (2013.01); *G06Q 30/02* (2013.01); *G06Q 30/06* (2013.01); *G06Q 30/0639* (2013.01)

(58) Field of Classification Search
CPC .... G06Q 20/12; G06Q 20/20; G06Q 20/3278; G06Q 30/02; G06Q 30/06; G06Q 30/0633; G06Q 30/0631; G06Q 30/0251; G06Q 30/026; G06Q 30/0222; G06Q 30/0639
USPC .... 705/14.23, 14.66, 26.8, 14.49, 26.7, 26.9
See application file for complete search history.

(56) References Cited

U.S. PATENT DOCUMENTS

| 7,370,276 | B2* | 5/2008 | Willis | 715/747 |
| 2002/0147645 | A1* | 10/2002 | Alao et al. | 705/14 |
| 2003/0126146 | A1* | 7/2003 | Van Der Riet | 707/100 |
| 2004/0003096 | A1* | 1/2004 | Willis | 709/228 |
| 2004/0103024 | A1* | 5/2004 | Patel et al. | 705/14 |
| 2007/0053513 | A1* | 3/2007 | Hoffberg | 380/201 |

(Continued)

OTHER PUBLICATIONS

Mobile Marketing: From Marketing Strategy to Mobile Marketing Campaign Implementation—By Matti Leppaniemi and Heikko Karjoluoto Journal of Mobile Marketing 2008.*

*Primary Examiner* — Beth V Boswell
*Assistant Examiner* — Charles Guiliano

(57) ABSTRACT

The invention synthesizes a social network, an electronic commerce (including a performance based advertisement and electronic payment), a mobile internet device and a machine learning algorithm(s). The synthesized social commerce further dynamically integrates stored information, real time information and real time information/data/image(s) from an object/array of objects. The machine learning algorithm(s) can include a software agent, a fuzzy logic algorithm, a predictive algorithm, an intelligence rendering algorithm and a self-learning (including relearning) algorithm.

20 Claims, 49 Drawing Sheets

(56) References Cited

U.S. PATENT DOCUMENTS

| | | | |
|---|---|---|---|
| 2007/0162337 A1* | 7/2007 | Hawkins et al. | 705/14 |
| 2008/0307034 A1* | 12/2008 | Fleet et al. | 709/202 |
| 2012/0179516 A1* | 7/2012 | Fakhrai | G06Q 30/08 705/14.1 |
| 2012/0265596 A1* | 10/2012 | Mazed et al. | 705/14.23 |
| 2013/0024360 A1* | 1/2013 | Ballout | G06Q 20/04 705/39 |

\* cited by examiner

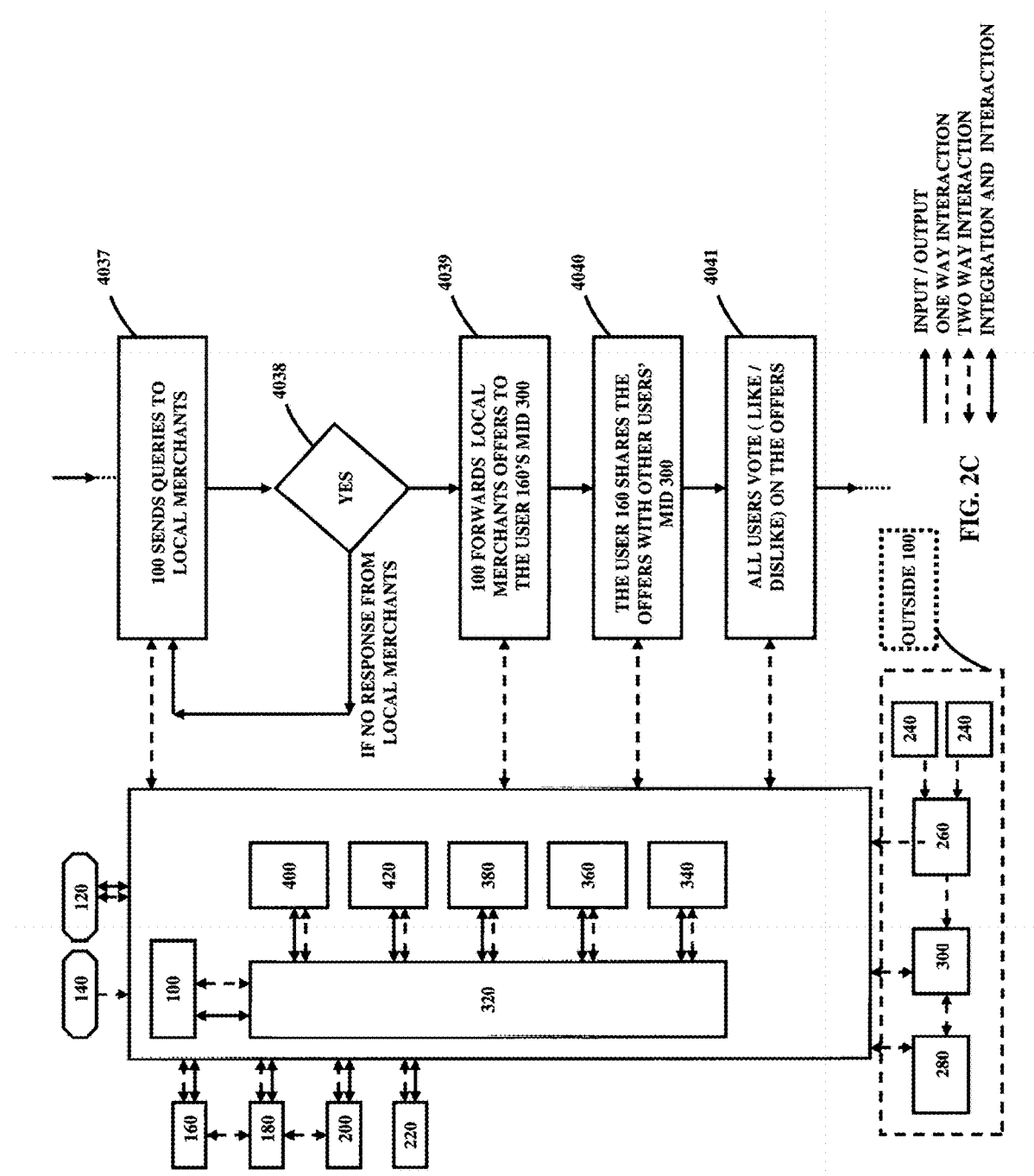

US 9,697,556 B2

SYSTEM AND METHOD OF MACHINE LEARNING BASED USER APPLICATIONS

CROSS REFERENCE OF RELATED APPLICATIONS

The present application is a continuation-in-part (CIP) of: (a) U.S. non-provisional patent application entitled "Dynamic Intelligent Bidirectional Optical Access Communication System With Object/Intelligent Appliance-To-Object/Intelligent Appliance Interaction", Ser. No. 12/931,384 filed on Jan. 31, 2011, (b) U.S. non-provisional patent application entitled "Portable Internet Appliance", Ser. No. 12/238,286 filed on Sep. 25, 2008 and (c) U.S. non-provisional patent application entitled "Dynamic Intelligent Bidirectional Optical and Wireless Access Communication System", Ser. No. 11/952,001 filed on Dec. 6, 2007, issued as U.S. Pat. No. 8,073,331; and furthermore, the present application claims its benefit and priority to: (d) U.S. provisional patent application entitled "Intelligent Social E-Commerce", Ser. No. 61/517,204 filed on Apr. 15, 2011, (e) U.S. provisional patent application entitled "Dynamic Intelligent Bidirectional Optical Access Communication System With Object/Intelligent Appliance-To-Object/Intelligent Appliance Interaction", Ser. No. 61/404,504 filed on Oct. 5, 2010 and (f) U.S. provisional patent application entitled "Intelligent Internet Device", Ser. No. 60/970,487 filed on Sep. 6, 2007. Above US non-provisional patent applications along with U.S. provisional patent applications are hereby incorporated by reference in their entireties.

FIELD OF THE INVENTION

The present invention generally relates to integration of a social network, electronic commerce (including performance based advertisement and electronic payment) and a mobile internet device (MID).

Furthermore, synthesized social electronic commerce dynamically integrates stored information, information (preferably real time information), communication with an object/array of objects (where the object can be coupled with a wireless (or radio) transmitter and/or a sensor) and a unified algorithm.

The unified algorithm can include a software agent, a fuzzy logic algorithm, a predictive algorithm, an intelligence rendering algorithm and a self-learning (including relearning) algorithm.

BACKGROUND OF THE INVENTION

Social networking is no longer just about making social connections online User experience can be enhanced not only by connecting with people, but also by connecting with information (preferably real time information) and communicating with an object/array of objects.

The cornerstone of today's electronic commerce is based on converting a probable click (in a search engine) into an actual sale.

By synthesizing social networking with electronic commerce, one can deliver consistent user experience across all touch-points (e.g., social, mobile and in-store).

Furthermore, synthesized social electronic commerce can integrate stored information, real time information, data from a mobile internet device and information/data/image(s) from an object/array of objects, where the object can be coupled with a wireless (or radio) transmitter and/or a sensor.

However, the mobile internet device can preferably communicate with a node, which can further communicate with the object/array of objects for spatial and time averaged information/data/image(s) from the object/array of objects.

The integration of social networking with (real time) user location information from a user's mobile internet device and information/data/image(s) from the object/array of objects can embed physical reality into an internet space and an internet reality into a physical space.

Furthermore, the unified algorithm (integrating a software agent, a fuzzy logic algorithm, a predictive algorithm, an intelligence rendering algorithm and a self-learning (including relearning)) algorithm can add a new dimension to the user experience.

Furthermore, by designing a system-on-chip (SoC) (an advanced microprocessor integrated with a security algorithm) (SoC) for the mobile internet device, intelligence can be rendered to the mobile internet device.

SUMMARY OF THE INVENTION

The invention synthesizes the social network, electronic commerce (including performance based advertisement and electronic payment) and the mobile internet device (intelligence is achieved by utilizing advanced algorithm(s) and/or advanced microprocessor design(s) for the mobile internet device).

Synthesized social electronic commerce further dynamically integrates stored information, real time information, information/data/image(s) from the object/array of objects (where the object can be coupled with a wireless (or radio) transmitter and/or a sensor) and the unified algorithm (the unified algorithm includes a software agent, a fuzzy logic algorithm, a predictive algorithm, an intelligence rendering algorithm and a self-learning (including relearning) algorithm).

DETAILED DESCRIPTION OF THE INVENTION

Figure 1A:
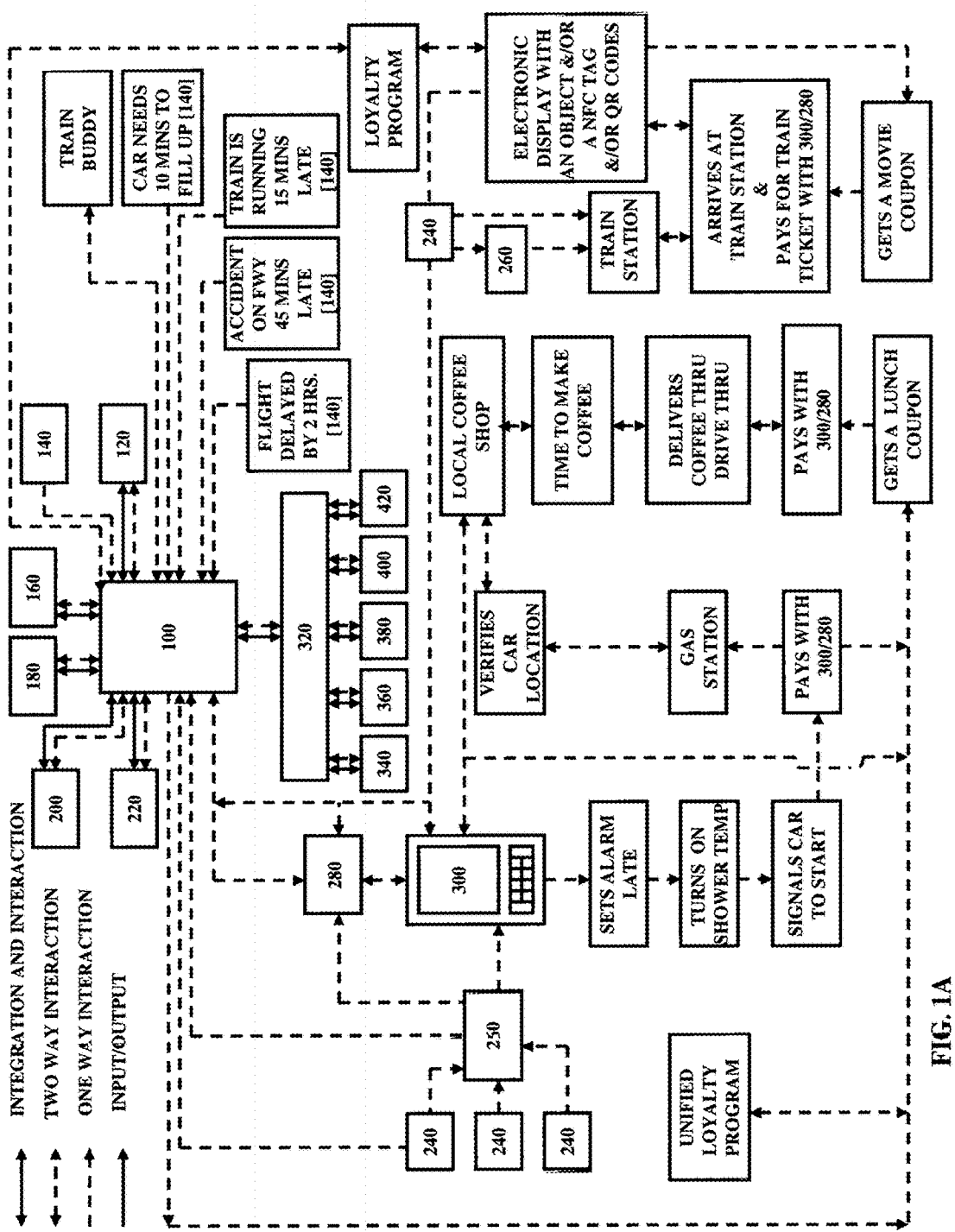
FIGS. 1(A and B) illustrates an integrated application flow chart of a social wallet, according to one embodiment of the present invention.

FIG. 1A illustrates an integrated application flow chart of a social wallet 100. The social wallet 100 can be a social networking web portal and it can typically reside at a cloud based secure server. The social wallet 100 can connect/access stored information from a data storage (preferably a cloud based secure data storage) component(s) 120, can connect/access with an information (preferably real time information) from information source(s) 140, can connect with a user(s) 160, can connect with a merchant(s) 180, can connect with a deposit account(s) 200, can connect with a payment account(s) 220, can connect with an object/array of objects 240, can connect with a node(s) 260, can connect with a social wallet electronic module(s) 280, can connect with the mobile internet appliance(s) 300. Furthermore, the social wallet 100 can connect/access with a unified algorithm 320.

The unified algorithm 320 can consist of a software agent 340, a fuzzy logic algorithm 360, a predictive algorithm 380, an intelligence rendering algorithm 400 and a self-learning (including relearning) algorithm 420.

Furthermore, the social wallet 100 can connect with a location measurement component of the mobile internet appliance(s) 300 and an electronic display, where the electronic display can be embedded with the object/array of objects 240 and/or near-field communication tags and/or one-dimensional (1-D) two dimensional (2-D) quick response (QR) codes.

The social wallet 100 can act as an ultimate integrator (e.g., a Trusted Service Manager (TSM) of many needs of the user 160, connecting with other users 160 for various information and needs, transferring information between users 160, securely transferring money to the deposit account 220 (e.g., a bank), securely transferring money to the payment account 220 (e.g., a bill payment account), securely transferring money (e.g., a microloan) between users 160.

Figure 1B:
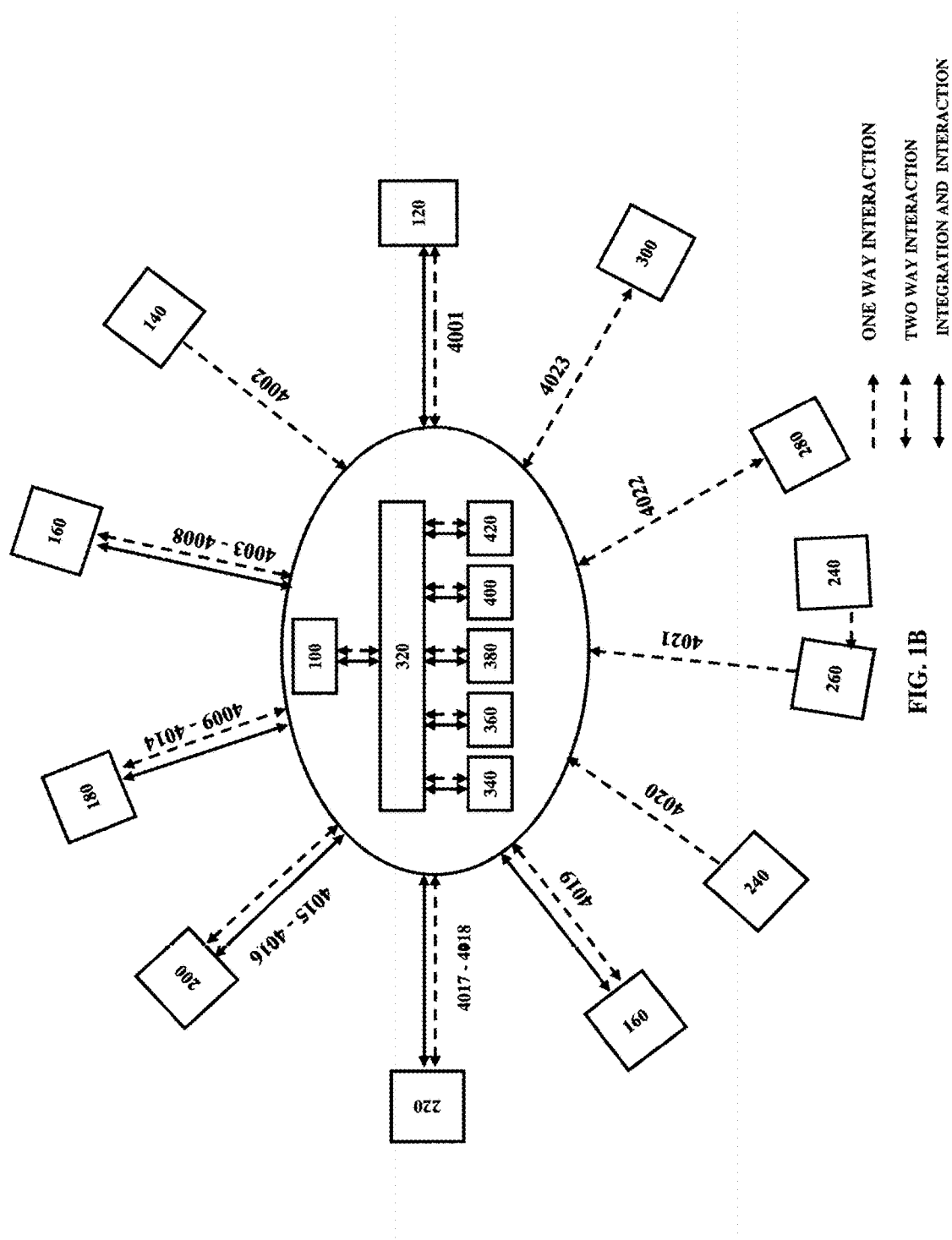

FIG. 1B illustrates steps from 4001 to 4025. In step 4001, the social wallet 100 can connect/access stored information from the data storage (preferably the cloud based secure data storage) component(s) 120. In step 4002, the social wallet 100 can connect/access to the information source (preferably real time information) 140.

In step 4003, the social wallet 100 can connect to the user 160 via a profile. In step 4004, the social wallet 100 can connect to the user 160 via an online/offline message. In step 4005, the social wallet 100 can connect to the user 160 via a chat message. In step 4006, the social wallet 100 can connect to the user 160 via a broadcast message. In step 4007, the social wallet 100 can connect to the user 160 via a like/dislike vote. In step 4008, the social wallet 100 can connect to the user 160 for a collaborative purchase of a product and/or service.

In step 4009, the social wallet 100 can connect to the merchant 180 via a profile. In step 4010, the social wallet 100 can connect to the merchant 180 via online/offline message. In step 4011, the social wallet 100 can connect to the merchant 180 via chat message. In step 4012, the social wallet 100 can connect to the merchant 180 via broadcast message. In step 4013, the social wallet 100 can connect to the merchant 180 via bid. In step 4014, the social wallet 100 can connect to the merchant 180 via bid in real time.

In step 4015, the user 160 can deposit money (electronic scan of a money order and/or a check) and/or legally approved electronic cash (e.g., bitcoins, digital gold currency and webmoney with traceable serial numbers) to the deposit account 200 via the social wallet 100. In step 4016, the user 160 can withdraw money from the deposit account 200 via the social wallet 100.

In step 4017, the user 160 can pay money to a payment account 220 via the social wallet 100. In step 4018, the user 160 can transfer/consolidate many payment accounts to the payment account 220 via the social wallet 100.

In step 4019, the user 160 can transfer money (e.g., a microloan) to another user 160 via the social wallet 100.

In step 4020, the social wallet 100 can communicate with the object 240.

Furthermore, the object 240, near-field communication tags and/or one-dimensional/two-dimensional quick response codes can be embedded on an electronic display (e.g. a smart poster).

Such communication with the object and/or near-field communication tags and/or one-dimensional/two-dimensional quick response codes can generate loyalty points in real time and can create personalized customer loyalty program, when they are connected with the social wallet 100.

In step 4021, the social wallet 100 can communicate with the node 260. Furthermore, the node 260 can communicate with the object/array of objects 240.

In step 4022, the social wallet 100 can communicate with the social wallet electronic module 280.

In step 4023, the social wallet 100 can communicate with the mobile internet device 300.

In step 4024, the social wallet 100 can communicate with the unified algorithm 320. The unified algorithm 320 can consist of a software agent 340, a fuzzy logic algorithm 360, a predictive algorithm 380, an intelligence rendering algorithm 400 and a self-learning (including relearning) algorithm 420. In step 4025, the software agent 340, the fuzzy logic algorithm 360, the predictive algorithm 380, the intelligence rendering algorithm 400 and the self-learning (including relearning) algorithm 420 and can communicate with each algorithm.

The intelligent rendering algorithm 400 can include algorithms such as: artificial intelligence, data interpretation, data mining, machine vision, natural language processing, neural networks, pattern recognition and reasoning modeling.

FIGS. 2(A, B, C, D, E, F and G) illustrates a method flow chart of integration of the social wallet (the social networking web portal) 100 and electronic commerce in the following steps:

In step 4026, the user 160 can log into the social wallet 100. In step 4027, the user 160 can set a privacy control in the social wallet 100. In step 4028, the user 160 can input his/her profile (e.g., gender, age group, income range, zip code, family members/friends' contacts) in the social wallet 100.

In step 4029, the unified algorithm 320 in the social wallet 100 can estimate the personal score of the user 160 by analyzing the profile, message history, chat history and data patterns (including purchase patterns). In step 4030, the unified algorithm 320 in the social wallet 100 can set the personal score of the user 160. The personal score of the user 160 can vary with time. In step 4031, the social wallet 100 can record the personal score of the user 160 over time.

In step 4032, the user 160 can authenticate in the social wallet 100, utilizing multi-level passwords and personalized questions. In step 4033, the user 160 can authenticate in the social wallet 100, by placing the social wallet electronic module 280, at proximity to a near-field communication terminal or by placing the mobile internet device 300, at proximity to a near-field communication terminal, where the mobile internet device 300 also integrates the social wallet electronic module 280.

In step 4034, the user 160 can also link the information about the product and/or service in the social wallet 100.

Alternatively, in step 4035, the user 160 can write a wanted ad for the product and/or service in the social wallet 100.

In step 4036, the unified algorithm 320 in the social wallet 100 can determine the location of the user 160 in real time by communicating with a location measurement component/miniature electronic module 1440 of the mobile internet device 300 of the user 160.

In step 4037, the unified algorithm 320 (in particular the software agent 340) in the social wallet 100 can send out queries to the location specific merchants 180 for the product and/or service, wanted by the user 160. If no offers from the location specific merchants 180 are found, then in step 4038, the unified algorithm 320 can send out queries to the location specific merchants in an increment of some distance (e.g., 20 Km) from the current location of the user 160 in order to secure the product and/or service, wanted by the user 160.

In step 4039, the unified algorithm in the social wallet 100 can forward the offers (e.g., in the form of a text/e-mail link/picture mail/video mail) from the merchants 180 to the mobile internet device 300 of the user 160, in real time (preferably via the user 160's profile in the social wallet 100).

In step 4040, the user 160 can optionally share the offers from the merchants 180 with the mobile internet devices 300 of other users, who are connected with the profile of the user 160, in real time (preferably via the other users' profiles in the social wallet 100).

In step 4041, other users connected with the profile of the user 160 vote for like/dislike vote—a quorum sensing. In step 4042, the user 160 can connect with another user for a collaborative purchase.

In step 4043, the unified algorithm 320 in the social wallet 100 can input the result of the like/dislike vote, in real time. In step 4044, the unified algorithm 320 in the social wallet 100 can estimate a merchant score of the merchants 180 by analyzing many like/dislike votes. The merchant score of the merchant 180 can vary over time. In step 4045, the social wallet 100 can record the merchant score. In step 4046, the social wallet 100 can display the merchant score of the merchant 180.

Furthermore, in step 4047, if the estimated personal score of the user 160 exceeds a certain pre-determined value set by the social wallet 100, then in step 4048, the unified algorithm 320 (in particular the fuzzy logic algorithm 360) in the social wallet 100 can determine other relevant products and/or services for the user 160. In step 4049, the social wallet 100 can send a coupon(s) (e.g., in the form of a text/e-mail link/picture mail/video mail) for other relevant products and/or services from the merchants 180 to the mobile internet device 300 of the user 160, in real time. In step 4050, the user 160 can share the coupon(s) with other users by simply forwarding the coupon(s) to the other users' mobile internet devices 300, in real time (preferably via the other users' profiles in the social wallet 100).

In step 4051, the user 160 can pay for the product and/or service via the social wallet 100, or by the social wallet electronic module 280, or by the mobile internet device 300.

Furthermore, in step 4052, the unified algorithm 320 (in particular the predictive algorithm 380) in the social wallet 100 can initially determine a set of relevant users for a targeted advertisement for a specified product and/or service.

In step 4053, the unified algorithm 320 in the social wallet 100 can send a coupon(s) (e.g., in the form of a text/e-mail link/picture mail/video mail) related to the specified product and/or service from merchants 180 to the profiles of the above set of relevant users.

In step 4054, the above set of relevant users can share coupon(s) (e.g., in the form of a text/e-mail link/picture mail/video mail) related to the specified product and/or service from merchants 180 with the other users' mobile internet devices 300, in real time (preferably via the other users' profiles in the social wallet 100).

If a targeted advertisement campaign does not receive responses greater than at a pre determined % (e.g., 10%), then in step 4055, the unified algorithm 320 (in particular the predictive algorithm 380, the intelligence rendering algorithm 400 and the self-learning (including relearning) algorithm 420) in the social wallet 100 can iterate (fine-tune) to find another set of relevant users for the targeted advertisement, until the targeted advertisement would be concluded successful to stop, when the targeted advertisement campaign receives responses greater than at the pre-determined % (e.g., 10%).

Figure 2A:
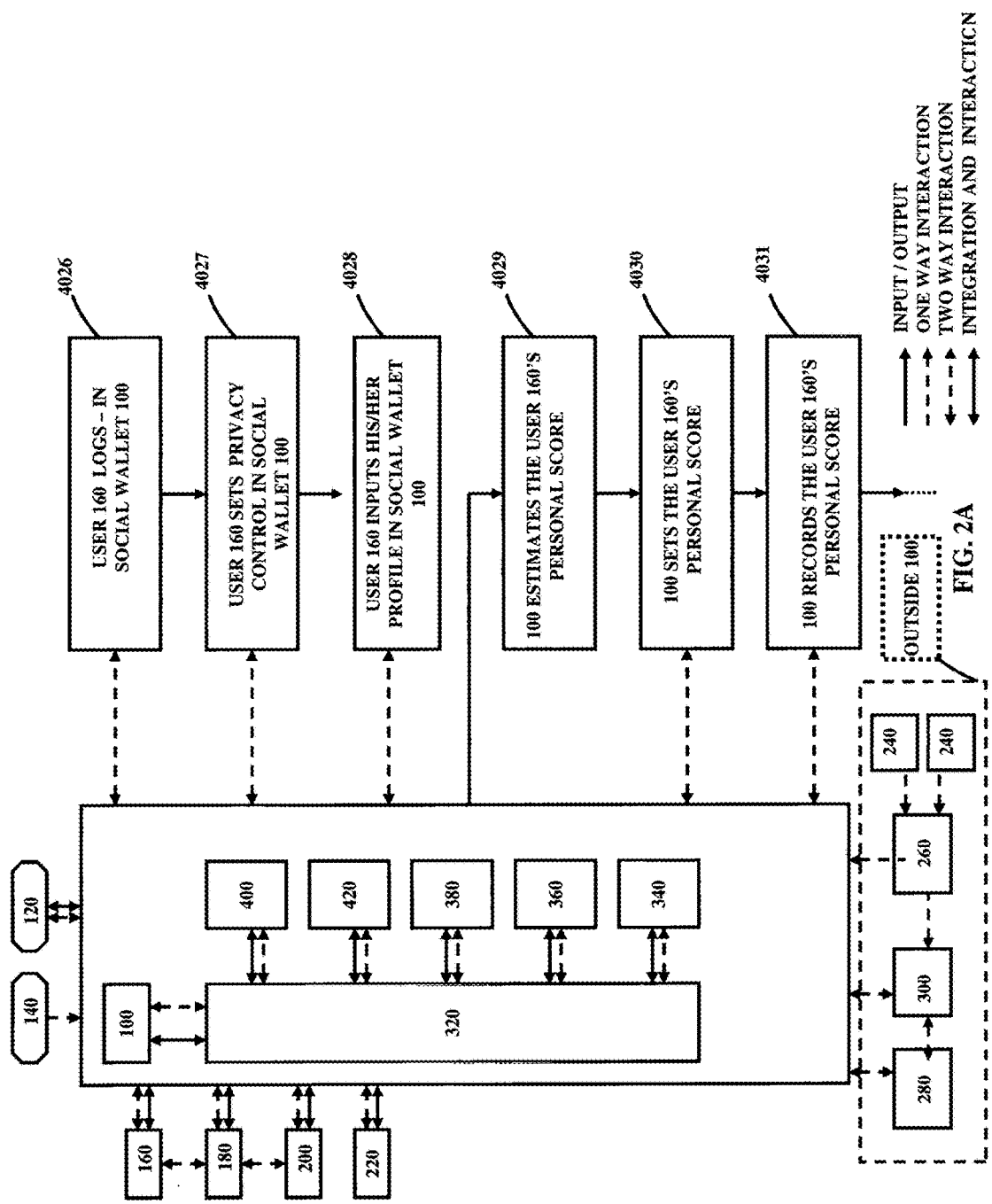
FIGS. 2(A, B, C, D, E, F, G and H) illustrates a method flow chart of integration of the social wallet, electronic commerce and performance based advertisement according to one embodiment of the present invention.
Figure 2B:
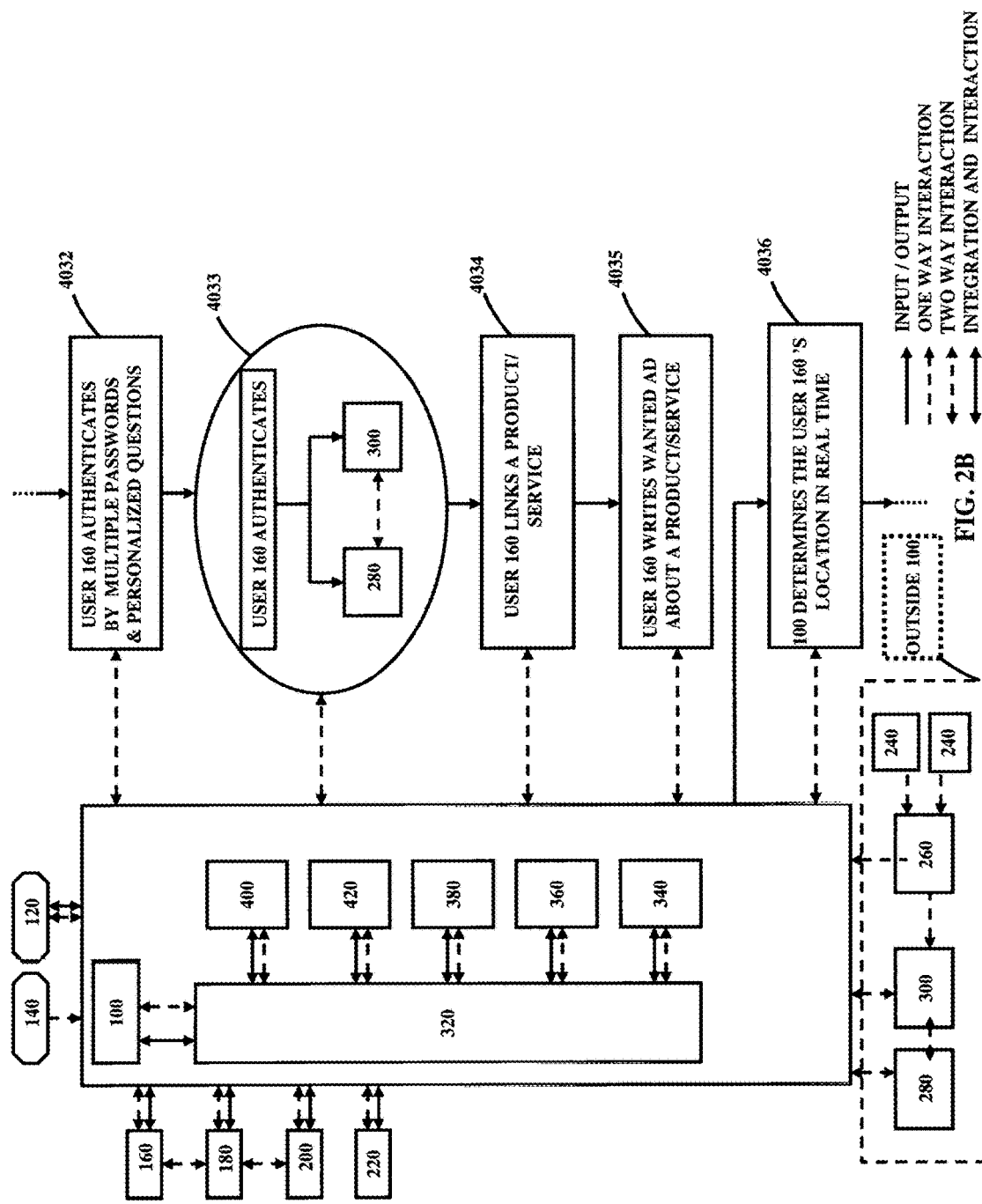
Figure 2D:
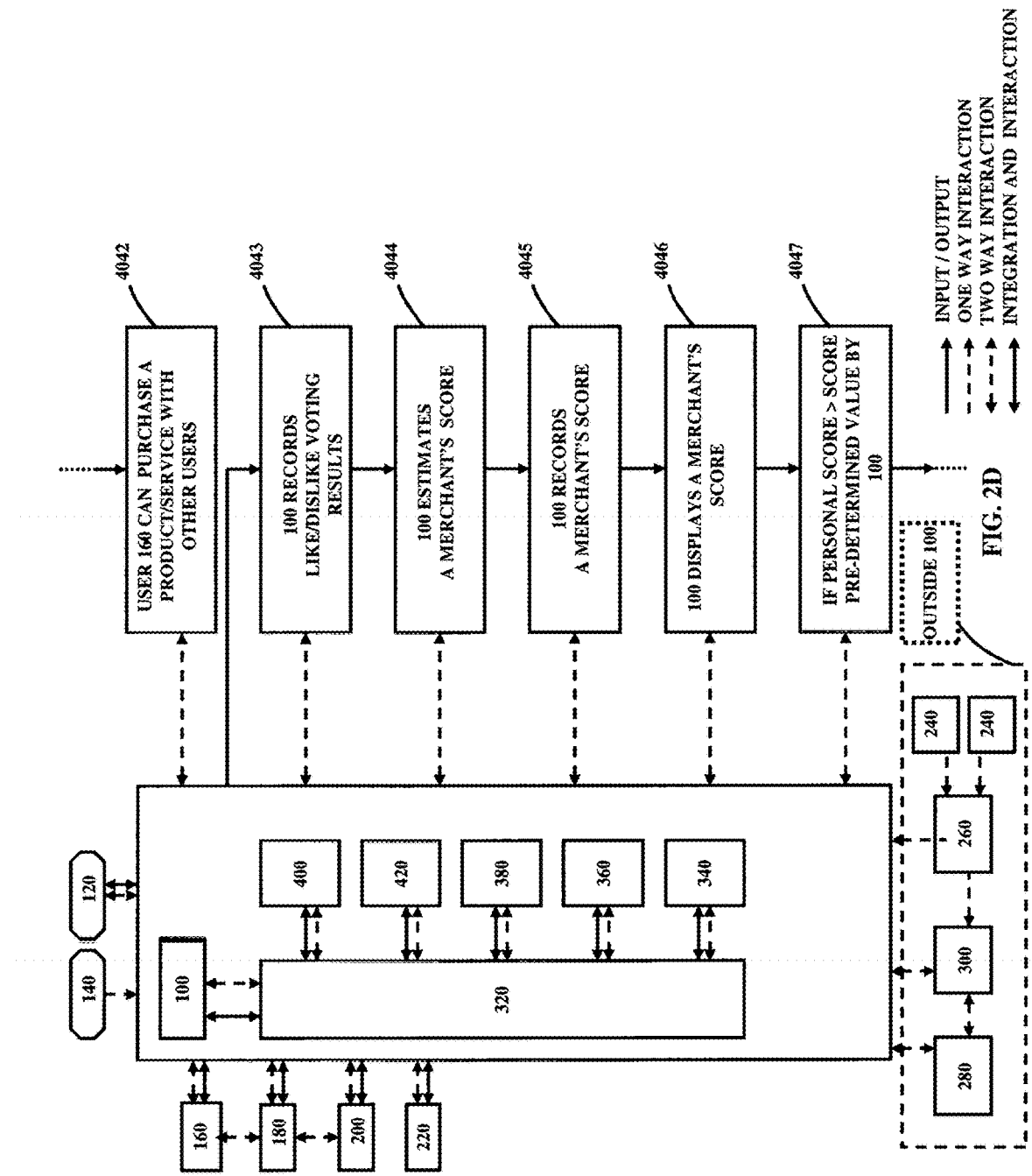
Figure 2E:
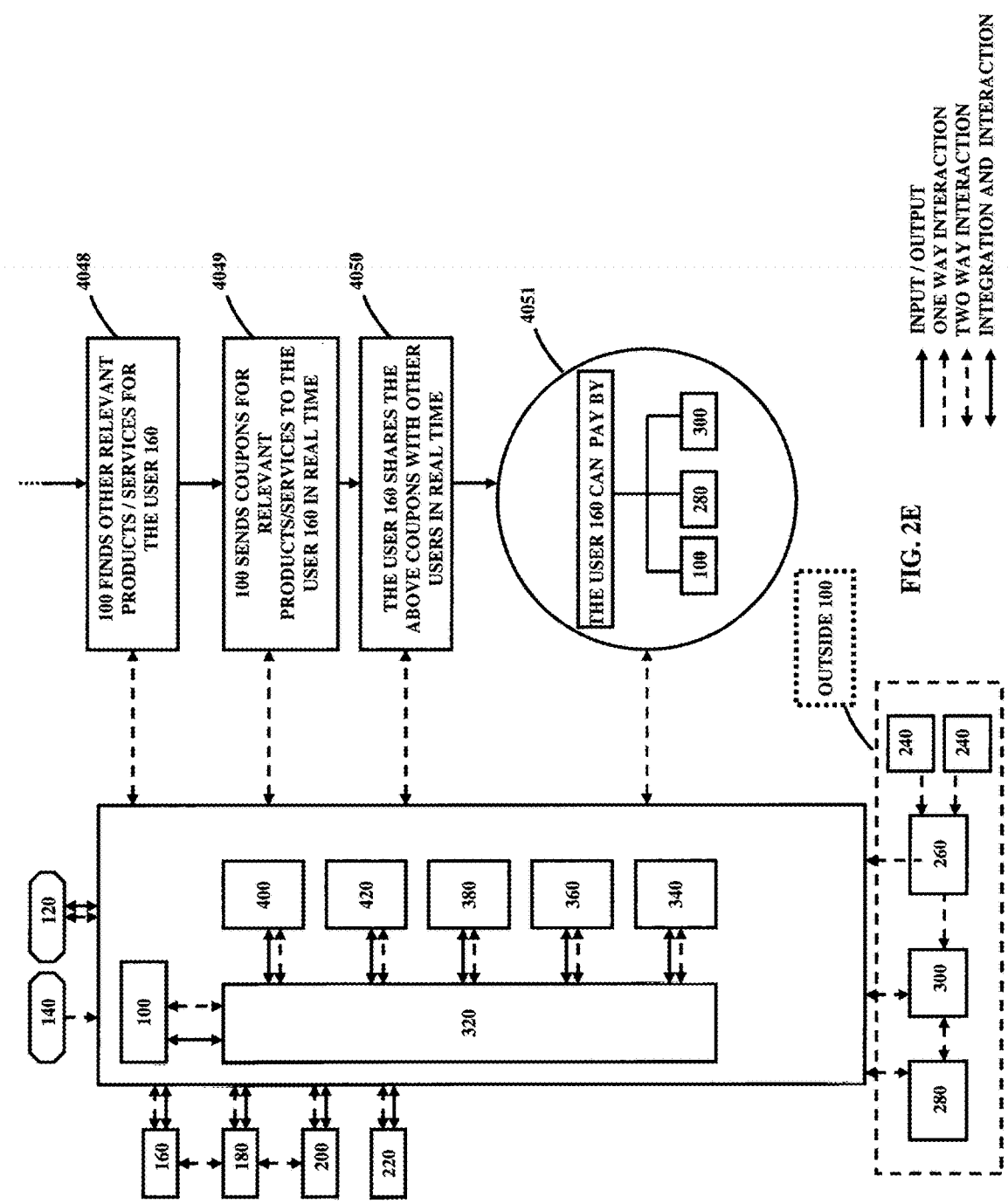
Figure 2F:
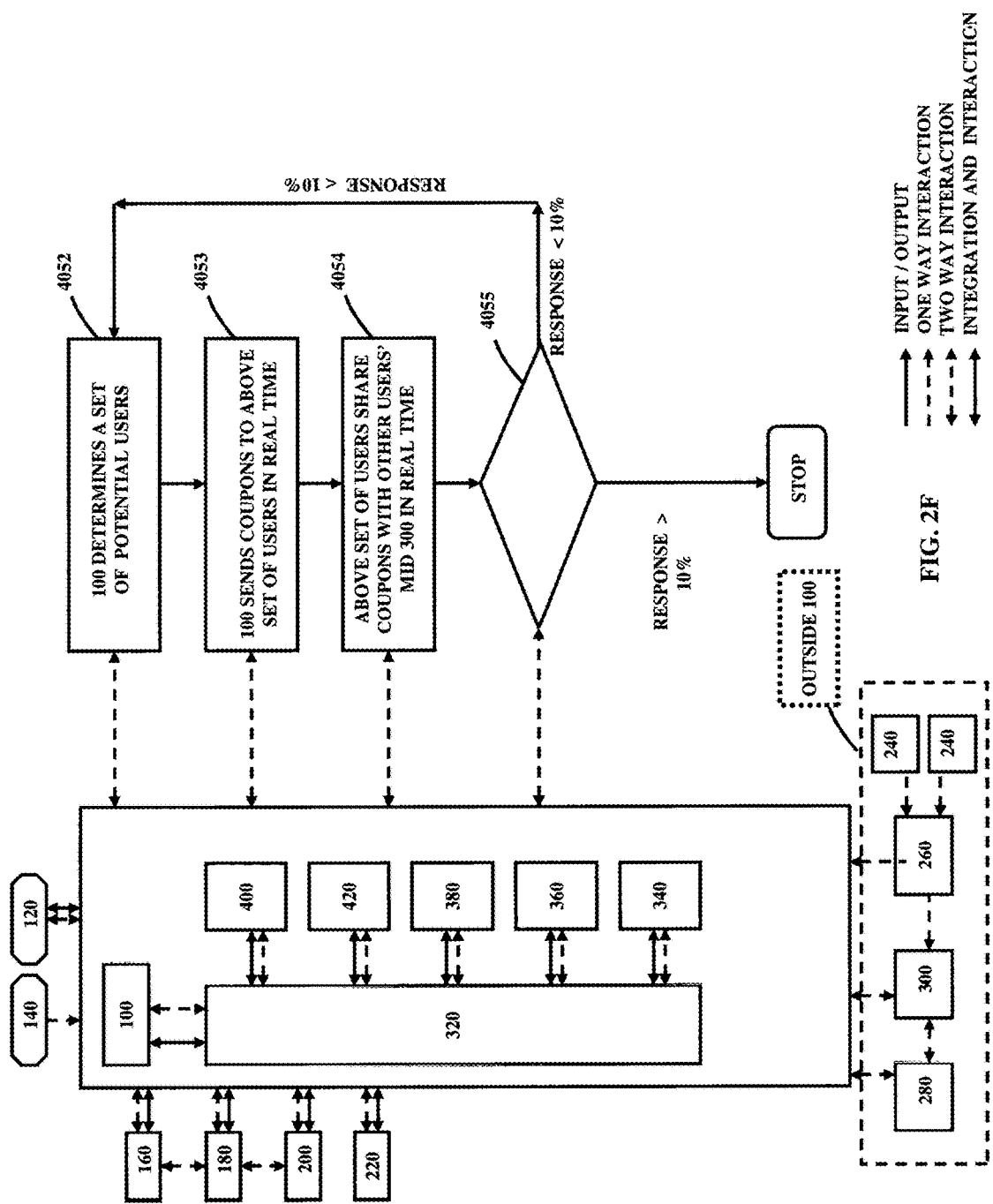
Figure 2G:
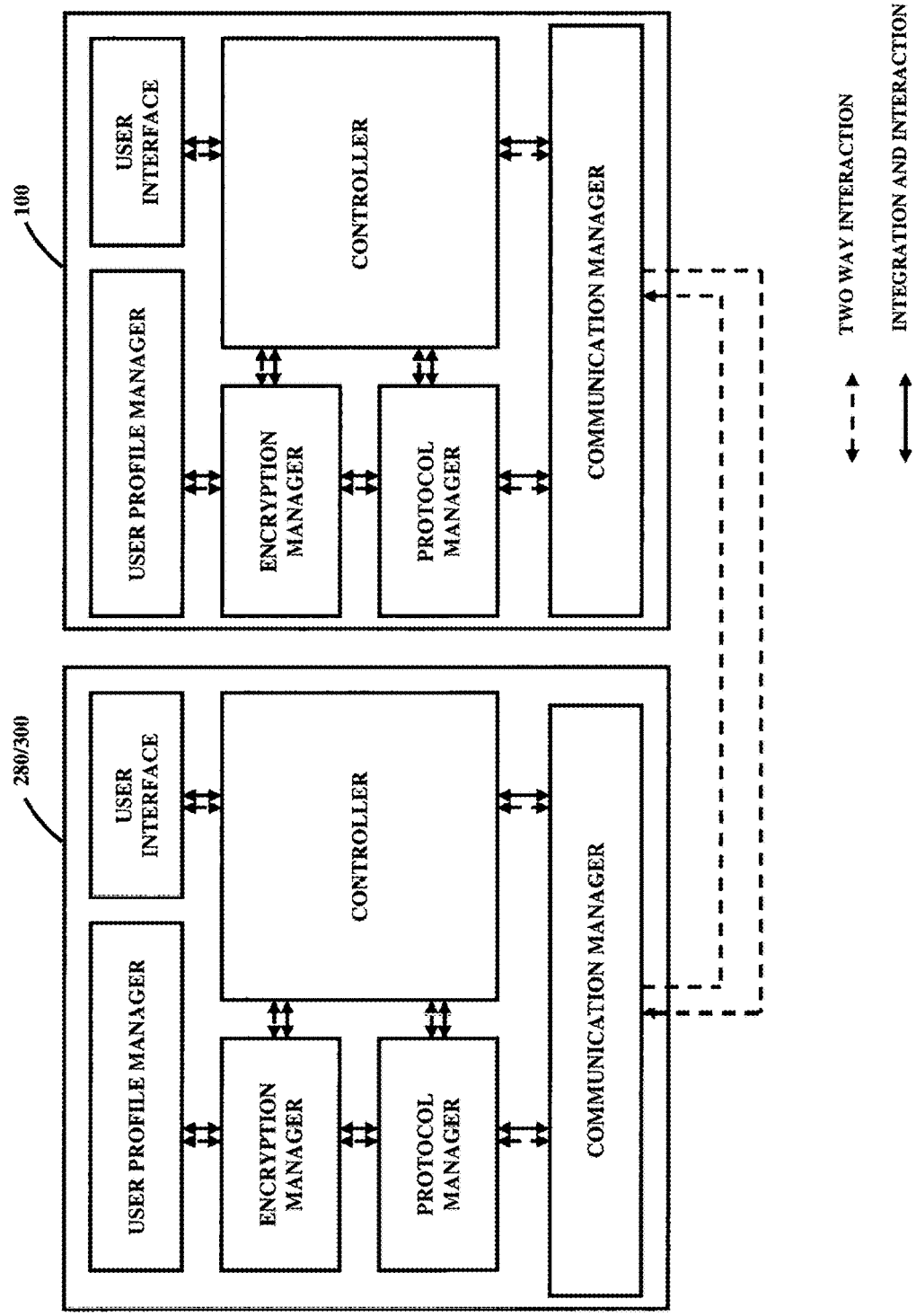

FIG. 2G illustrates how the social wallet electronic module 280 and/or mobile internet device 300 can communicate symmetrically with the social wallet 100 utilizing a controller, a user interface layer, a user profile management layer, an encryption management layer, a protocol management layer and a communication management layer.

A Trusted Service Manager can consolidate/integrate/simplify various services with service providers (e.g., banks, phone companies and other service providers).

Figure 2H:
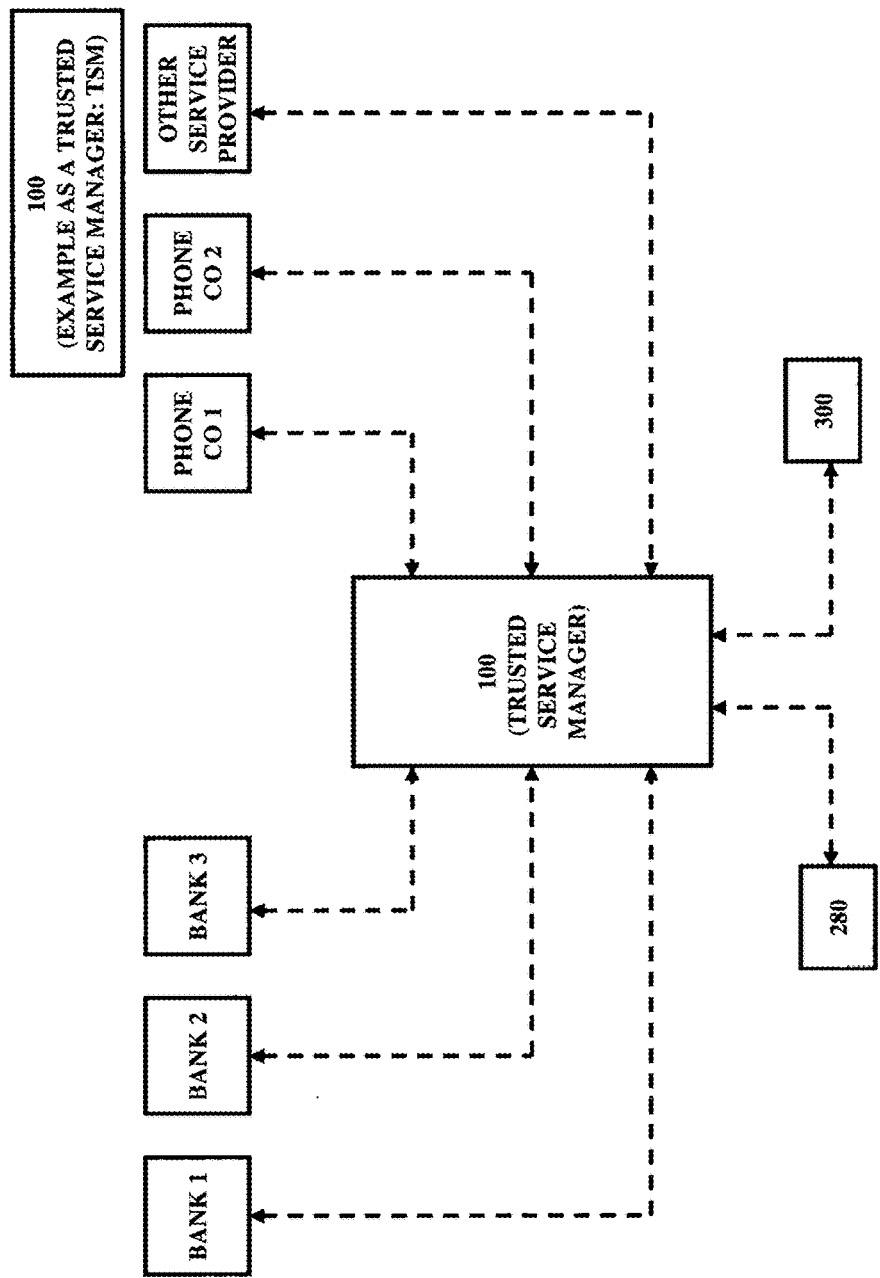

FIG. 2H illustrates how the social wallet 100 can function as the Trusted Service Manager to enable social electronic commerce utilizing the social wallet electronic module 280 and/or the mobile internet device 300. The Trusted Service Manager can be coupled with various service providers such as banks, phone companies and service providers.

Figure 3A:
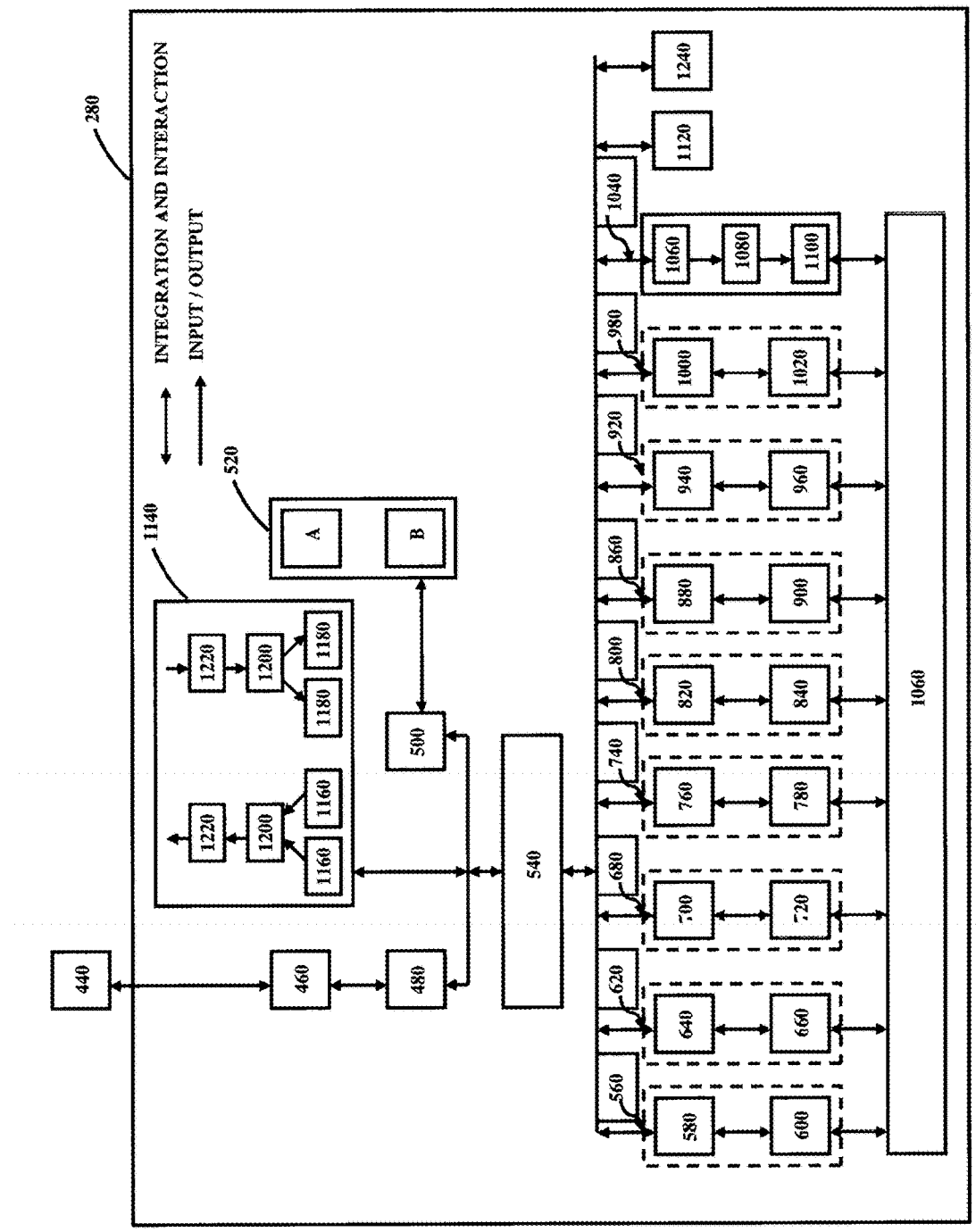
FIG. 3A illustrates a block diagram of a social wallet electronic module, according to one embodiment of the present invention.

FIG. 3A illustrates a block diagram of a social wallet electronic module 280 (preferably in a small form factor e.g., a SD/mini SD).

An external universal serial bus port 440 can connect with a universal serial bus (USB) connector 460. The universal serial bus connector 460 can be electrically coupled with a universal serial bus interface 480. The universal serial bus interface 480 can be electrically coupled with a computer readable medium (CRM) interface 500.

The computer readable medium interface 500 can be electrically coupled with a solid state non-volatile (e.g., a flash/memristor based ReRAM) storage/memory 520 to store information. The solid state non-volatile storage/memory 520 can be partitioned to have both private password protected storage/memory section (520-A) and a publicly viewable storage/memory section (520-B).

Furthermore, the solid state non-volatile memory 520 can store legally approved electronic cash (e.g., bitcoins, digital gold currency and webmoney with traceable serial numbers).

Both the universal serial bus interface 480 and the computer readable medium interface 500 can be electrically coupled with a microcontroller 540.

A biometric (e.g., finger print/retinal scan) sensor miniature electronic module 560 (an interface 580 and a component 600) can be electrically coupled with the microcontroller 540. The biometric sensor miniature electronic module 560 can enhance the security of the social wallet electronic module 280 by matching the stored biometric scan and instant biometric scan at a point of presence or at a point of use.

A near-field communication (NFC) miniature electronic module 620 (an interface 640 and a component 660) can be electrically coupled with the microcontroller 540. Near-field communication is a close proximity range 13.56 MHz wireless (or radio) protocol.

Near-field communication has two key components: an initiator and a target. The initiator actively generates an RF field that can electrically power a passive target without a battery.

A near-field communication tag contains simple data to a perform task (e.g., paying for a product or service and exchanging data between users). A near-field communication tag can securely store data (e.g., a personal identification number, debit/credit card information, loyalty card information, health records, physical access information, logical access information and digital rights access for local digital rights storage). But the near-field communication tag can also be re-writeable.

A Wibree (a low power-short range wireless (or radio) protocol) miniature electronic module 680 (an interface 700 and a component 720) can be electrically coupled with the microcontroller 540.

A DASH7 (a low power-moderate range wireless (or radio) protocol) miniature electronic module 740 (an interface 760 and a component 780) can be electrically coupled with the microcontroller 540. DASH7's electrical power requirements are about 10% of its next closest competitor (IEEE 802.15.4) and an even smaller fraction of WiFi and Bluetooth. With DASH7 miniature electronic module 720, the user 160 passing by a restaurant at a low velocity (e.g., about 5 mph) could simply click a "get info" button to seek a customer review of the restaurant, before the user 160 decides to eat at the restaurant or not.

A Bluetooth miniature electronic module 800 (an interface 820 and a component 840) can be electrically coupled with the microcontroller 540 to transmit and/or receive data.

A WiFi miniature electronic module 860 (an interface 880 and a component 900) can be electrically coupled with the microcontroller 540 to transmit and/or receive data.

An ultra wideband miniature electronic module 920 (an interface 940 and a component 960) can be electrically coupled with the microcontroller 540 to transmit and/or receive a vast quantity of data (e.g., a movie) in a short period of time.

A 60 GHz millimeter wave miniature electronic module 980 (an interface 1000 and a component 1020) can be electrically coupled with the microcontroller 540 to transmit and/or receive a vast quantity of data (e.g., a movie) in a short period of time. The 60 GHz millimeter wave miniature electronic module 980 can enable applications such as (a) wireless docking and (b) distributed storage.

A software-defined radio 1040 can be fabricated/constructed by integrating the tunable antenna 1060, a carbon nanotube tunable filter 1080 and an analog to digital converter 1100.

A tunable antenna 1060 can tune in between 2 GHz and 3 GHz by utilizing a carbon nanotube. The tunable antenna 1060 can merge/integrate many antennas into one single antenna.

The software-defined radio 1040 and tunable antenna 1060 can be electrically coupled with the microcontroller 540.

Additionally, a sensor (e.g., a wireless sensor-radio frequency identification (RFID) 1120 can be electrically coupled with the microcontroller 540.

Furthermore, a line-of-sight optical transceiver 1140 (integrating an array of multi-color light source modulators 1160, an array photodiodes 1180, two (2) waveguide combiner/decombiners 1200 and two (2) lenses 1220) can be electrically coupled with the microcontroller 540. The optical transceiver 1140 can transmit and/or receive a vast quantity of data (e.g., a movie) in a short period of time.

Additionally, an electrical power provider component (a thick-film/thin-film battery/solar cell/micro fuel-cell/supercapacitor) 1240 can be electrically coupled with the microcontroller 540.

Furthermore, the microcontroller 540 can be replaced by a high performance microprocessor 1360.

Figure 3B:
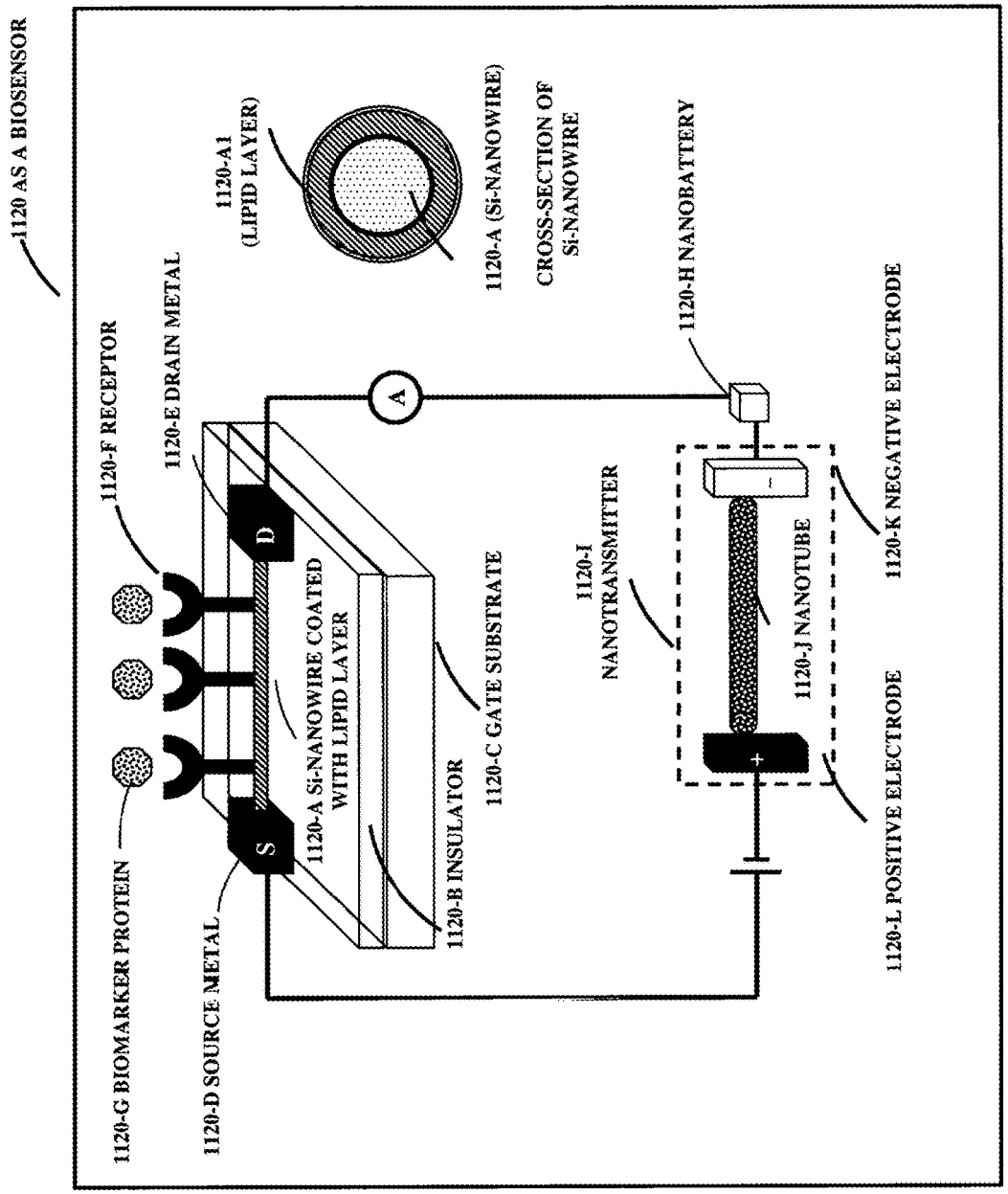
FIGS. 3B and 3C illustrate a block diagram of an application of a biosensor (as a sensor) of the social wallet electronic module, according to one embodiment of the present invention.
Figure 3C:
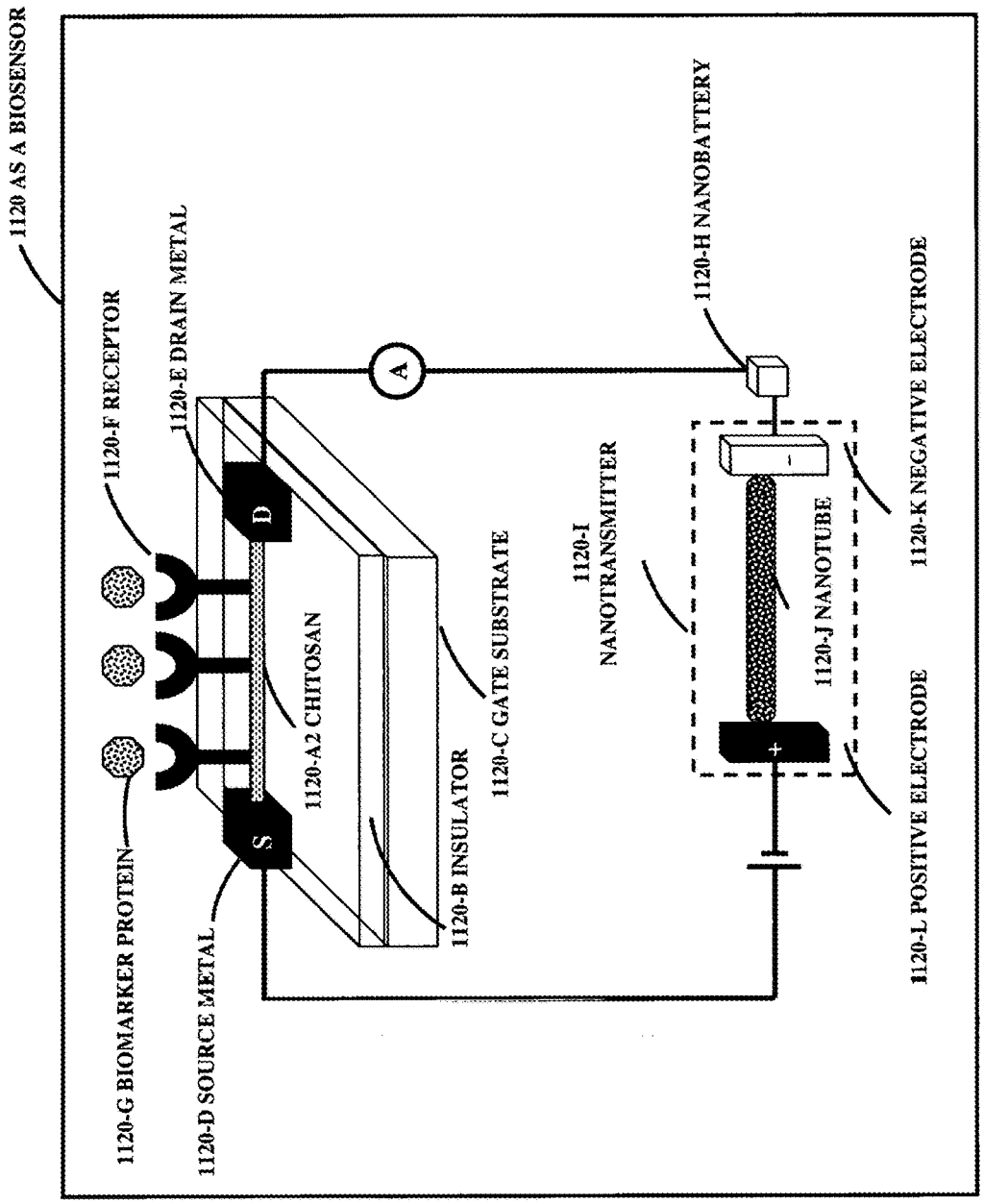

Furthermore the sensor 1120 can be a biosensor. FIGS. 3B and 3C are described in Tables-1 and Table-2 below:

TABLE 1

| FIG. 3B Legend | Description |
| --- | --- |
| 1120-A | Silicon Nanowire |
| 1120-A1 | Lipid Layer |
| 1120-B | Insulator (e.g., Silicon Dioxide) |
| 1120-C | Gate (e.g., Silicon Substrate) |
| 1120-D | Source Metal |
| 1120-E | Drain Metal |
| 1120-F | Receptor (e.g., Antibody or Aptamer) |
| 1120-G | Biomarker Protein |
| 1120-H | Nanobattery |
| 1120-I | Nanotransmitter |
| 1120-J | Nanotube (e.g., Carbon Nanotube) |
| 1120-K | Negative Electrode |
| 1120-L | Positive Electrode |

TABLE 2

| FIG. 3C Legend | Description |
| --- | --- |
| 1120-A2 | Chitosan |
| 1120-B | Insulator (e.g., Silicon Dioxide) |
| 1120-C | Gate (e.g., Silicon Substrate) |
| 1120-D | Source Metal |
| 1120-E | Drain Metal |
| 1120-F | Receptor (e.g., Antibody or Aptamer) |
| 1120-G | Biomarker Protein |
| 1120-H | Nanobattery |
| 1120-I | Nanotransmitter |
| 1120-J | Nanotube (e.g., Carbon Nanotube) |

TABLE 2-continued

| FIG. 3C Legend | Description |
| --- | --- |
| 1120-K | Negative Electrode |
| 1120-L | Positive Electrode |

FIG. 3B illustrates an application of the biosensor 1120, which can be integrated with the social wallet electronic module 280. In 1120, a silicon nanowire field effect transistor (FET), a source is identified by S, a drain is identified by D and a gate is identified by G. Furthermore, the silicon nanowire can be coated with a lipid layer and integrated with receptors on the lipid layer. The receptors can chemically bind with a biomarker protein (e.g., a disease biomarker protein)—thus giving rise to electrical signals (due to changes in the electrical properties of the silicon nanowire), further transmitted by a nanotube (e.g., a carbon nanotube) based wireless (or radio) transmitter. The nanotube based wireless (or radio) transmitter can be electrically powered with a nanobattery.

FIG. 3C illustrates a disease detection application of the biosensor 1120, which can be integrated with the social wallet electronic module 280. In 1120, chitosan proton (ionic) field effect transistor ($H^+$ FET), a source is identified by S, a drain is identified by D and a gate is identified by G. Furthermore, chitosan can be integrated with receptors. The receptors can chemically bind with a biomarker protein (e.g., a disease biomarker protein)—thus giving rise to electrical signals (due to changes in the electrical properties of chitosan), further transmitted by a nanotube (e.g., a carbon nanotube) based wireless (or radio) transmitter. The nanotube based wireless (or radio) transmitter can be electrically powered with a nanobattery.

Furthermore, the biosensor 1120 can be integrated with the near-field communication miniature electronic module 620 on a human body can enable smart biosensor, which can transmit vital health data to a near-field communication terminal.

Figure 3D:
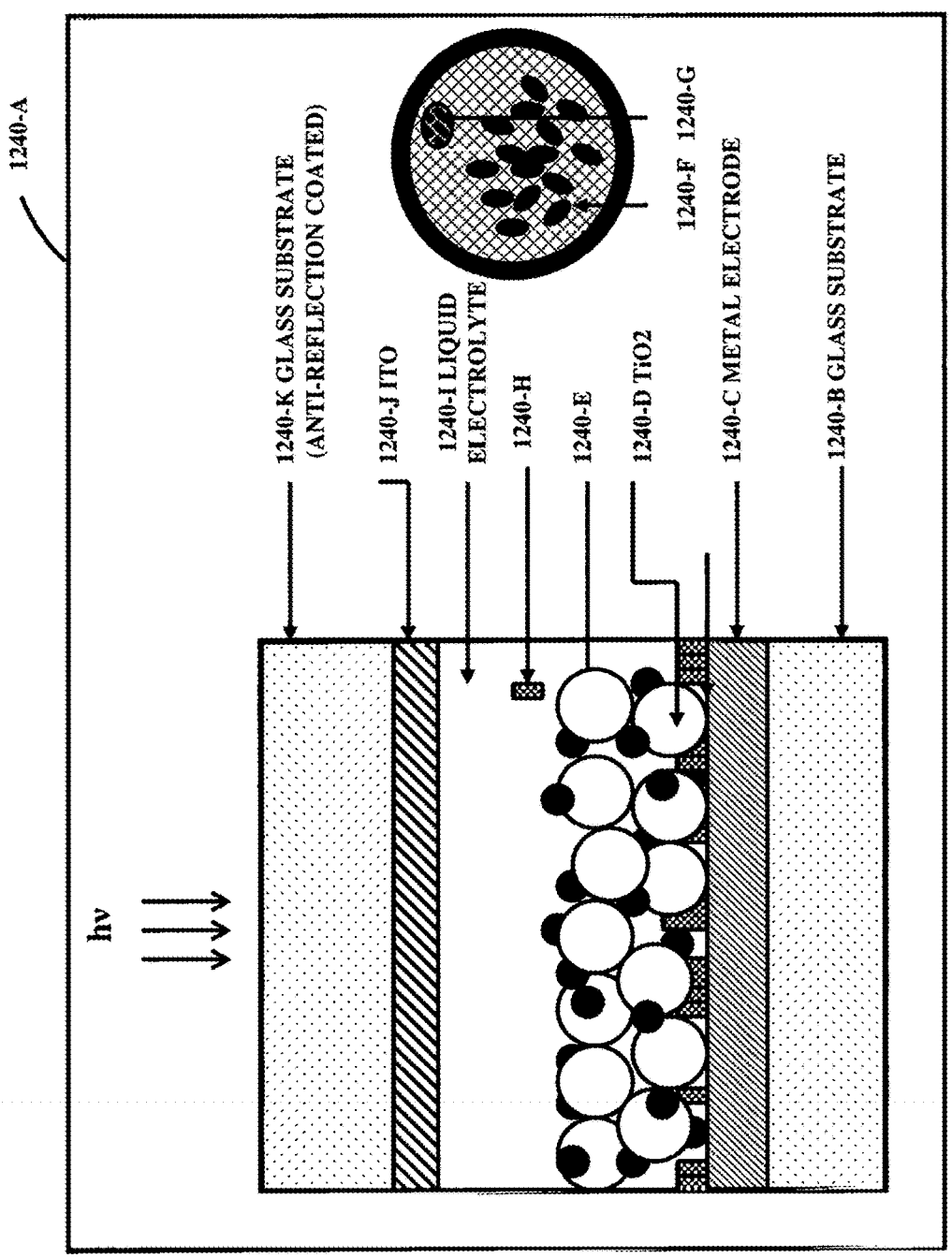
FIGS. 3D, 3E and 3F illustrate cross-section diagrams of various configurations of a solar cell (an electrical power providing component) of the social wallet electronic module and/or a mobile internet device, according to one embodiment of the present invention.

FIG. 3D illustrates a solar cell 1240-A as an electrical power provider component. About 2 micron thick meso-porous $TiO_2$ thin-film 1240-D can be coated with nanocrystals/nanoshells 1240-E. The nano crystals/nanoshells 1240-E can cage/encapsulate light-absorbing organic dye molecules (e.g., porphyrins and/or phthalocyanines) 1240-F. Furthermore, the nanocrystals/nanoshells 1240-E can contain another specific molecule 1240-G for energy transfer upon excitation.

The nanocrystals/nanoshells 1240-E can be also varied in diameter to have an absorption over wider wavelength range in order for the solar cell 1240-A to be more efficient (for light to electricity conversion).

Furthermore, the solar cell 1240-A could be made more efficient (for light to electricity conversion) with an addition of an array of nanotubes (e.g., carbon or boron nitride nanotubes) 1240-H.

The meso-porous TiO2 thin-film 1240-D can be sandwiched between two electrodes: indium tin oxide transparent front electrode 1240-J and back metal (e.g., aluminum, silver or platinum) electrode 1240-C.

Furthermore, the back metal electrode 1240-C can be fabricated/constructed with nanocorrugated plasmonic reflectors to trap more residual light inside the solar cell 1240-A.

The meso-porous $TiO_2$ thin-film 1240-D can be immersed within a liquid ionic electrolyte solution 1240-I.

Figure 3E:
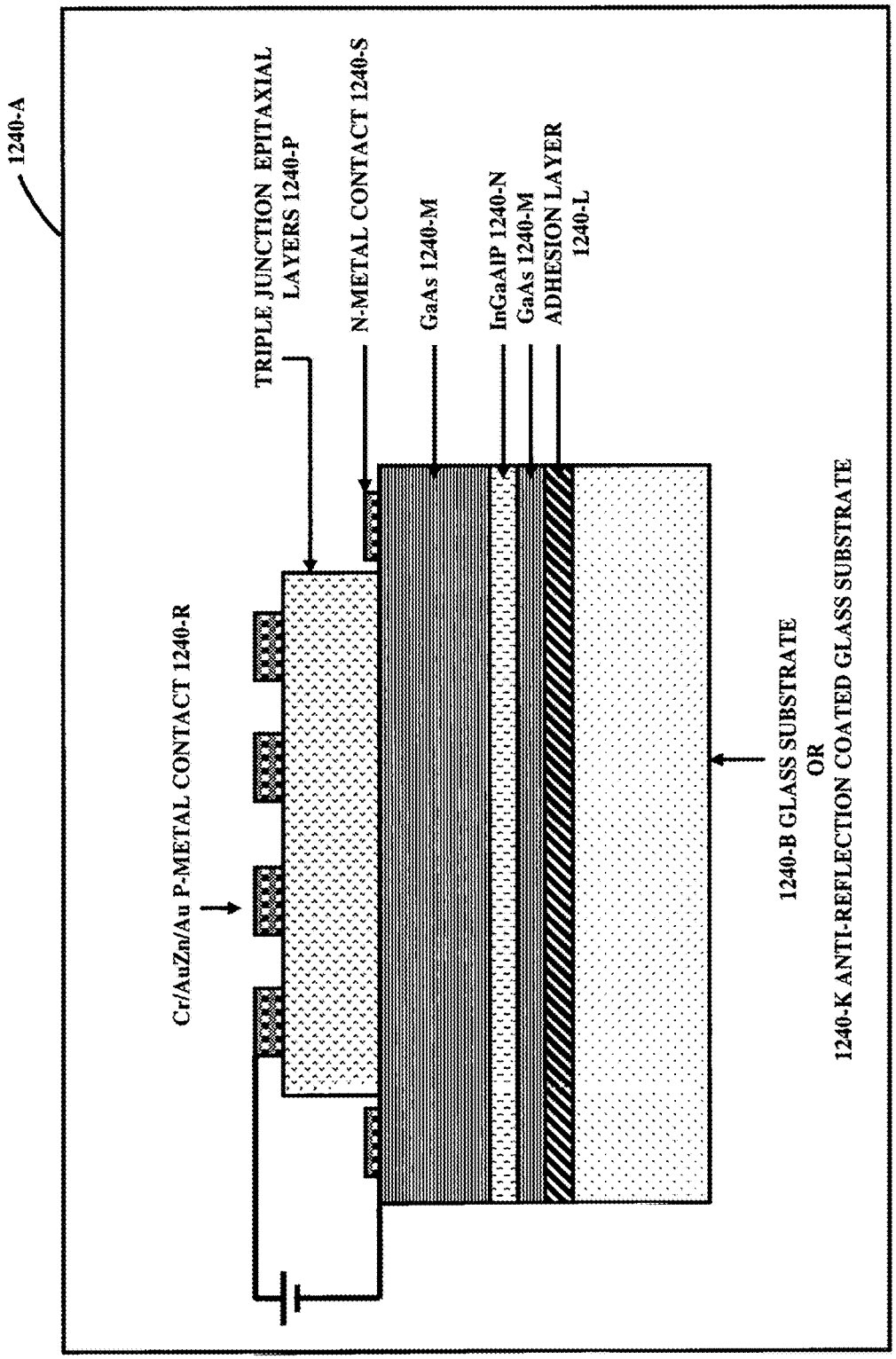

FIG. 3E illustrates a solar cell 1240-A as an electrical power provider component. Triple junction semiconductor epitaxial layers 1240-P can be purchased from Microlink Devices. The critical element of this embodiment is (a) chemically separating (by selectively etching 50 nanometers thick AlAs layer in hydrofluoric (HF) acid), (b) lifting (by covering the patterned front device side with a black wax) triple junction semiconductor epitaxial layers 1240-P, all other relevant layers (such as GaAs layer 1240-M and InGaAlP layer 1240-N), p-metallization 1240-R and n-metallization 1240-S, (c) bonding onto the glass substrate 1240-B with an adhesion layer 1240-L and (d) finally dissolving the black wax in trichloroethylene (TCE).

Figure 3F:
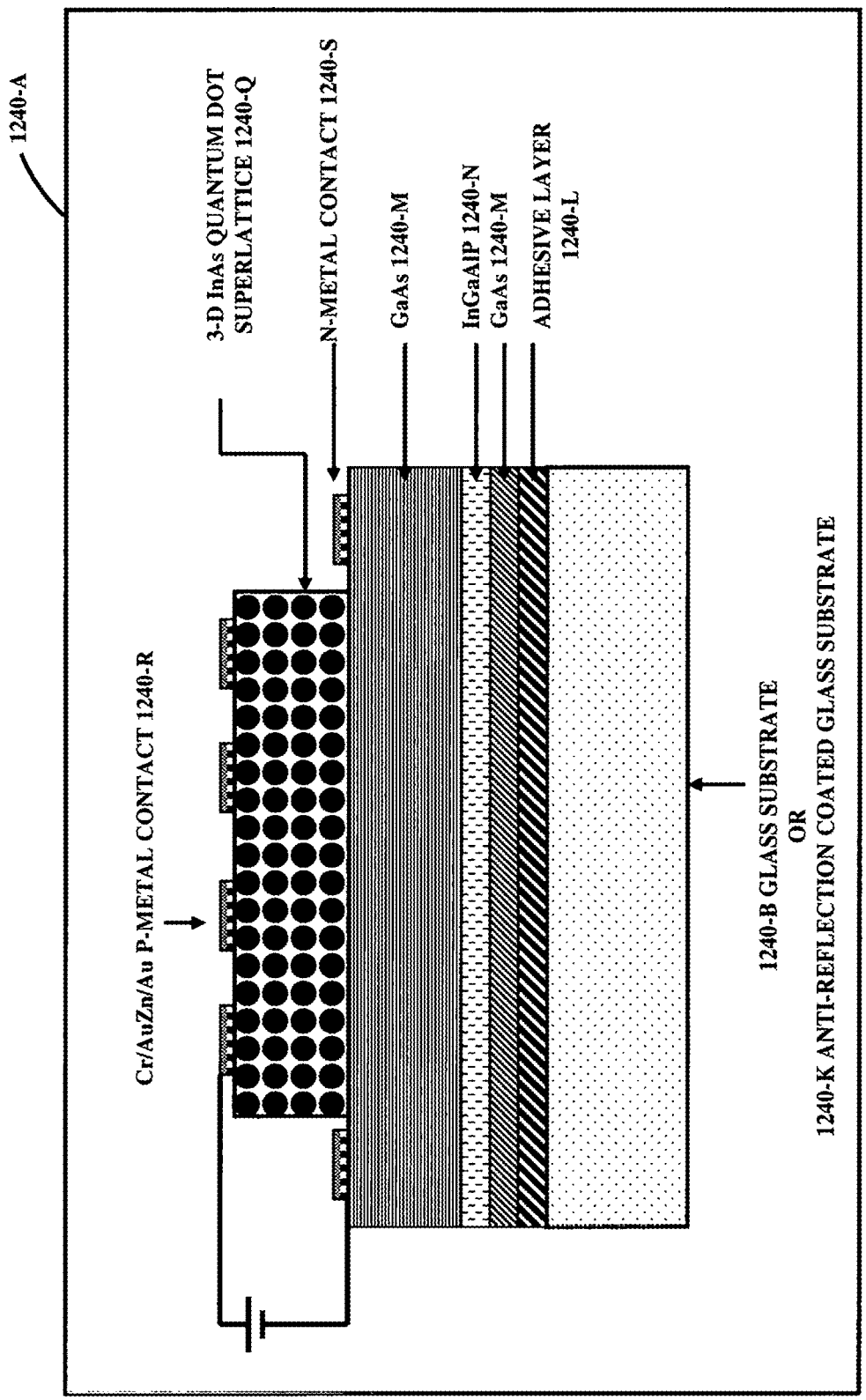

FIG. 3F illustrates a cross-section of a solar cell 1240-A as the electrical power provider component. The critical element of this embodiment is (a) chemically separating (by selectively etching 50 nanometers thick AlAs layer in hydrofluoric acid), (b) lifting (by covering the patterned front device side with a black wax) three-dimensional (3-D) quantum dot superlattice of InAs 1240-Q, all other relevant layers (such as GaAs layer 1240-M and InGaAlP layer 1240-N), p-metallization 1240-R and n-metallization 1240-S, (c) bonding onto the glass substrate 1240-B with an adhesion layer 1240-L and (d) finally dissolving the black wax in trichloroethylene.

Figure 3G:
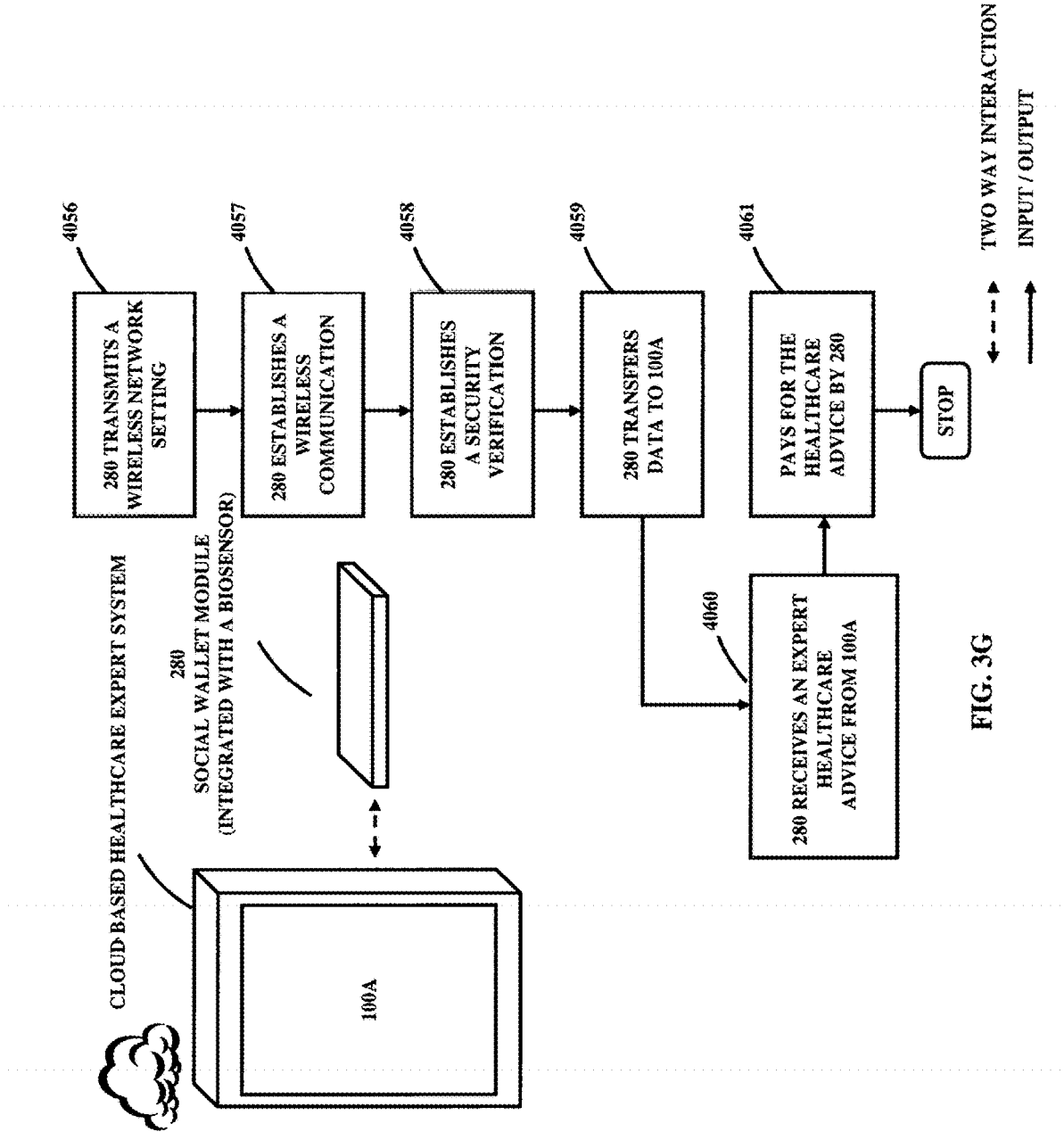
FIG. 3G illustrates a healthcare (as a virtual doctor) related application of the social wallet electronic module, according to one embodiment of the present invention.

FIG. 3G illustrates a healthcare related application of the social wallet electronic module 280: how the social wallet electronic module 280 can be utilized to obtain a healthcare related advice from a healthcare expert system (a virtual doctor) at a cloud server. The social wallet electronic module 280 can be integrated with a biosensor. In step 4056, the social wallet electronic module 280 transmits wireless (or radio) network settings to the cloud based healthcare expert system (the virtual doctor) 100A. In step 4057, the social wallet electronic module 280 establishes wireless (or radio) connection with the cloud based healthcare expert system (the virtual doctor) 100A. In step 4058, the social wallet electronic module 280 establishes security verification with the cloud based healthcare expert system (the virtual doctor) 100A. In step 4059, the social wallet electronic module 280 transfers the user's health related data to the cloud based healthcare expert system (the virtual doctor) 100A. In step 4060, the social wallet electronic module 280 receives an expert healthcare advice from the cloud based healthcare expert system (the virtual doctor) 100A. In step 4061, the user 160 pays by the social wallet electronic module 280 for the expert advice received from the cloud based healthcare expert system (the virtual doctor) 100A.

Figure 3H:
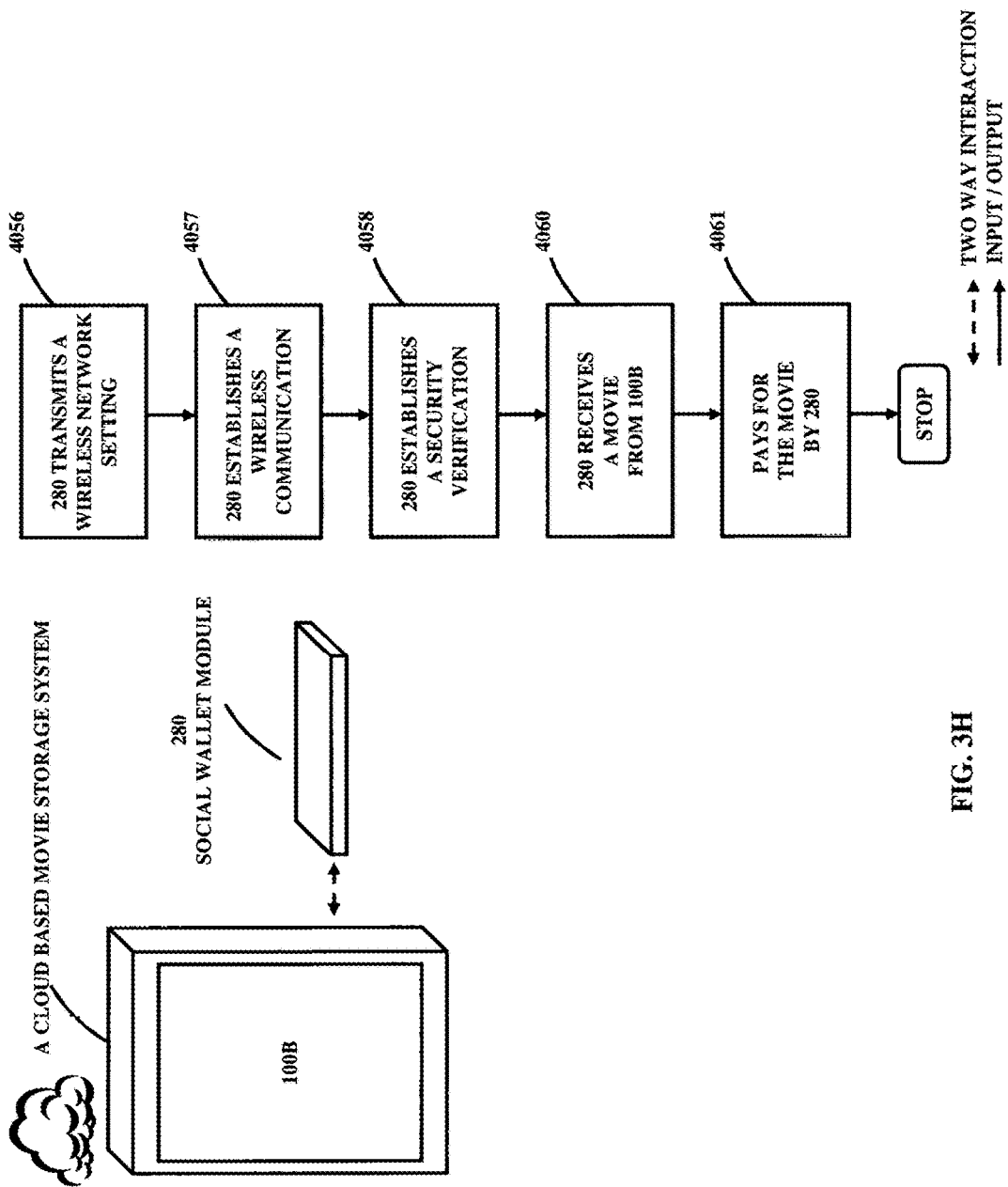
FIG. 3H illustrates a consumer related application of the social wallet electronic module, according to one embodiment of the present invention.

FIG. 3H illustrates a consumer related application of the social wallet electronic module 280: how the social wallet electronic module 280 can be utilized to obtain a movie from a cloud based movie storage system 100B. In step 4056, the social wallet electronic module 280 transmits wireless (or radio) network setting(s) to the cloud based movie storage system 100B. In step 4057, the social wallet electronic module 280 establishes wireless (or radio) connection with the cloud based movie storage system 100B. In step 4058, the social wallet electronic module 280 establishes security verification with the cloud based movie storage system 100B. In step 4060, the social wallet electronic module 280 receives a movie from the cloud based movie storage system 100B. In step 4061, the user 160 pays for the movie received from the cloud based movie storage system 100B by the social wallet electronic module 280.

Figure 4:
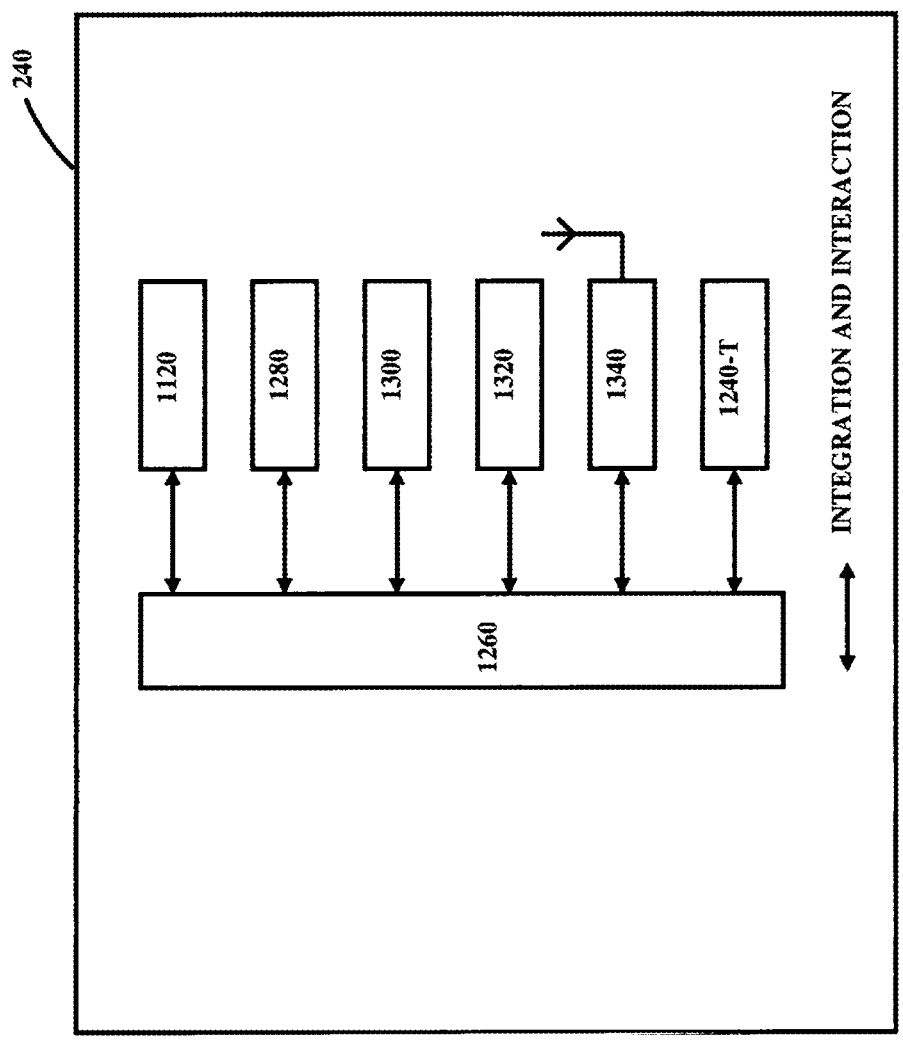
FIG. 4 illustrates a block diagram of an object, according to one embodiment of the present invention.

Alternatively, a movie storage system can be located at widely distributed (and conveniently located) kiosks instead of a cloud based movie storage system 100B FIG. 4 illustrates a block diagram of the object 240. The object 240 has an ultra-low power consumption and miniature medium performance microprocessor (e.g., Ambiq Micro or InAs-on-Insulator based microprocessor or a memristor) 1260, which can be electrically coupled with: (a) a sensor (e.g., a wireless sensor-radio frequency identification) 1120, (b) an optional IP/micro IP/light weight IP address 1280, (c) a miniature memory/storage (e.g., a memristor) 1300, (d) an embedded tiny operating algorithm/executable set of instructions 1320 (e.g., Tiny OS), (e) a low power "object-specific" miniature wireless (or radio) transmitter (e.g., a radio frequency identification and/or Wibree and/or Bluetooth and/or WiFi and/or near-field communication and/or DASH7) with a miniature antenna 1340 and (f) an "object-specific" miniature electrical power provider component 1240-T (which can be the solar cell 1240-A in a miniature form).

Furthermore, the object 240 can also be a biological object on or within (e.g., implanted) a human body.

The object 240 can utilize semiconductor fabrication, micro-electromechanical systems fabrication, plastic electronics fabrication, printed electronics fabrication, multi-chip module fabrication (packaging), three-dimensional fabrication (packaging) and microfluidic fabrication.

Furthermore the object 240 can have an outer external case.

The array of objects 240 can connect to the node (e.g., a node with an internet connection) 260. The node 260 can map, sense, measure, collect, aggregate, compare information collected from the array of objects 240. The node 260 can share/communicate information with the social wallet 100 and/or electronic social wallet electronic module 280 and/or mobile internet device 300.

Furthermore the electronic social wallet electronic module 280 and/or mobile internet device 300 can proximity contact or physically contact with the object 240 to communicate for relevant information.

Figure 5A:
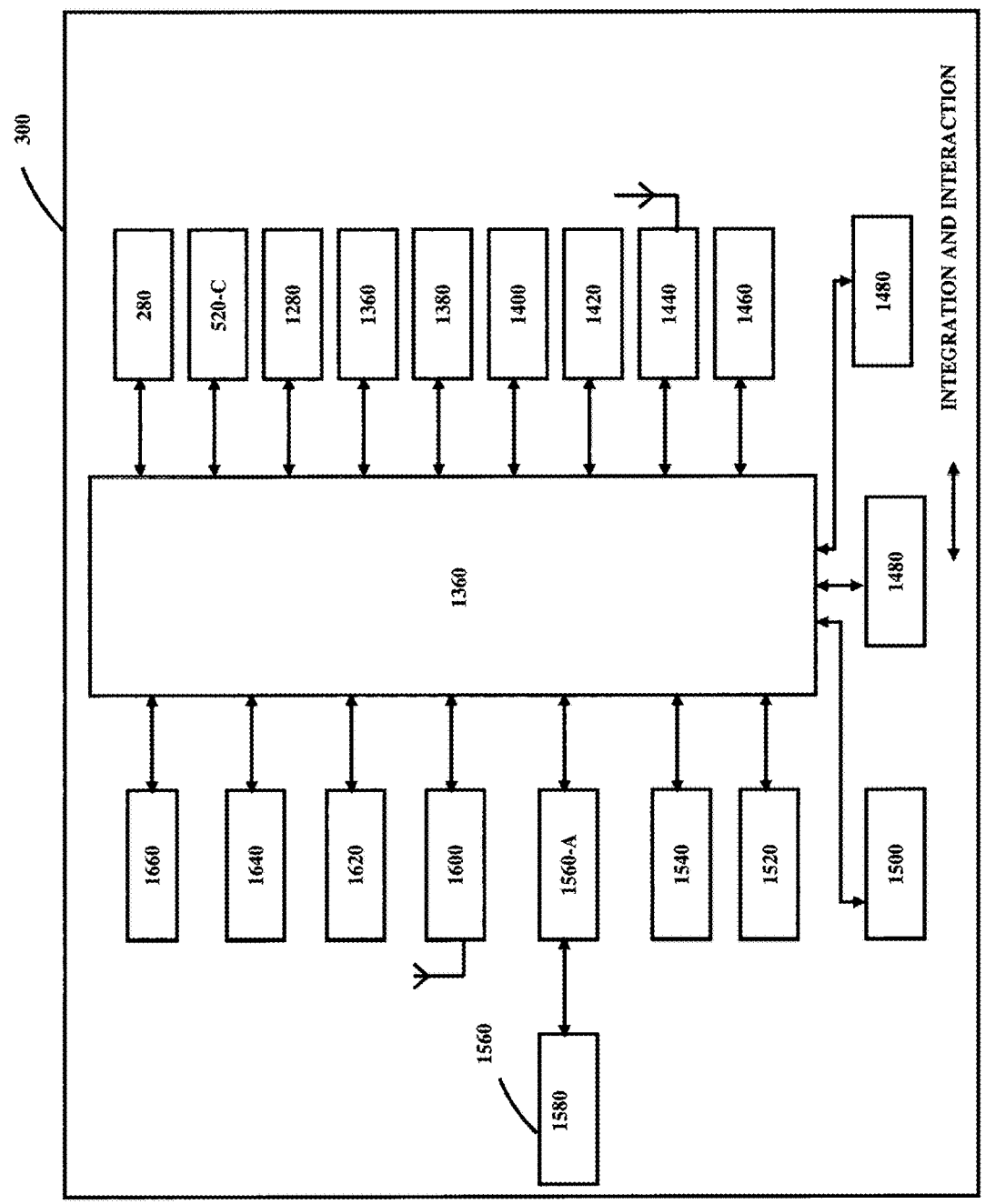
FIG. 5A illustrates a block diagram of the mobile internet device, according to one embodiment of the present invention.

FIG. 5A illustrates a block diagram of the mobile internet device 300. The mobile internet device 300 is about 125 mm long, 75 mm wide and 20 mm thick. It has the high performance microprocessor (e.g., Intel's x86 based Medfield) 1360, which can be electrically coupled with (a) a social wallet electronic module 280, (b) a general data storage electronic module 520-C, (c) an IP/micro IP/light weight IP address 1280, (d) a lab-on-chip electronic module (a biological diagnostics electronic module) 1360, (e) an embedded operating algorithm 1380 stored in the general data storage electronic module 520-C, (f) an internet security algorithm (internet firewall/spyware/user-specified security control and authentication) 1400, (g) a one-dimensional/two-dimensional barcodes/quick response codes reader 1420, (h) a miniature wireless (or radio) electronic module (e.g., radio frequency identification/Bluetooth/WiFi/global positioning system with antenna(s)) 1440 for indoor/outdoor location measurement, (i) an electronic compass 1460, (j) two (2) cameras (a 180 degree rotating camera is preferred, instead of two cameras—one for video chat and one for photo taking) 1480, (k) a video conferencing (integrated with a dynamic video compression module—which could be either an electronic module and/or an algorithm) system-on-chip 1500, (l) a display component 1520, (m) a micro-projector 1540, (n) a sketch pad (with a write/erase option) electronic module 1560, which includes a sketch pad-specific miniature electronic module 1560-A with a stylus 1580, (o) a communication wireless (or radio) transceiver electronic module (e.g., WiMax/LTE) with antenna(s) 1600, (p) a personal awareness assistant miniature electronic module 1620, (q) a voice-to-text-to-voice conversion algorithm 1640 and (r) an algorithm 1660.

A multi-touch high definition liquid crystal display (integrated with an array of thin-film transistors on indium gallium zinc oxide) can be utilized as a display component 1520.

Organic light emitting (red, green and blue) diodes driven by an array of organic thin-film transistor on an organic substrate (e.g., plastic) can also be utilized as a rolled up/stretchable display component 1520. The rolled up/stretchable display component 1520 can minimize a display size related distinction between a portable computer and the mobile internet device 300.

Furthermore, a display component 1520 can enable a dual-view to show entirely two separate scenes simultaneously.

Furthermore, the algorithm 1660 includes: (a) a physical search algorithm, (b) an algorithm-as-a-service, (c) an intelligent rendering algorithm (e.g., artificial intelligence, behavior modeling, data interpretation, data mining, fuzzy logic, machine vision, natural language processing, neural networks, pattern recognition and reasoning modeling) and (d) a self-learning (including relearning) algorithm.

In the context of the mobile internet device 300, data can be compared with respect to a set of parameters to learn or relearn continuously by analyzing patterns of data, where patterns of data can consist/utilize/couple the algorithm 1660.

The algorithm 1660 of the mobile internet device 300 includes the intelligent rendering algorithm (e.g., artificial intelligence, behavior modeling, data interpretation, data mining, fuzzy logic, machine vision, natural language processing, neural networks, pattern recognition and reasoning modeling).

In the context of the social wallet 100, data can be compared with respect to a set of parameters to learn or relearn continuously by analyzing patterns of data, where patterns of data can consist/utilize/couple the fuzzy logic algorithm 360, the intelligence rendering algorithm 400 and the self-learning (including relearning) algorithm 420.

Furthermore, this continually learned analysis along with a predictive algorithm 380 can enable the social wallet 100 to identify a set of users with particular parameters for a targeted advertisement.

The antenna for the communication wireless (or radio) transceiver 1600 of the mobile internet device 300 can be fabricated/constructed from metamaterial. Metamaterial is a material of designer crystal structure combining two materials (e.g., lead selenide and iron oxide).

Furthermore the antenna can be integrated with/onto an outer external case of the mobile internet device 300.

The outer external case of the mobile internet device 300 can be fabricated/constructed from a nano-engineered aluminum/magnesium alloy, a liquid metal alloy and glass.

The outer external case of the mobile internet device 300 can also be fabricated/constructed from carbon fiber embedded with plastic. Carbon fibers can be inserted into an injection mold of a plastic film and bonded to the molten injection mold of the plastic film, thereby forming a composite material of carbon fibers and plastic film.

Figure 5B:
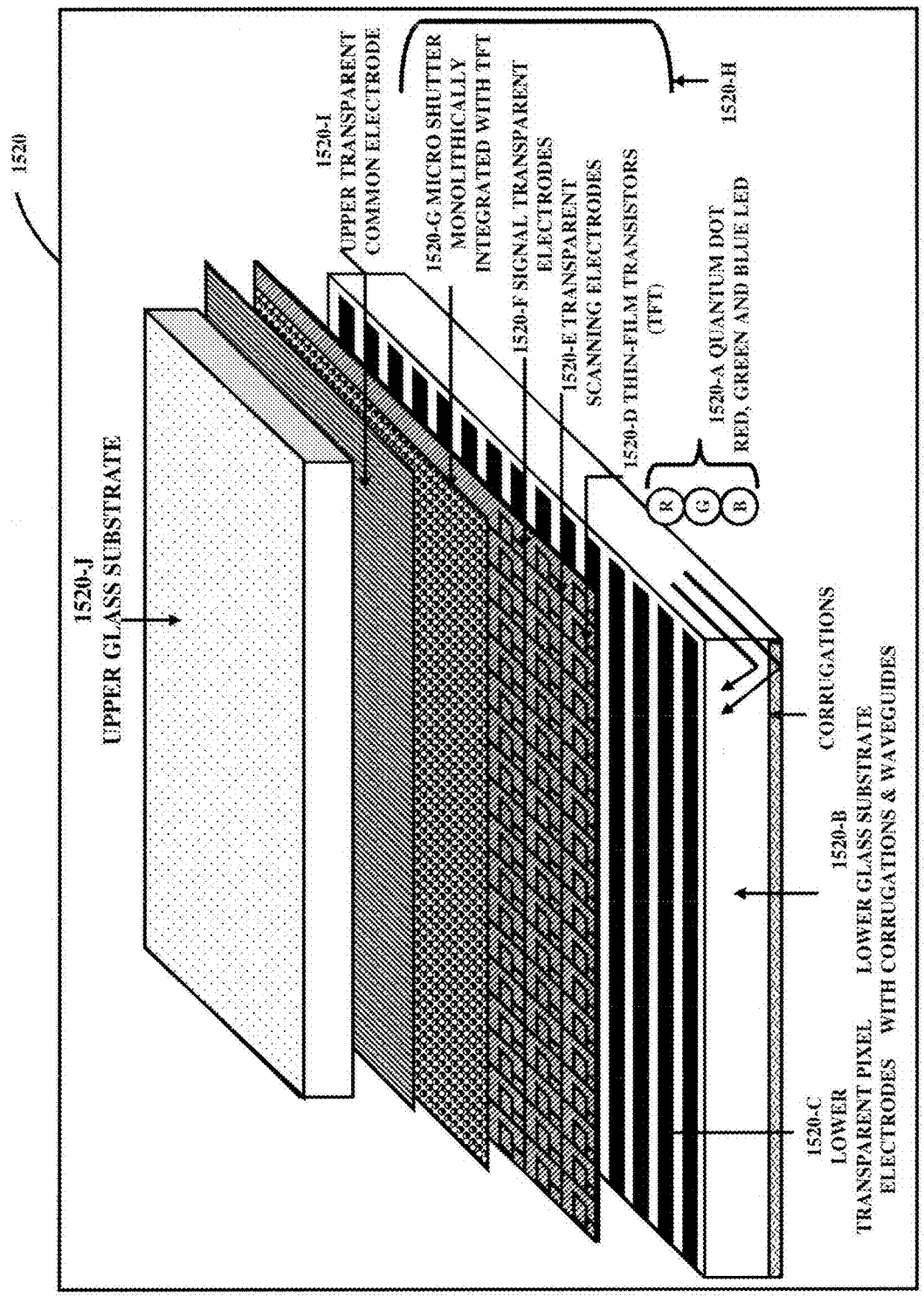
FIG. 5B illustrates a cross-section of the display component of the mobile internet device, according to one embodiment of the present invention.

FIG. 5B illustrates a cross-section of a display component 1520 of the mobile internet device, which utilizes highly efficient quantum dot light emitting diodes 1520-A (red, green and blue) incident at an angle with respect to the lower glass substrate 1520-B. The lower glass substrate 1520-B has built-in corrugations and waveguides to enable reflection of incident light from the quantum dot light emitting diodes 1520-A.

Table-3 below describes subcomponents required to fabricate/construct the display component 1520. The critical subcomponents are micro-electromechanical systems micro shutters, which are monolithically integrated with an array of thin-film transistors (e.g., fabricated/constructed on zinc oxide or zinc-indium-tin oxide or graphene oxide).

This can enable an efficient high brightness display component 1520 at lower electrical power consumption, eliminating two (2) polarizer filter films, color filter and liquid crystal. This is substantially compatible with standard display component manufacturing methods/processes.

TABLE 3

| FIG. 5B Legend | Description |
| --- | --- |
| 1520-A | Quantum Dot Light Emitting Diodes (Red, Green & Blue) |
| 1520-B | Lower Glass Substrate With Built-In Corrugations & Waveguides |
| 1520-C | Array Of Transparent Lower Pixel Electrodes |
| 1520-D | Array Of Thin-Film Transistors |
| 1520-E | Scanning Transparent Electrodes |
| 1520-F | Signal Transparent Electrodes |
| 1520-G | Micro-Electromechanical Systems Micro Shutters Monolithically Integrated With A Thin-Film Transistor |
| 1520-H | Monolithic Integration Of 1520-D, 1520-E, 1520-F & 1520-G |
| 1520-I | Transparent Upper Common Electrode |
| 1520-J | Upper Glass Substrate |

Furthermore, a quantum dot white light emitting diode (with a specific thin-film color filter (to transmit only optically filtered red or green or blue light), preferably located below the upper glass substrate) can be used instead of a quantum dot red light emitting diode, a quantum dot green light emitting diode and a quantum dot blue light emitting diode.

The thin-film transistor 1520-D located at each pixel can control an image at each pixel of the display component 1520. However, the thin-film transistor 1520-D can also have a light sensing circuitry to sense the light reaching the pixel of the display component 1520 from its surroundings, enabling a possibility of new user experience with the display component 1520.

Figure 5C:
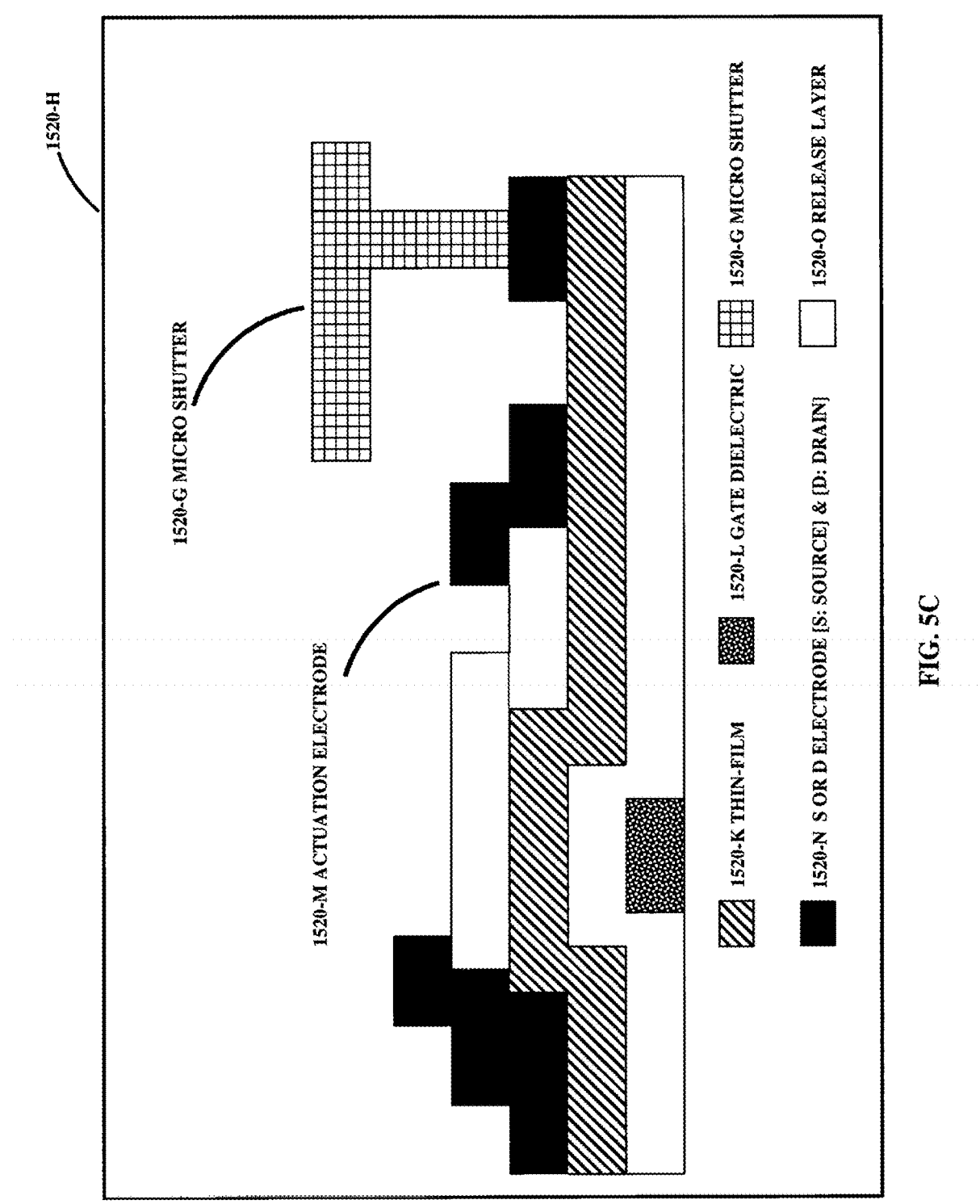
FIG. 5C illustrates a cross-section of a micro-electromechanical systems (MEMS) micro shutter, monolithically integrated with an array of thin-film transistors (TFTs), according to one embodiment of the present invention.

FIG. 5C illustrates 1520-H: a micro-electromechanical systems micro shutter 1520-G, which can be monolithically integrated with the array of thin-film transistors 1520-D (e.g., fabricated/constructed on zinc oxide or zinc-indium-tin oxide or graphene oxide).

Table-4 below describes subcomponents required to fabricate/construct the micro-electromechanical systems micro shutter 1520-G, which can be monolithically integrated with the array of thin-film transistors 1520-D (e.g., fabricated/constructed on zinc oxide or zinc-indium-tin oxide or graphene oxide).

TABLE 4

| FIG. 5C Legend | Description |
| --- | --- |
| 1520-K | Thin-Film |
| 1520-L | Gate Dielectric |
| 1520-G | Micro Shutter |
| 1520-N | Source Electrode Or Drain Electrode |
| 1520-M | Actuation Electrode |
| 1520-O | Release Layer |

Figure 5D:
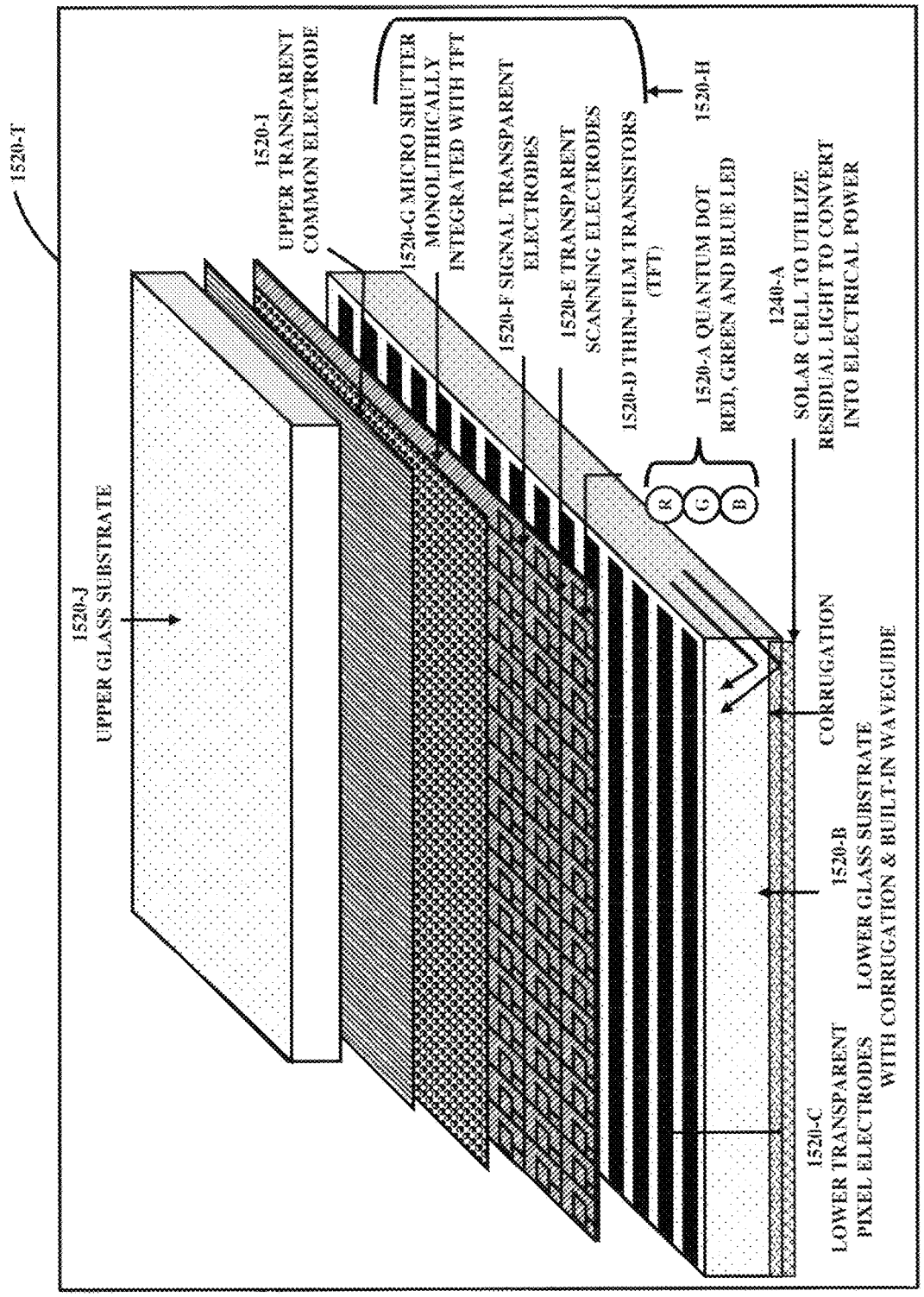
FIG. 5D illustrates a cross-section of the display component integrated with the solar cell of the mobile internet device, according to one embodiment of the present invention.

FIG. 5D illustrates a cross-section of a display component 1520-T integrated with the solar cell 1240-A.

Figure 5E:
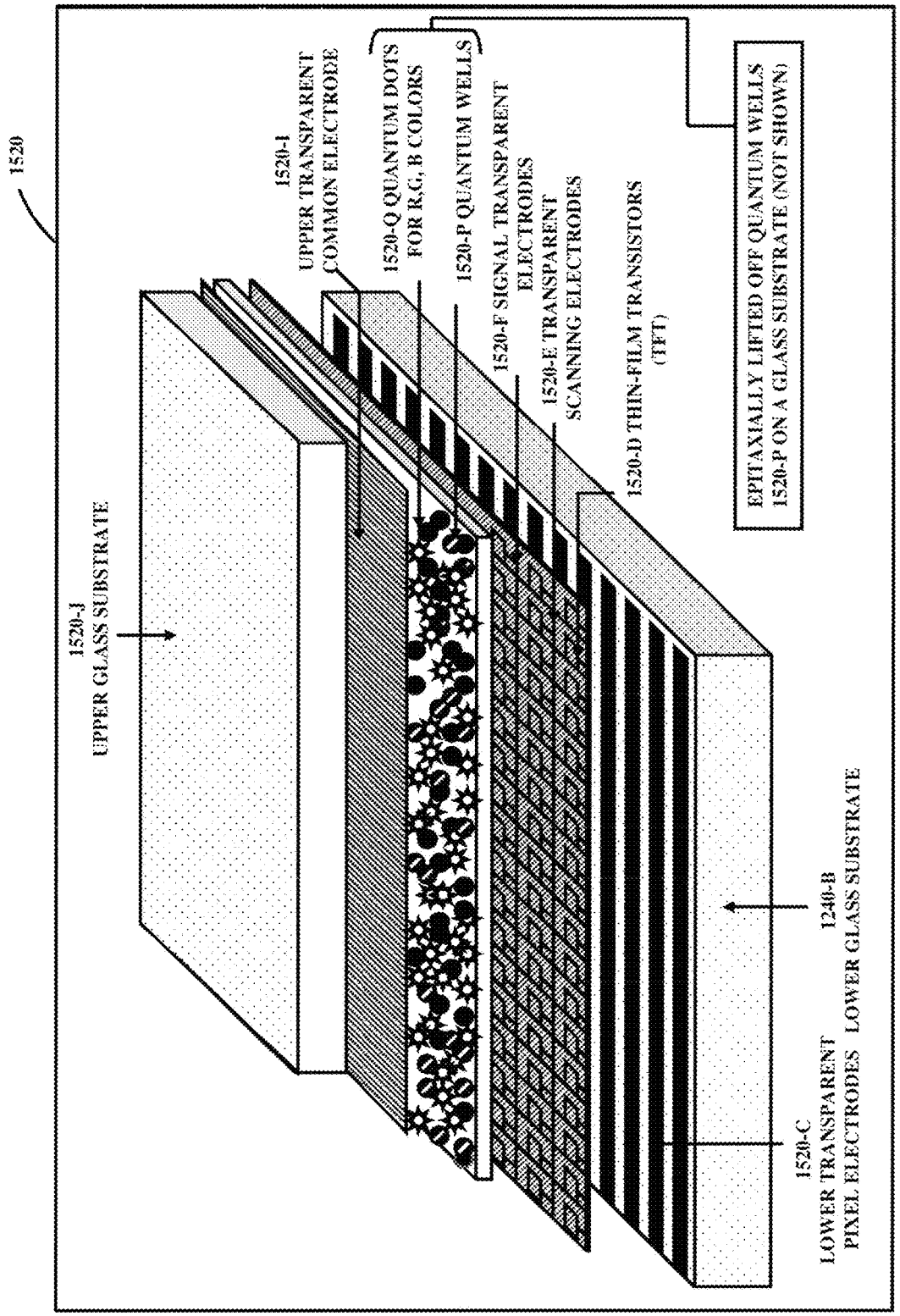
FIGS. 5E and 5F illustrate cross-sections of thr display component of the mobile internet device, according to one embodiment of the present invention.

FIG. 5E illustrates a cross-section of another enabling configuration of the display component 1520 of the mobile internet device 300. Along with the array of thin-film transistors 1520-D, the critical element of this configuration is lifted semiconductor quantum-wells layers 1520-P on a glass substrate (e.g. the glass substrate 1240-B). Furthermore, the semiconductor quantum-wells layers 1520-P have both p-metal and n-metal contacts.

The semiconductor quantum-well layers 1520-P can be electrically excited by current from a battery. The released energy can be non-radiatively transferred to nanocrystal quantum dots (of various diameters/sizes) 1520-Q to produce red, green and blue light from an adjacent layer of nanocrystal quantum dots 1520-Q to enable an efficient color display component 1520.

Figure 5F:
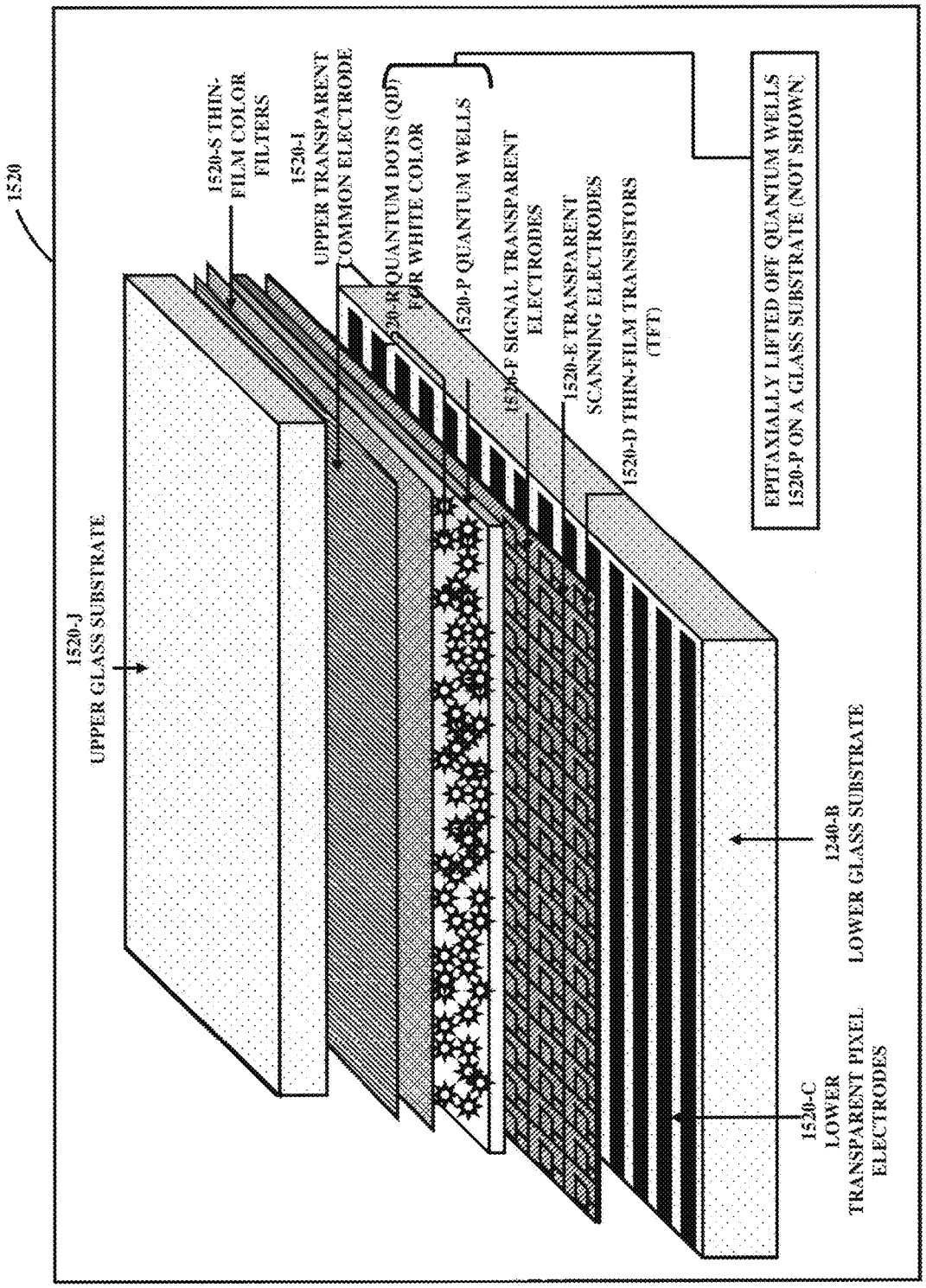

FIG. 5F illustrates a cross-section of another enabling configuration of the display component 1520 of the mobile internet device 300. Along with the array of thin-film transistors 1520-D, the critical element of this configuration is epitaxially lifted semiconductor quantum-wells layers 1520-P on a glass substrate (e.g., the glass substrate 1240-B). Furthermore, the semiconductor quantum-wells layers 1520-P have both p-metal and n-metal contacts.

The semiconductor quantum-well layers 1520-P can be electrically excited by current from a battery. The released energy can be non-radiatively transferred to uniformly sized nanocrystal quantum dots 1520-R to produce white light emission from an adjacent layer of uniformly sized nanocrystal quantum dots 1520-R. The white light can be filtered by an array of thin-film color filters 1520-S to enable an efficient color display component 1520.

Figure 6:
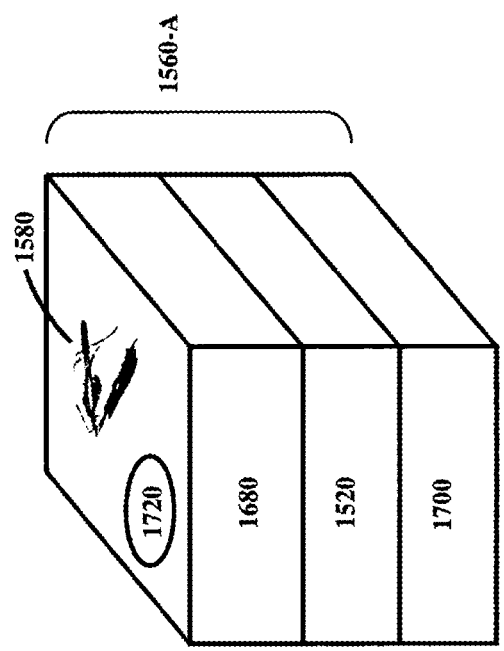
FIG. 6 illustrates a block diagram of a sketch pad electronic module, according to one embodiment of the present invention.

FIG. 6 illustrates a block diagram of the sketch pad (with write/erase options) electronic module 1560 with the stylus 1580. The sketch patch electronic module 1560 is a multi-layer device, having a transparent (e.g., indium tin oxide or graphene) input matrix 1680, below the transparent input matrix 1680, there is the display component (e.g., liquid crystal or graphene based display component) 1520 and below which, there is an electronic (scan, drive and display memory) circuitry 1700.

The stylus 1580 can be formed in the shape of a pencil from silicon rubber impregnated with metal particles.

As the stylus 1580 writes over the transparent input matrix 1680, it can capacitively couple with the transparent input matrix 1680. Thus, if there is a change in the capacitance, it can be sensed by the electronics circuitry 1700. The electronics circuitry 1700 can be electrically coupled with a switch 1720. Utilizing the switch 1720, the sketch pad electronic module 1560 can be operated in both write and erase modes.

Figure 7:
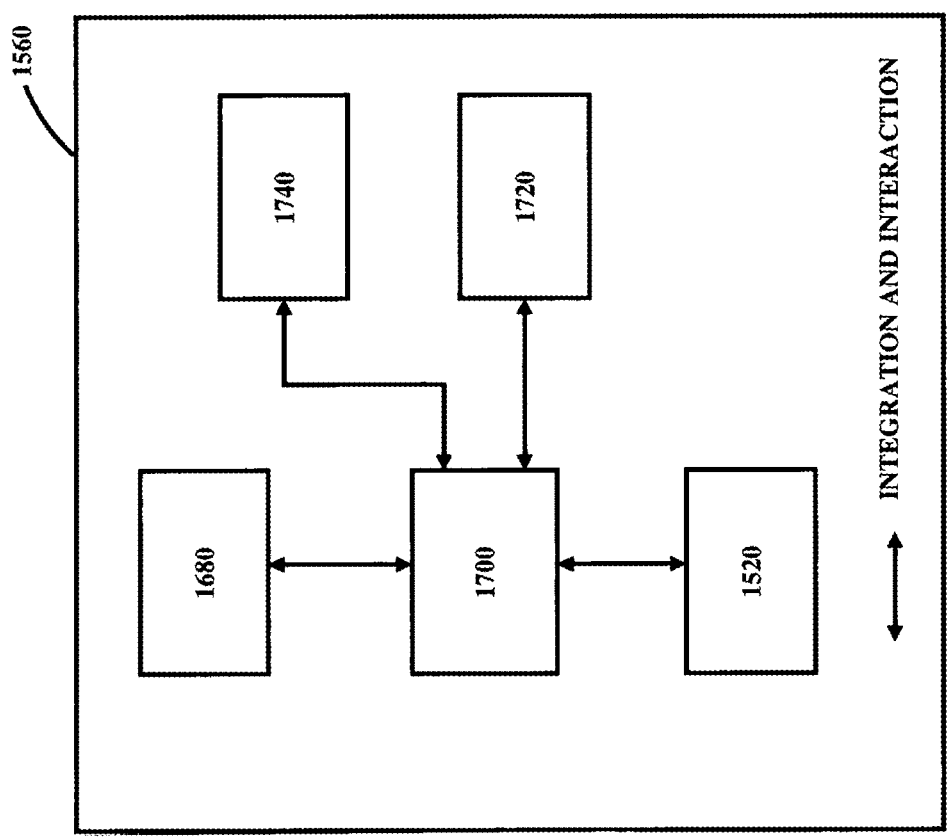
FIG. 7 illustrates a block diagram of the sketch pad electronic module, according to one embodiment of the present invention.

FIG. 7 illustrates a block diagram of the sketch pad electronic module 1560, where the electrical coupling between the transparent input matrix 1680, display component 1520, electronics circuitry 1700 and switch 1720 are described. Furthermore, a hand-writing recognition algorithm and/or a pattern recognition algorithm 1740 can enhance the performance of the sketch pad electronic module 1560.

Figure 8A:
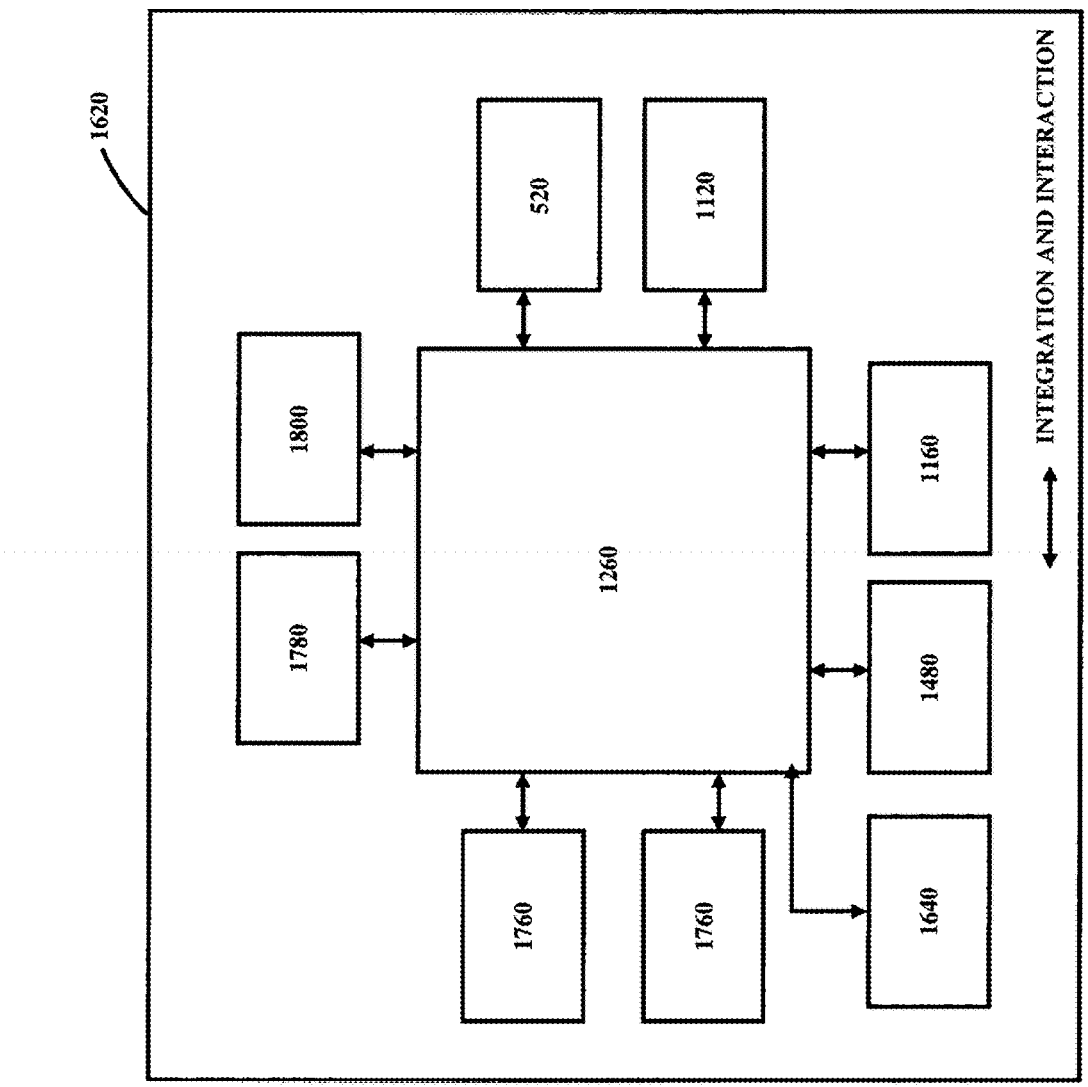
FIG. 8A illustrates a block diagram of a personal awareness assistant miniature electronic module, according to one embodiment of the present invention.

FIG. 8A illustrates a block diagram of the personal awareness assistant miniature electronic module 1620, which integrates: a storage/memory 520 (however, the storage/memory 520 can also be replaced by the general storage electronic module 520-C), a sensor 1120, a light source modulator 1160, a medium performance microprocessor 1260, a camera 1480, a voice-to-text-to-voice conversion algorithm 1640, two (2) microphones 1760, a scrolling audio recording buffer 1780 and a voice recognition algorithm 1800.

The personal awareness assistant miniature electronic module 1620 can be always on. It can passively listen to what the user 160 says and can respond to particular contexts and situations. For example: the user 160 can hear about a product and the user 160 can create a reminder by speaking to the personal awareness assistant miniature electronic module 1620. The user 160 can transmit that information from the personal awareness assistant miniature electronic module 1620 to the social wallet 100 via the electronic social wallet electronic module 280 and/or mobile internet device 300 for further processing and/or fulfillment. After processing the information from the personal awareness assistant miniature electronic module 1620, the social wallet 100 can then deliver real time location based coupon(s) to the mobile internet device 300, by measuring the user's 160 location information by utilizing the indoor/outdoor location measurement miniature electronic module 1440 of the mobile internet device 300.

Optionally the personal awareness assistant miniature electronic module 1620 can be standalone miniature electronic module (but it can be pluggable to the mobile internet device 300).

For example, when the user 160 is introduced to someone, the personal awareness assistant miniature electronic module 1620 can automatically recognize and may take a low-resolution photo. Once, the mobile internet device 300 collects the information, it can automatically categorize the information into a pre-designated database with audio, digital image, time/date stamp and global position system location. Because the data is stored contextually, information retrieval can be straightforward. In response to a simple voice command inquiry such as "whom did I meet on Apr. 15, 2009 at 12 PM"? the personal awareness assistant miniature electronic module 1620 can bring up the appropriate information about that specific person. Thus, the mobile internet appliance is context-aware.

Furthermore, the voice recognition algorithm 1800 can enhance the capability of the personal awareness assistant miniature electronic module 1620.

Additionally, a face recognition algorithm can enhance the capability of the personal awareness assistant miniature electronic module 1620.

Figure 8B:
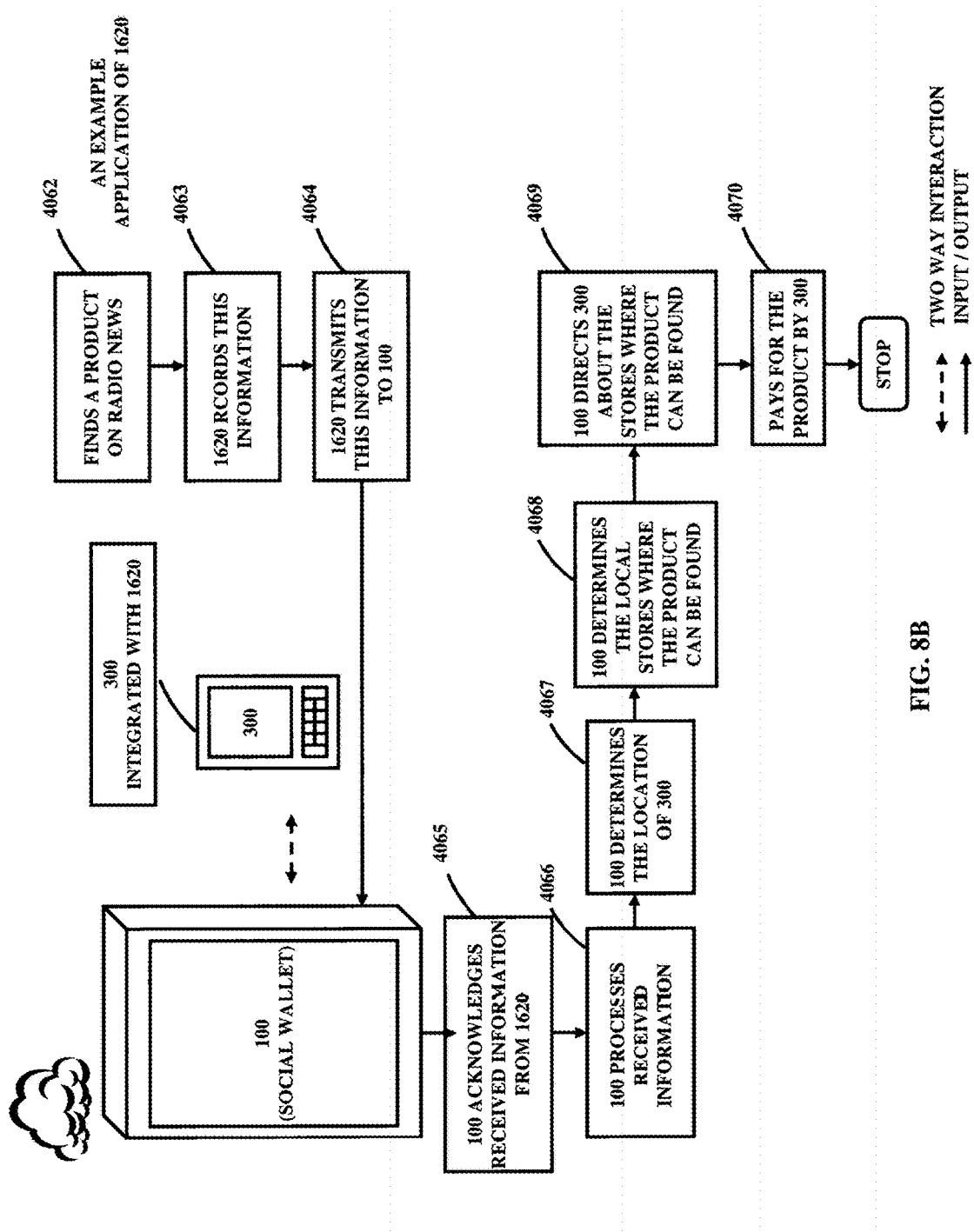
FIG. 8B illustrates an application of the personal awareness assistant miniature electronic module, according to one embodiment of the present invention.

FIG. 8B illustrates an application of the personal awareness assistant miniature electronic module 1620 of the mobile internet device 300. In step 4062, the user finds a product (e.g., on a radio news). In step 4063, the personal awareness assistant miniature electronic module 1620 records that product information with the user's consent. In step 4064, the personal awareness assistant miniature electronic module 1620 transmits the product information to the social wallet 100. In step 4065, the social wallet 100 acknowledges the received (product) information from the personal awareness assistant miniature electronic module 1620. In step 4066, the social wallet 100 processes the received (product) information from the personal awareness assistant miniature electronic module 1620. In step 4067, the social wallet 100 determines the location of the mobile internet device 300 in real time. In step 4068, the social wallet 100 determines the local stores, where the product can be found. In step 4069, the social wallet 100 directs (turn by turn) the mobile internet device 300 in real time regarding the location of a specific or closest store, where the product can be found. In step 4070, the user pays for the product by the mobile internet device 300 (the mobile internet device 300 can be integrated with the social wallet electronic module 280). Furthermore, the social wallet electronic module 280 can be integrated with a near-field communication miniature electronic module 620.

As the social wallet 100 can learn or relearn the user's preferences, the unified algorithm 320 can render intelligence based on the user's preferences, utilizing the intelligence rendering algorithm 400 and the self-learning (including relearning) algorithm 420.

Similarly, the mobile internet device 300 can also learn or relearn the user's preferences utilizing the algorithm 1660. The algorithm 1660 includes: (a) a physical search algorithm, (b) an algorithm-as-a-service, (c) an intelligent rendering algorithm (e.g., artificial intelligence, behavior modeling, data interpretation, data mining, fuzzy logic, machine vision, natural language processing, neural networks, pattern recognition and reasoning modeling) and (d) a self-learning (including relearning) algorithm.

As the personal awareness assistant miniature electronic module 1620 is context-aware, thus the mobile internet device 300 can also be context-aware.

Figure 9:
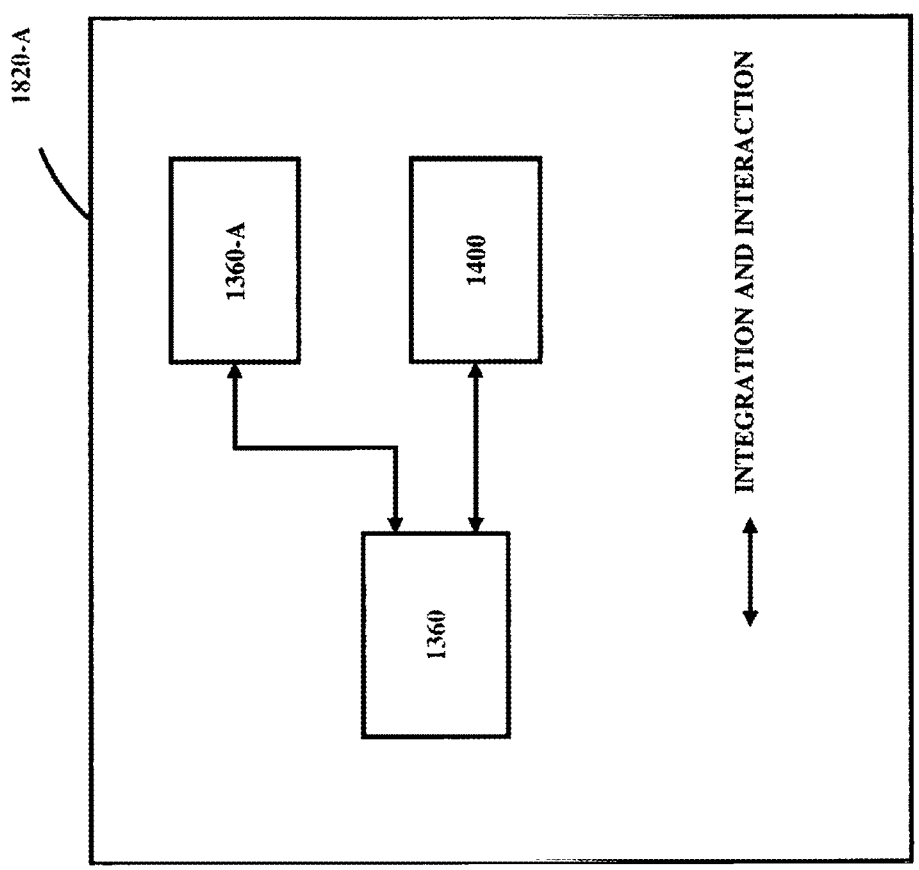
FIG. 9 illustrates a block diagram of first system-on-chip for the mobile internet device, according to one embodiment of the present invention.

FIG. 9 illustrates a block diagram of a first system-on-chip 1820-A, integrating a microprocessor 1360, a graphics processor unit (GPU) 1360-A and an internet security algorithm 1400.

Figure 10:
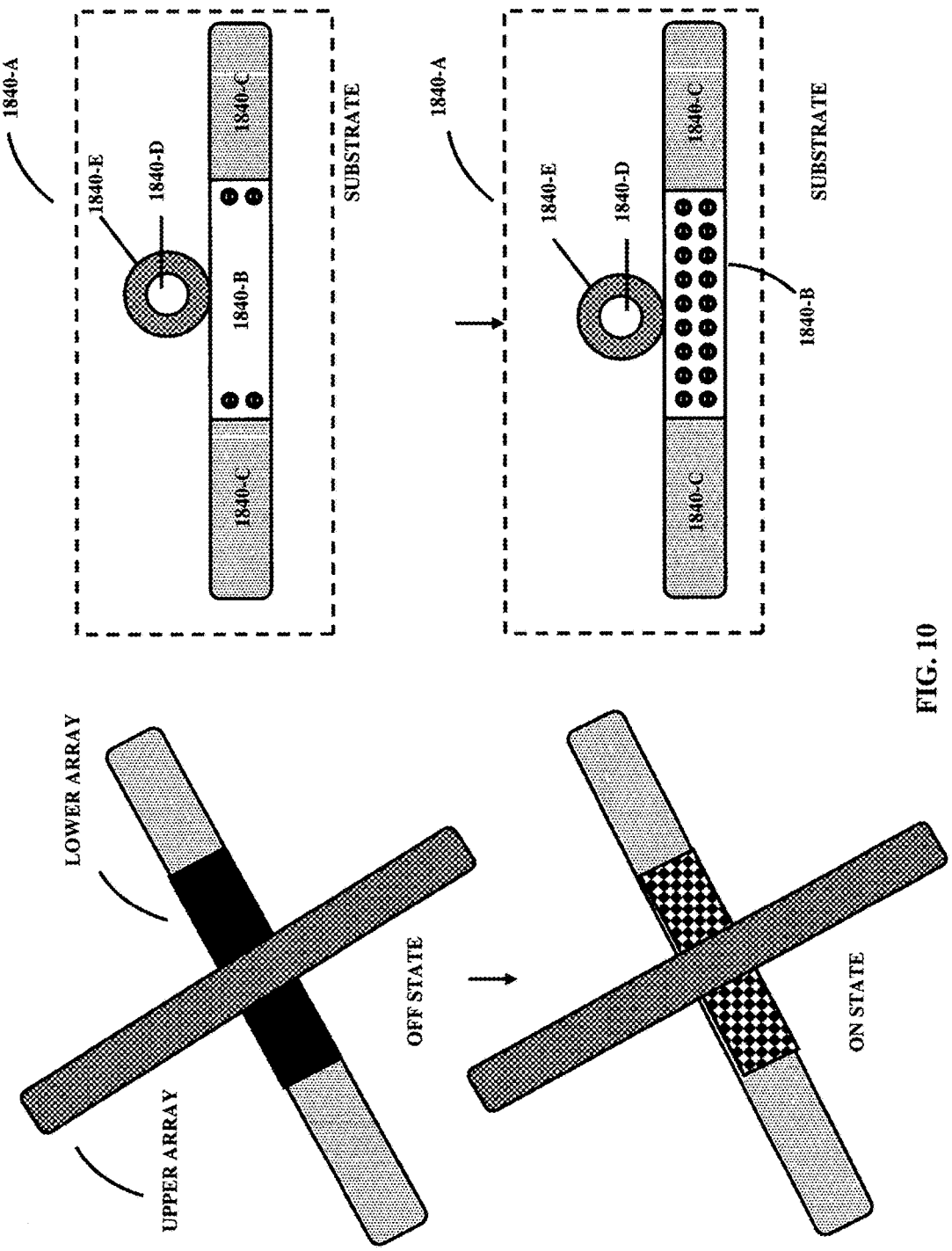
FIG. 10 illustrates a configuration of a nano-transistor, according to one embodiment of the present invention.

FIG. 10 illustrates a block diagram configuration of a nano-transistor 1840-A. A lower nanowire array of switchable active material (e.g., silicon or germanium) 1840-B sandwiched between contacts (e.g., nickel silicide for silicon or nickel germanide for germanium) 1840-C can be fabricated/constructed. An upper array of gate metal 1840-D enclosed within an insulating shell 1840-E can be fabricated/constructed. Voltage applied via the gate metal 1840-D can switch the active material 1840-B from an off state to an on state.

Figure 11:
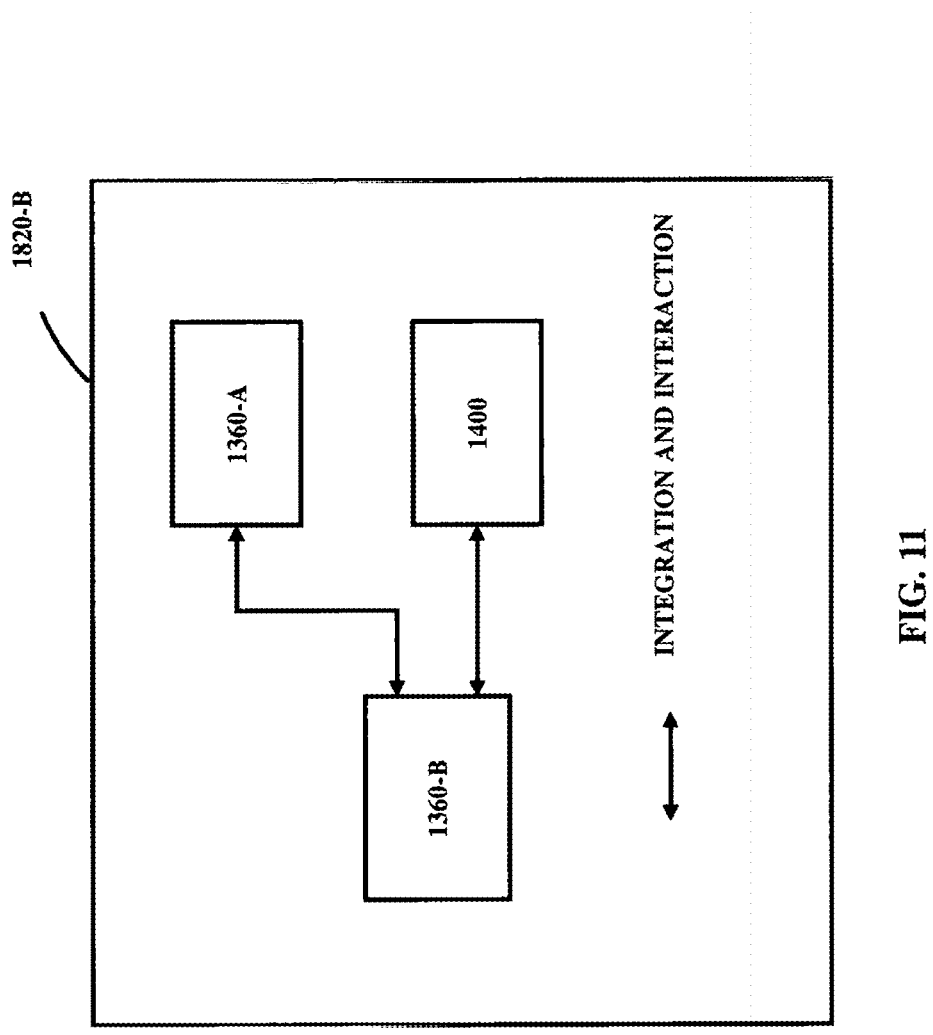
FIG. 11 illustrates a block diagram of a second system-on-chip (where a microprocessor is based on nano-transistors) for the mobile internet device, according to another embodiment of the present invention.

FIG. 11 illustrates a block diagram configuration of a second system-on-chip 1820-B, which integrates a microprocessor 1360-B, (where the microprocessor 1360-B is based on nano-transistors 1840-A), a graphics processor unit 1360-A and the internet security algorithm 1400.

Molybdenite ($MoS_2$) is a two-dimensional crystal with a natural bandgap. It is suitable for production of digital integrated circuits. A reduction in bandgap and/or increase in mobility of molybdenite can be achieved by an addition of lithium (Li) ions.

Graphene is also a two-dimensional crystal with a higher carrier mobility, as well as lower noise. It has the ideal properties to be an excellent component of integrated circuits. Graphene epitaxially grown on silicon carbide (SiC) can be suitable for production of integrated circuits.

Graphene variant called graphane, in which hydrogen atoms are attached to the carbon lattice in insulating layers.

Graphynes is a one-atom-thick sheets of carbon that resemble graphene, except its 2D framework of atomic bonds, which contains triple bonds in addition to double bonds. Graphynes has a graphene-like electronic structure resulting in effectively massless electrons due to Dirac Cones. All electrons are travelling at roughly the same speed (about 0.3 percent of the speed of light). This uniformity leads to conductivity greater than copper. Graphynes has a capability of self-modulating its electronic properties, which means that it could be used as a semiconductor practically as-is, without requiring any non-carbon dopant atoms to be added as a source of electrons, as non-carbon dopants may be required for graphene. Furthermore, graphyne crystal structures allows electrons to flow in just one direction.

A first lower parallel array of nanoscaled metal (platinum) wires can be fabricated/constructed onto a substrate. A titanium oxide-titanium dioxide thin film can be deposited on the first lower parallel array of nanoscaled metal wires. A second upper parallel array of nanoscaled metal (platinum) wires can be fabricated/constructed on top of the titanium oxide-titanium dioxide thin film. The second upper parallel array is typically fabricated/constructed perpendicular to the first lower parallel array.

A memristor of a titanium oxide-titanium dioxide oxide junction, can be formed when the first lower parallel array of nanoscaled metal (platinum) wires cross the second upper parallel array nanoscaled metal (platinum) wires. Memristor is about 50 microns×50 microns in size. Memristor is a two-terminal nanoscaled non-linear passive switching element, whose resistance changes depending on the amount, direction and duration of voltage applied on it. But whatever its past state or resistance was, it freezes at that state, until another voltage is applied to change it. It has a variable resistance and can retain the resistance even when the power is switched off. It is similar to a transistor, used to store data in flash memory. Since memristor is a two-terminal nanoscaled passive switching element, therefore it can be built on top of transistors to power it up.

Phase-change memory (e.g., germanium-antimony-tellurium) has been used in optical information technologies (e.g., DVD) and non-volatile memory applications. Furthermore, a phase-change memory based switching element can be used instead of a memristor. Phase-change memory based switching element exploits a unique switching behavior of phase-change material between amorphous (high resistivity) and crystalline (low resistivity) material states with the application of electrical pulses by titanium nitride top electrode and titanium nitride-tungsten bottom electrode to generate the required joule heating for a phase transformation.

Furthermore, a dense local network of switching elements 1840 (e.g., based on memristor and/or phase-change memory material based switching elements) can be monolithically integrated with transistors fabricated/constructed on a semiconductor (e.g., silicon or germanium or silicon-germanium), and/or nano-transistors fabricated/constructed on a semiconductor (e.g., silicon or germanium or silicon-germanium) and/or transistors fabricated/constructed on two-dimensional crystal.

Figure 12:
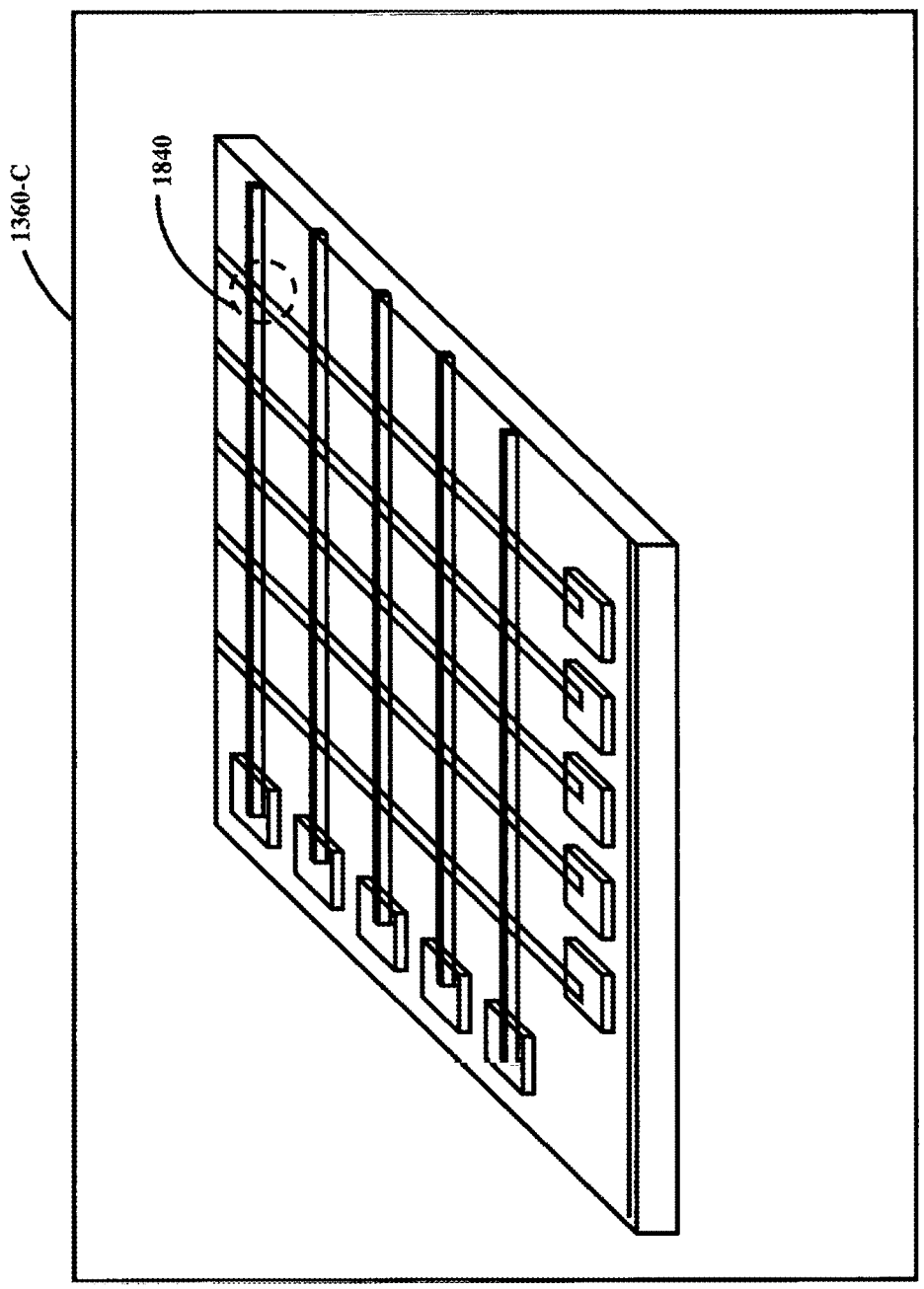
FIG. 12 illustrates a block diagram configuration of a memristor (or phase change material based switching element), according to one embodiment of the present invention.

FIG. 12 illustrates a switching element 1840 based on memristor and/or phase-change memory material.

Thus, transistors (fabricated/constructed on a semiconductor and/or two-dimensional crystal) with integrated switching elements 1840 can be utilized to fabricate/construct a reconfigurable (and with lower electrical power consumption) advanced microprocessor 1360-C.

Figure 13:
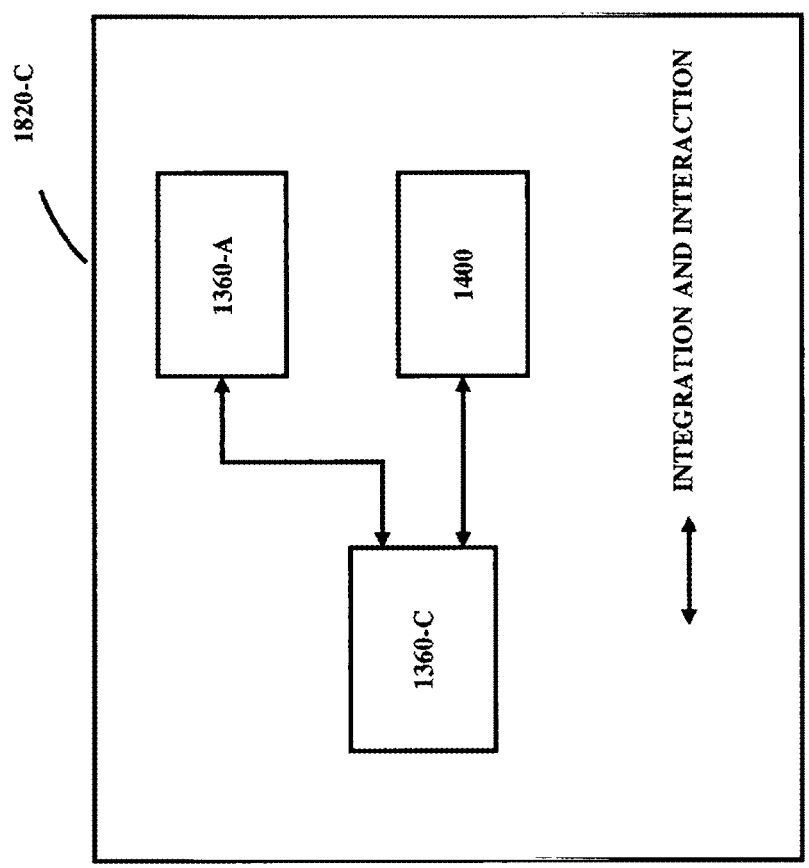
FIG. 13 illustrates a block diagram of a third system-on-chip, (where a microprocessor is based on memristors (or the phase change material based switching elements)) for the mobile internet device, according to one embodiment of the present invention.

FIG. 13 illustrates a block diagram configuration of a third system-on-chip 1820-C, which integrates an advanced microprocessor 1360-C, a graphics processor unit 1360-A and the internet security algorithm 1400.

In a human brain, neurons are connected to each other through programmable junctions called synapses. The synaptic weight modulates how signals are transmitted between neurons and can in turn be precisely adjusted by an ionic flow through the synapse.

The switching element 1840 is a non-linear resistive device with an inherent memory and it is similar to a synapse. They are both two-terminal devices whose conductance can be modulated by an external stimulus with the ability to store (memorize) the new information. The switching element 1840 can bring data close to computation without a lot of electrical power consumption, as a biological neural system does.

Figure 14:
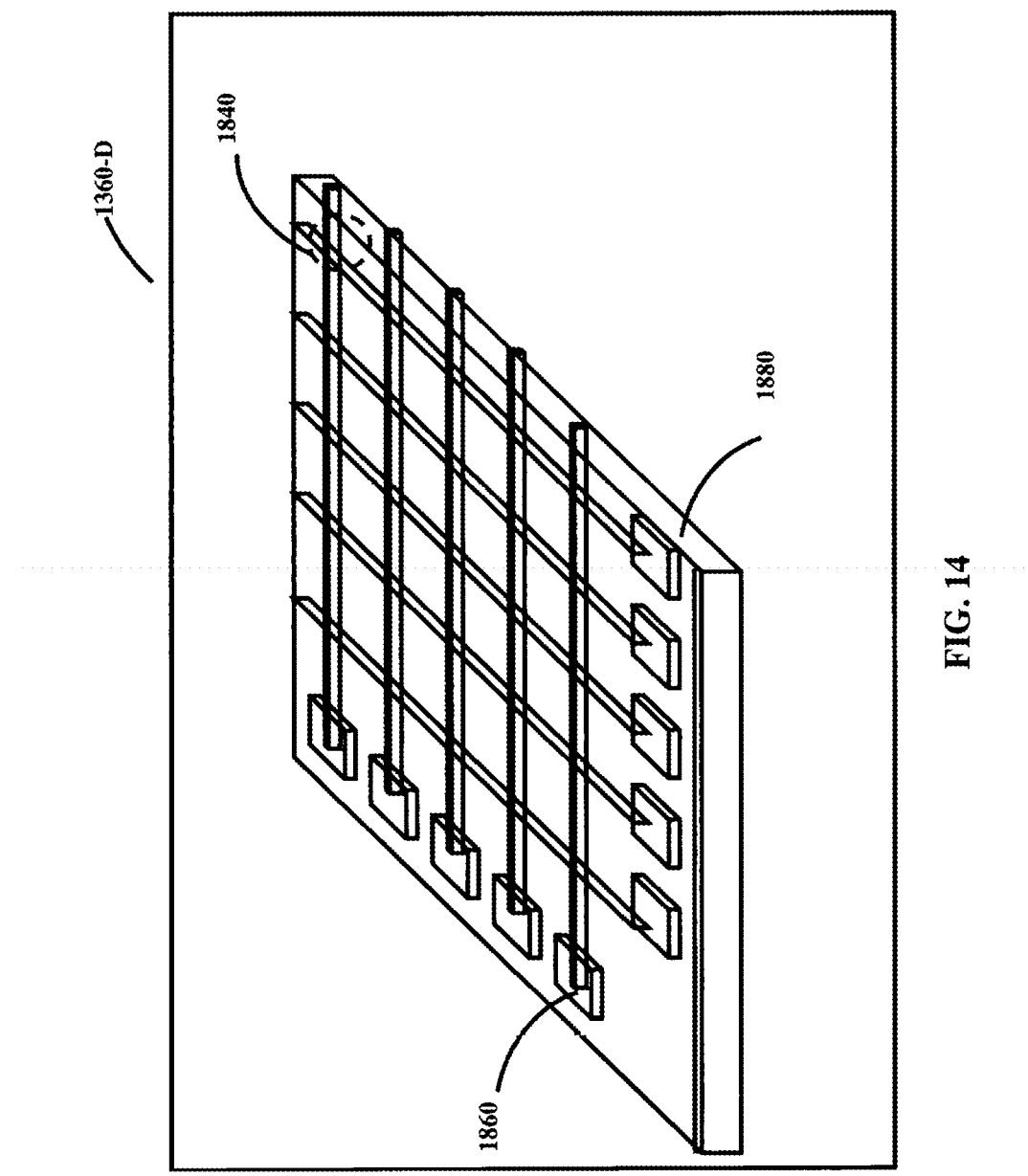
FIG. 14 illustrates a block diagram configuration of a memristor (or the phase change material based switching elements) with pre-neurons and post-neurons.

FIG. 14 illustrates an embodiment of neural network microprocessor 1360-D. 1360-D integrates switching element 1840 based synapses, complementary metal-oxide semiconductor (CMOS) pre-neurons 1860 (fabricated/constructed on a semiconductor and/or two-dimensional crystal) and complementary metal-oxide semiconductor post neurons 1880 (fabricated/constructed on a semiconductor and/or two-dimensional crystal).

Figure 15:
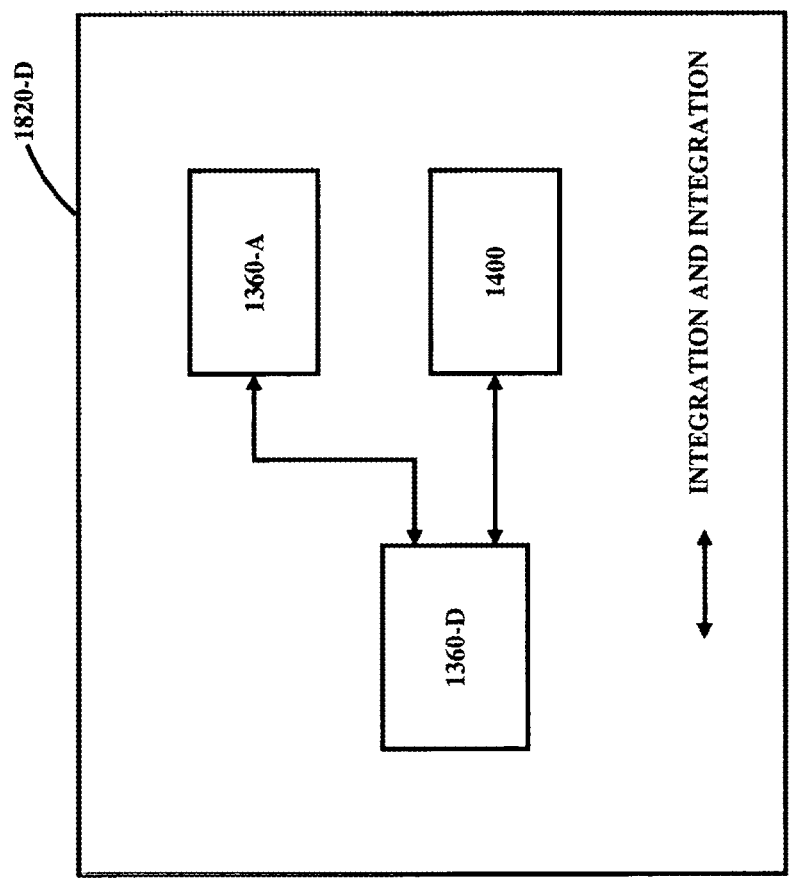
FIG. 15 illustrates a block diagram of a fourth system-on-chip (where a microprocessor is based on a neural network) for the mobile internet device, according to another embodiment of the present invention.

FIG. 15 illustrates a block diagram configuration of a fourth system-on-chip 1820-D, which integrates an advanced microprocessor (based on a neural network) 1360-D, a graphics processor unit 1360-A and the internet security algorithm 1400.

Figure 16:
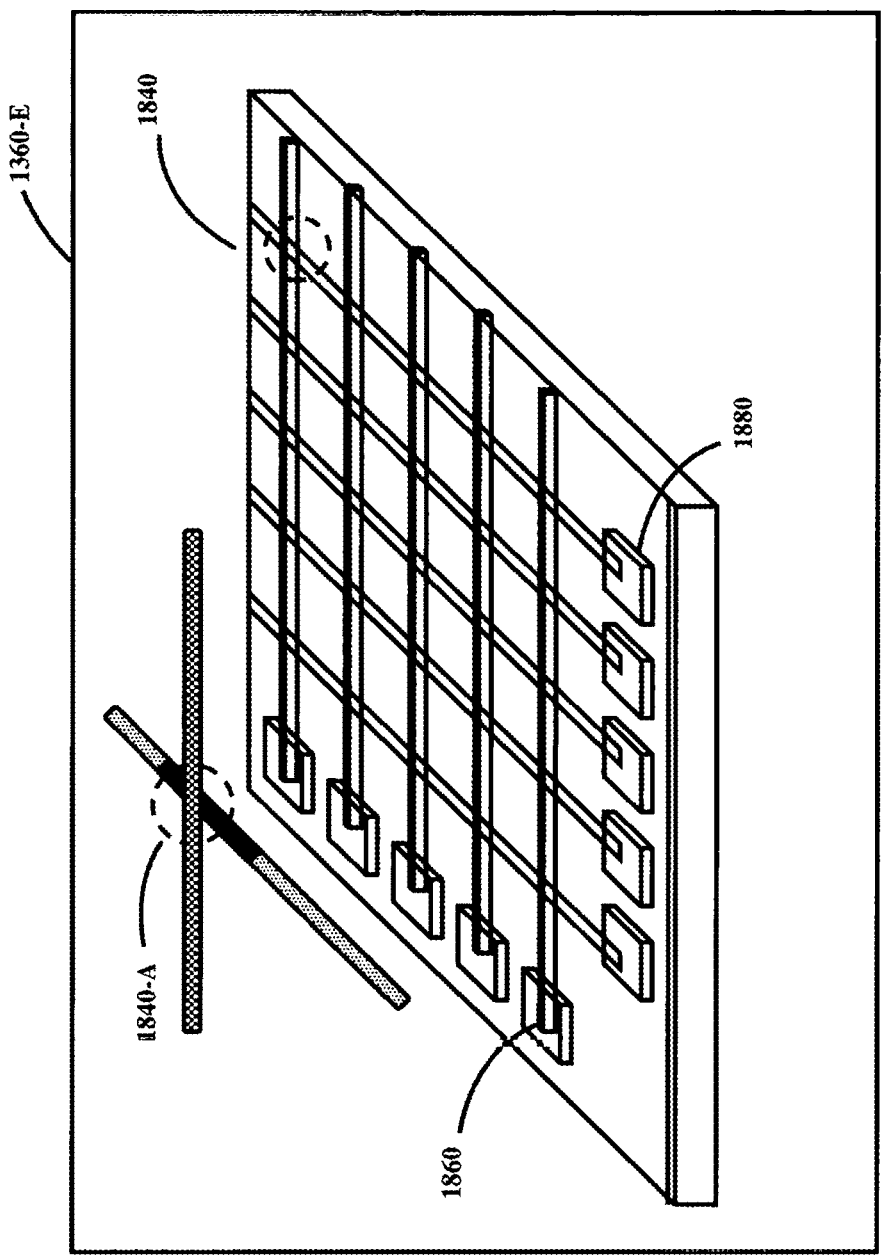
FIG. 16 illustrates a block diagram configuration of the memristor (or the phase change material based switching elements) with pre-neurons, post-neurons and nano-transistors, according to one embodiment of the present invention.

FIG. 16 illustrates another embodiment of an advanced microprocessor 1360-E (based on a neural network and nano-transistors 1840-A). 1360-E integrates switching element 1840 based synapses, complementary metal-oxide semiconductor pre-neurons 1860 (fabricated/constructed on a semiconductor and/or two-dimensional crystal), complementary metal-oxide semiconductor post neurons 1880 (fabricated/constructed on a semiconductor and/or two-dimensional crystal) and nano-transistors 1840-A.

Figure 17:
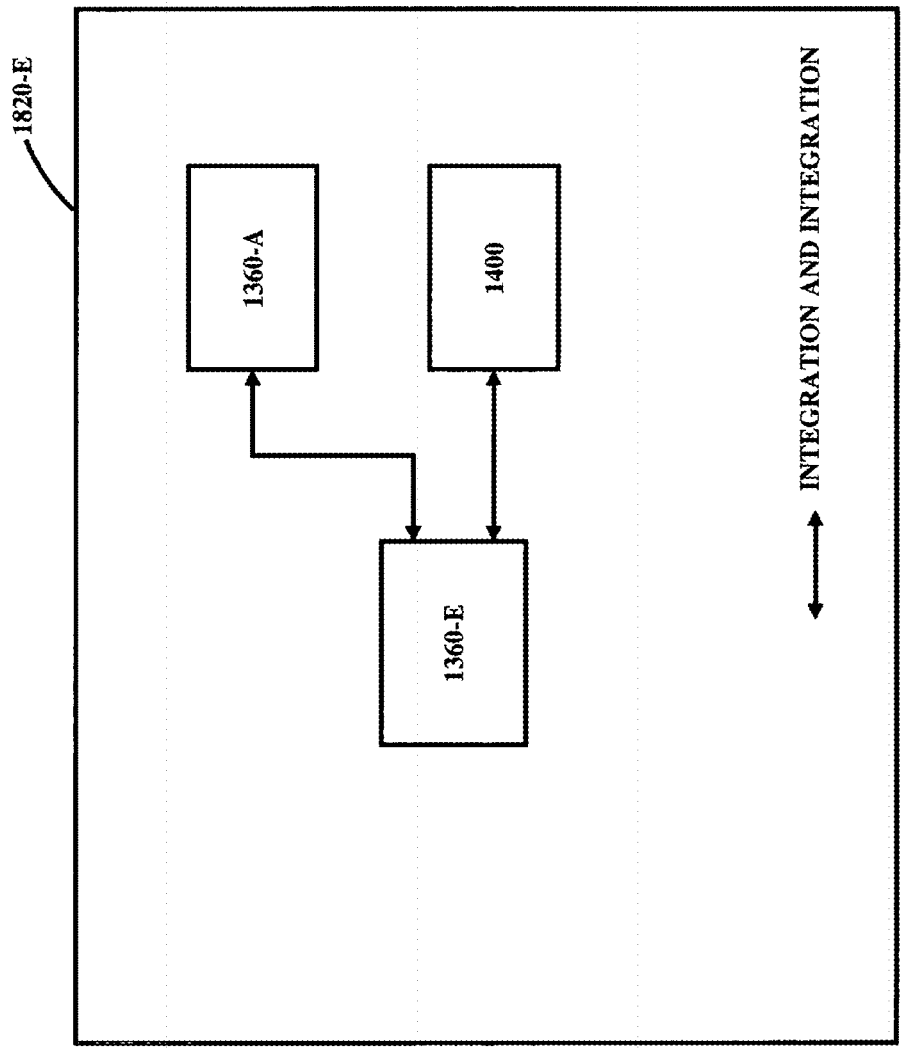
FIG. 17 illustrates a block diagram of a fifth system-on-chip (where a microprocessor is based on a neural network and nano-transistors) for the mobile internet device, according to another embodiment of the present invention.
Figure 18A:
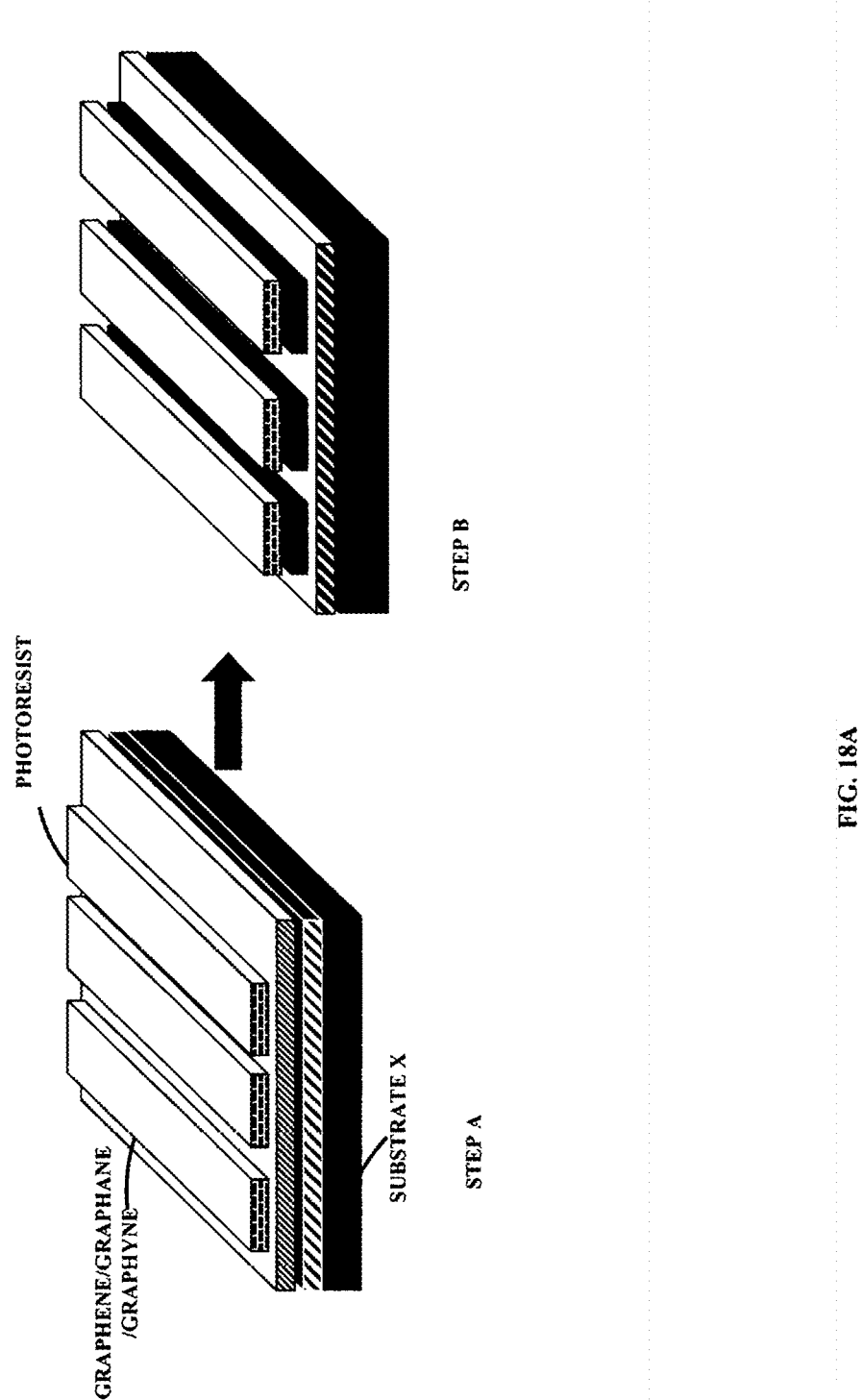
FIGS. 18(A, B and C) illustrates process steps for integrating one or two two-dimensional crystals on a semiconductor substrate, according to one embodiment of the present invention.
Figure 18B:
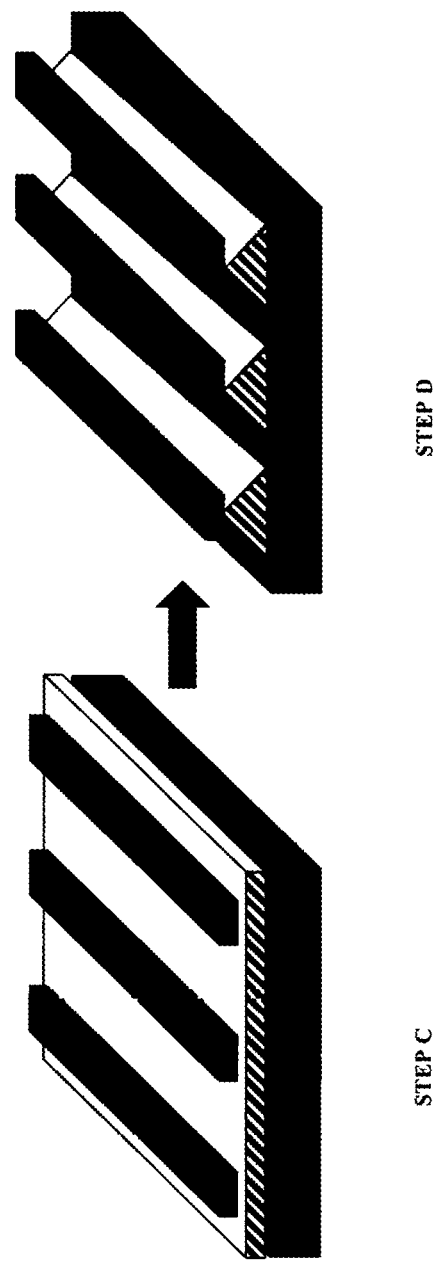
Figure 18C:
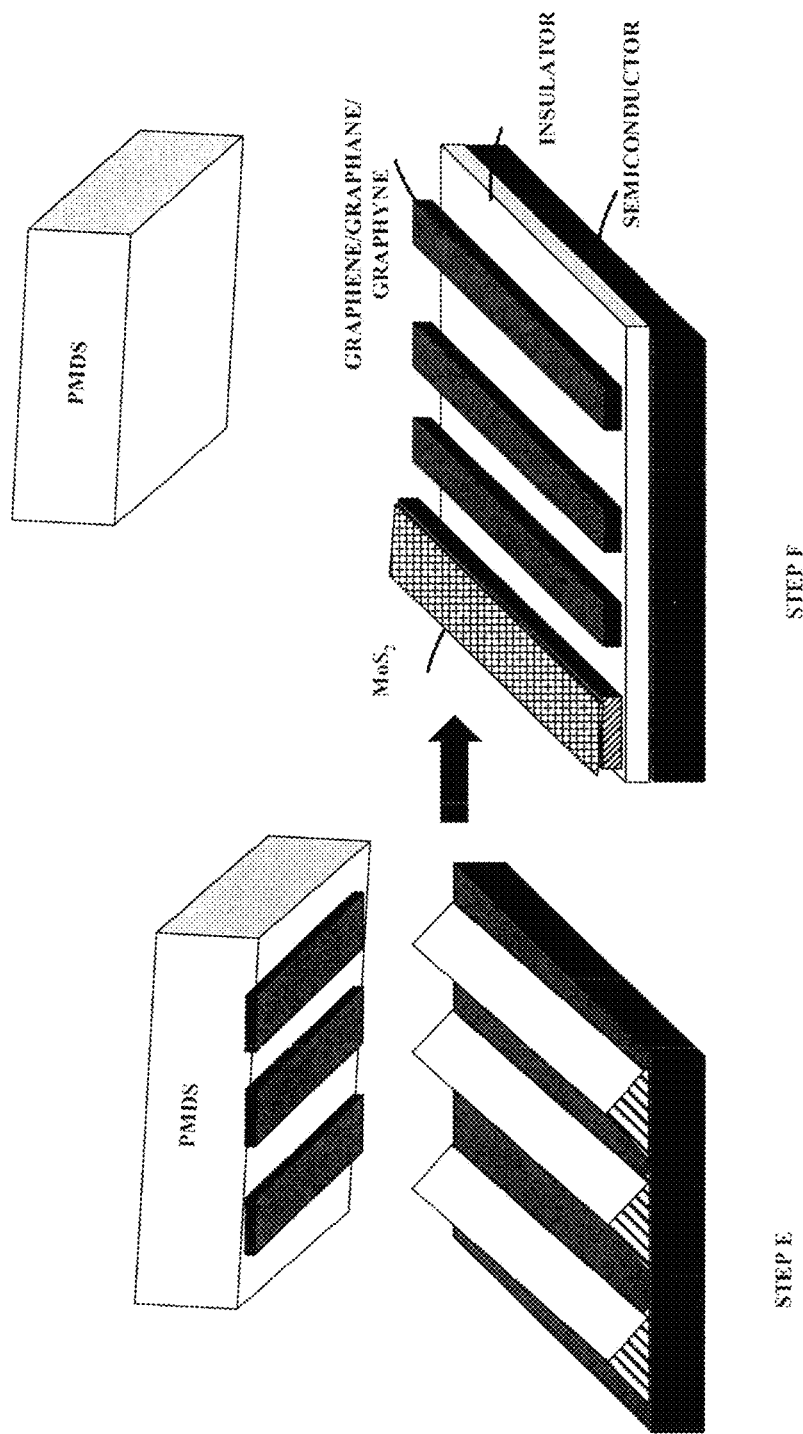

FIG. 17 illustrates a block diagram configuration of a fifth system-on-chip 1820-E, which integrates an advanced microprocessor (based on a neural network and nano-transistors 1840-A) 1360-E, a graphics processor unit 1360-A and the internet security algorithm 1400.

Furthermore, the advanced microprocessors 1360-D and 1360-E can have Cog Ex machines as an operating algorithm/system.

FIGS. 18(A, B and C) illustrate a block diagram of process flow for integrating two (2) two-dimensional crystals on an insulator on a semiconductor substrate (e.g., silicon or germanium or silicon-germanium). Graphene/graphane/graphyne is grown on a substrate X (e.g., Graphene can be epitaxially grown on silicon carbide substrate).

Graphene/graphane/graphyne can be patterned with photoresist and reactive ion beam (RIE) etch processes. Graphene/graphane/graphyne can be bonded and detached by PMDS onto an insulator on a semiconductor substrate. Thus, the above semiconductor fabrication process/method enables integration of one or more two-dimensional crystals on an insulator on a semiconductor substrate for further circuit fabrication.

For efficient thermal management of the system-on-chip 1820-A/B/C/D/E for the mobile internet device 300, thermal resistance must be minimized at all material interfaces and materials with closely matching thermal expansion coefficients must be used.

Figure 19:
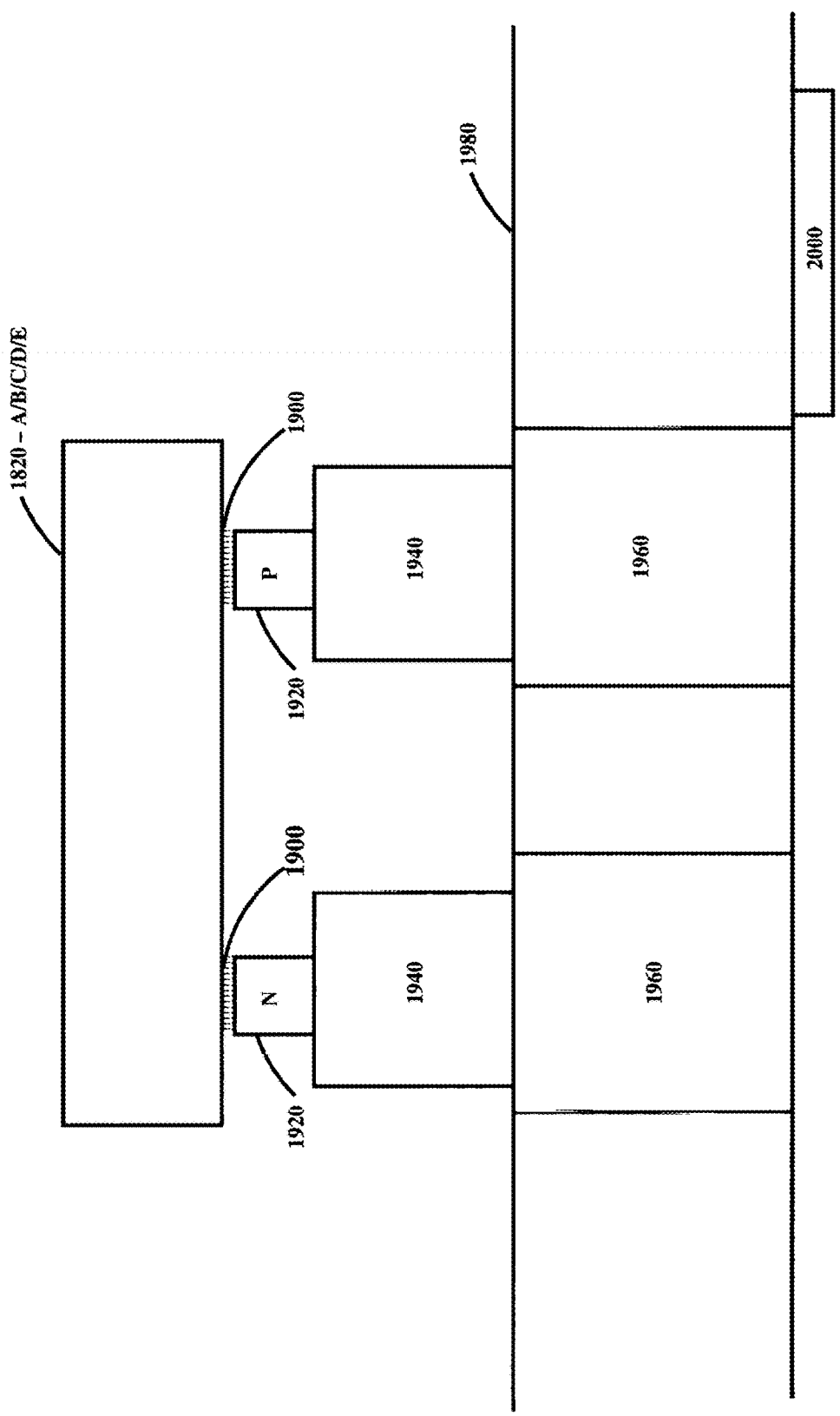
FIG. 19 illustrates a block diagram of an attachment of the above system-on-chip on a printed circuit board, according to one embodiment of the present invention.

FIG. 19 illustrates that the circuit side of the system-on-chip 1820-A/B/C/D/E can be flip-attached or flip-bonded on an array of thermoelectric film (both n-type and p-type) 1920 with a built-in nano-structured surface 1900 for active cooling.

About ten times (10×) heat transfer can be realized by creating a nano-structured surface (e.g., zinc oxide nano-structure surface) 1900 on the thermoelectric film 1920.

However, significant thermoelectric efficiency can be gained by fabricating a quantum wire/quantum dot based thermoelectric film 1920, transitioning from a two-dimensional superlattice.

Furthermore, the thermoelectric film can be attached or bonded on a thermal pillar 1940. The thermal pillar 1940 is about 250 micron in diameter and 50 micron in height. The thermal pillar (e.g., copper material) 1940 can be attached or bonded on a thermal via 1960 on a printed circuit board 1980 with a cooling module 2000.

Figure 20A:
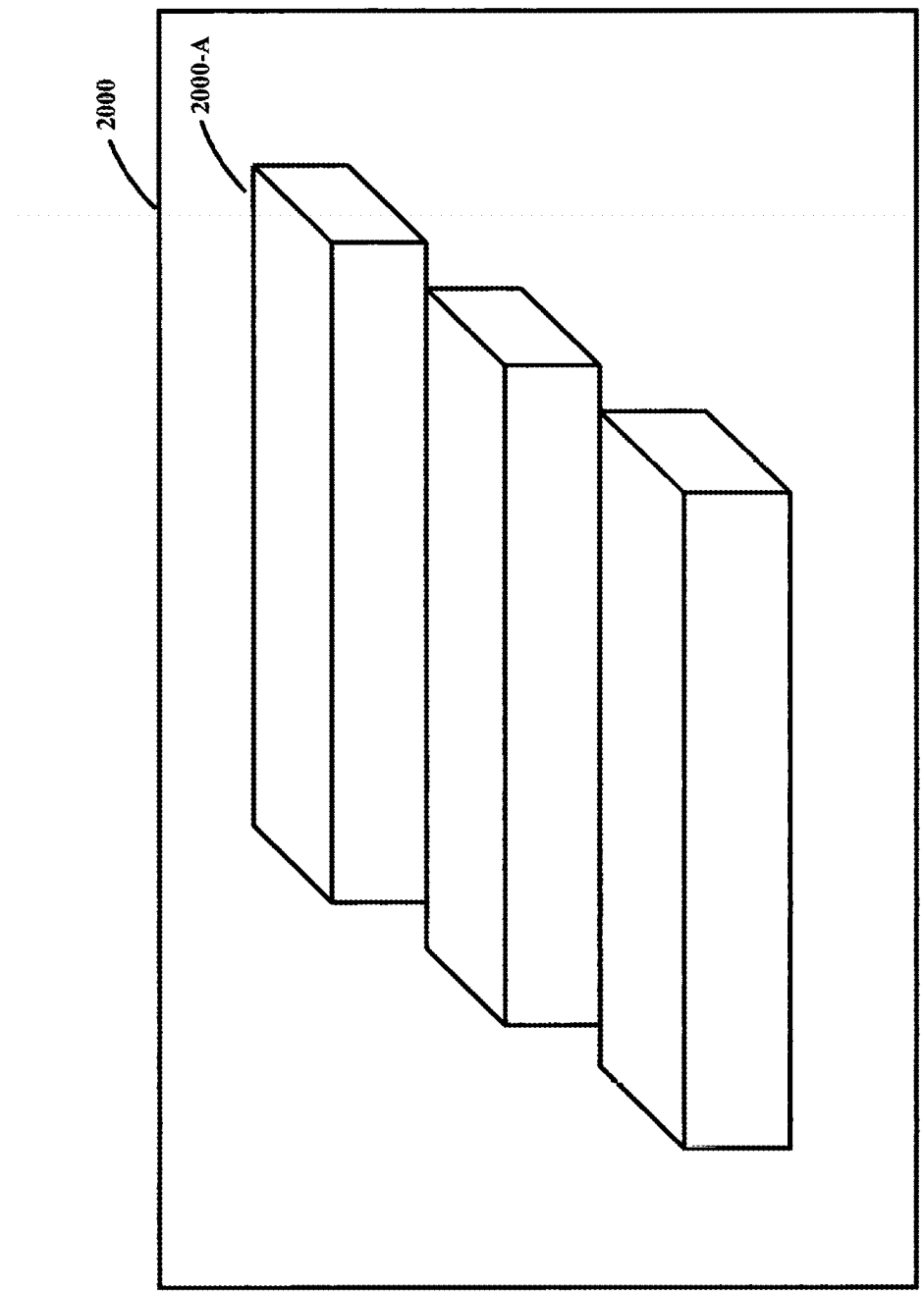
FIGS. 20(A, B and C) illustrates a block diagram of a cooling module for the above system-on-chip on the printed circuit board, according to one embodiment of the present invention.

FIG. 20A illustrates a cooling module 2000, which can be attached or bonded with the printed circuit board 1980 to disperse the heat from the system-on-chip 1820-A/B/C/D/E. The cooling module 2000 consists of an array of mini cooling modules 2000-A.

Figure 20B:
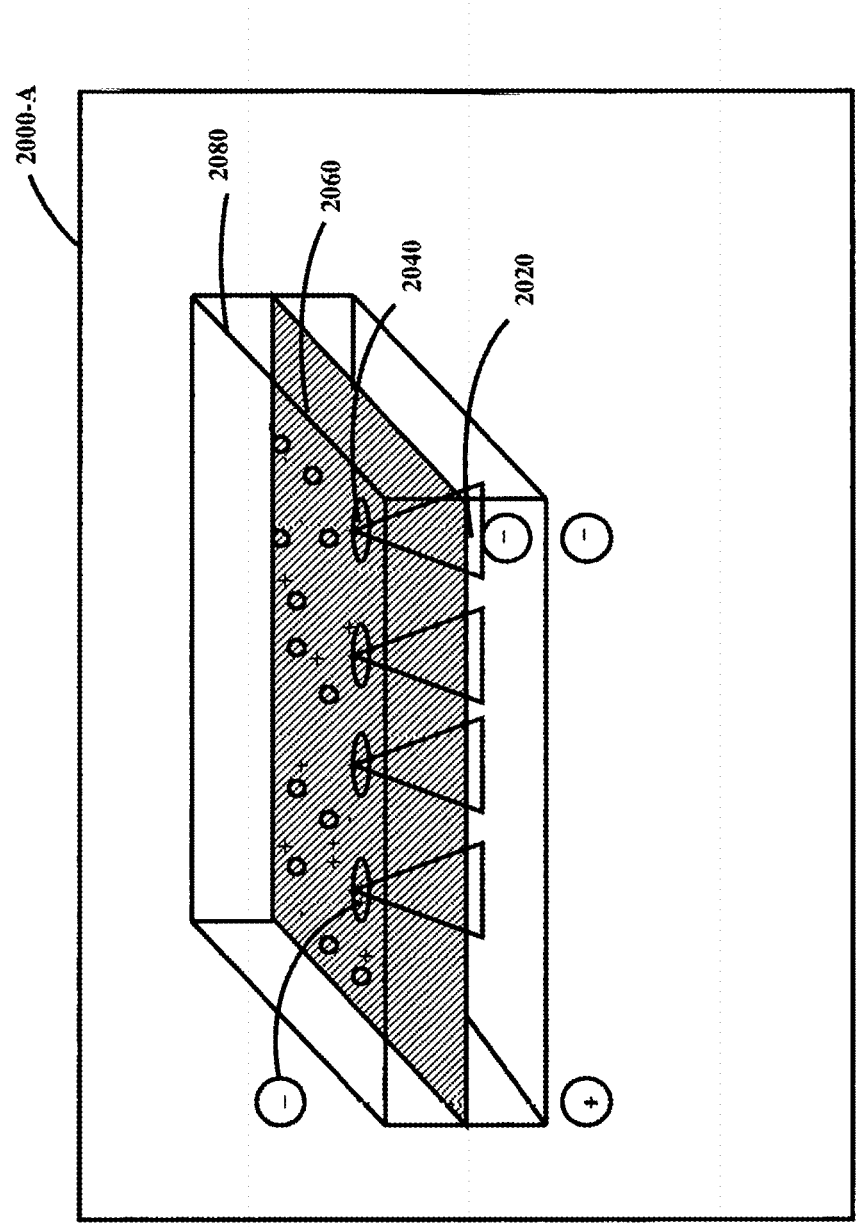

FIG. 20B illustrates a mini cooling module 2000-A. The mini cooling module 2000-A has an array of negative voltage biased tips (e.g., tips fabricated/constructed from boron nanotube/carbon nanotube/amorphous diamond/tungsten) 2020, which is placed just below a hole (e.g., about 100 micron in diameter) 2040 of positive voltage biased surface (e.g., tungsten/two-dimensional crystal material (e.g., graphene)) 2060. Electrons emitted from the negative voltage biased array of tips 2020 can escape through the hole 2040 and ionize the gas molecules within the boundaries of the heat sink (e.g., the heat sink can be fabricated/constructed from materials such as aluminum/silicon/copper/carbon nanotube-copper composite/two-dimensional crystal material (e.g., graphene)/diamond) 2080. By switching the voltage polarity of the heat sink 2080, a moving ionized gas cloud can disperse the heat from the printed circuit board 1980.

However, it is desirable that an array of tips 2020 emits electrons at a much lower voltage (e.g., 10 volts).

Figure 20C:
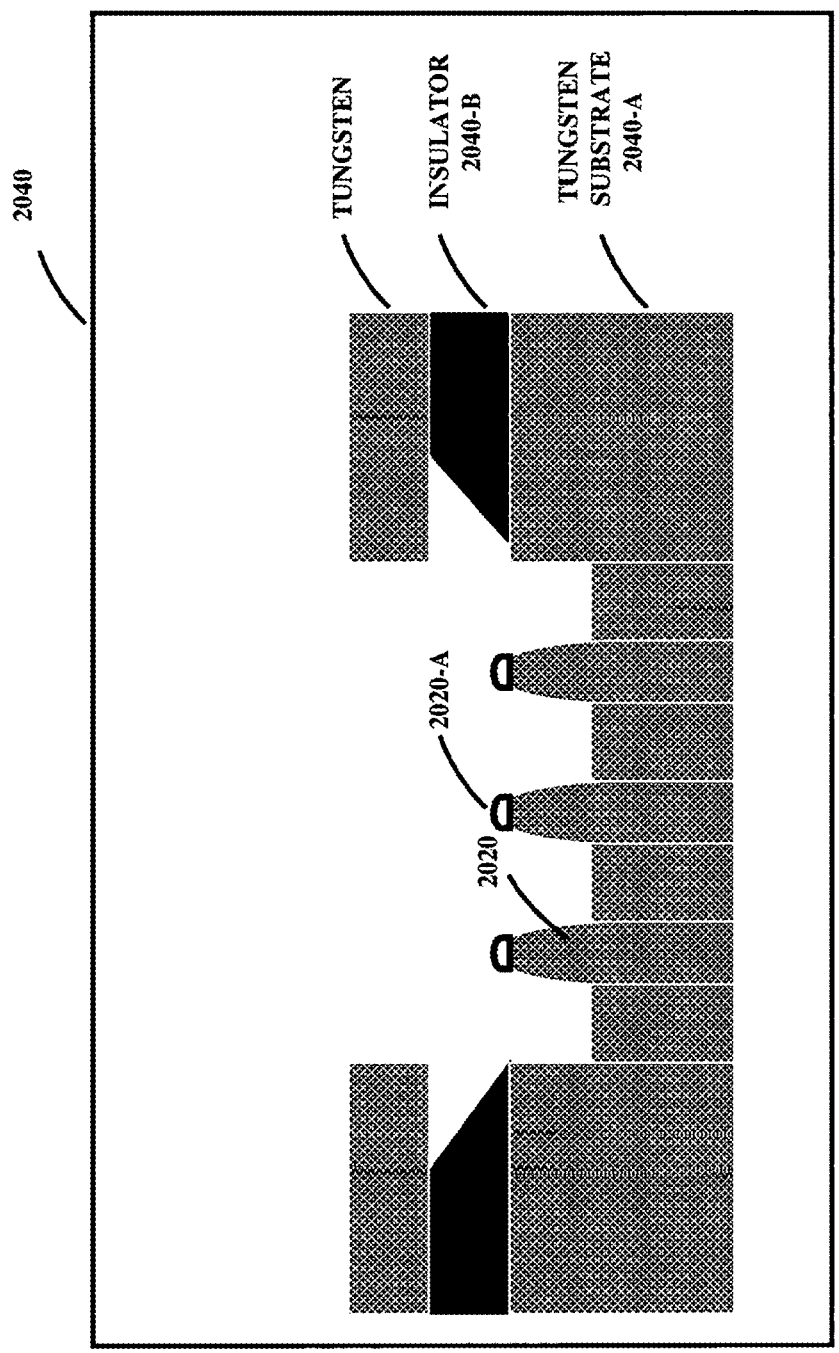

FIG. 20C illustrates an array of nano-sized tungsten tips 2020, which can be fabricated/constructed on tungsten substrate 2040-A. The array of nano-sized tungsten tips 2020 can be surrounded by an insulator 2040-B. The array of nano-sized tungsten tips 2020 can be decorated with a monolayer of material 2020-A (e.g., diamond, deposited by low temperature electron cyclotron resonance chemical vapor deposition ECR-CVD or gold deposited by RF magnetron sputtering) to enable electrons to emit at a much lower voltage (e.g., at 10 volts) through the hole 2040, where the hole 2040 can be fabricated/constructed from tungsten material.

To achieve faster connectivity between the system-on-chips 1820-A/B/C/D/E, an optical interconnection is preferable than an electrical interconnection.

Figure 21A:
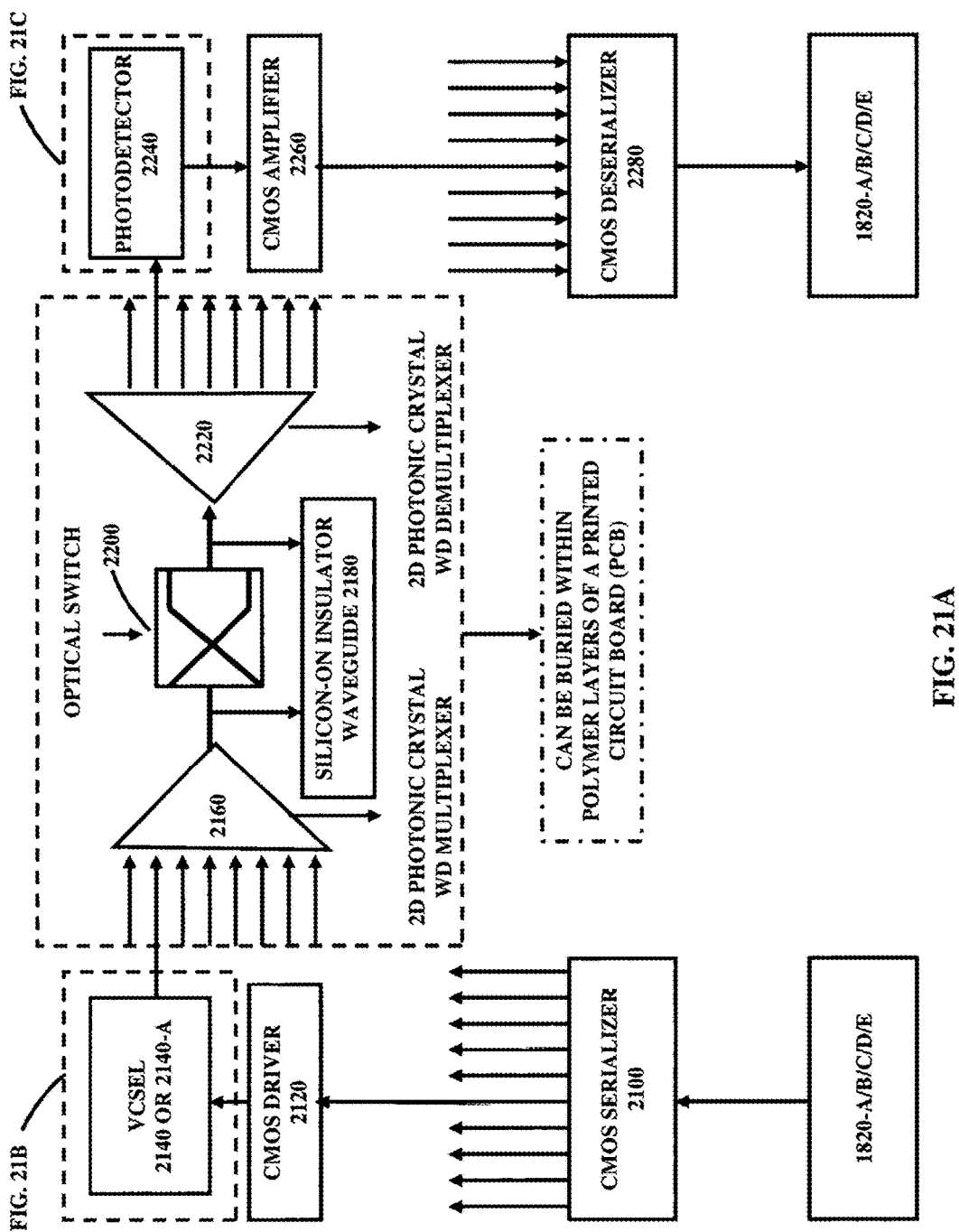
FIGS. 21(A, B and C) illustrates a block diagram of an interconnection between the above system-on-chips (via wavelength division multiplexing) on the printed circuit board, according to one embodiment of the present invention.
FIG. 21D illustrates a cross section of a vertical cavity surface emitting laser, monolithically integrated with a modulator, according to one embodiment of the present invention.

FIG. 21A illustrates a block diagram of an interconnection between the system-on-chips 1820-A/B/C/D/E (via optics) on the printed circuit board 1980.

Table-5 below describes subcomponents required to fabricate/construct the interconnection between the system-on-chips 1820-A/B/C/D/E (via optics) on a printed circuit board 1980.

TABLE 5

| FIG. 21A Legend | Description |
|---|---|
| 1820-A/B/C/D/E | System-On-Chip |
| 2100 | Complementary Metal-Oxide Semiconductor Serializer |
| 2120 | Complementary Metal-Oxide Semiconductor Driver |
| 2140 | Directly Modulated Vertical Cavity Laser |
| 2140-A | Vertical Cavity Laser Integrated With E-O Modulator |
| 2160 | Silicon On-Insulator (SOI) Two-Dimensional Photonic Crystal Wavelength Division Multiplexer |
| 2180 | Silicon-On-Insulator Waveguide |
| 2200 | Silicon On-Insulator Reconfigurable Optical Switch |
| 2220 | Silicon On-Insulator Two-Dimensional Photonic Crystal Wavelength Division Demultiplexer |
| 2240 | Photo Detector |
| 2260 | Complementary Metal-Oxide Semiconductor Amplifier |

TABLE 5-continued

| FIG. 21A Legend | Description |
| --- | --- |
| 2280 | Complementary Metal-Oxide Semiconductor Deserializer |
| 1820-A/B/C/D/E | System-On-Chip |

Electrical outputs from a system-on-chip (e.g., 1820-A/B/C/D/E) are serialized by a complementary metal-oxide semiconductor serializer 2100. The outputs of a complementary metal-oxide semiconductor serializer 2100 can be utilized as the inputs to an array of complementary metal-oxide semiconductor drivers 2120. Correspondingly, the array of complementary metal-oxide semiconductor drivers 2120 can activate an array of directly modulated (in intensity) vertical cavity surface emitting lasers 2140 or an array of vertical cavity surface emitting lasers, which are monolithically integrated electro-optic modulators 2140-A.

The modulated wavelength of the directly modulated vertical cavity surface emitting laser 2140 or vertical cavity surface emitting lasers with monolithically integrated electro-optic modulators 2140-A can be combined on wavelengths (or colors) by a silicon-on-insulator two-dimensional photonic crystal wavelength division multiplexer 2160.

The wavelengths (or colors) can be propagated by a silicon-on-insulator waveguide 2180 and if necessary, can be reconfigured by a silicon-on-insulator reconfigurable optical switch 2200.

The outputs of a silicon-on-insulator waveguide 2180 or silicon-on-insulator reconfigurable optical switch 2200 can be decombined on wavelengths (or colors) by a silicon-on-insulator two-dimensional photonic crystal wavelength division demultiplexer 2220.

Furthermore, the wavelengths (or colors) outputs (of a silicon-on-insulator two-dimensional photonic crystal wavelength division demultiplexer 2220) can be received by an array of photodetectors (e.g., P-i-N photodetectors) 2240, an array of complementary metal-oxide semiconductors amplifiers 2260, then as electrical inputs to a complementary metal-oxide semiconductor deserializer 2280 and finally as electrical inputs to another system-on-chip (e.g., 1820-A/B/C/D/E).

Figure 21B:
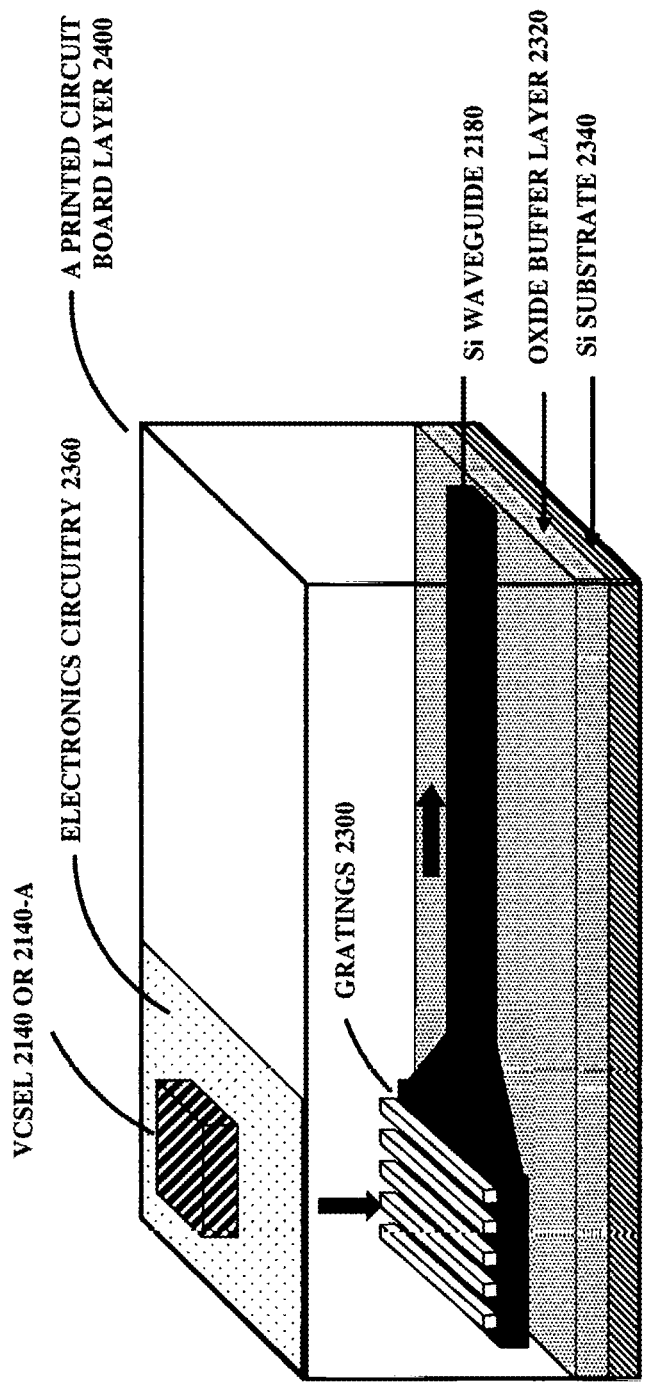

FIG. 21B illustrates details of the silicon-on-insulator waveguide 2180, silicon-on-insulator vertical coupler gratings 2300 and the directly modulated vertical cavity surface emitting laser 2140 or the vertical cavity surface emitting lasers with monolithically integrated electro-optic modulator 2140-A.

The shape of the silicon-on-insulator waveguide 2180 (fabricated/constructed on oxide buffer layer 2320 on silicon substrate 2340) can be adiabatically tapered in at proximity of the silicon-on-insulator vertical coupler gratings 2300. The silicon-on-insulator vertical coupler gratings 2300 can be shaped linear or curved.

Figure 21C:
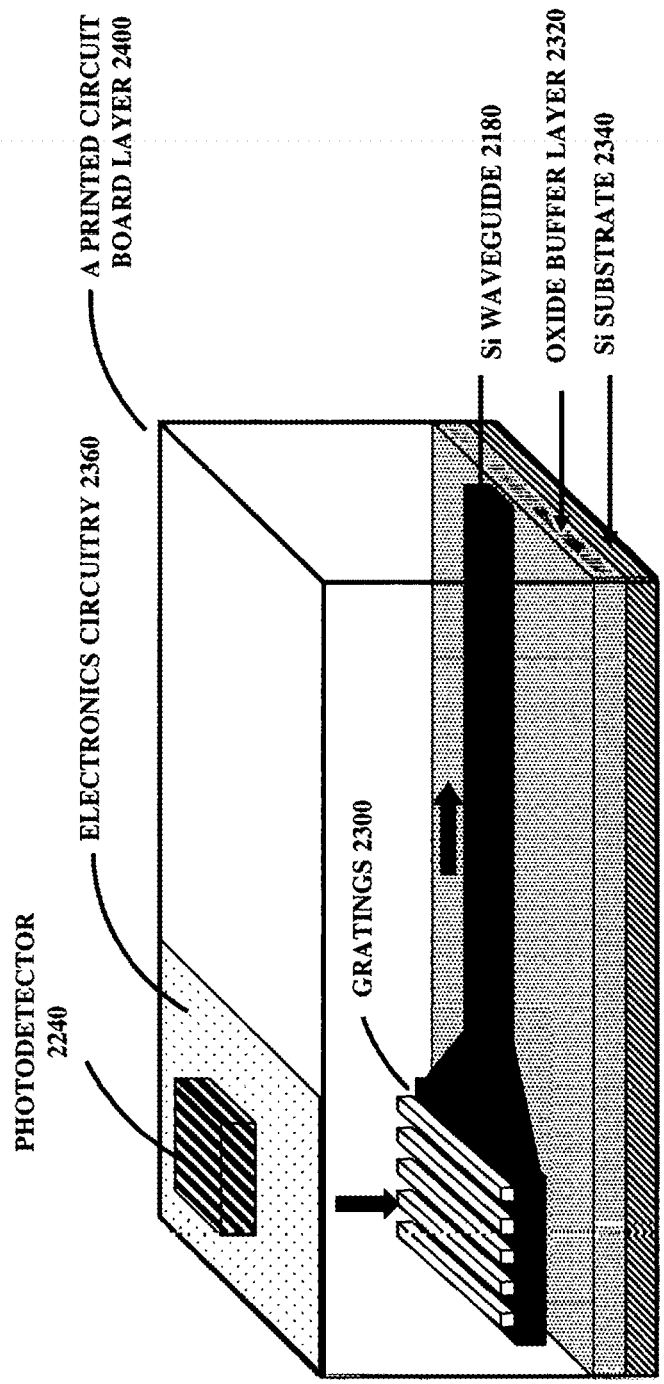

FIG. 21C illustrates details of the silicon-on-insulator waveguide 2180 silicon-on-insulator vertical coupler gratings 2300 and the photodiode 2240. The shape of the silicon-on-insulator waveguide 2180 (fabricated/constructed on the oxide buffer layer 2320 on the silicon substrate 2340) can be adiabatically tapered in at proximity of the silicon-on-insulator vertical coupler gratings 2300. The silicon-on-insulator vertical coupler gratings 2300 can be shaped linear or curved.

Furthermore, the silicon-on-insulator two-dimensional photonic crystal wavelength division multiplexer 2160, silicon-on-insulator waveguide 2180, silicon-on-insulator reconfigurable optical switch 2200 and silicon-on-insulator two-dimensional photonic crystal wavelength division demultiplexer 2220, can be embedded within an etched area of polymers layers of the printed circuit board 1980. An optical mode match between the silicon-on-insulator waveguide 2180 and a polymer waveguide (utilizing a polymer layer of the printed circuit board 1980) can be fabricated/constructed. Also, the etched area can be buried within the printed circuit board 1980. Alternatively, the polymer (e.g., polyimide material) waveguide of the printed circuit board 1980 can be utilized instead of the silicon-on-insulator waveguide 2180.

Figure 21D:
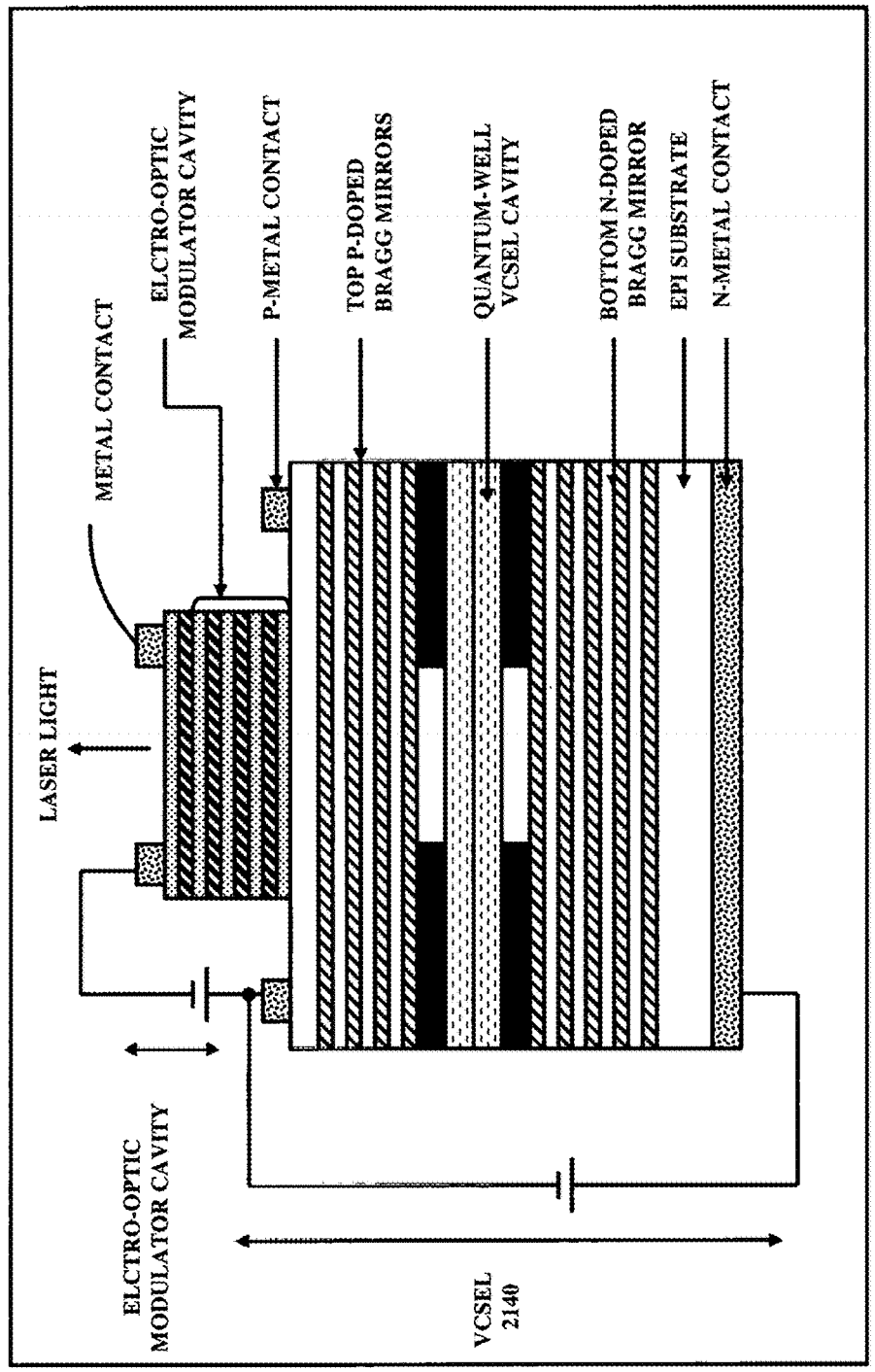
Figure 1A:
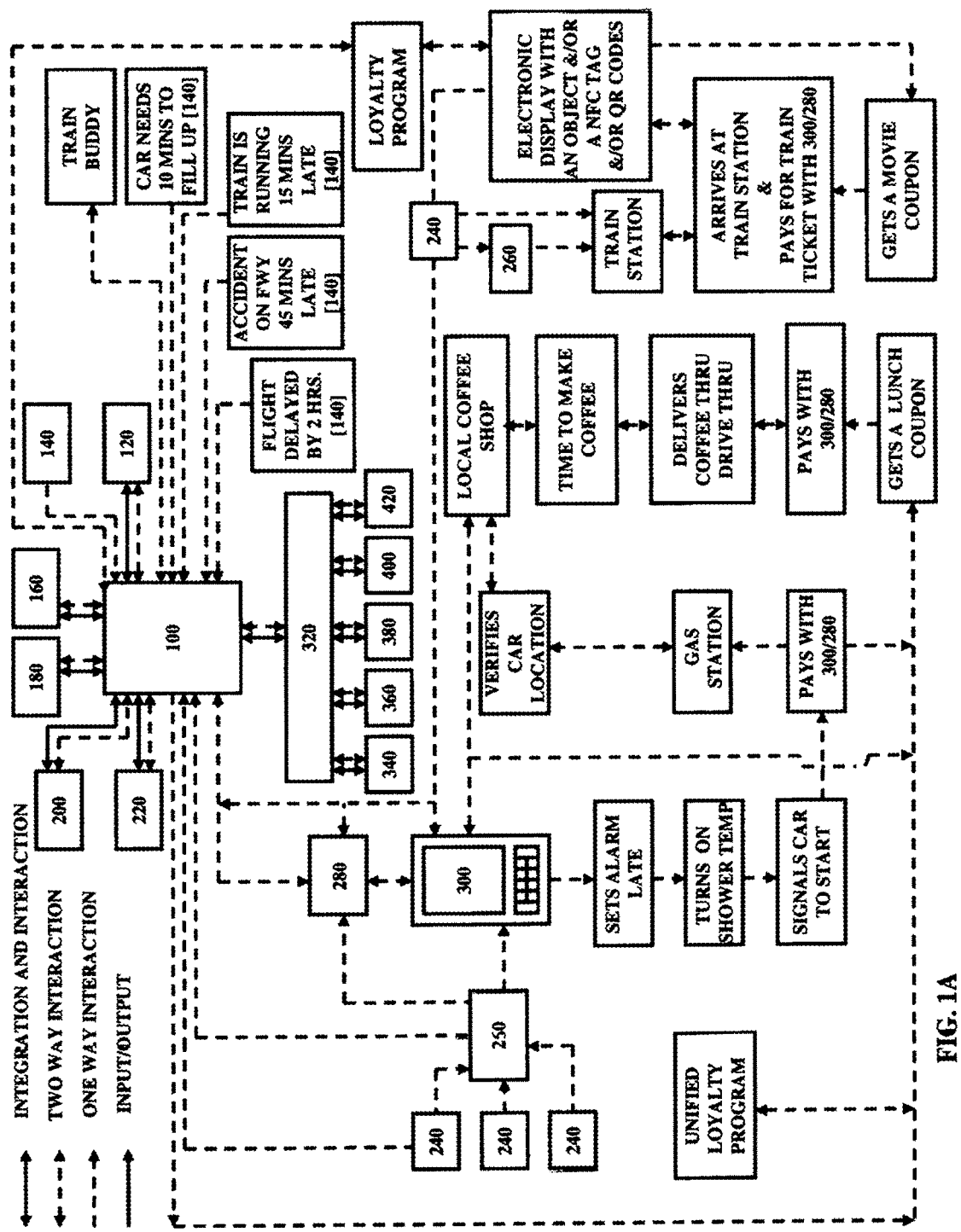
Figure 1B:
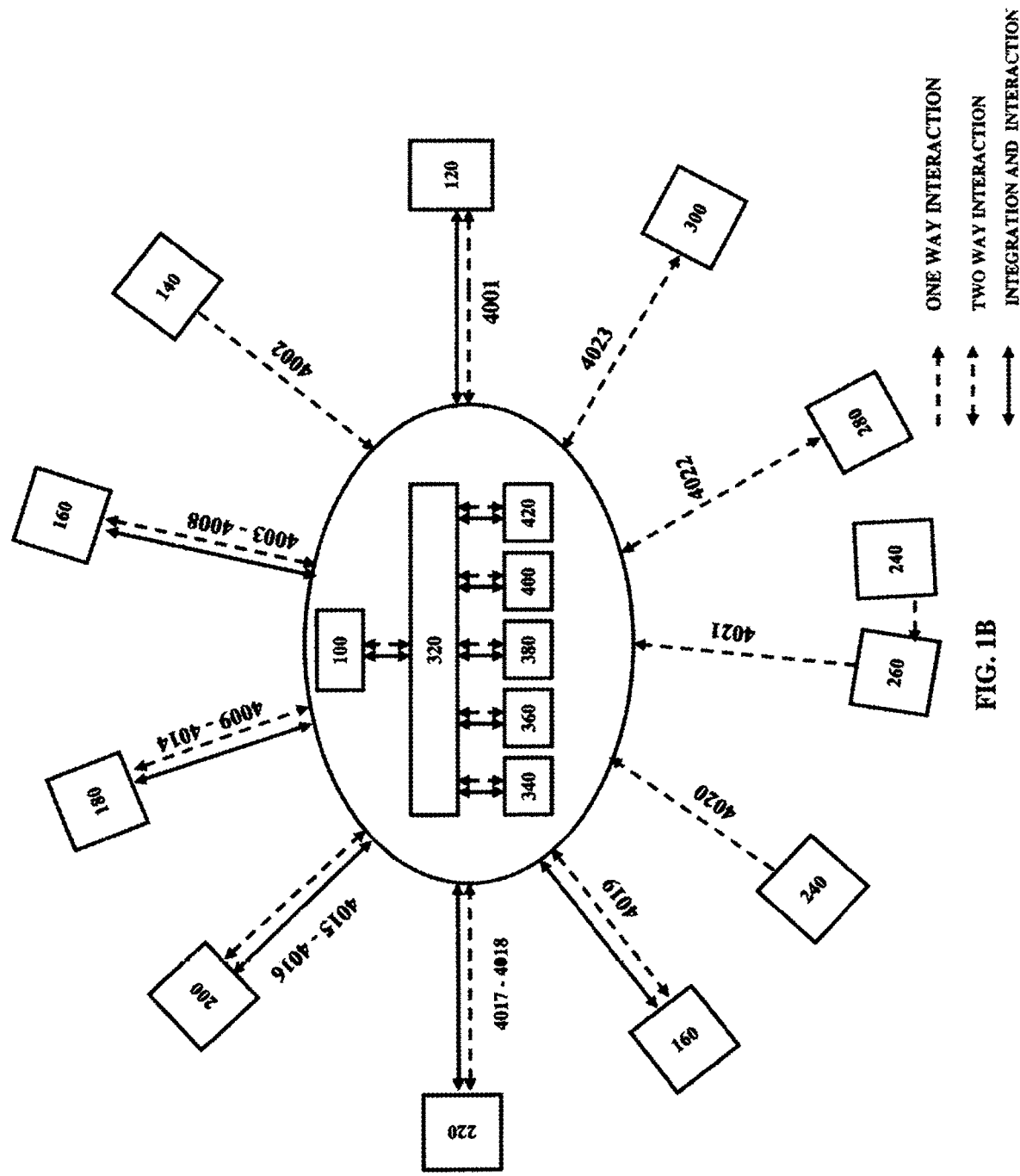
Figure 2A:
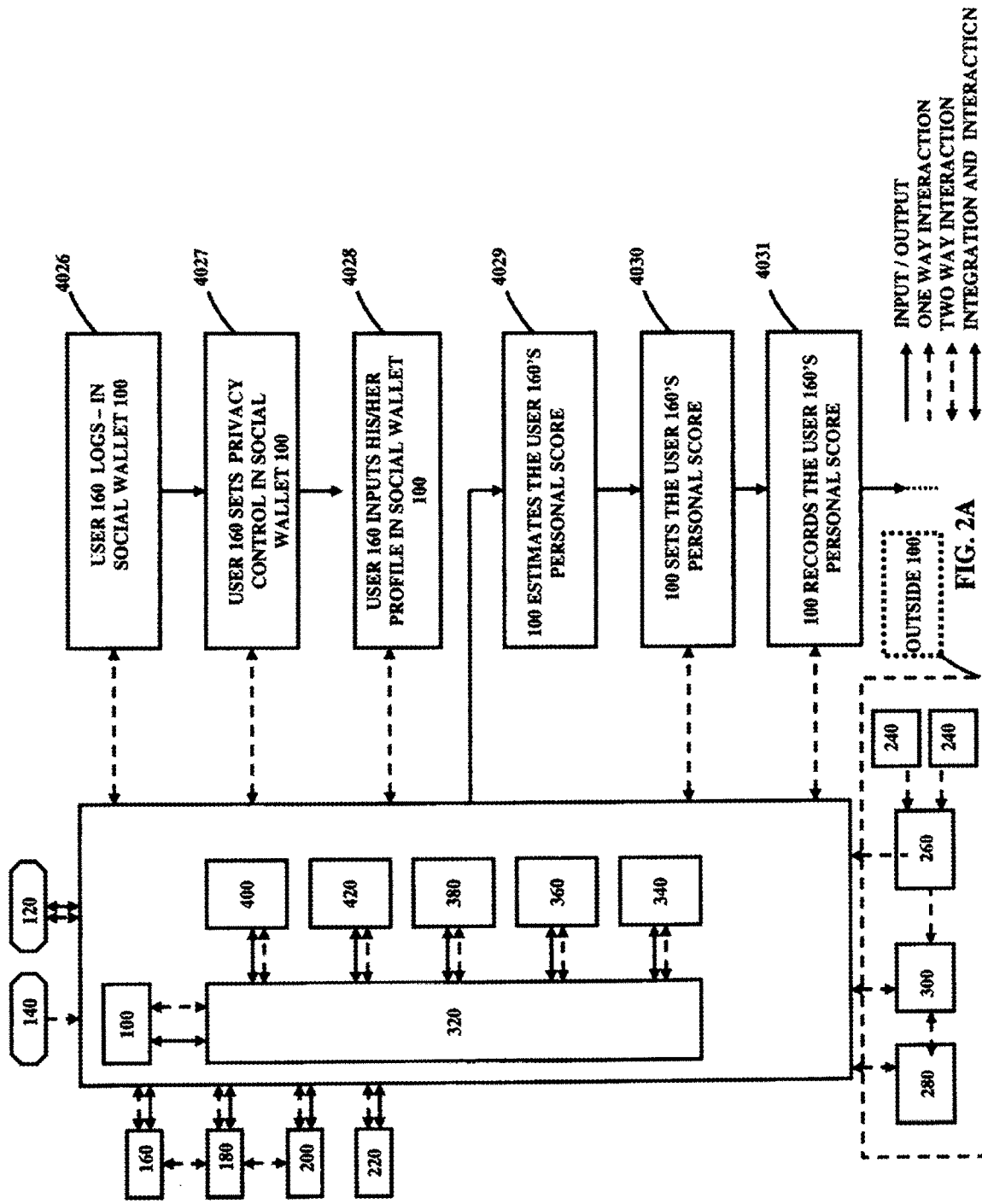
Figure 2C:
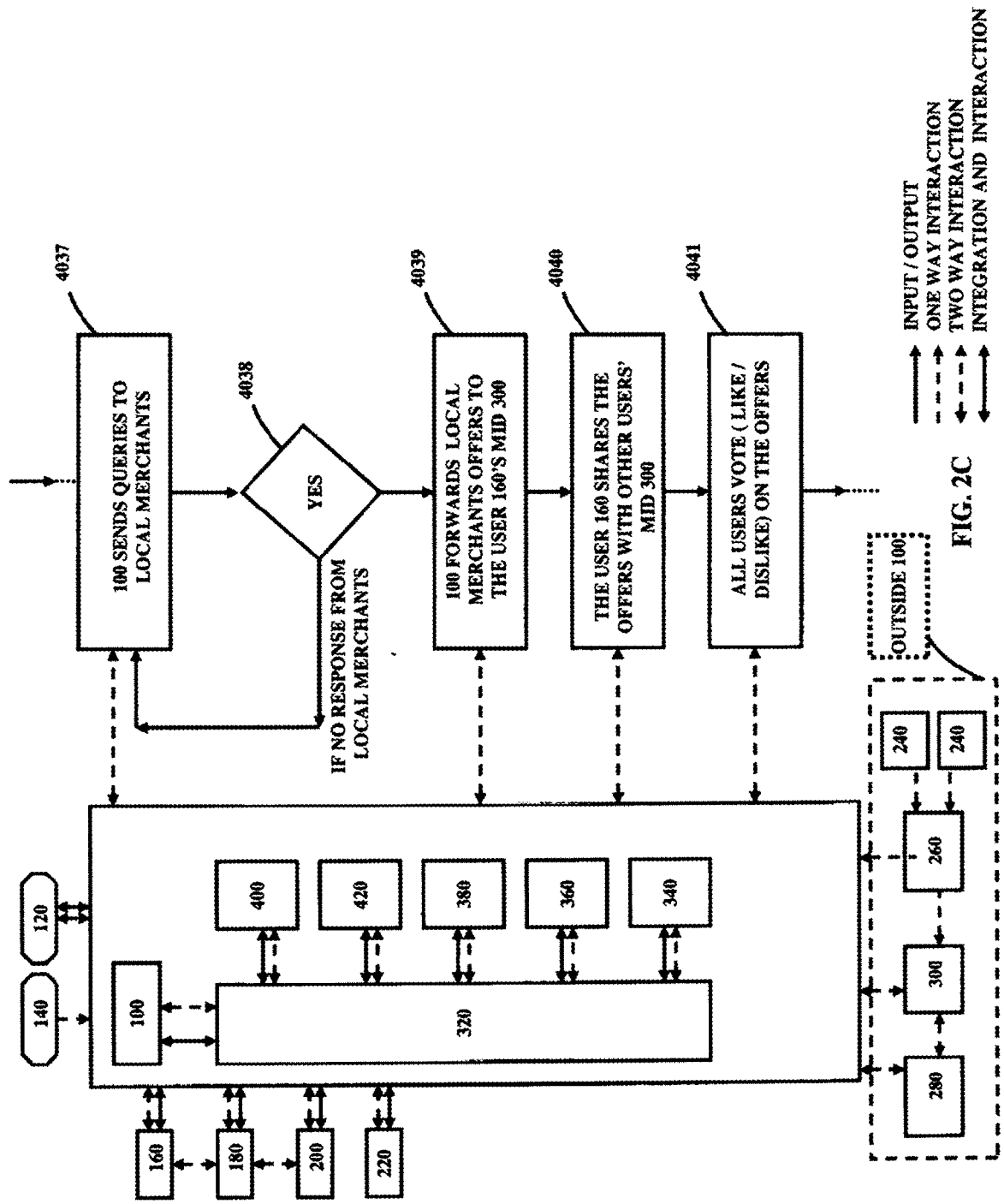
Figure 2D:
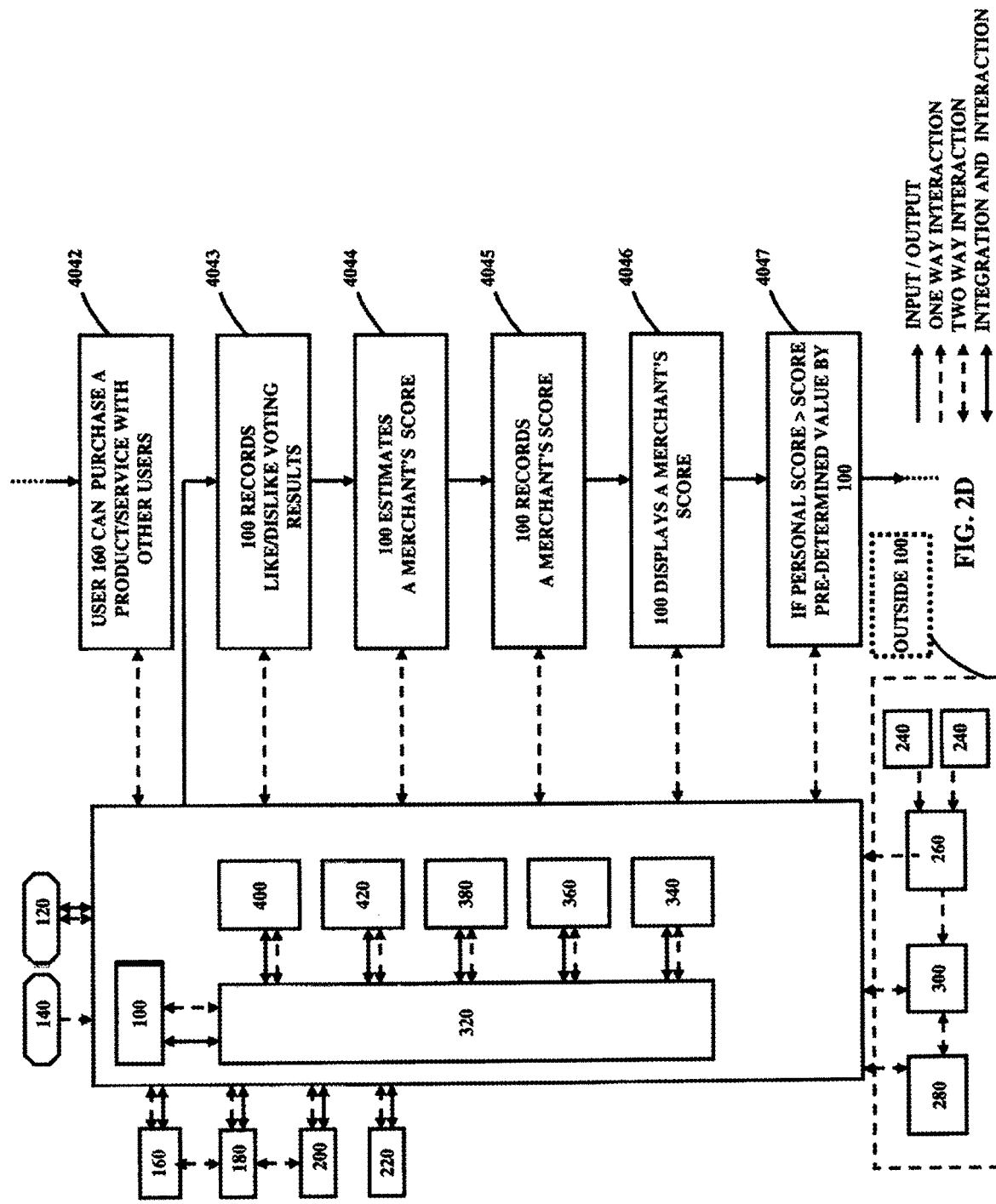
Figure 2F:
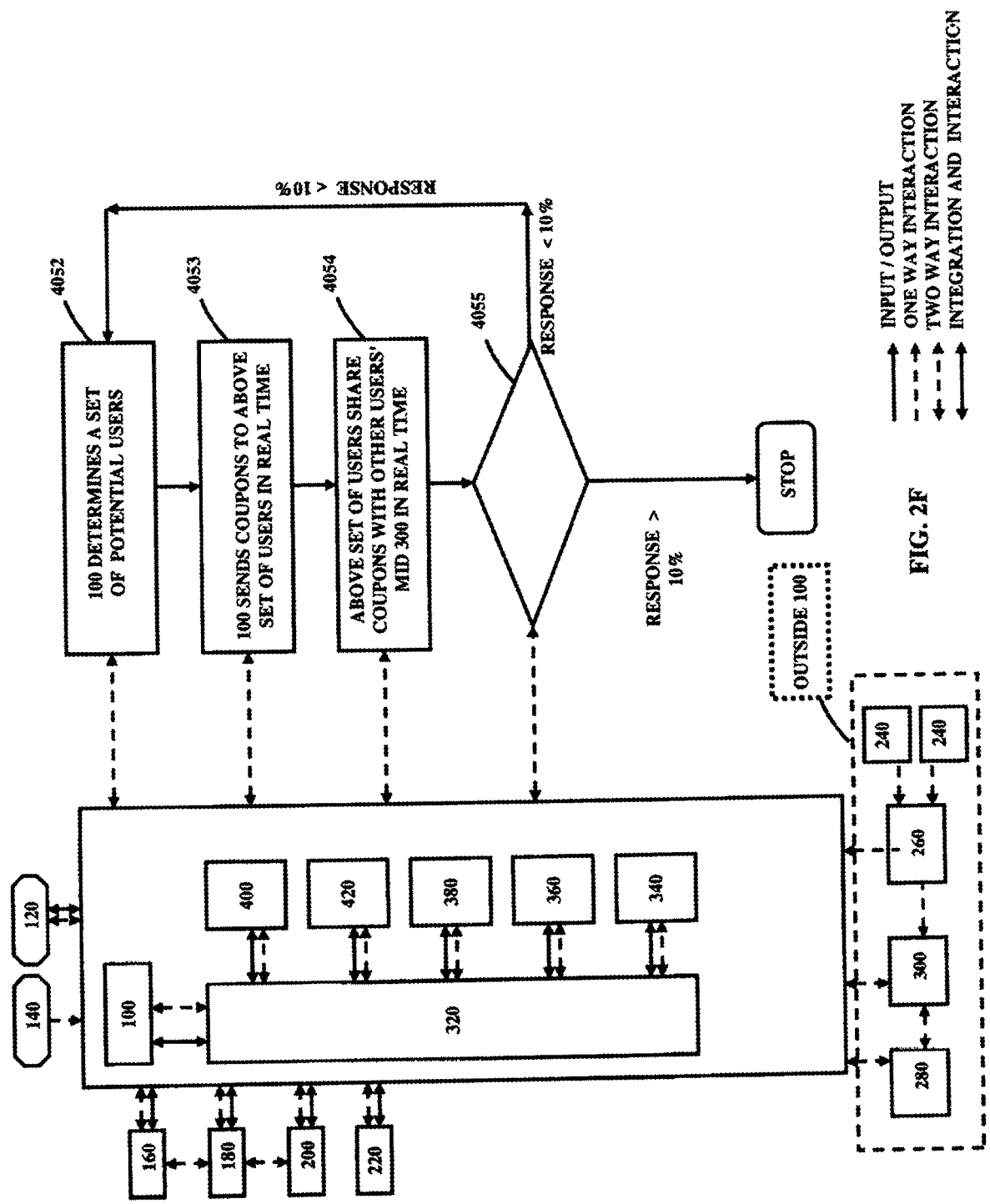
Figure 2G:
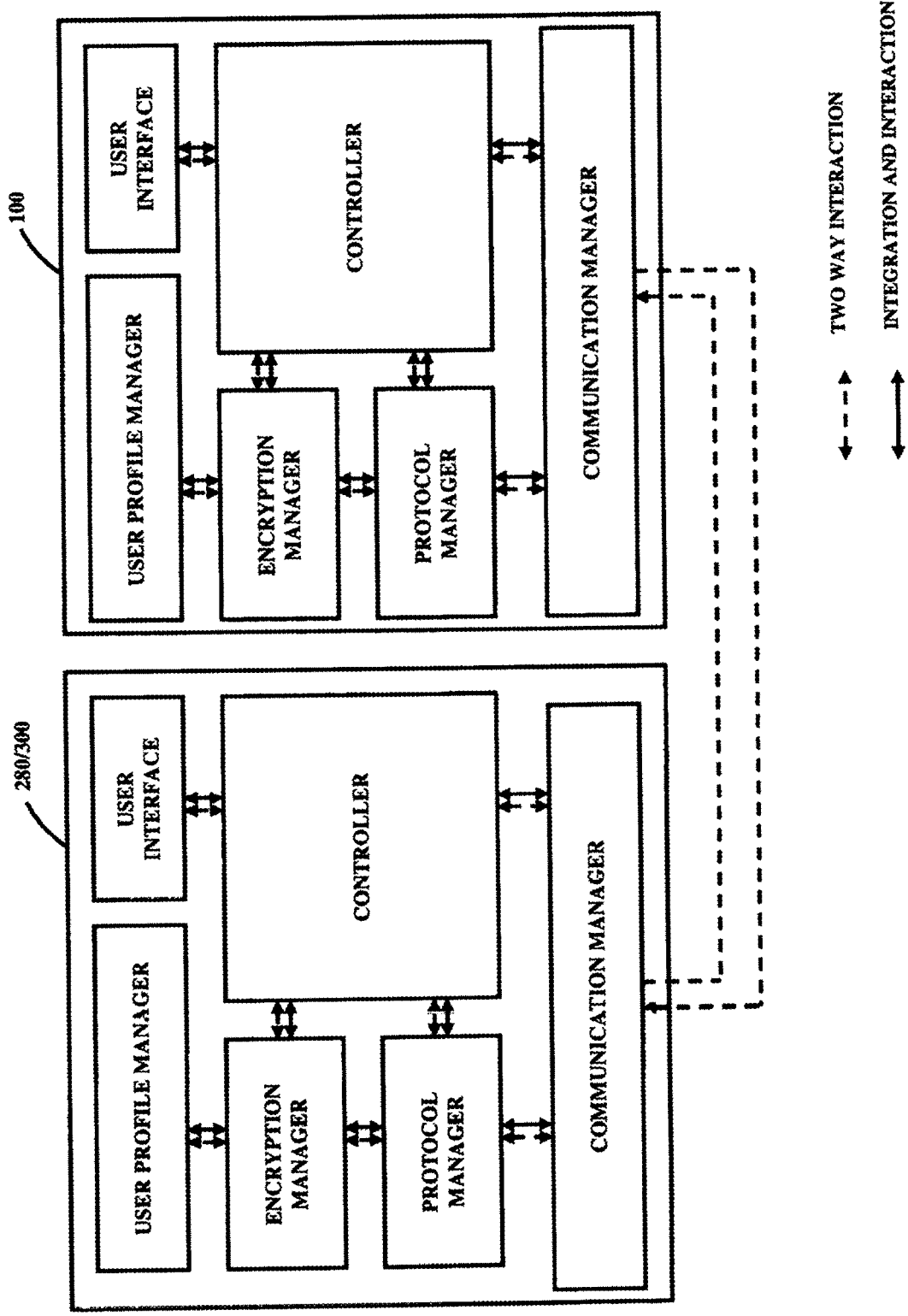
Figure 3A:
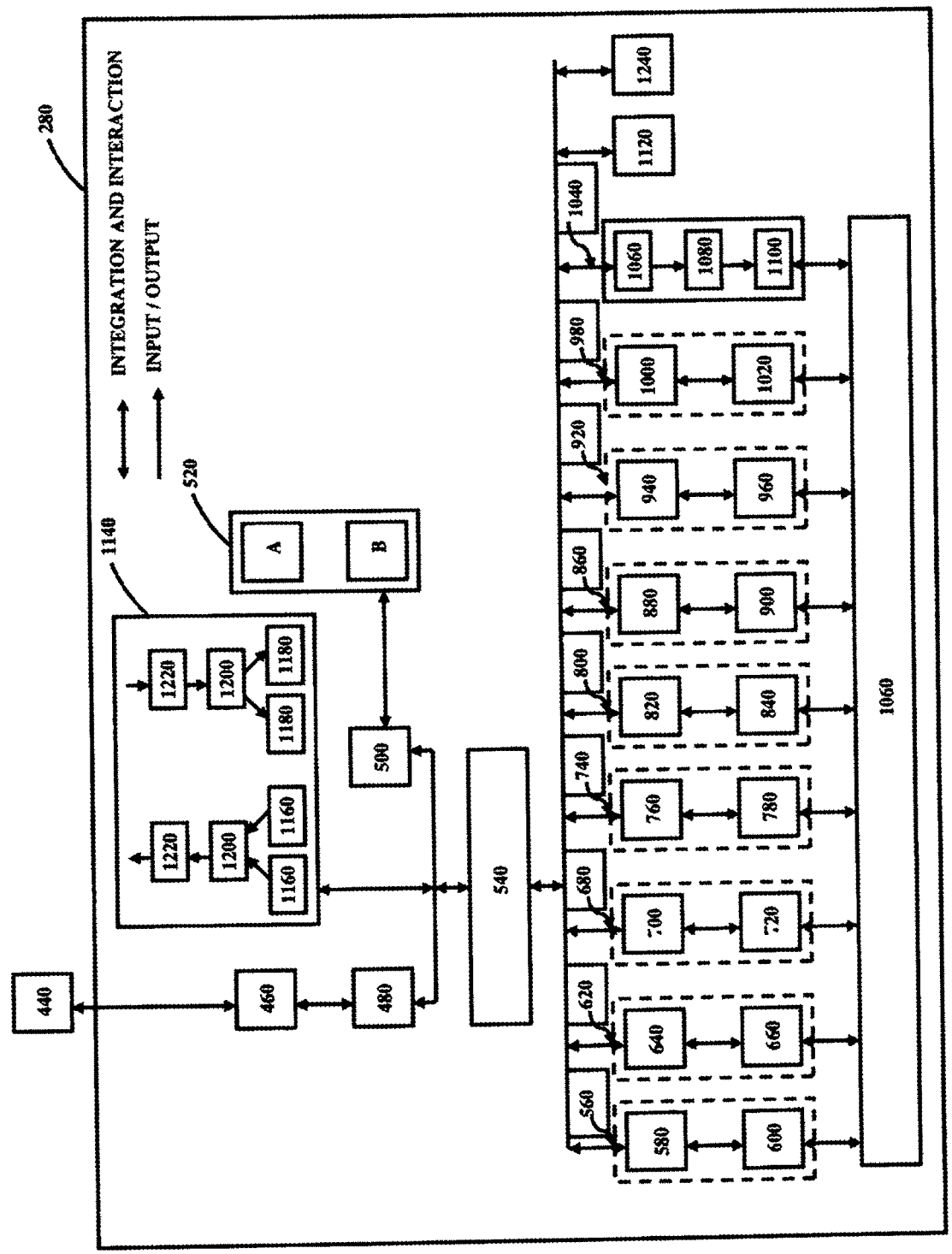
Figure 3B:
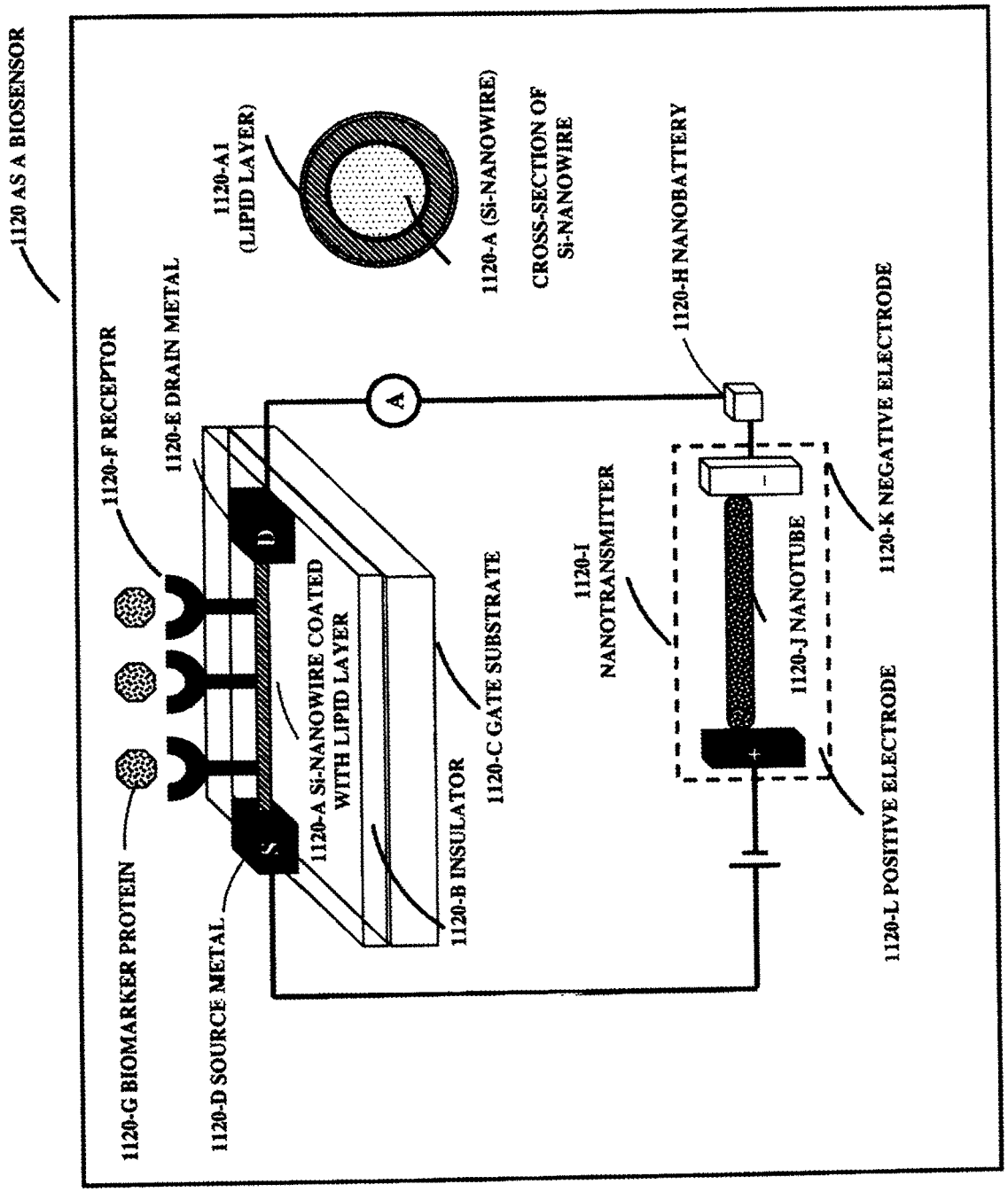
Figure 3C:
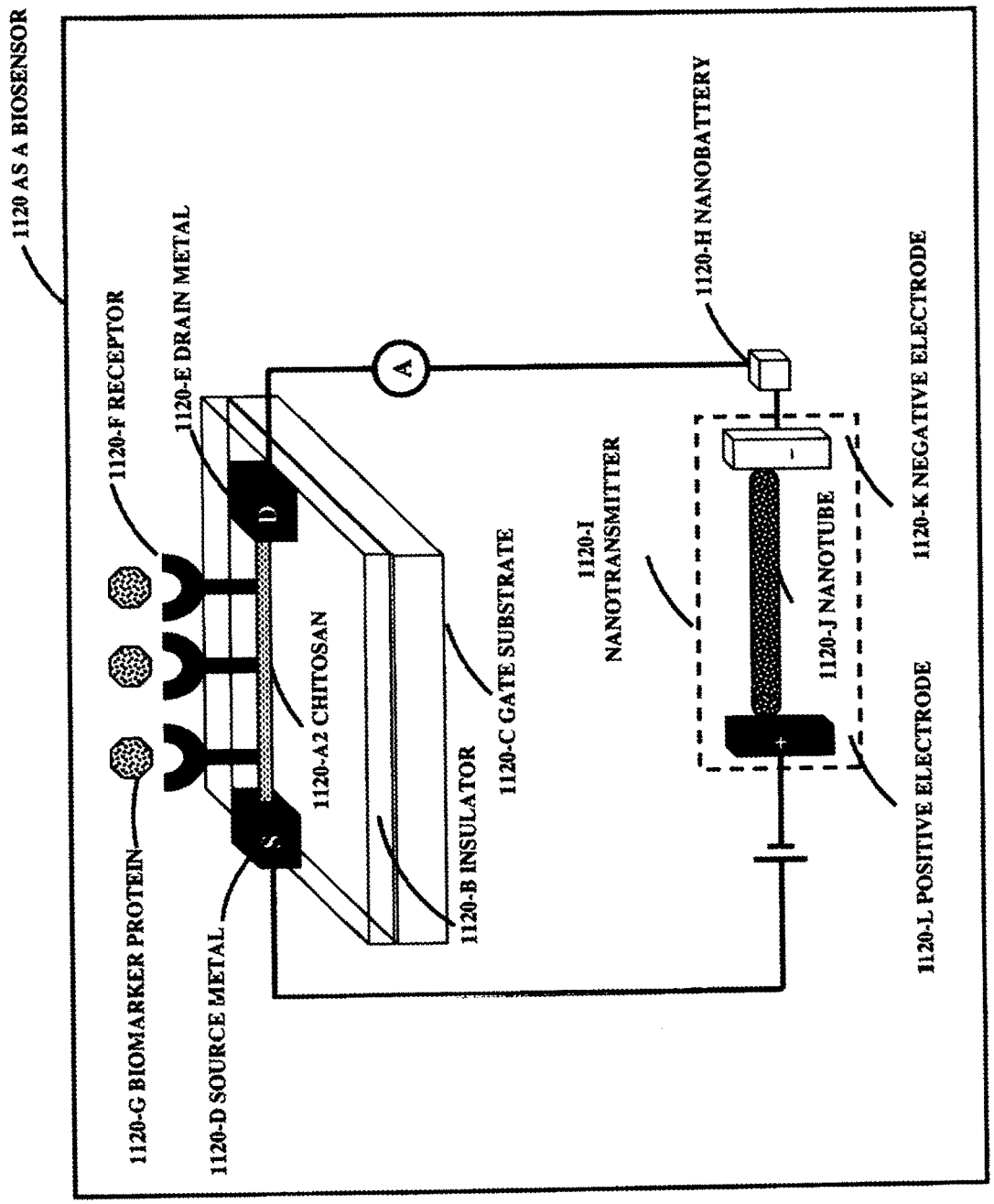
Figure 3D:
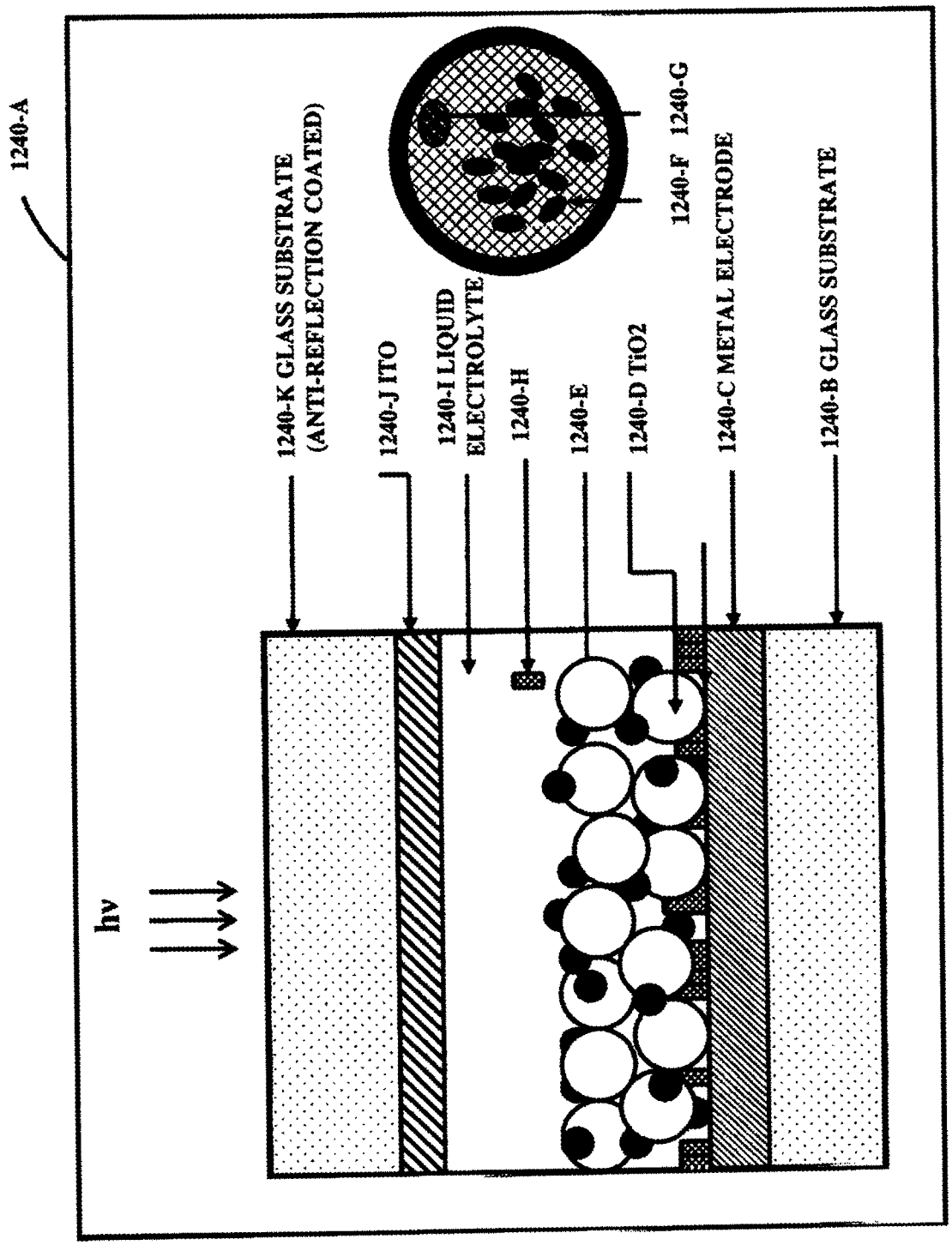
Figure 3E:
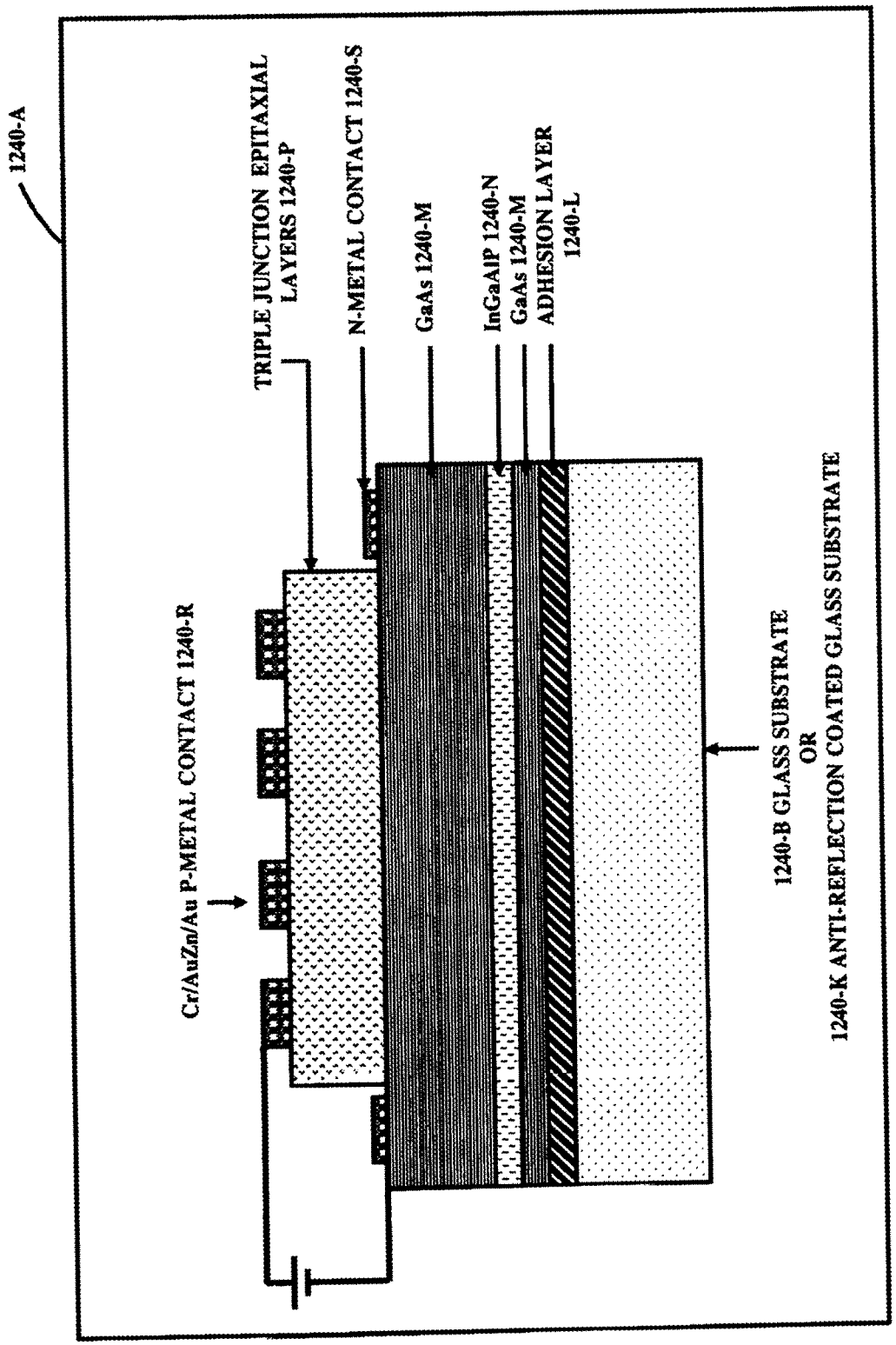
Figure 3F:
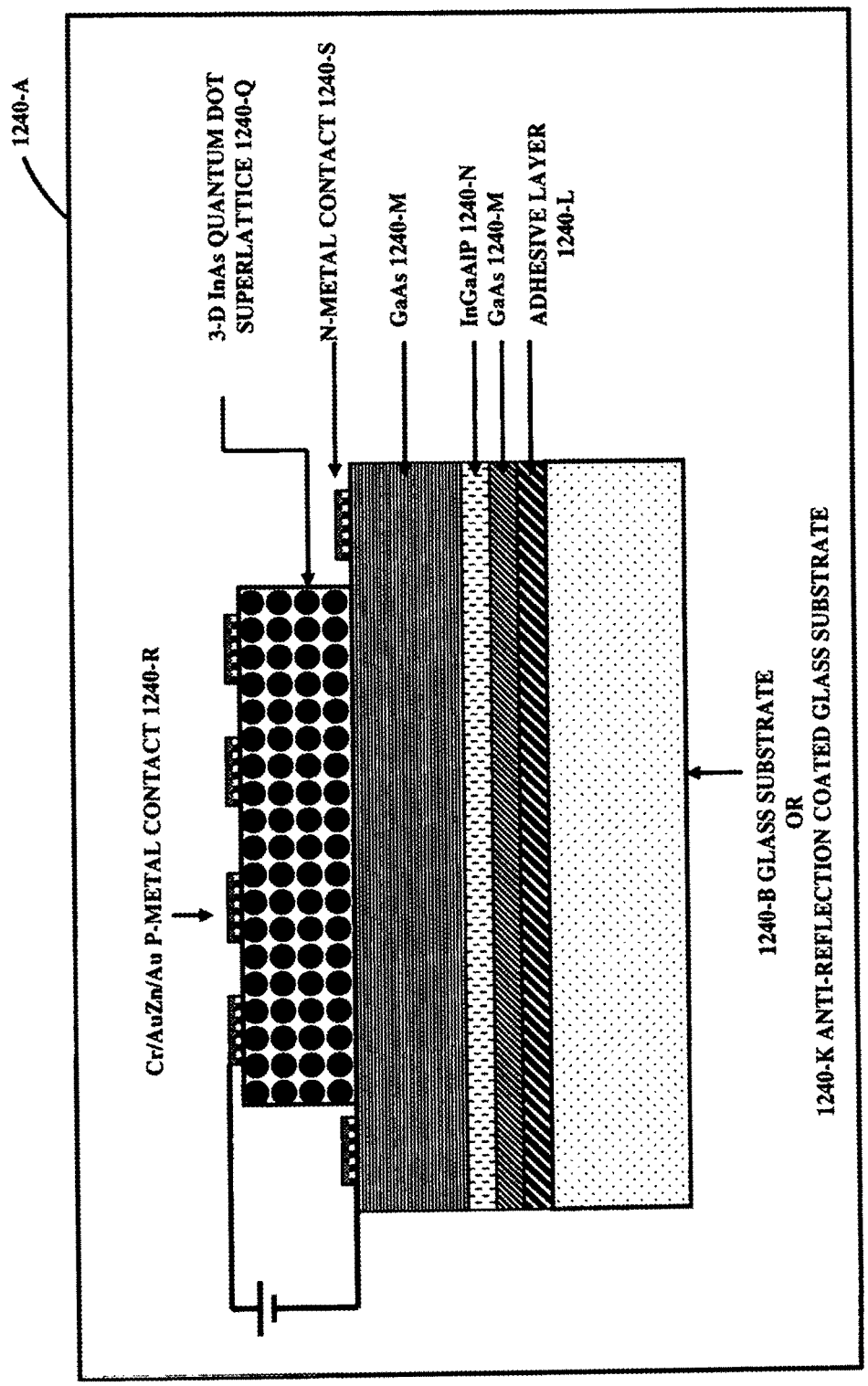
Figure 3G:
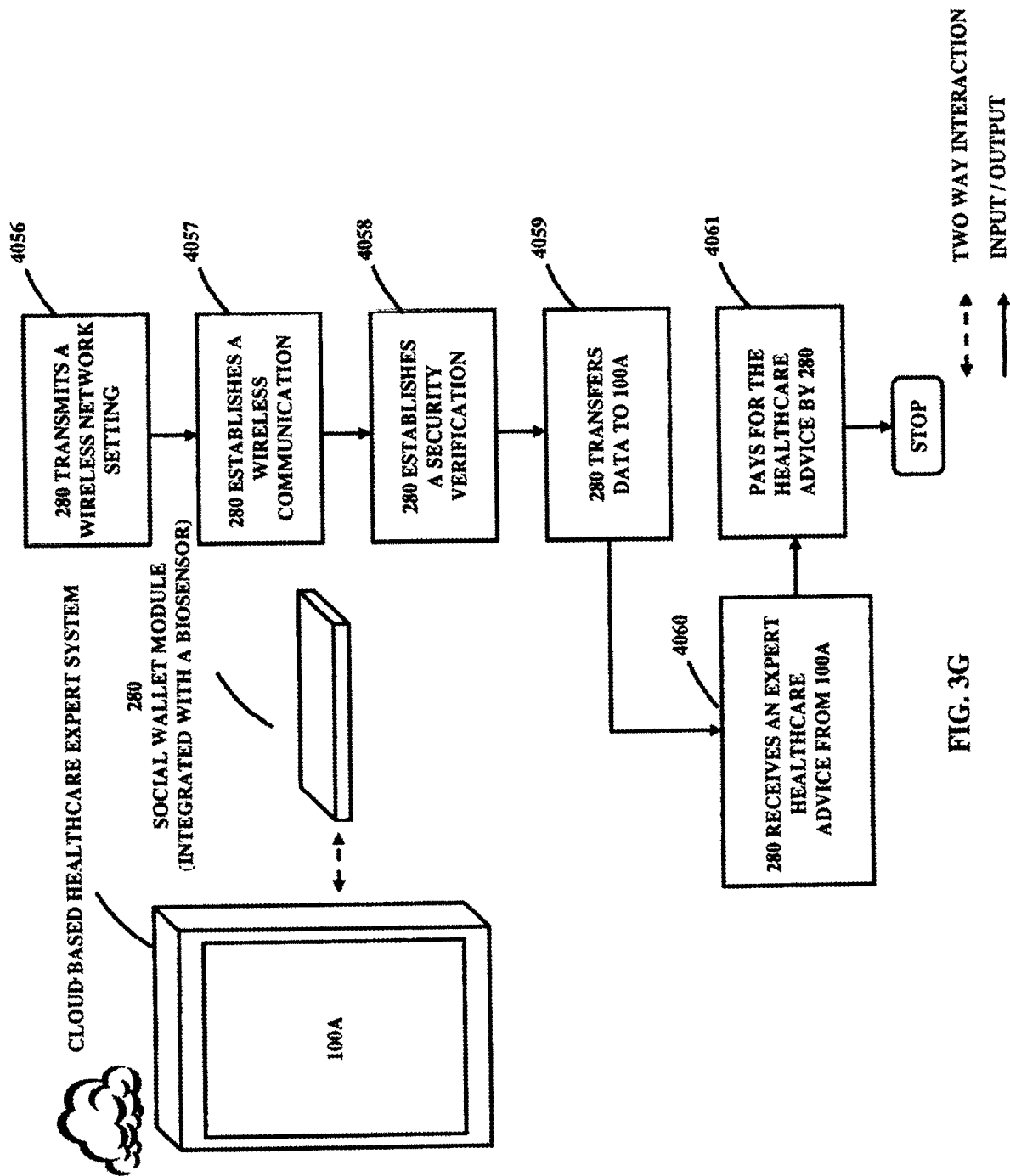
Figure 3H:
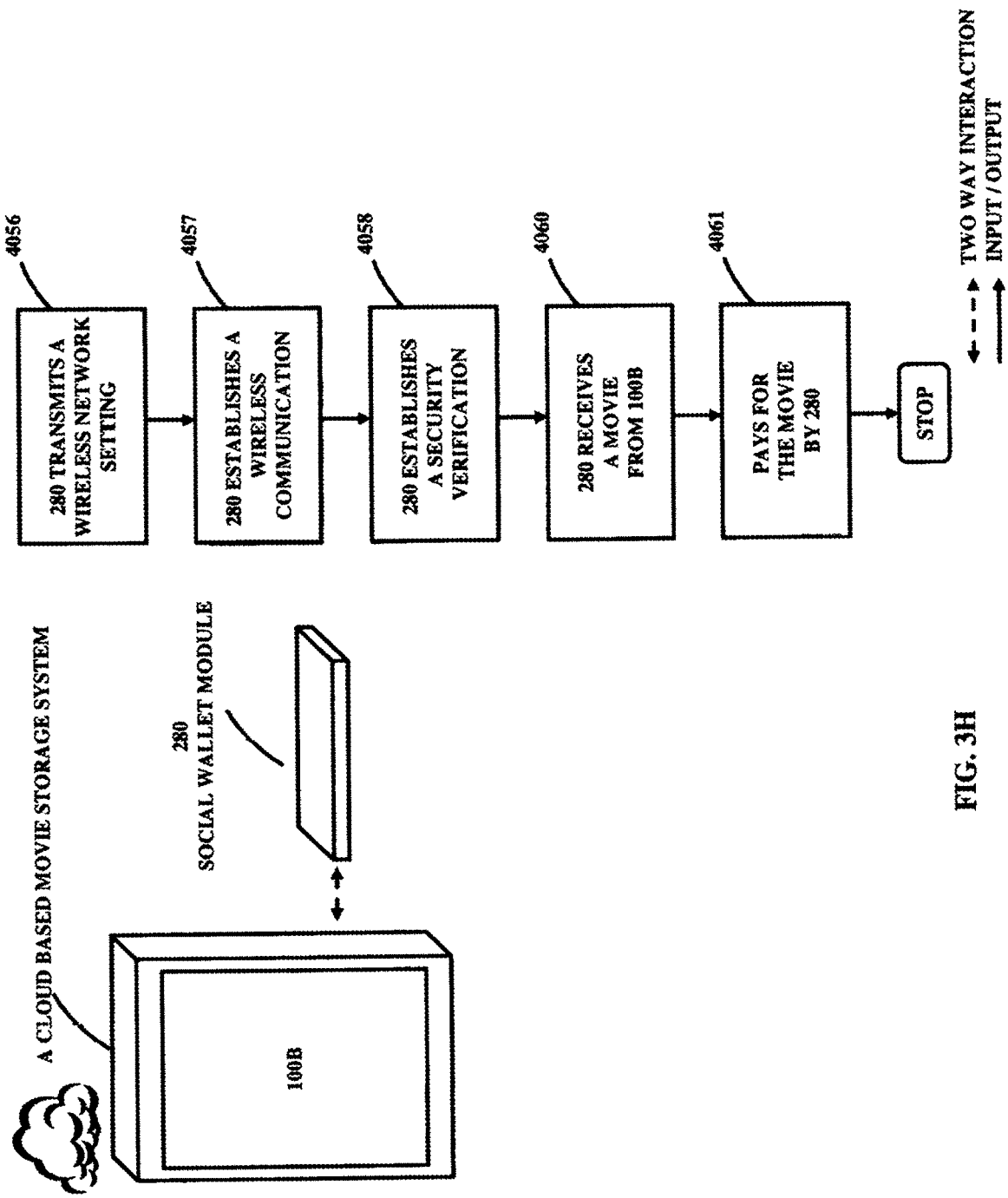
Figure 5A:
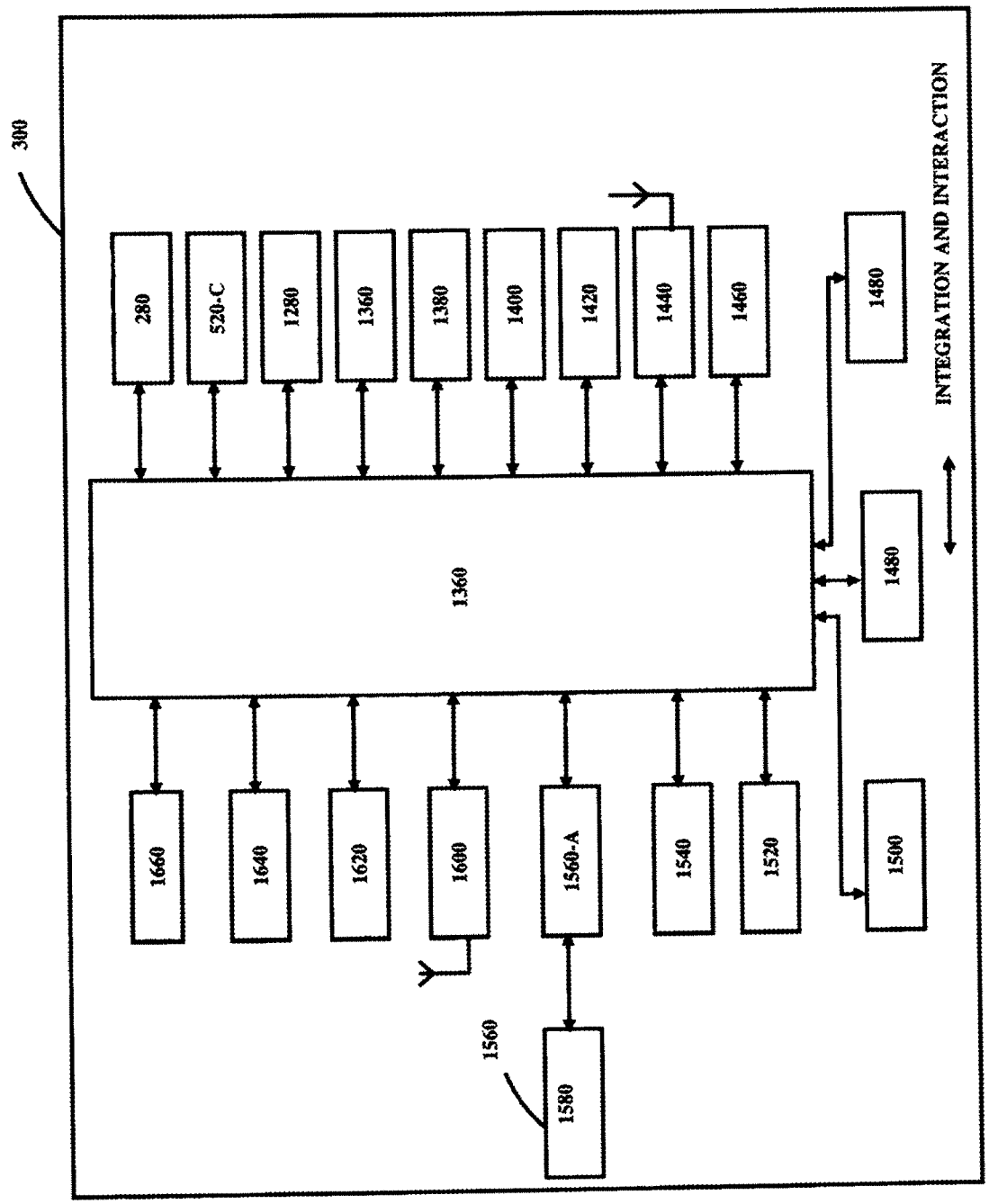
Figure 5B:
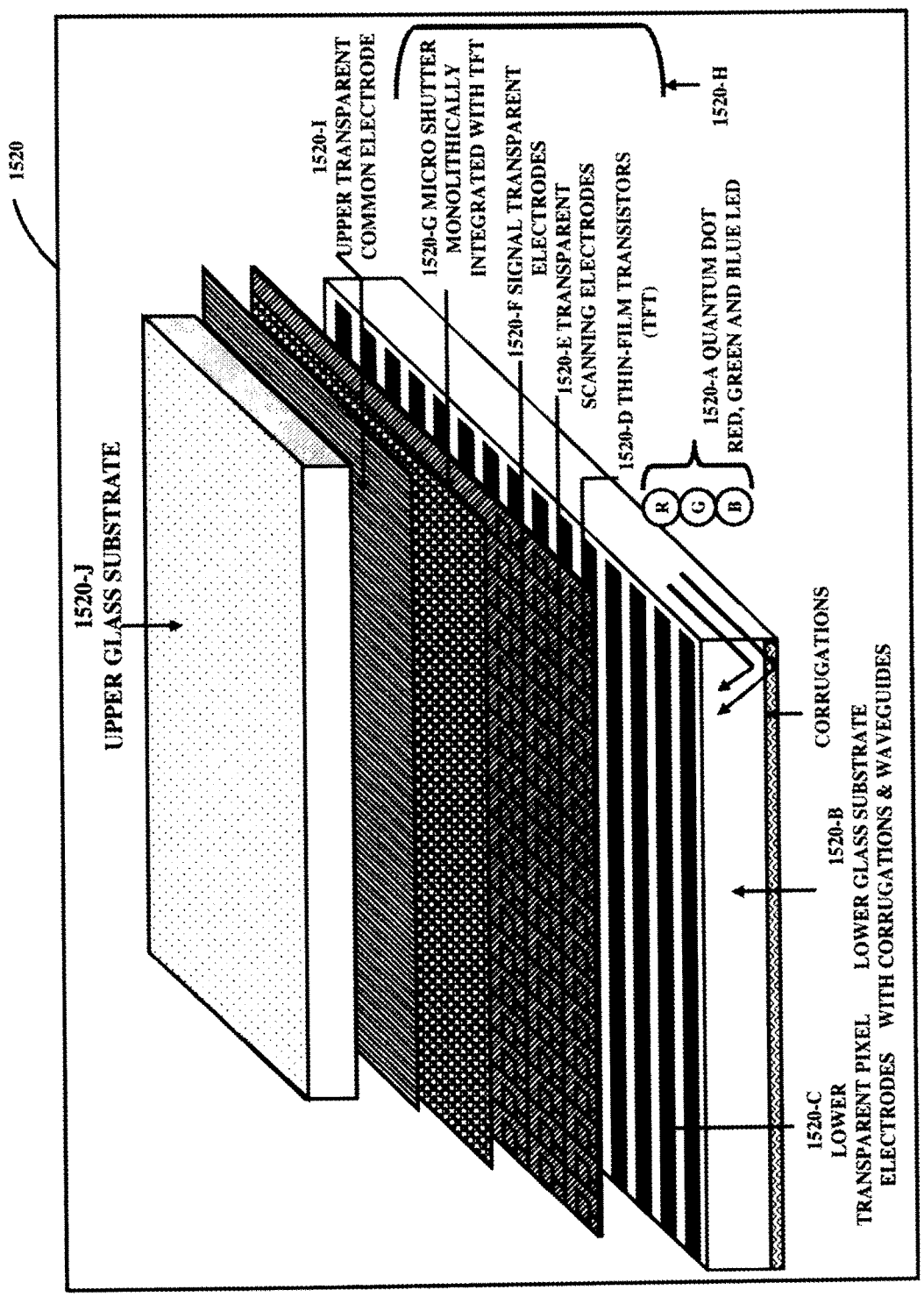
Figure 5C:
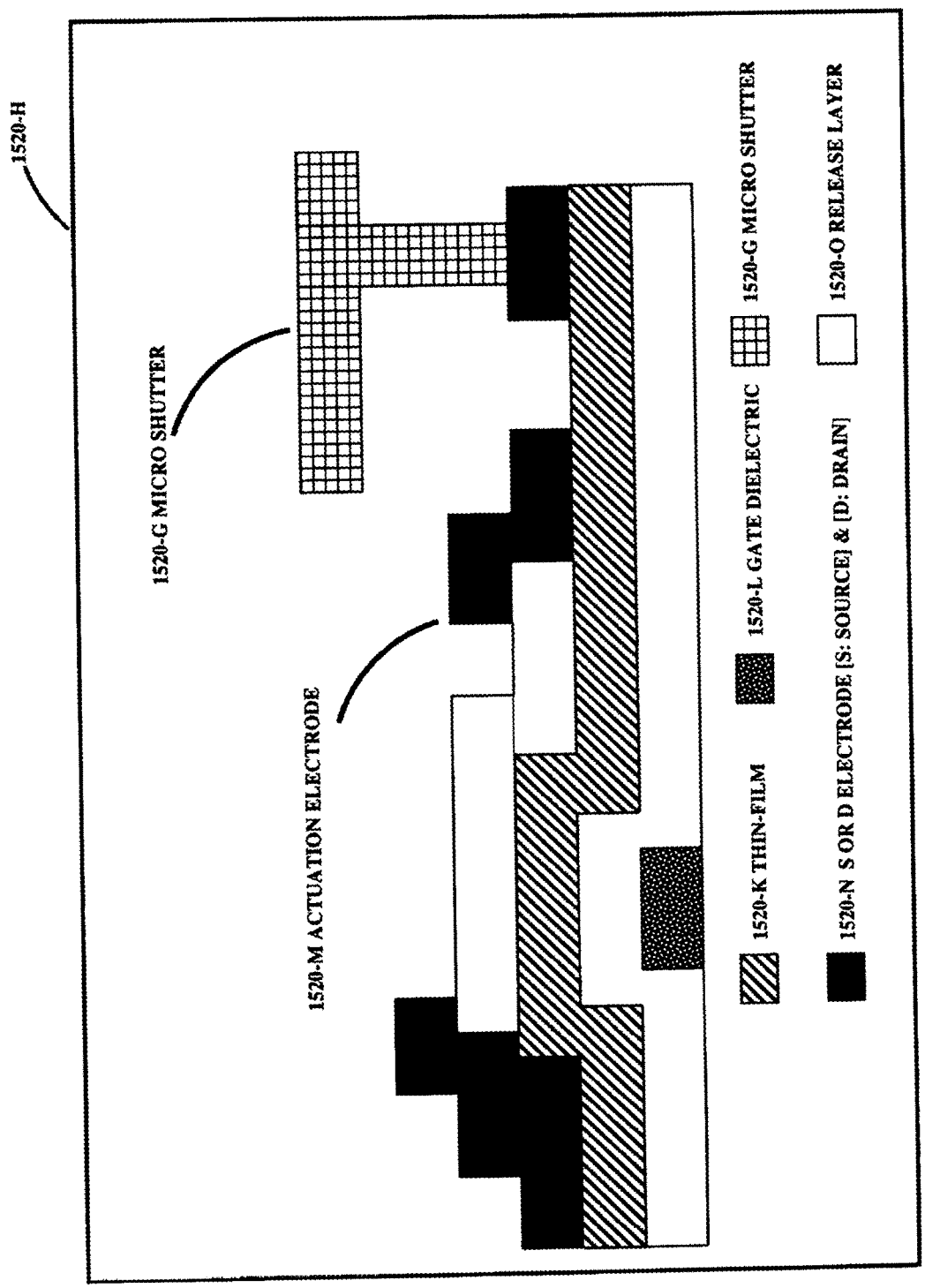
Figure 5D:
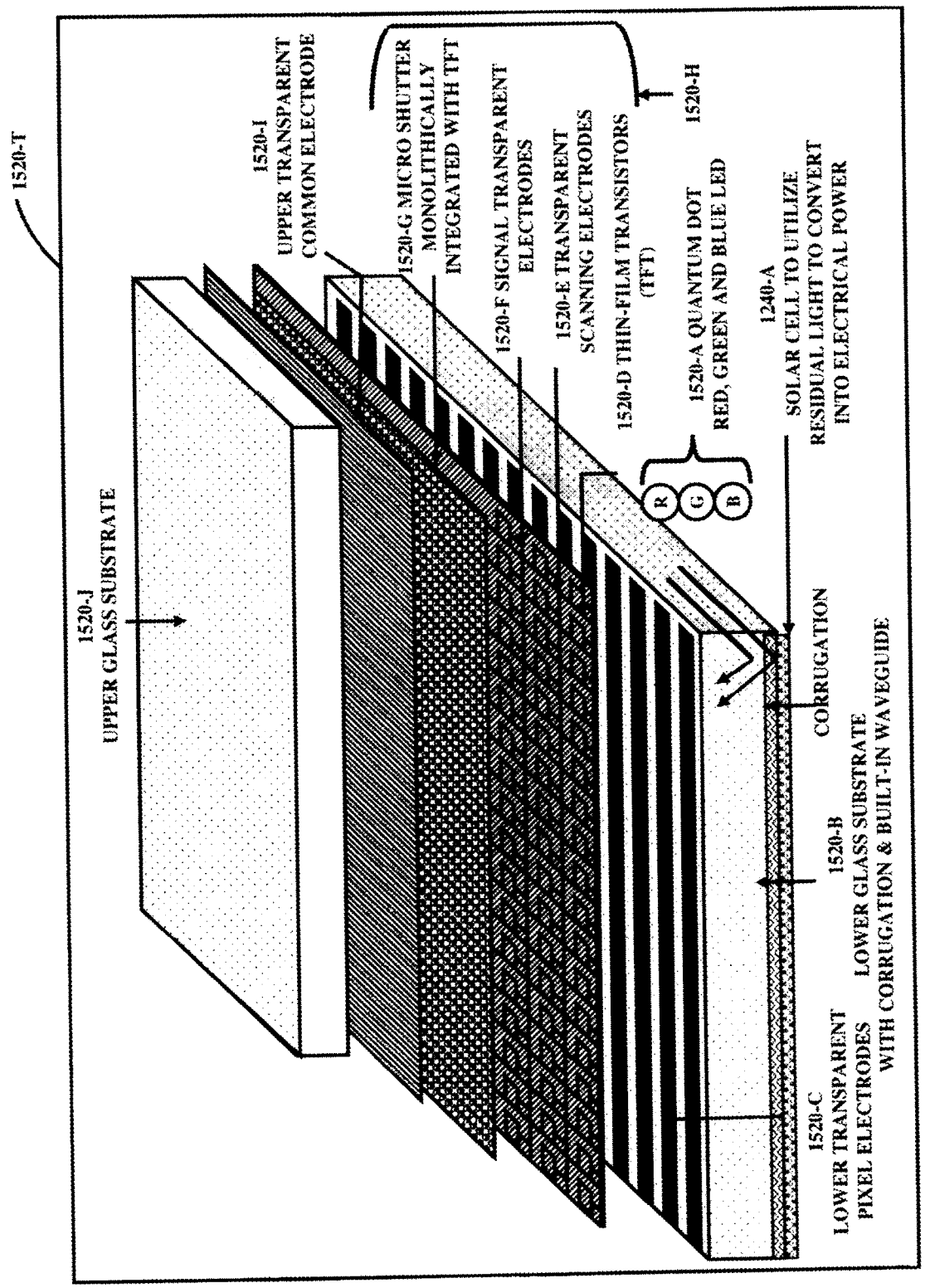
Figure 5E:
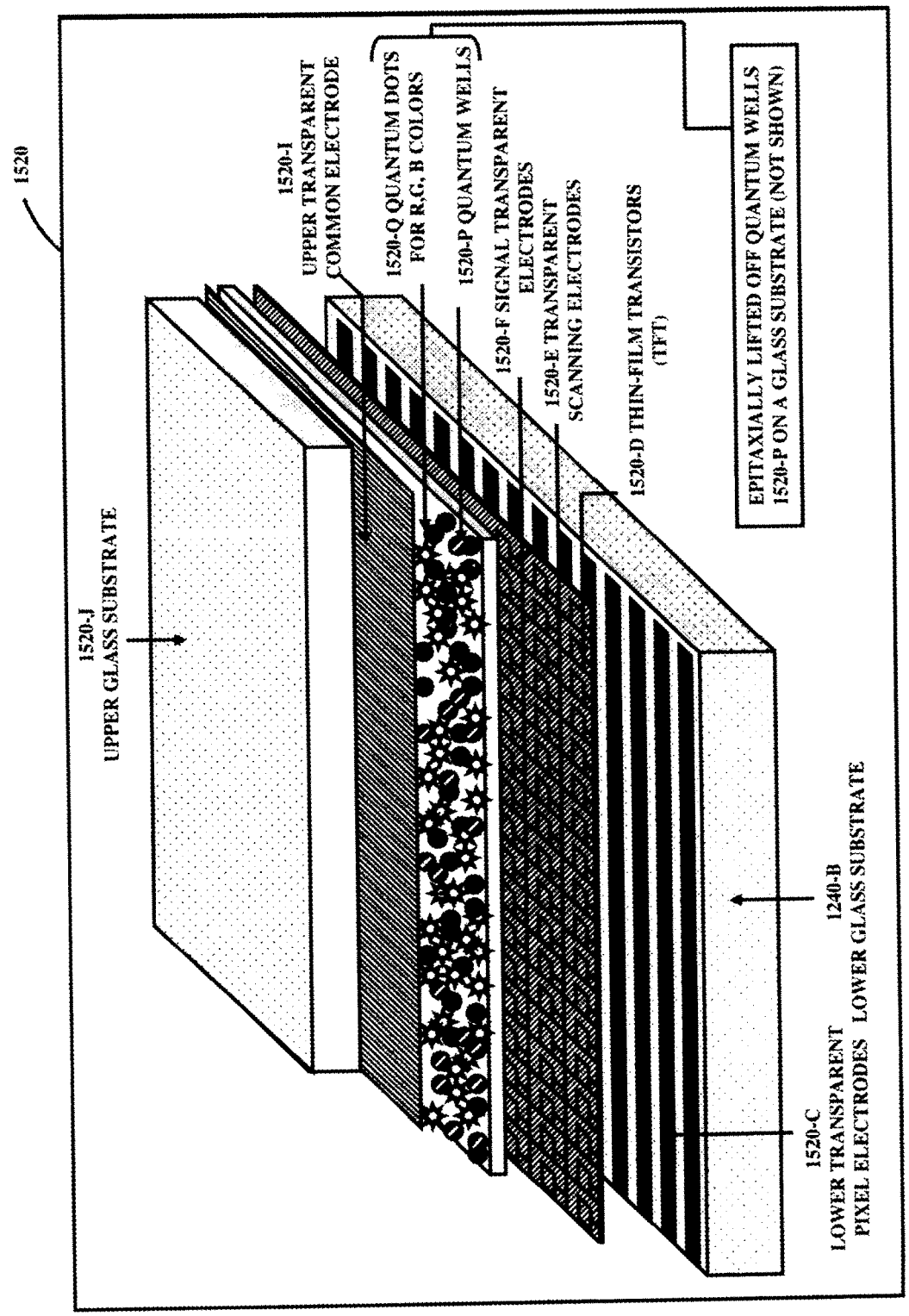
Figure 5F:
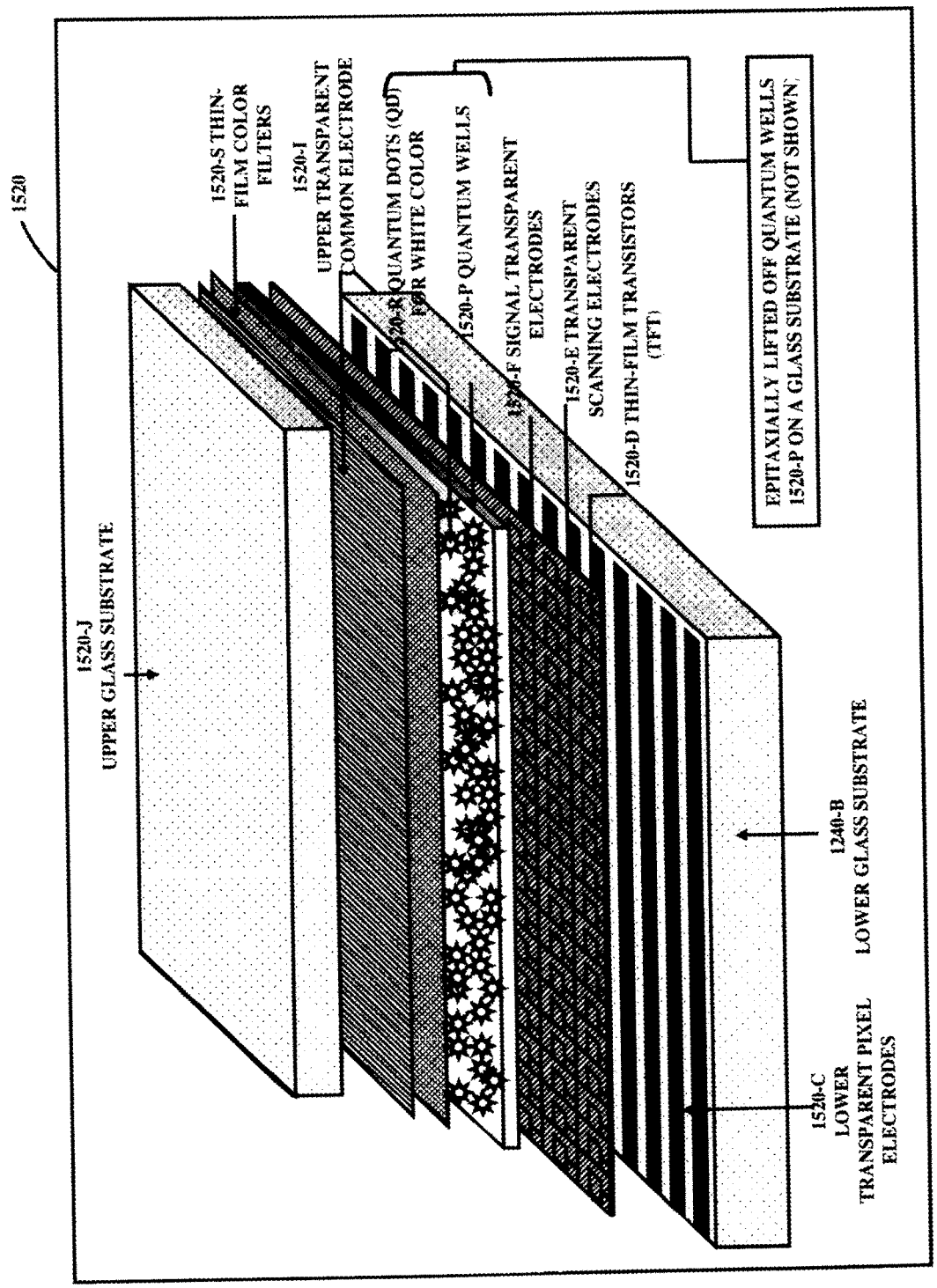
Figure 6:
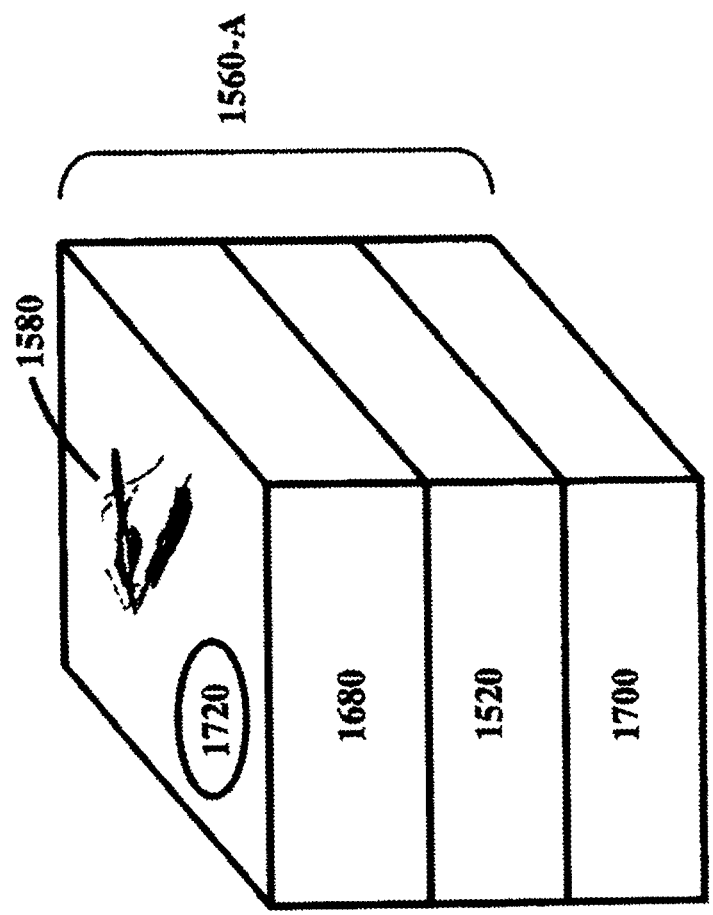
Figure 8A:
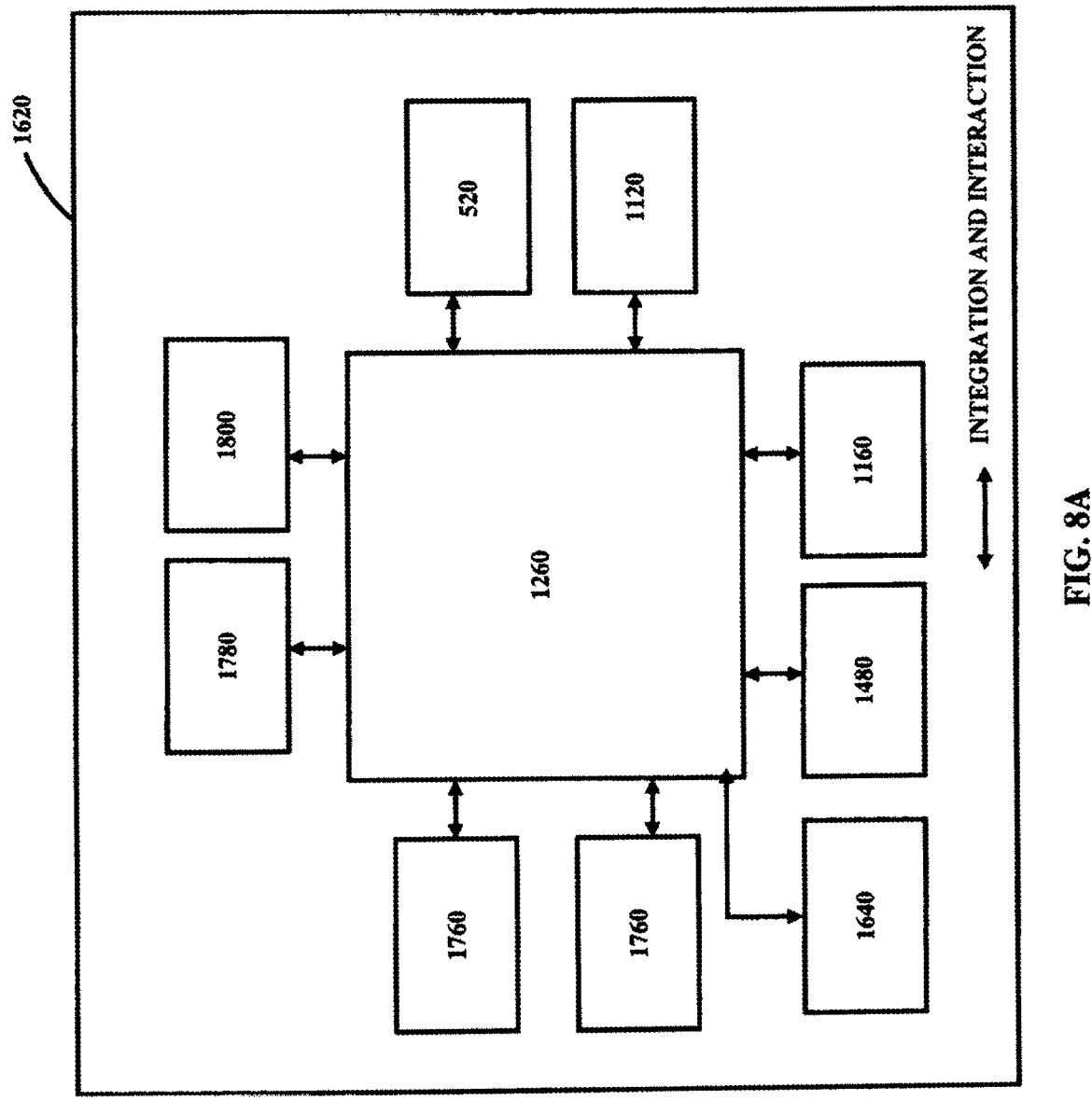
Figure 8B:
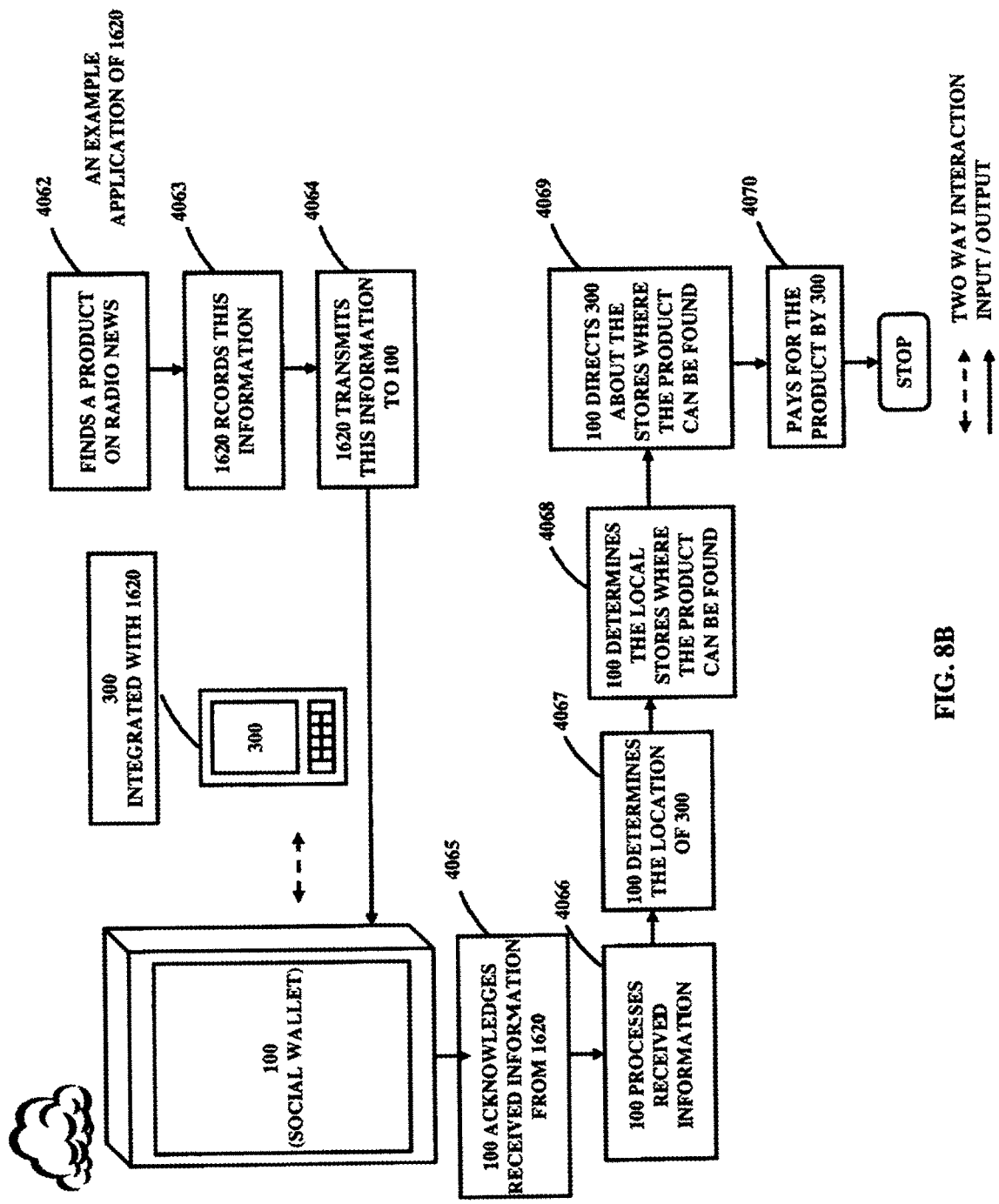
Figure 9:
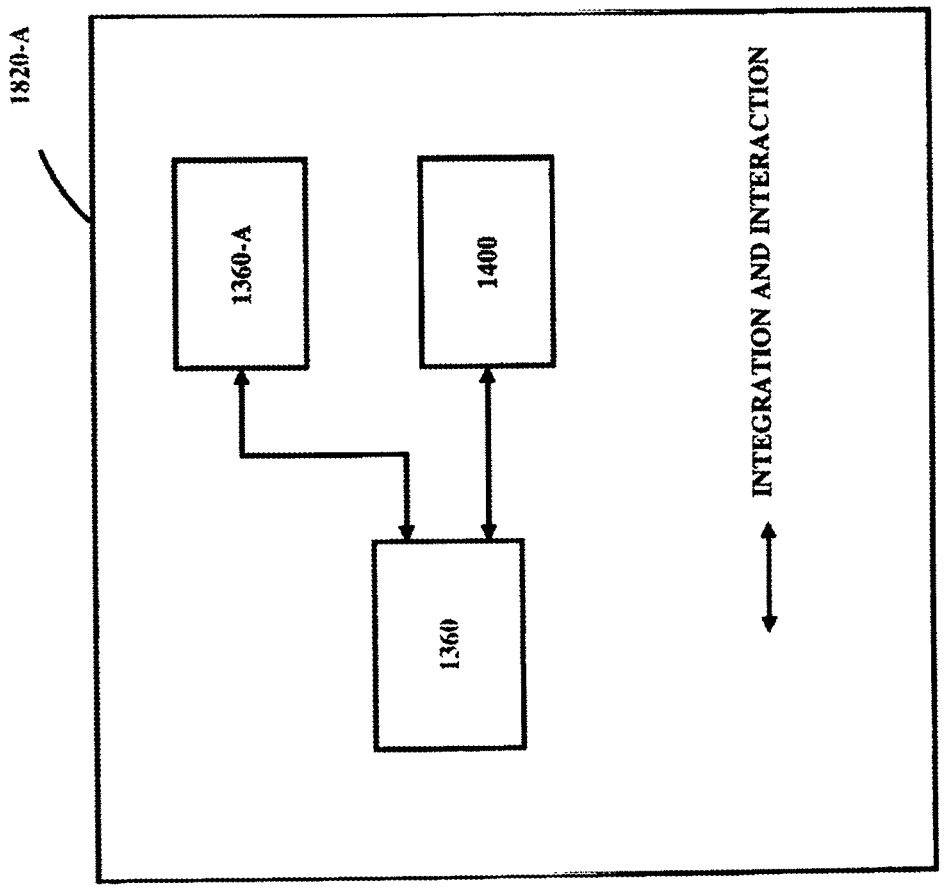
Figure 10:
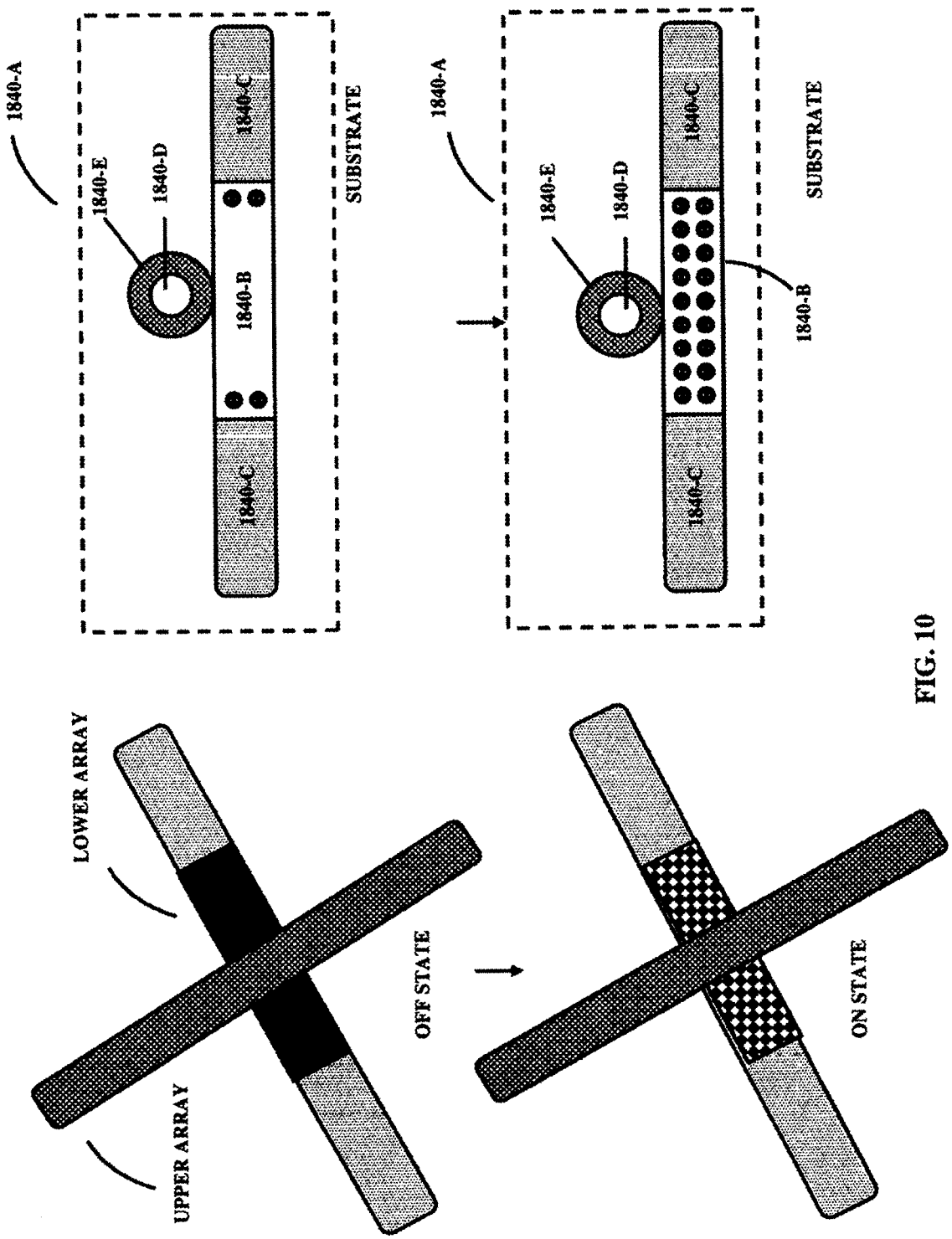
Figure 11:
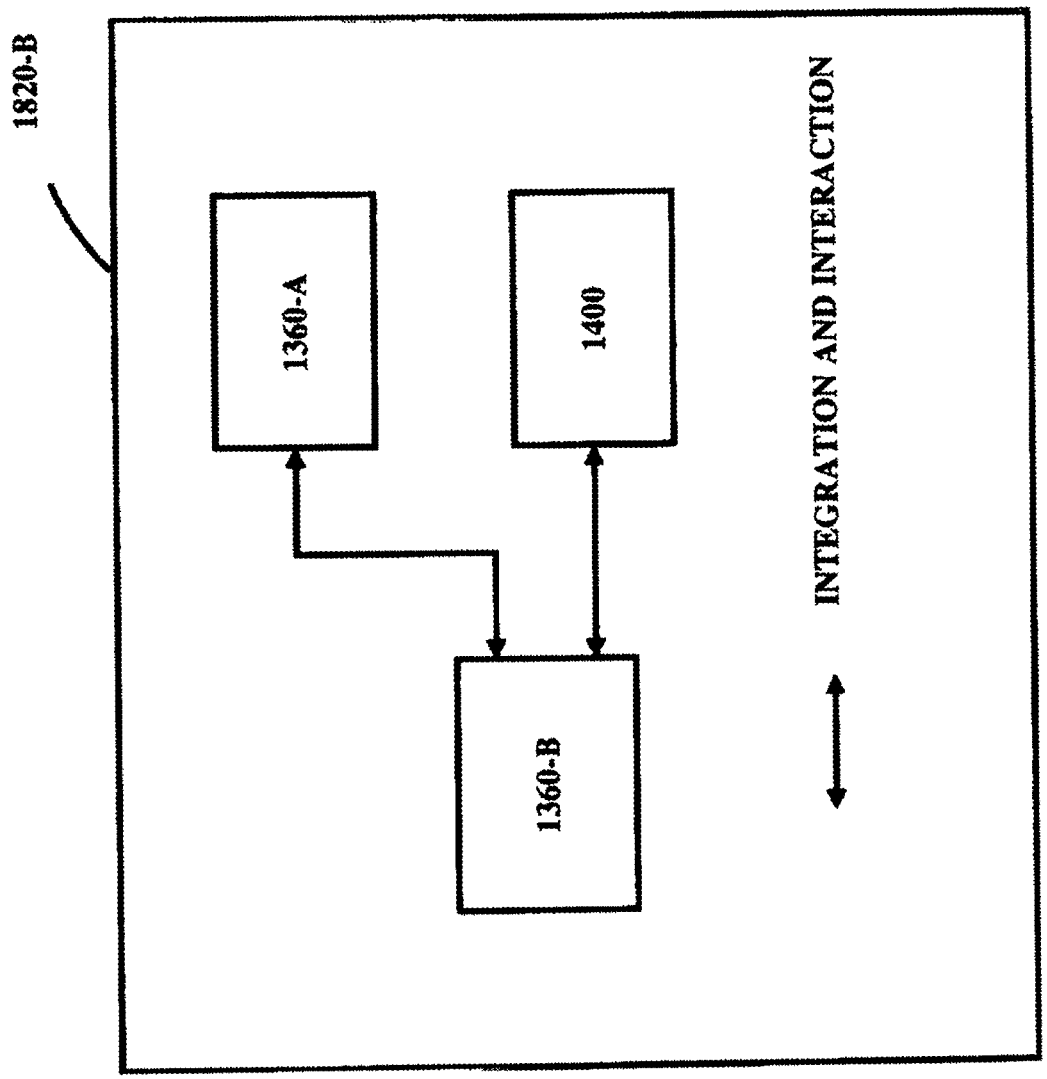
Figure 13:
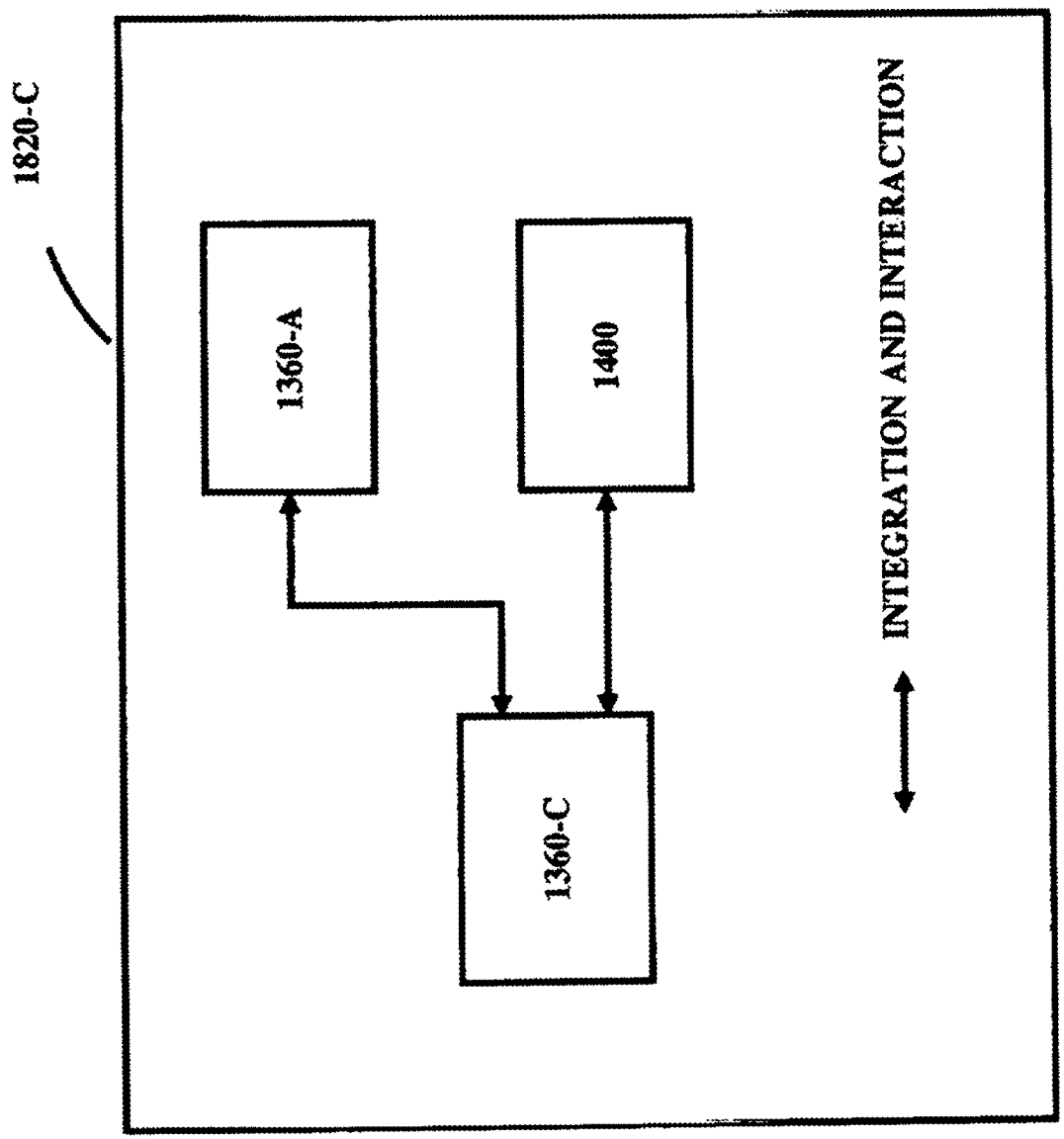
Figure 14:
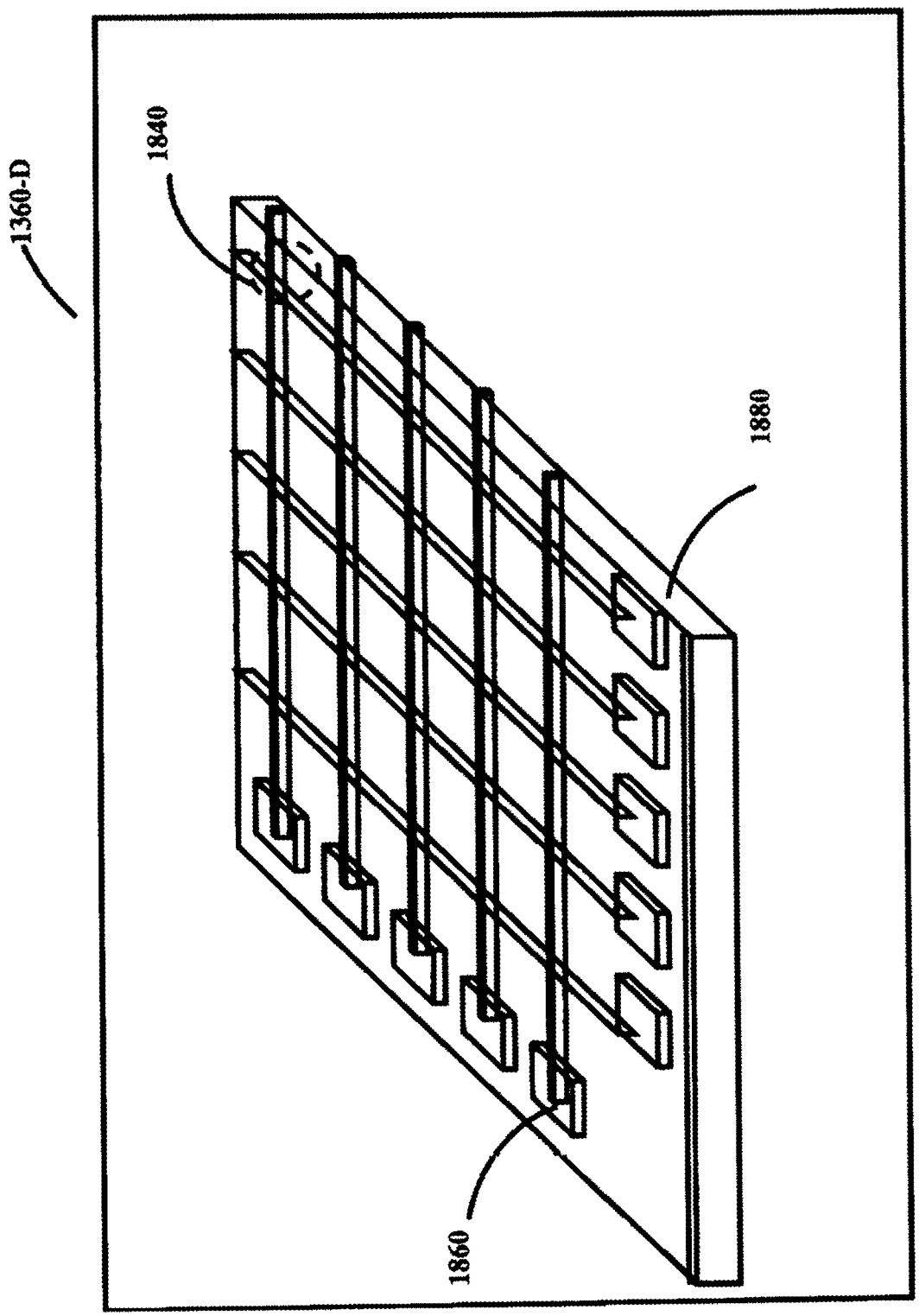
Figure 15:
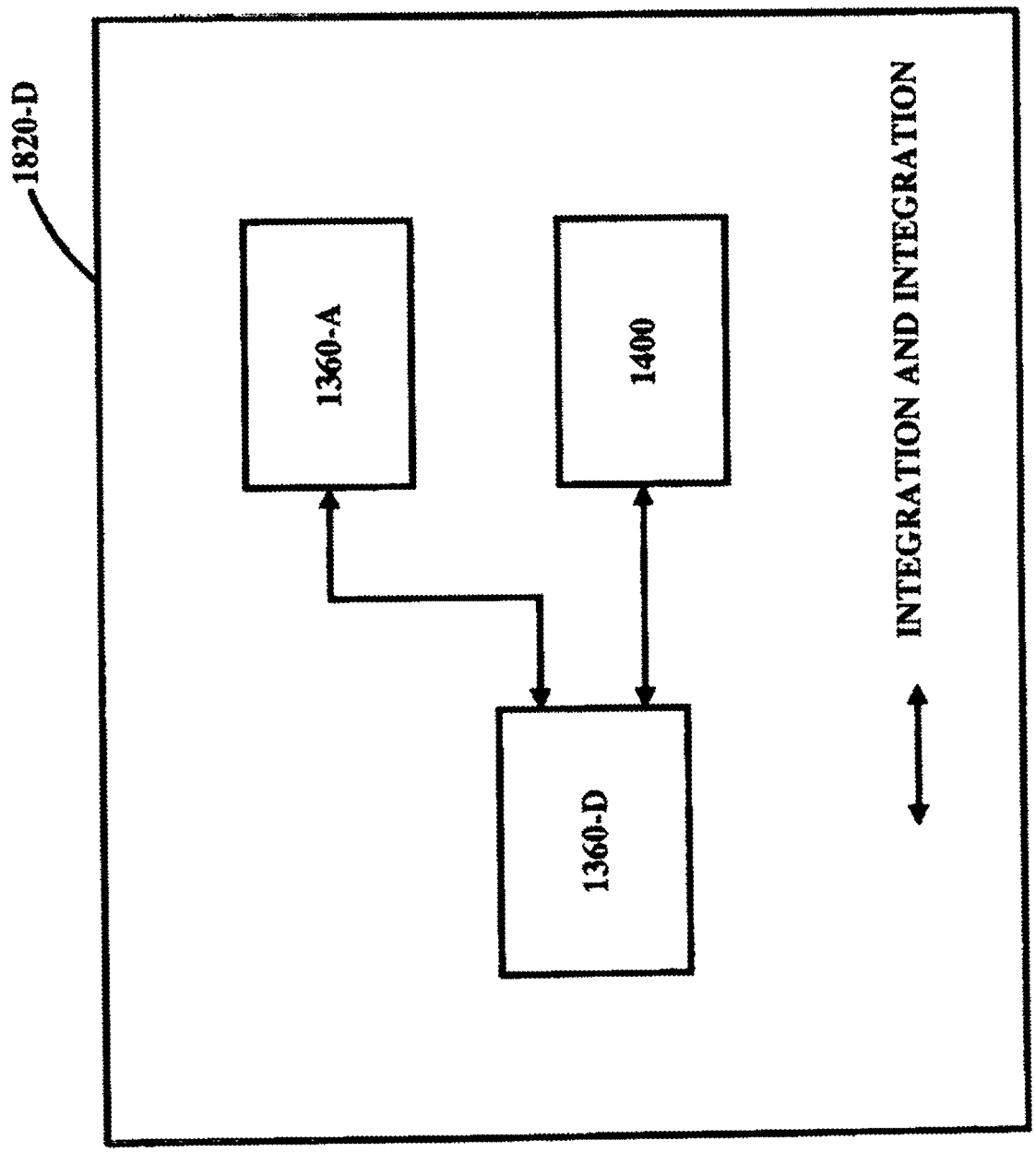
Figure 16:
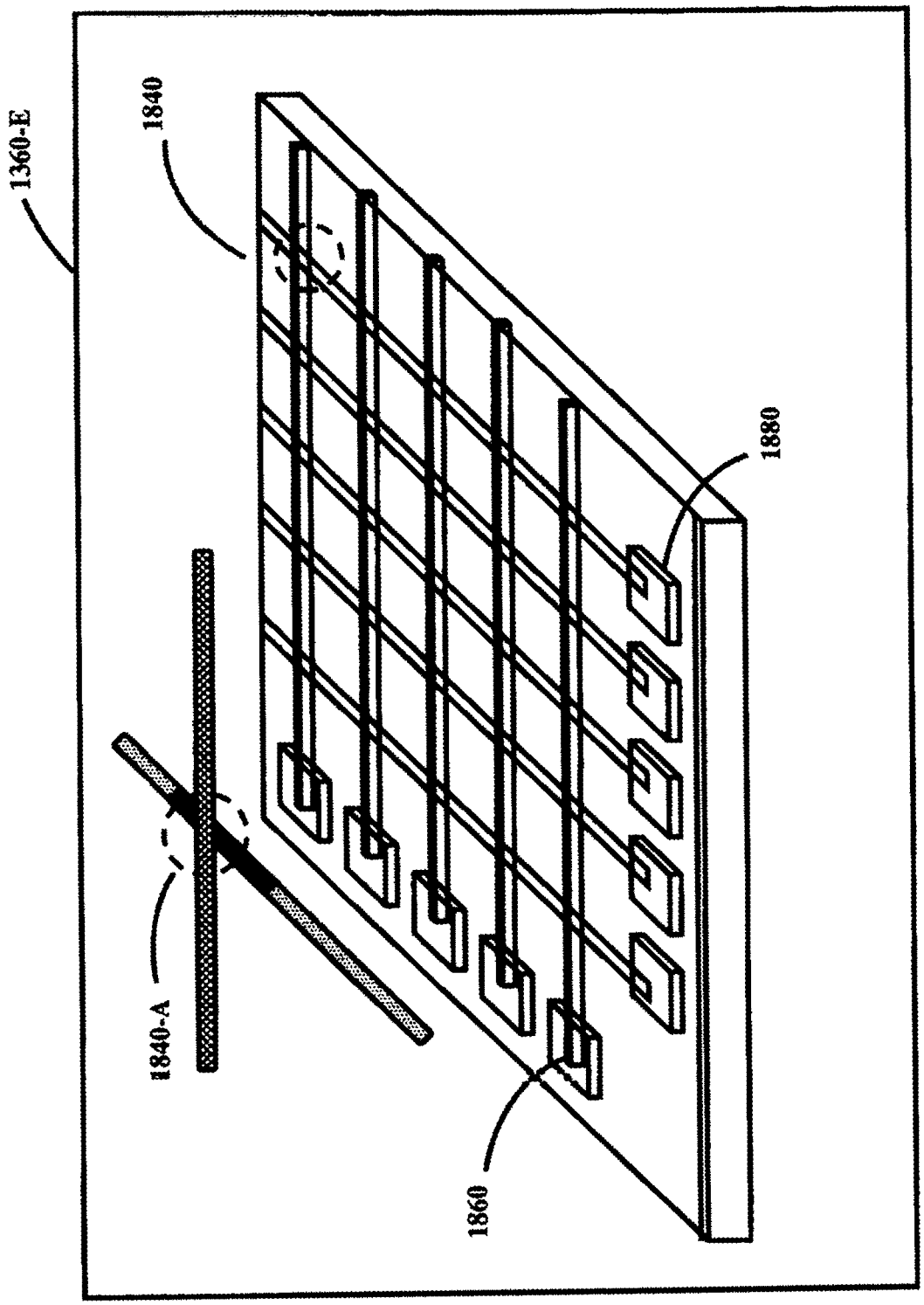
Figure 17:
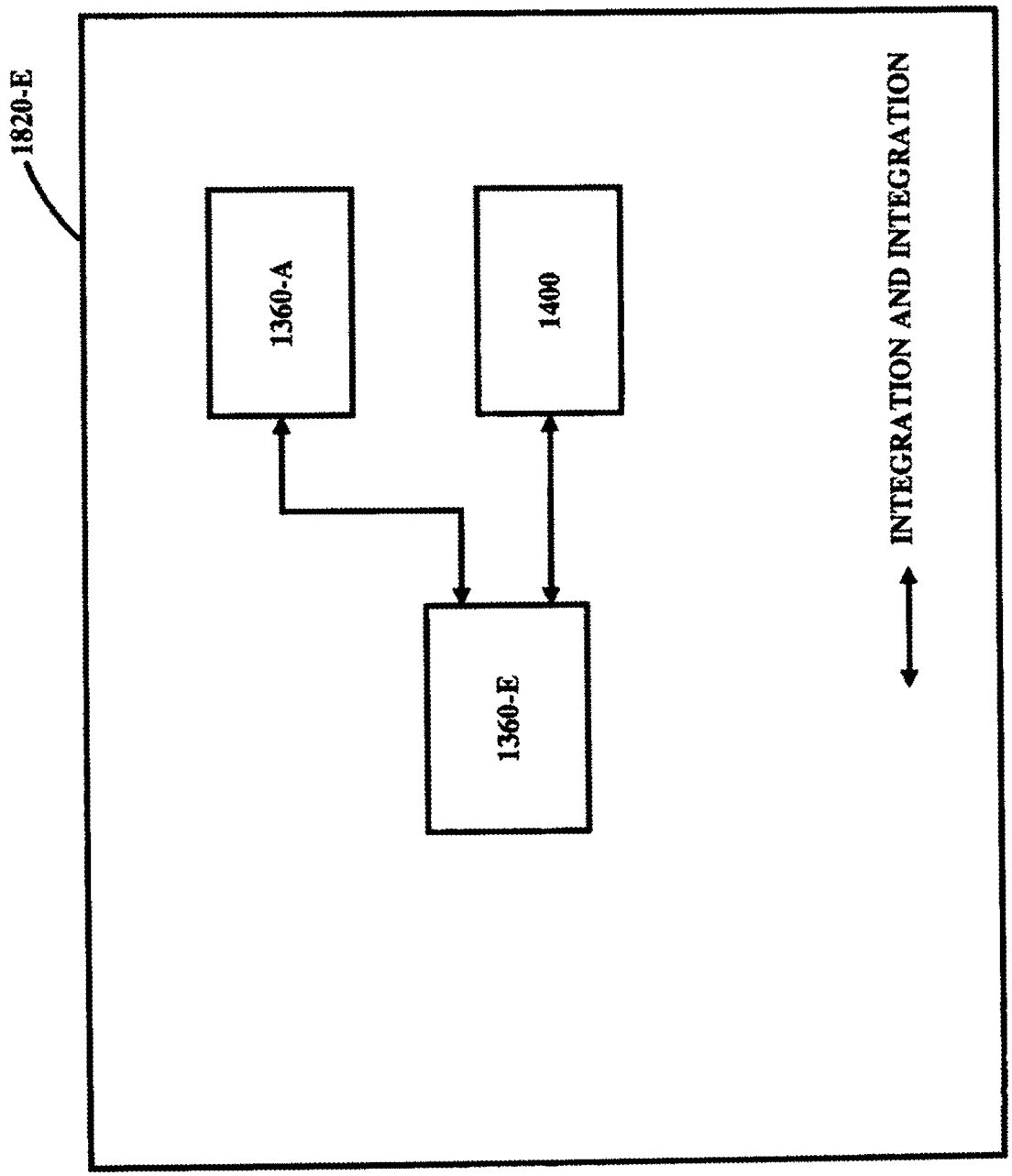
Figure 18A:
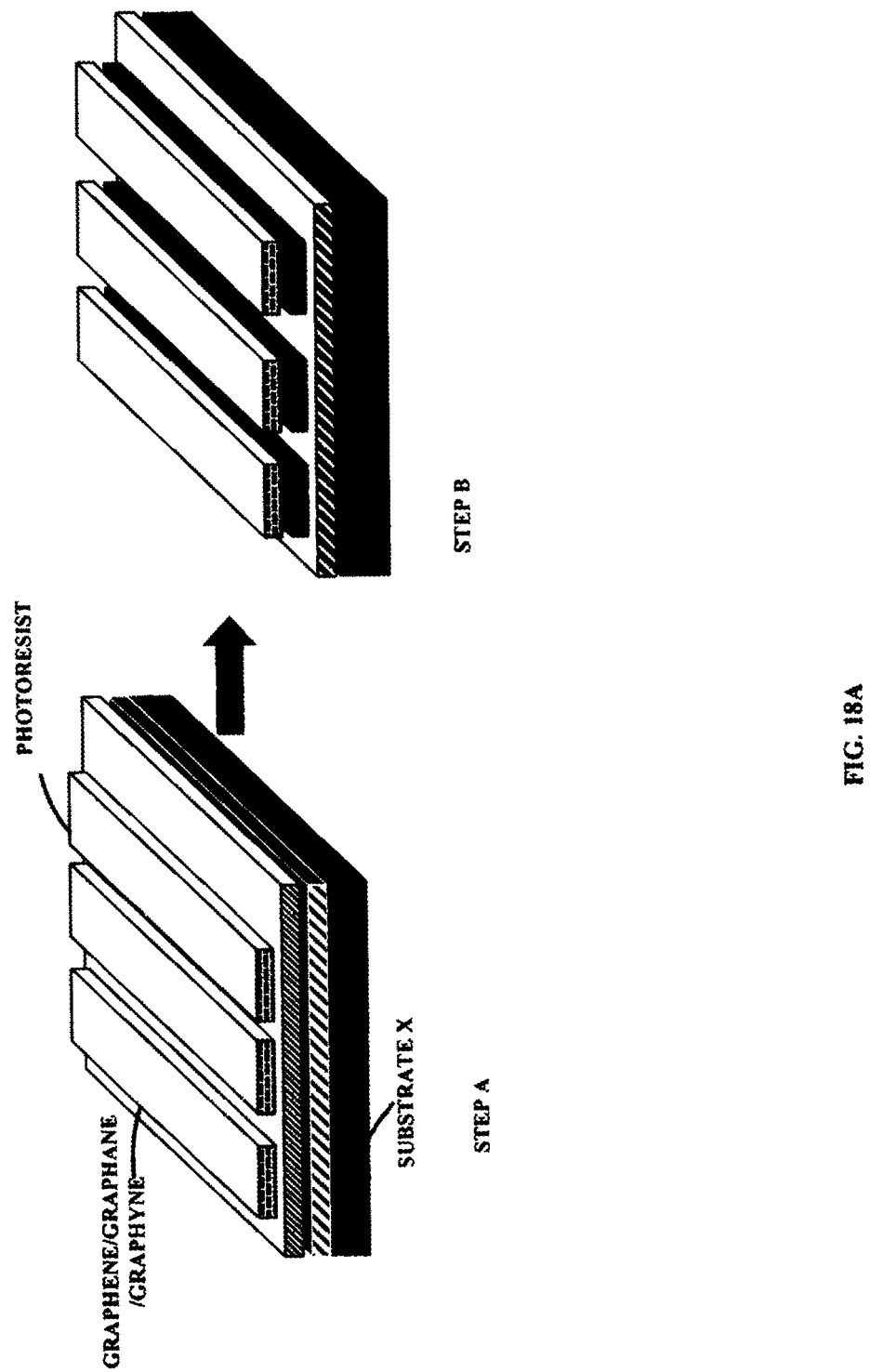
Figure 18B:
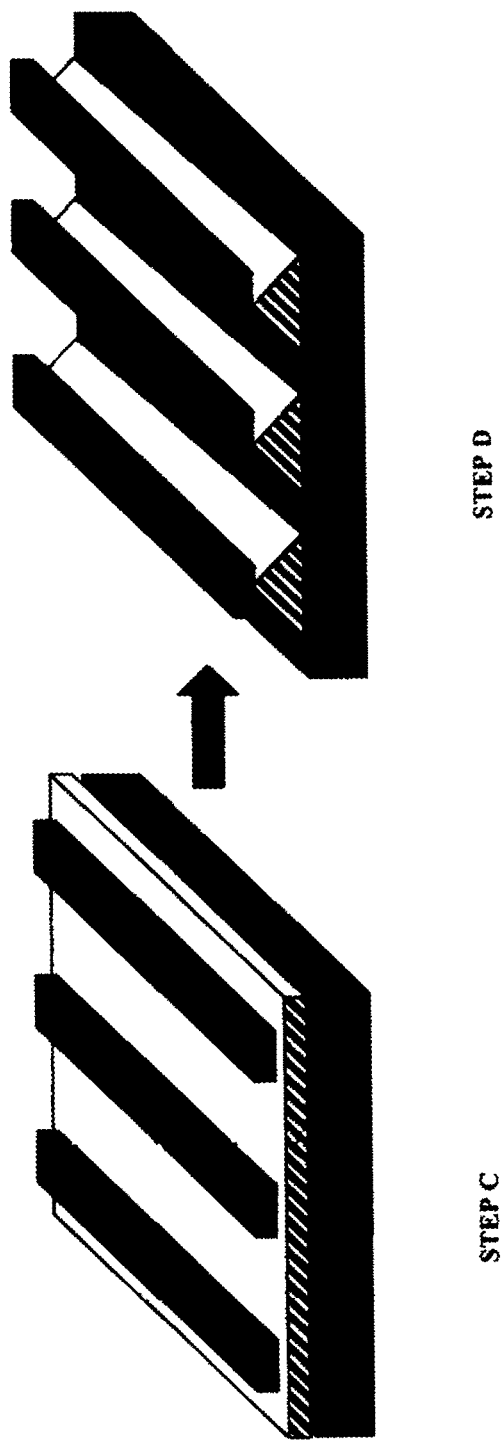
Figure 18C:
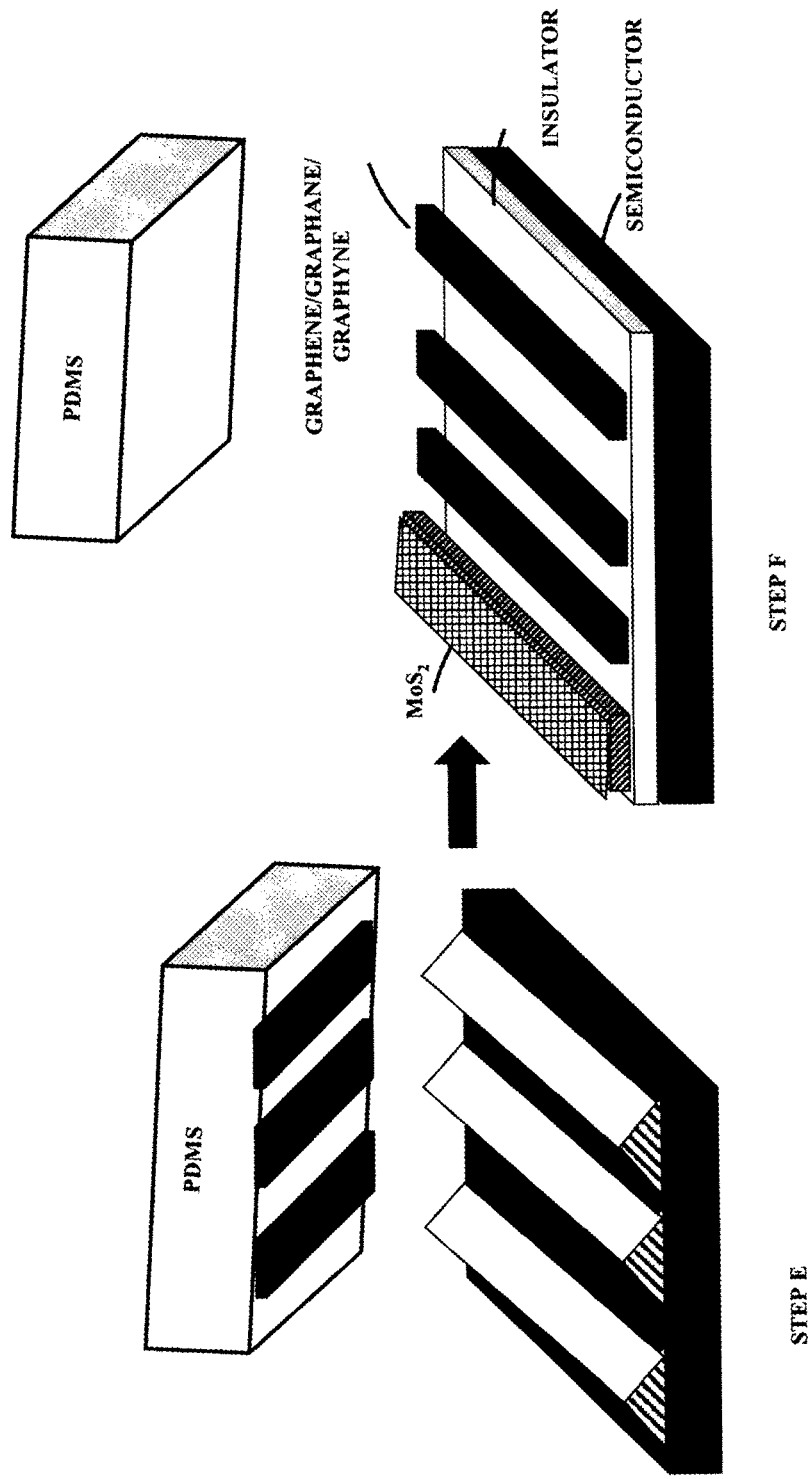
Figure 19:
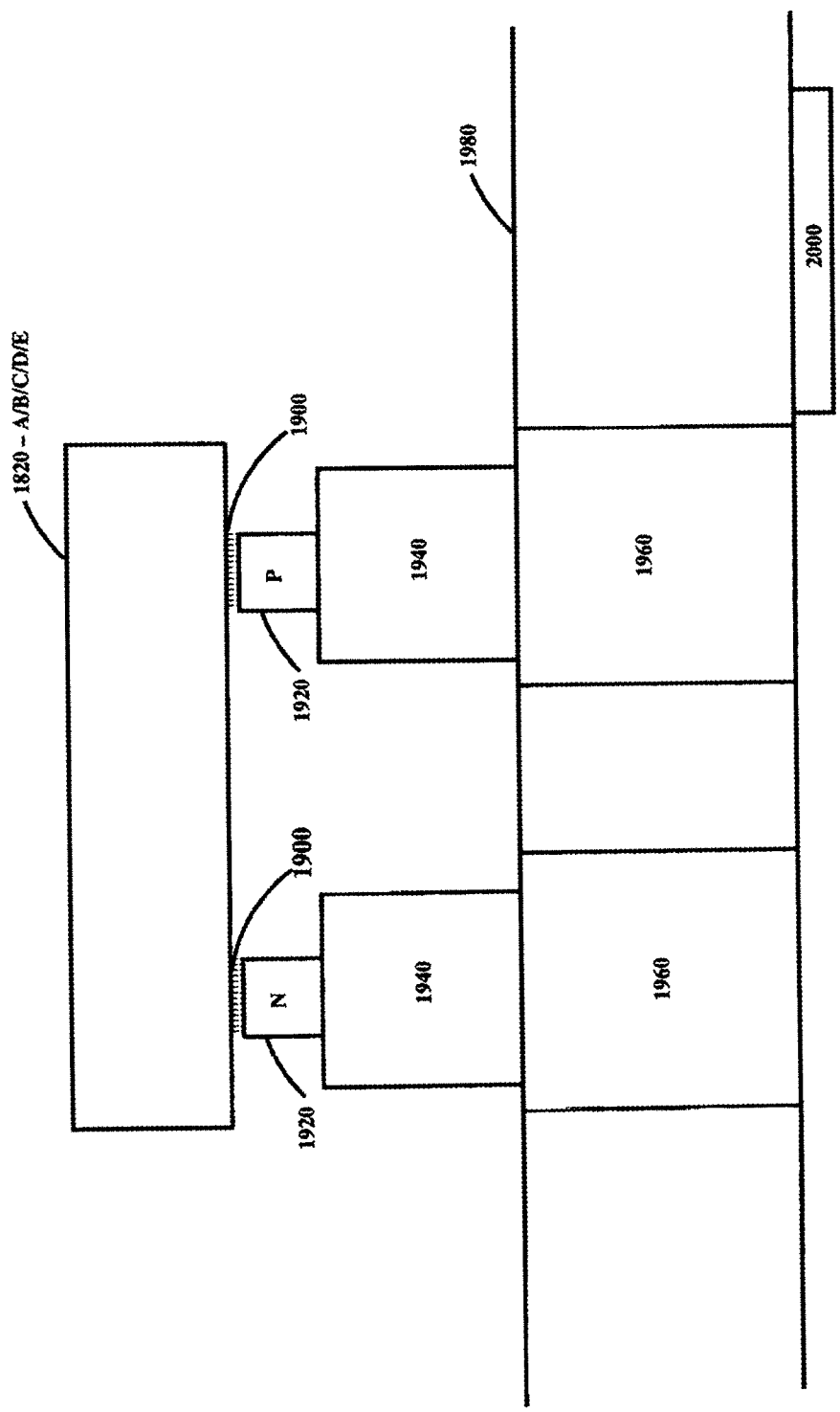
Figure 20A:
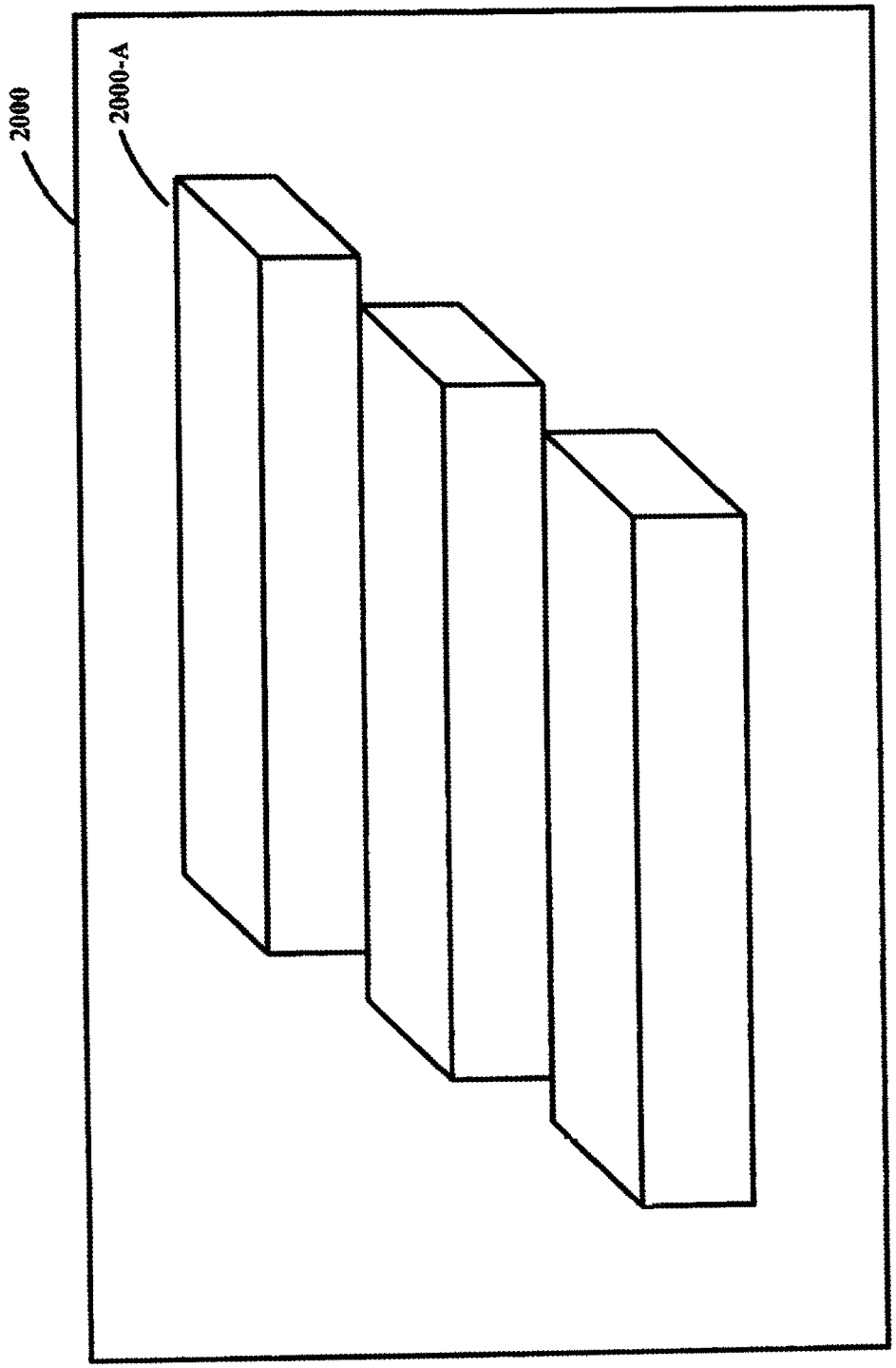
Figure 20B:
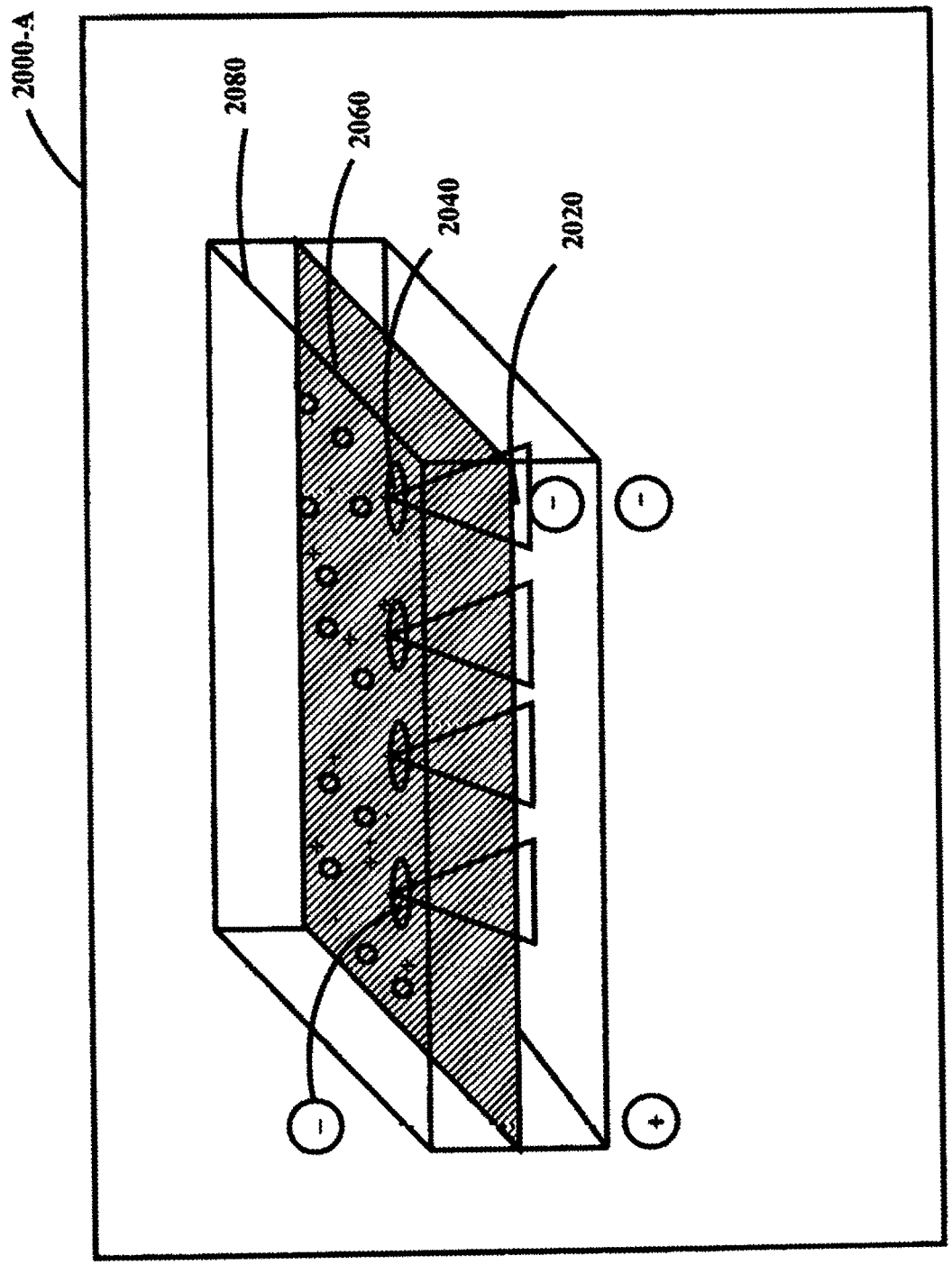
Figure 21B:
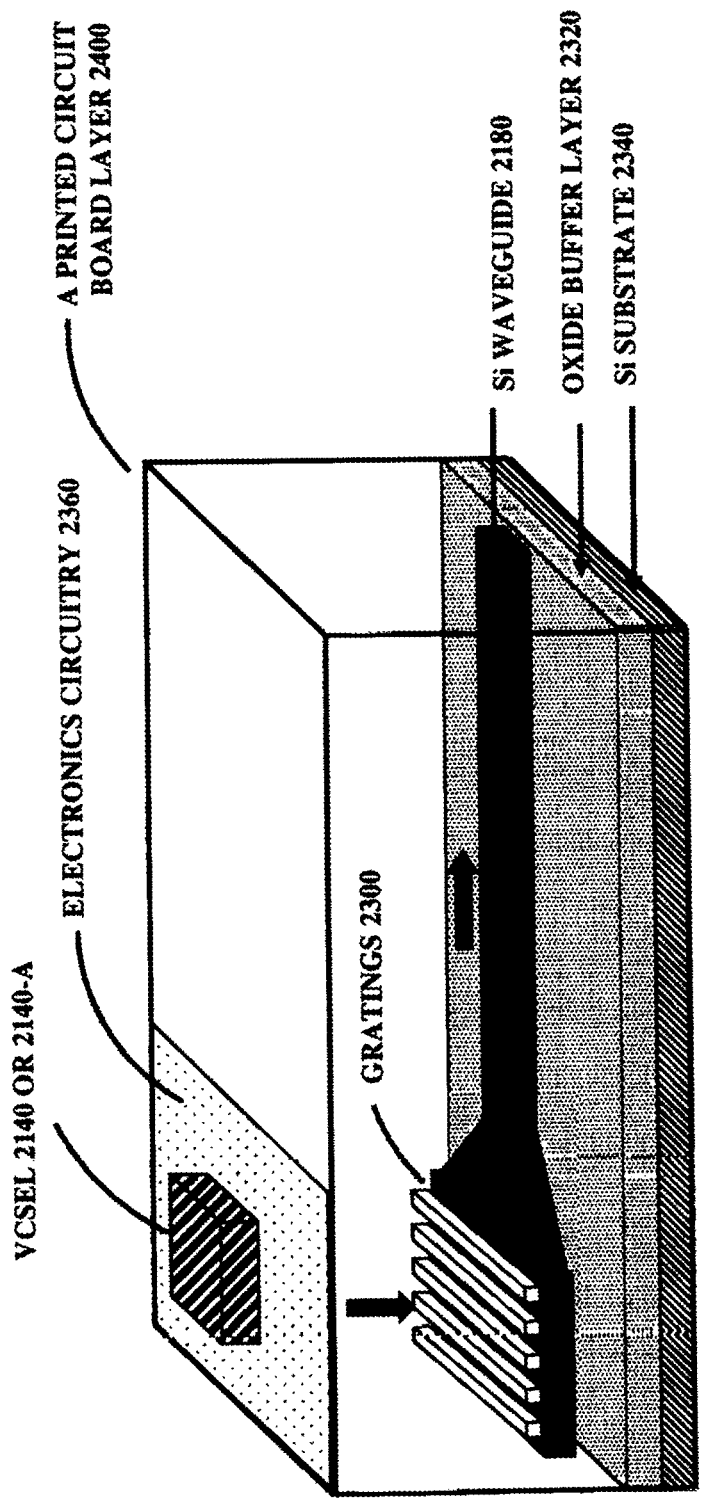
Figure 21C:
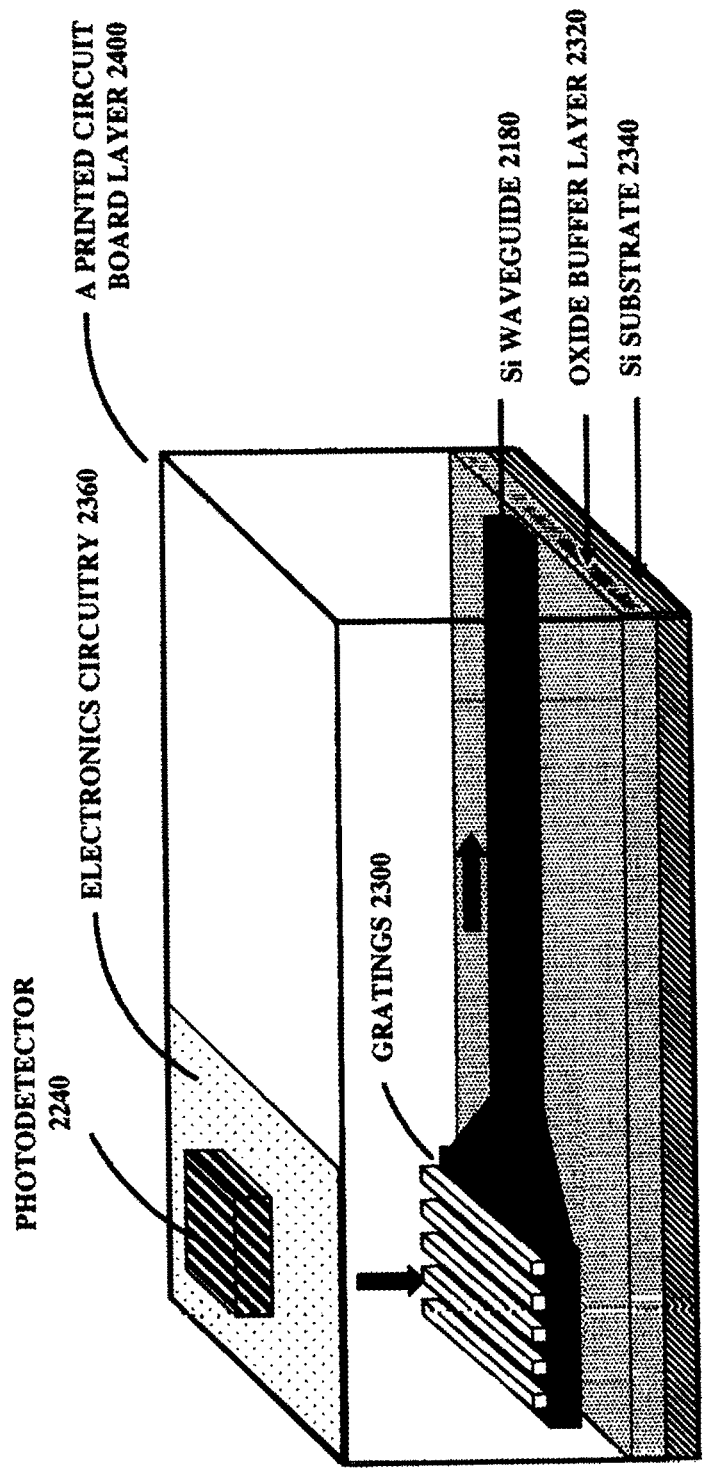
Figure 21D:
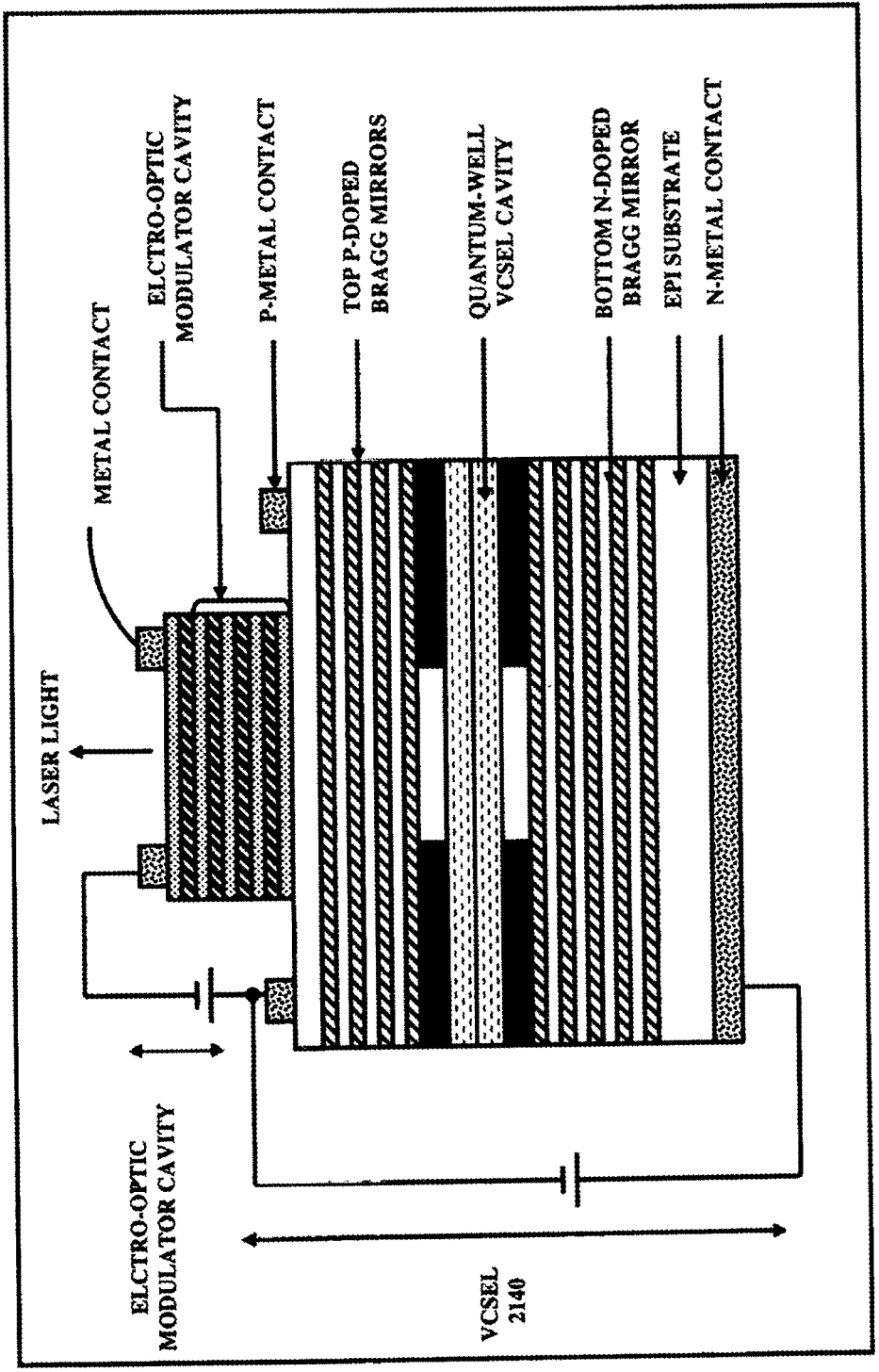

FIG. 21D illustrates a cross section of 2140-A: a vertical cavity surface emitting laser, which can be monolithically integrated with an electro-optic modulator. Similarly, microelectromechanical systems tunable vertical cavity surface emitting laser (preferably a quantum dot vertical cavity surface emitting laser) can also be monolithically integrated with the electro-optic modulator.

The above disclosed descriptions are only the most preferred embodiments of the present invention. However, they are not intended to be limited to the most preferred embodiments of the present invention. Numerous variations and/or modifications are possible within the scope of the present invention.

We claim:

1. A computer implemented method comprising:
   (a) accessing, by a mobile internet device of a first user, via a wired or a wireless network, a web portal enabled by a learning or relearning computer, wherein the web portal comprises: at least a first user profile associated with the first user and a second user profile associated with a second user,
   wherein the learning or relearning computer is one or more cloud computers, or premise computers, or mobile computers,
   wherein the learning or relearning computer comprises: one or more first microprocessors, or one or more neural network based microprocessors, executing computer readable instructions and one or more machine learning algorithms, stored on a non-transitory computer readable medium to implement the web portal,
   wherein the mobile internet device of the first user comprises: a wired connector or a wireless transceiver,
   wherein the mobile internet device of the first user is physically, or wirelessly communicatively coupled to a social wallet electronic module of the first user,
   wherein the social wallet electronic module of the first user comprises: a second microprocessor, or a microcontroller,
   wherein the social wallet electronic module of the first user further comprises: a near-field communication component and a biometric sensor,
   wherein the mobile internet device of the first user accessing the web portal,
   wherein the said accessing the web portal comprises:
      obtaining a first biometric scan of the first user from the biometric sensor of the social wallet electronic module of the first user,
      storing the first biometric scan of the first user,
      obtaining a second biometric scan of the first user from the biometric sensor of the social wallet electronic module of the first user, wherein the second biometric scan of the first user is a current biometric scan of the first user, comparing the first biometric scan of the first user with the second biometric scan of the first user to authenticate the first user, or the social wallet electronic module of the first user;

(b) in response to at least (a), listing or linking, by the first user, a product or a service for purchase on the first user profile in the web portal;

(c) in response to at least (a) and (b), automatically determining, by the web portal, that the first user is interested in purchasing the product or the service;

(d) in response to at least (a), (b) and (c), automatically determining, by the web portal, a near real time location of the first user, wherein the near real time location of the first user is detected by a location measurement module of the mobile internet device of the first user, wherein the location measurement module is selected from a group consisting of: an RFID module, a Bluetooth module, a WiFi module and a GPS module;

(e) in response to at least (a), (b), (c) and (d), automatically querying, by the web portal, queried sellers offering to sell the product or the service, automatically selecting one of the queried sellers, as a selected seller of the product or the service to purchase the product or the service, based on a distance from the near real time location of the first user, automatically connecting the first user with the selected seller;

(f) in response to at least (a), (b), (c), (d) and (e), automatically forwarding, by the web portal, to the mobile internet device of the first user, in near real time, one or more sale offers to purchase the product or the service, from the selected seller;

(g) in response to at least (a), (b), (c), (d), (e) and (f), automatically accepting, by the web portal, like votes and dislike votes for the queried seller from the first user, the second user and a plurality of third users, automatically determining, a number of the like votes and a number of the dislike votes, automatically determining, a seller score for the queried seller, based on the number of the like votes and the number of the dislike votes, automatically displaying, the seller score for the queried seller;

(h) in response to at least (a), (b), (c), (d), (e), (f) and (g), automatically sending, by the web portal, to the mobile internet device of the first user, a coupon for purchasing an additional product or service from the queried sellers; and (i) in response to at least (a), (b), (c), (d), (e), (f), (g) and (h), automatically accepting, by the web portal, payment by the first user for the product or the service, using the web portal, or the first user profile, or the near-field communication component of the social wallet electronic module of the first user, based on one or more forwarded sale offers.

2. The method according to claim 1, wherein the web portal is receiving a first input data from the first user, the second user and the plurality of third users.

3. The method according to claim 1, wherein the web portal is receiving a second input data from one or more first sensors.

4. The method according to claim 1, wherein the web portal is receiving a third input data from a near-field communication tag, or a QR code, or an object, wherein the object comprises: a second sensor and a wireless transmitter.

5. The method according to claim 1, further comprising: the first user paying for the product or the service by transferring a currency or a check from the first user to the selected seller, or to the second user or the plurality of third users.

6. A computer implemented method comprising:

(a) accessing, by a mobile internet device of a first user, via a wired or a wireless network, a web portal enabled by a learning or relearning computer, wherein the web portal comprises: at least a first user profile associated with the first user and a second user profile associated with a second user, wherein the learning or relearning computer is one or more cloud computers, or premise computers, or mobile computers, wherein the learning or relearning computer comprises: one or more first microprocessors, or one or more neural network based microprocessors, executing computer readable instructions and one or more machine learning algorithms, stored on a non-transitory computer readable medium to implement the web portal, wherein the mobile internet device of the first user comprises: a wired connector or a wireless transceiver, wherein the mobile internet device of the first user is physically, or wirelessly communicatively coupled to a social wallet electronic module of the first user, wherein the social wallet electronic module of the first user comprises: a second microprocessor, or a microcontroller, wherein the social wallet electronic module of the first user further comprises: a near-field communication component and a biometric sensor, wherein the social wallet electronic module of the first user further comprises: a radio frequency identification reader or an optical transceiver, wherein the optical transceiver comprises: a light source and a photodetector, wherein the mobile internet device of the first user accessing the web portal, wherein the said accessing the web portal comprises:

obtaining a first biometric scan of the first user from the biometric sensor of the social wallet electronic module of the first user, storing the first biometric scan of the first user, obtaining a second biometric scan of the first user from the biometric sensor of the social wallet electronic module of the first user, wherein the second biometric scan of the first user is a current biometric scan of the first user, comparing the first biometric scan of the first user with the second biometric scan of the first user to authenticate the first user, or the social wallet electronic module of the first user;

(b) in response to at least (a), listing or linking, by the first user, a product or a service for purchase on the first user profile in the web portal;

(c) in response to at least (a) and (b), automatically determining, by the web portal, that the first user is interested in purchasing the product or the service;

(d) in response to at least (a), (b) and (c), automatically determining, by the web portal, a near real time location of the first user, wherein the near real time location of the first user is detected by a location measurement module of the mobile internet device of the first user, wherein the location measurement module is selected from a group consisting of: an RFID module, a Bluetooth module, a WiFi module and a GPS module;

(e) in response to at least (a), (b), (c) and (d), automatically querying, by the web portal, queried sellers offering to sell the product or the service, automatically selecting one of the queried sellers, as a selected seller of the product or the service to purchase the product or the service, based on a distance from the near real time location of the first user, automatically connecting the first user with the selected seller;

(f) in response to at least (a), (b), (c), (d) and (e), automatically forwarding, by the web portal, to the mobile internet device of the first user, in near real time, one or more sale offers to purchase the product or the service, from the selected seller;

(g) in response to at least (a), (b), (c), (d), (e) and (f), automatically accepting, by the web portal, like votes and dislike votes for the queried seller from the first user, the second user and a plurality of third users, automatically determining, a number of the like votes and a number of the dislike votes, automatically determining, a seller score for the queried seller, based on the number of the like votes and the number of the dislike votes, automatically displaying, the seller score for the queried seller;

(h) in response to at least (a), (b), (c), (d), (e), (f) and (g), automatically sending, by the web portal, to the mobile internet device of the first user, a coupon for purchasing an additional product or service from the queried sellers; and (i) in response to at least (a), (b), (c), (d), (e), (f), (g) and (h), automatically accepting, by the web portal, payment by the first user for the product or the service, using the web portal, or the first user profile, or the near-field communication component of the social wallet electronic module of the first user, based on one or more forwarded sale offers.

7. A system comprising:

a learning or relearning computer physically, or wirelessly communicatively coupled to a mobile internet device of a first user, wherein the learning or relearning computer comprises: one or more first microprocessors, or one or more first neural network based microprocessors, executing computer readable instructions and one or more machine learning algorithms, stored on a non-transitory computer readable medium to implement a web portal, wherein the web portal comprises: at least a first user profile associated with the first user and a second user profile associated with a second user, wherein the mobile internet device of the first user comprises: a second microprocessor, or a second neural network based microprocessor, multi-touch display, or a stretchable display, or a quantum dot display, a camera, a wireless transceiver, a location measurement module, wherein the location measurement module is selected from a group consisting of: an RFID module, a Bluetooth module, a WiFi module and a GPS module, a social wallet electronic module comprising: a biometric sensor and a near-field communication component, wherein the non-transitory computer readable medium further stores computer-readable instructions, a first set of instructions, a second set of instructions, a third set of instructions, a fourth set of instructions, a fifth set of instructions, a sixth set of instructions, a seventh set of instructions, an eighth set of instructions and a ninth set of instructions, wherein the second microprocessor, or the second neural network based microprocessor communicates with the non-transitory computer readable medium, wherein the second microprocessor, or the second neural network based microprocessor is configured to execute, in communication with the non-transitory computer readable medium, (a) the first set of instructions to access, by the mobile internet device of the first user, via a wired or wireless network, the web portal enabled by the learning or relearning computer, wherein the said accessing the web portal comprises:

obtaining a first biometric scan of the first user from the biometric sensor of the social wallet electronic module of the first user, storing the first biometric scan of the first user, obtaining a second biometric scan of the first user from the biometric sensor of the social wallet electronic module of the first user, wherein the second biometric scan of the user is a current biometric scan of the first user, comparing the first biometric scan of the first user with the second biometric scan of the first user to authenticate the first user or the social wallet electronic module of the first user;

(b) in response to at least (a), the second set of instructions to list or link, a product or a service for purchase on the first user profile in the web portal;

(c) in response to at least (a) and (b), the third set of instructions to automatically determine, by the web portal, that the first user is interested in purchasing the product or the service;

(d) in response to at least (a), (b) and (c), the fourth set of instructions to automatically determine, by the web portal, a near real-time location of the first user, wherein the near real-time location of the first user is detected by the location measurement module of the mobile internet device of the first user;

(e) in response to at least (a), (b), (c) and (d), the fifth set of instructions to automatically query, by the web portal, queried sellers offering to sell the product or the service, automatically to select one of the queried sellers as a selected seller of the product or the service to purchase the product or the service, based on a distance from the near real-time location of the first user, automatically to connect the first user with the selected seller;

(f) in response to at least (a), (b), (c), (d) and (e), the sixth set of instructions automatically to forward by the web portal, to the mobile internet device of the first user in near real-time, one or more sale offers to purchase the product or the service from the selected seller;

(g) in response to at least (a), (b), (c), (d), (e) and (f), the seventh set of instructions to automatically accept, by the web portal, like votes and dislike votes for the queried sellers from the first user, the second user and a plurality of third users, automatically to determine a number of the like votes and a number of the dislike votes, automatically to determine a seller score for the queried sellers, based on the number of the like votes and the number of the dislike votes, automatically to display the seller score of the queried sellers;

(h) in response to at least (a), (b), (c), (d), (e), (f) and (g), the eighth set of instructions to, automatically send, by the web portal, to the mobile internet device of the first user, a coupon for purchasing an additional product or service from one or more the queried sellers; and (i) in response to at least (a), (b), (c), (d), (e), (f), (g) and (h), the ninth set of instructions to, automatically accept, by the web portal, payment by the first user for the product or the service, using the web portal, or the first user profile, or the near-field communication component of the social wallet electronic module of the first user, based on one or more of the forwarded sale offers.

8. The system according to claim 7, wherein the mobile internet device is further receiving an input data from a first sensor, or a near-field communication tag, or a QR code, or an object for learning or relearning, wherein the object comprises: a second sensor and a first wireless transmitter.

9. The system according to claim 7, wherein the mobile internet device further comprises: an algorithm selected from the group consisting of: a fuzzy logic algorithm, an intelligence rendering algorithm and a self-learning algorithm.

10. The system according to claim 7, wherein the mobile internet device further comprises: a search algorithm for a physical item.

11. The system according to claim 7, wherein the mobile internet device further comprises: an algorithm selected from the group consisting of: a voice-to-text-to-voice conversion algorithm, a voice recognition algorithm, a handwriting recognition algorithm, a facial recognition algorithm and a biometric recognition algorithm.

12. The system according to claim 7, wherein the mobile internet device further comprises: a component selected from the group consisting of: a barcode reader and a RFID reader.

13. The system according to claim 7, wherein the mobile internet device further comprises: a component selected from the group consisting of: a DASH7 transceiver and a millimeter wave transceiver.

14. The system according to claim 7, wherein the mobile internet device further comprises: a component selected from the group consisting of: a software-defined radio and a tunable antenna.

15. The system according to claim 7, wherein the mobile internet device further comprises: a video compression module selected from the group consisting of: a video compression component and a video compression algorithm.

16. The system according to claim 7, wherein the mobile internet device further comprises: a sketch pad electronic module and a stylus, wherein the sketch pad electronic module comprises: an electronic circuitry for capacitive coupling, a transparent input matrix component and a write-erase switch.

17. The system according to claim 7, wherein the mobile internet device further comprises: a personal awareness assistant electronic module, wherein the personal awareness electronic module comprises: a microphone or an audio recorder.

18. The system according to claim 17, wherein the personal awareness assistant electronic module categorizes information or data received by the personal awareness assistant electronic module into a database.

19. The system according to claim 7, wherein the mobile internet device is further enabling a service by an object, or a biological object, wherein the object comprises: a second sensor and a first wireless transmitter, wherein the biological object comprises: a biosensor and a second wireless transmitter.

20. The system according to claim 7, wherein the mobile internet device is further sensor aware, or context aware.

* * * * *

UNITED STATES PATENT AND TRADEMARK OFFICE
CERTIFICATE OF CORRECTION

PATENT NO. : 9,697,556 B2
APPLICATION NO. : 13/448378
DATED : July 4, 2017
INVENTOR(S) : Mazed et al.

It is certified that error appears in the above-identified patent and that said Letters Patent is hereby corrected as shown below:

Please delete Pat. No. 9,697,556 B2 in its entirety and insert Pat. No. 9,697,556 B2 in its entirety as shown on the attached pages.

Signed and Sealed this
Tenth Day of April, 2018

Andrei Iancu
*Director of the United States Patent and Trademark Office*

(12) United States Patent
Mazed et al.

(10) Patent No.: US 9,697,556 B2
(45) Date of Patent: Jul. 4, 2017

(54) SYSTEM AND METHOD OF MACHINE LEARNING BASED USER APPLICATIONS

(76) Inventors: Mohammad A. Mazed, Yorba Linda, CA (US); Sayeeda Mazed, Yorba Linda, CA (US)

(*) Notice: Subject to any disclaimer, the term of this patent is extended or adjusted under 35 U.S.C. 154(b) by 1203 days.

(21) Appl. No.: 13/448,378

(22) Filed: Apr. 16, 2012

(65) Prior Publication Data

US 2012/0265596 A1     Oct. 18, 2012

Related U.S. Application Data

(63) Continuation-in-part of application No. 12/931,384, filed on Jan. 31, 2011, now Pat. No. 8,548,334, and a continuation-in-part of application No. 12/238,286, filed on Sep. 25, 2008, now abandoned, and a continuation-in-part of application No. 11/952,001, filed on Dec. 6, 2007, now Pat. No. 8,073,331.

(60) Provisional application No. 61/404,504, filed on Oct. 5, 2010, provisional application No. 60/970,487, filed on Sep. 6, 2007, provisional application No. 61/517,204, filed on Apr. 15, 2011.

(51) Int. Cl.
*G06Q 30/00* (2012.01)
*G06Q 30/06* (2012.01)
*G06Q 30/02* (2012.01)
*G06Q 20/12* (2012.01)
*G06Q 20/20* (2012.01)
*G06Q 20/32* (2012.01)

(52) U.S. Cl.
CPC ......... *G06Q 30/0631* (2013.01); *G06Q 20/12* (2013.01); *G06Q 20/20* (2013.01); *G06Q 20/3278* (2013.01); *G06Q 30/02* (2013.01); *G06Q 30/06* (2013.01); *G06Q 30/0639* (2013.01)

(58) Field of Classification Search
CPC .... G06Q 20/12; G06Q 20/20; G06Q 20/3278; G06Q 30/02; G06Q 30/06; G06Q 30/0633; G06Q 30/0631; G06Q 30/0251; G06Q 30/026; G06Q 30/0222; G06Q 30/0639
USPC .... 705/14.23, 14.66, 26.8, 14.49, 26.7, 26.9
See application file for complete search history.

(56) References Cited

U.S. PATENT DOCUMENTS

| | | | |
|---|---|---|---|
| 7,370,276 B2 * | 5/2008 | Willis | 715/747 |
| 2002/0147645 A1 * | 10/2002 | Alao et al. | 705/14 |
| 2003/0126146 A1 * | 7/2003 | Van Der Riet | 707/100 |
| 2004/0003096 A1 * | 1/2004 | Willis | 709/228 |
| 2004/0103024 A1 * | 5/2004 | Patel et al. | 705/14 |
| 2007/0053513 A1 * | 3/2007 | Hoffberg | 380/201 |

(Continued)

OTHER PUBLICATIONS

Mobile Marketing: From Marketing Strategy to Mobile Marketing Campaign Implementation—By Matti Leppaniemi and Heikko Karjoluoto Journal of Mobile Marketing 2008.*

*Primary Examiner* — Beth V Boswell
*Assistant Examiner* — Charles Guiliano

(57) ABSTRACT

The invention synthesizes a social network, an electronic commerce (including a performance based advertisement and electronic payment), a mobile internet device and a machine learning algorithm(s). The synthesized social commerce further dynamically integrates stored information, real time information and real time information/data/image(s) from an object/array of objects. The machine learning algorithm(s) can include a software agent, a fuzzy logic algorithm, a predictive algorithm, an intelligence rendering algorithm and a self-learning (including relearning) algorithm.

20 Claims, 49 Drawing Sheets

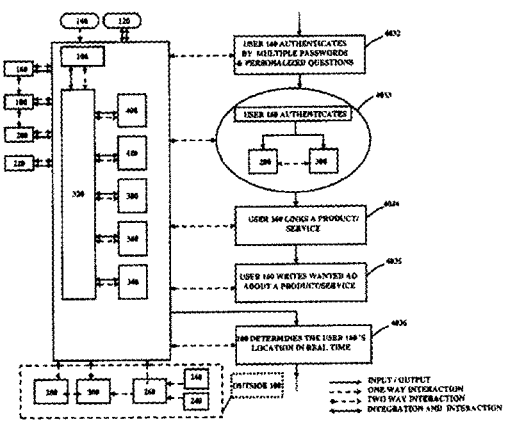

US 9,697,556 B2

Page 2

(56) References Cited

U.S. PATENT DOCUMENTS

| | | | |
|---|---|---|---|
| 2007/0162337 A1* | 7/2007 | Hawkins et al. | 705/14 |
| 2008/0307034 A1* | 12/2008 | Fleet et al. | 709/202 |
| 2012/0179516 A1* | 7/2012 | Fakhrai | G06Q 30/08 705/14.1 |
| 2012/0265596 A1* | 10/2012 | Mazed et al. | 705/14.23 |
| 2013/0024360 A1* | 1/2013 | Ballout | G06Q 20/04 705/39 |

* cited by examiner

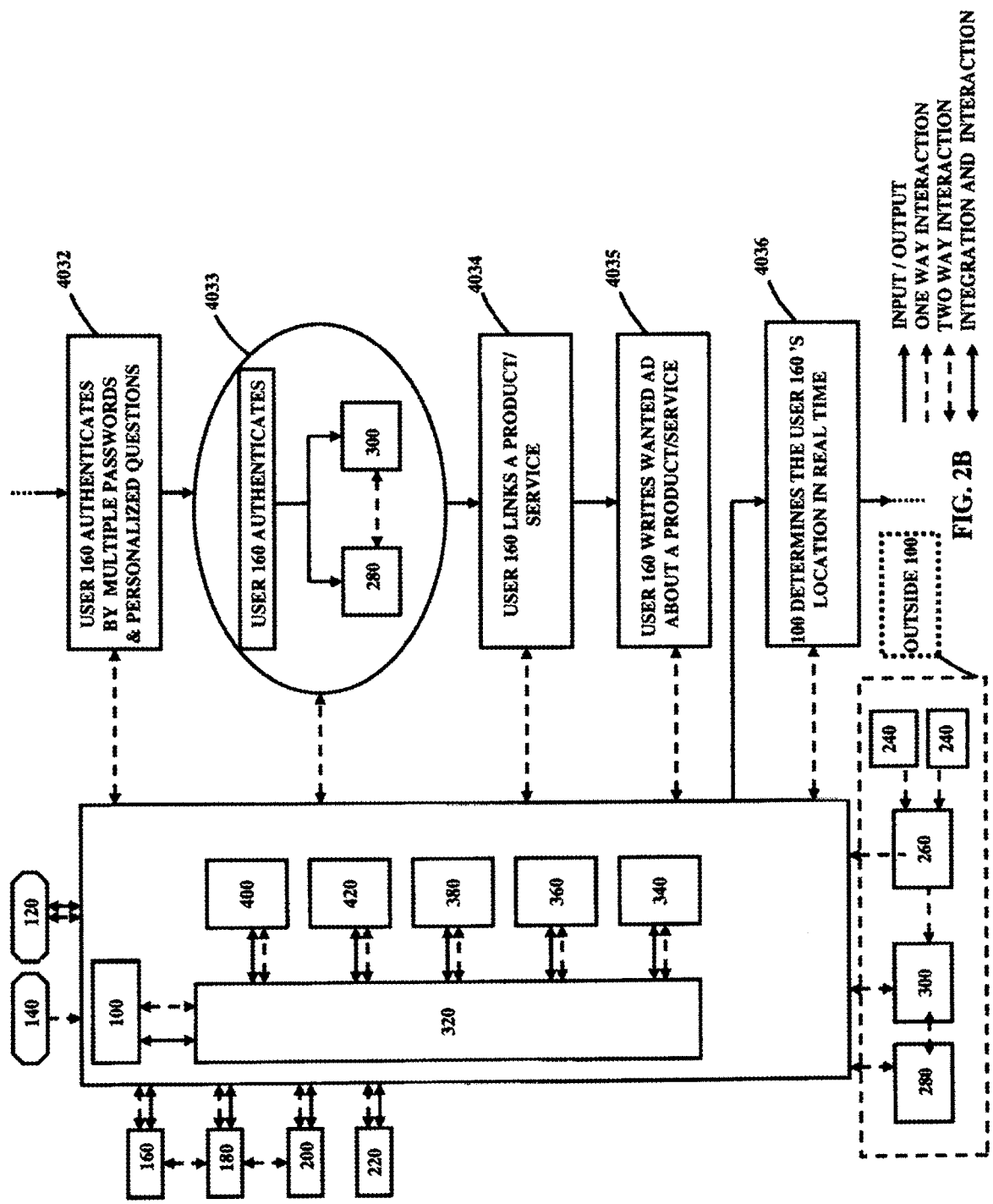

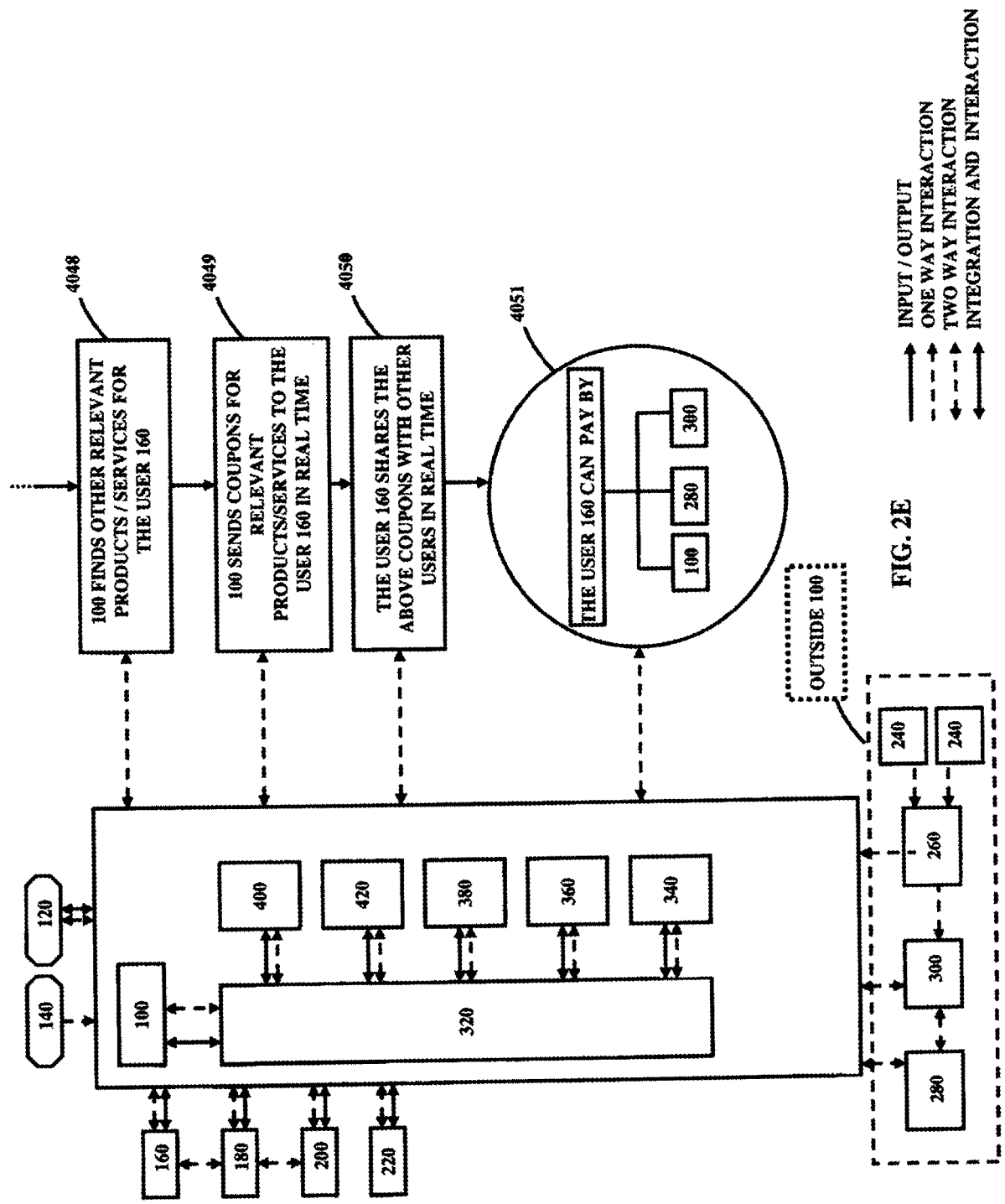

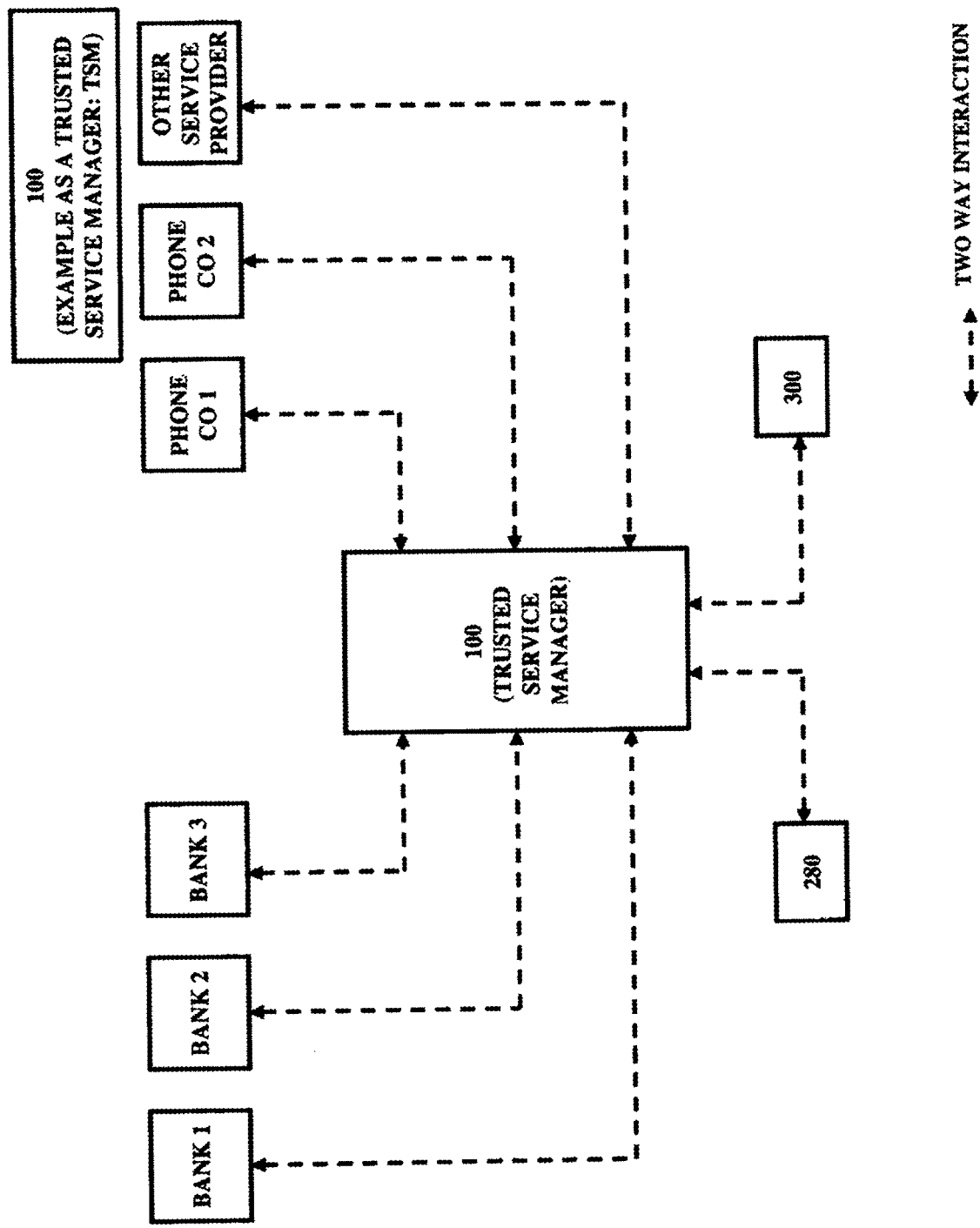

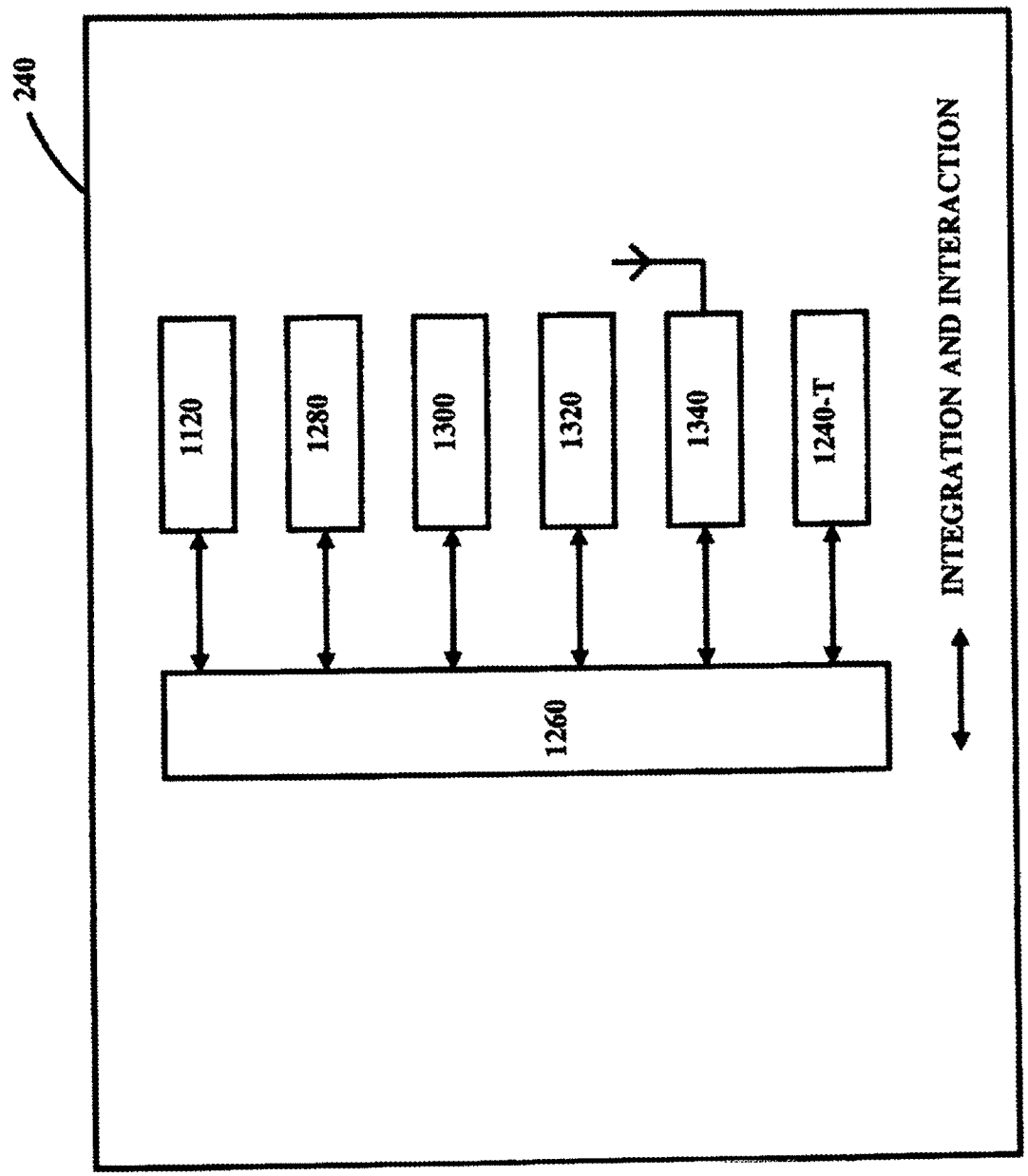

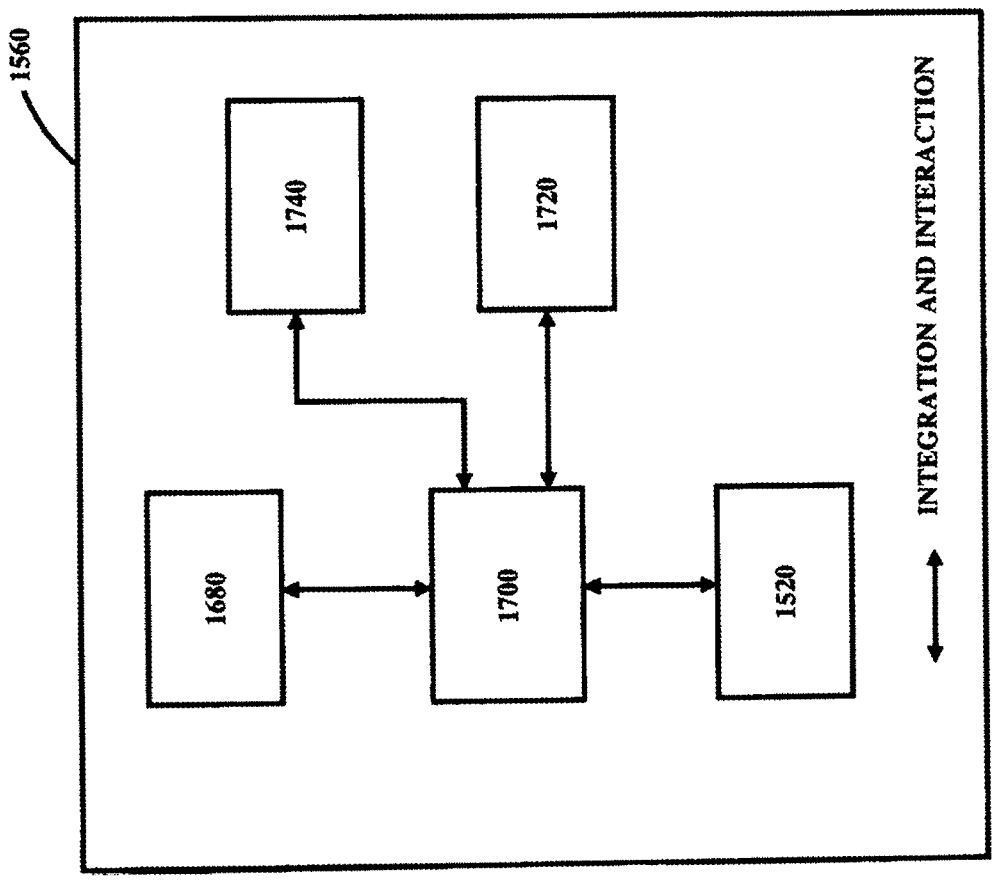

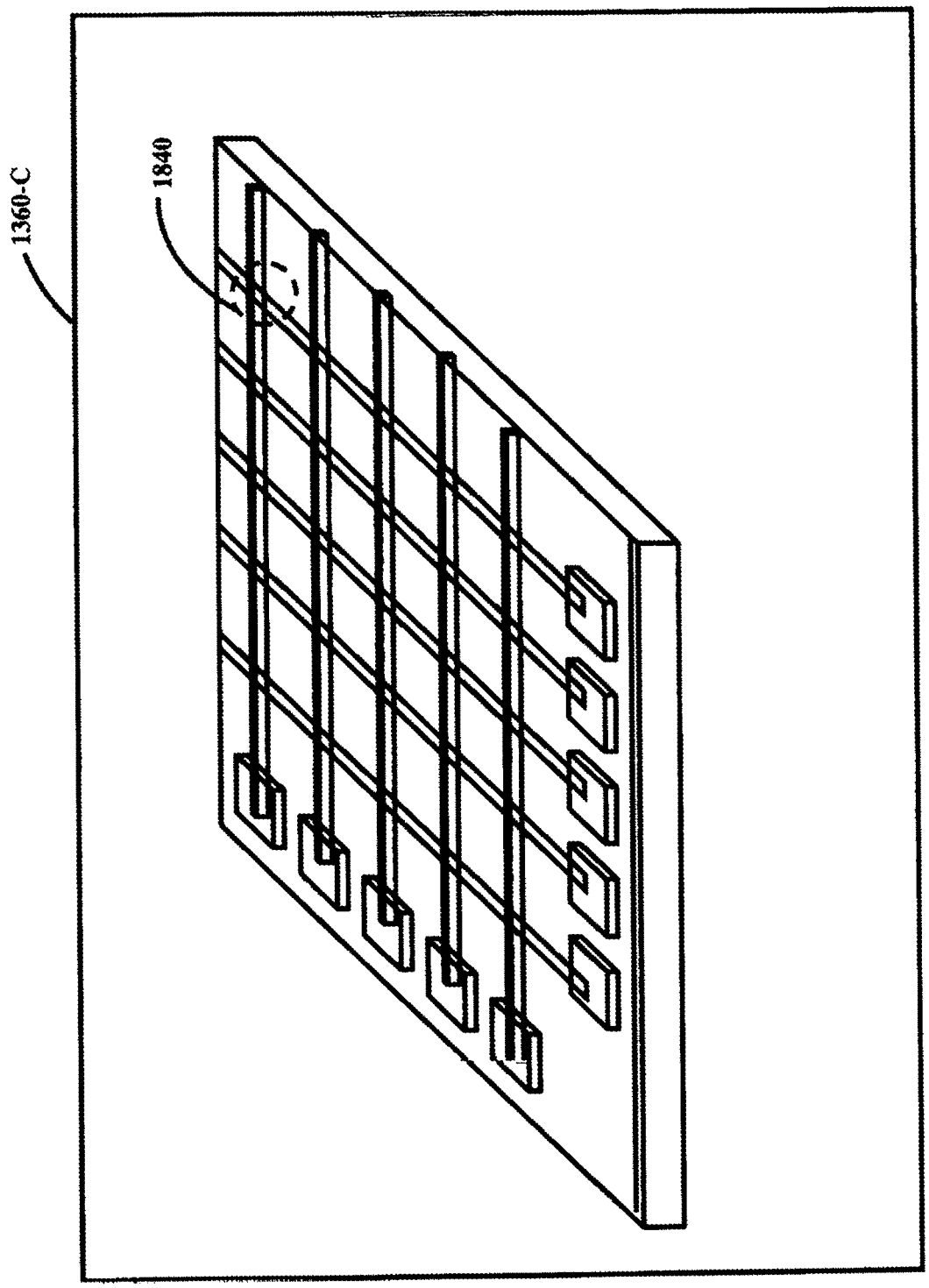

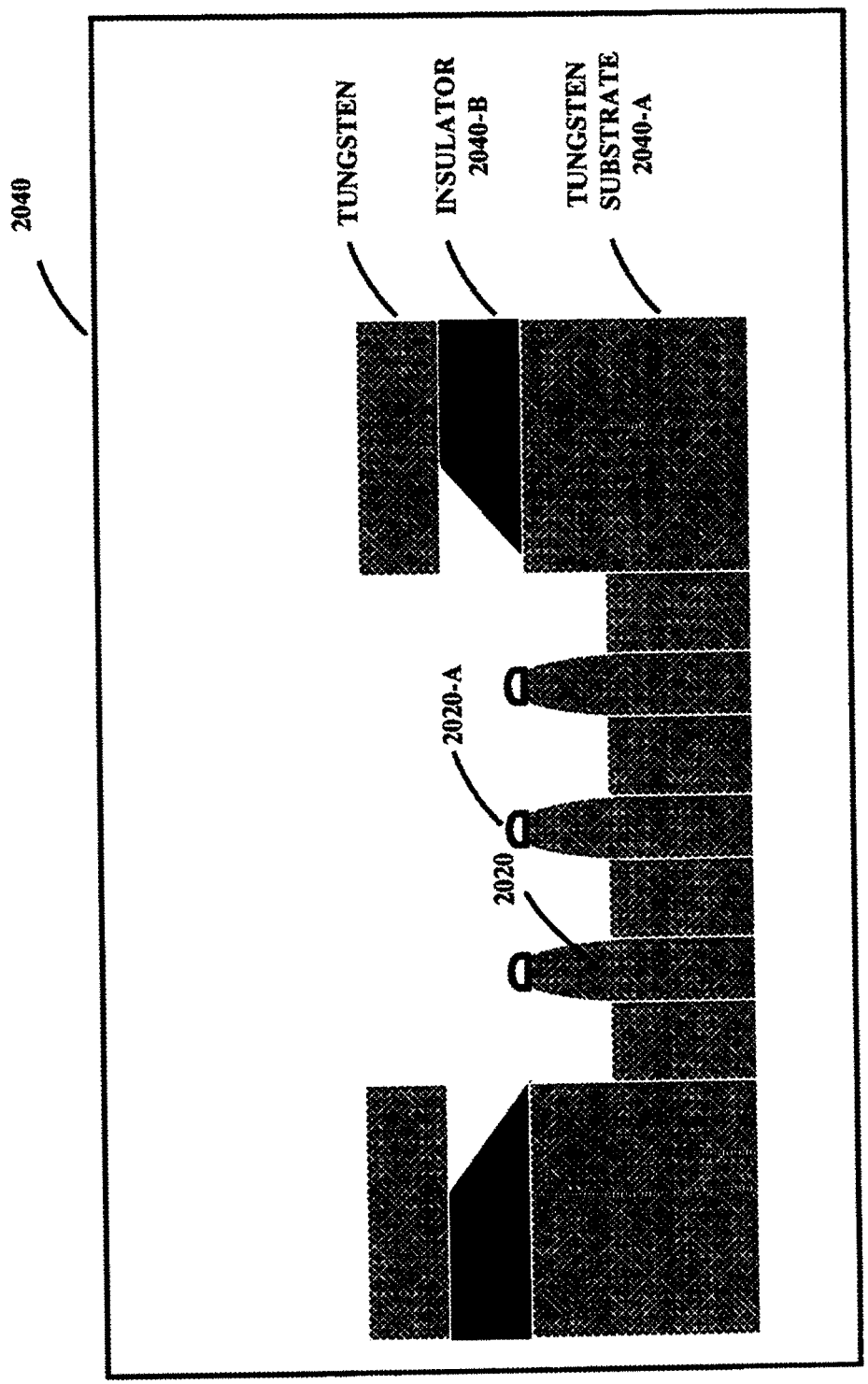

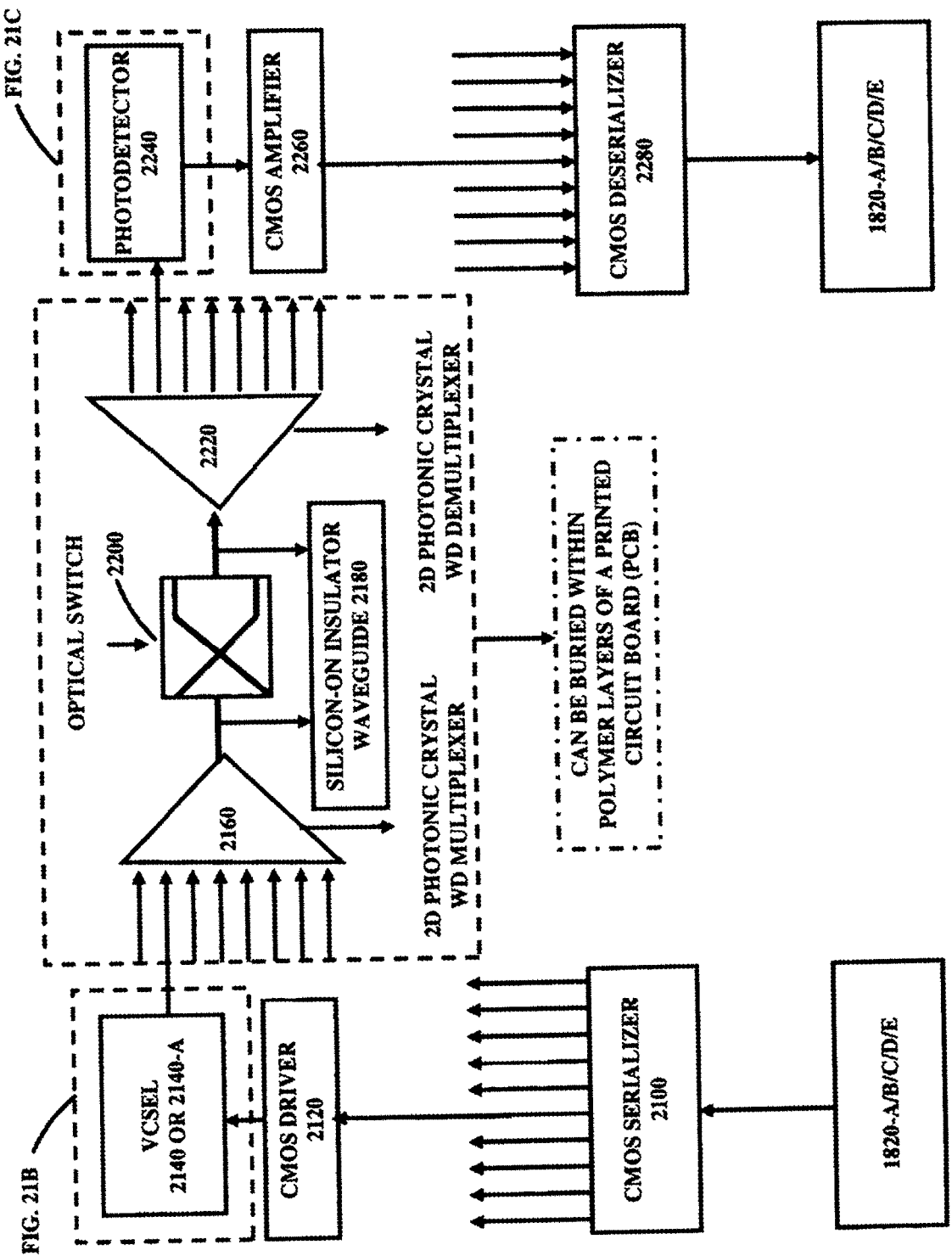

SYSTEM AND METHOD OF MACHINE LEARNING BASED USER APPLICATIONS

CROSS REFERENCE OF RELATED APPLICATIONS

The present application is a continuation-in-part (CIP) of: (a) U.S. non-provisional patent application entitled "Dynamic Intelligent Bidirectional Optical Access Communication System With Object/Intelligent Appliance-To-Object/Intelligent Appliance Interaction", Ser. No. 12/931,384 filed on Jan. 31, 2011, (b) U.S. non-provisional patent application entitled "Portable Internet Appliance", Ser. No. 12/238,286 filed on Sep. 25, 2008 and (c) U.S. non-provisional patent application entitled "Dynamic Intelligent Bidirectional Optical and Wireless Access Communication System", Ser. No. 11/952,001 filed on Dec. 6, 2007, issued as U.S. Pat. No. 8,073,331; and furthermore, the present application claims its benefit and priority to: (d) U.S. provisional patent application entitled "Intelligent Social E-Commerce", Ser. No. 61/517,204 filed on Apr. 15, 2011, (e) U.S. provisional patent application entitled "Dynamic Intelligent Bidirectional Optical Access Communication System With Object/Intelligent Appliance-To-Object/Intelligent Appliance Interaction", Ser. No. 61/404,504 filed on Oct. 5, 2010 and (f) U.S. provisional patent application entitled "Intelligent Internet Device", Ser. No. 60/970,487 filed on Sep. 6, 2007. Above US non-provisional patent applications along with U.S. provisional patent applications are hereby incorporated by reference in their entireties.

FIELD OF THE INVENTION

The present invention generally relates to integration of a social network, electronic commerce (including performance based advertisement and electronic payment) and a mobile internet device (MID).

Furthermore, synthesized social electronic commerce dynamically integrates stored information, information (preferably real time information), communication with an object/array of objects (where the object can be coupled with a wireless (or radio) transmitter and/or a sensor) and a unified algorithm.

The unified algorithm can include a software agent, a fuzzy logic algorithm, a predictive algorithm, an intelligence rendering algorithm and a self-learning (including relearning) algorithm.

BACKGROUND OF THE INVENTION

Social networking is no longer just about making social connections online. User experience can be enhanced not only by connecting with people, but also by connecting with information (preferably real time information) and communicating with an object/array of objects.

The cornerstone of today's electronic commerce is based on converting a probable click (in a search engine) into an actual sale.

By synthesizing social networking with electronic commerce, one can deliver consistent user experience across all touch-points (e.g., social, mobile and in-store).

Furthermore, synthesized social electronic commerce can integrate stored information, real time information, data from a mobile internet device and information/data/image(s) from an object/array of objects, where the object can be coupled with a wireless (or radio) transmitter and/or a sensor.

However, the mobile internet device can preferably communicate with a node, which can further communicate with the object/array of objects for spatial and time averaged information/data/image(s) from the object/array of objects.

The integration of social networking with (real time) user location information from a user's mobile internet device and information/data/image(s) from the object/array of objects can embed physical reality into an internet space and an internet reality into a physical space.

Furthermore, the unified algorithm (integrating a software agent, a fuzzy logic algorithm, a predictive algorithm, an intelligence rendering algorithm and a self-learning (including relearning)) algorithm can add a new dimension to the user experience.

Furthermore, by designing a system-on-chip (SoC) (an advanced microprocessor integrated with a security algorithm) for the mobile internet device, intelligence can be rendered to the mobile internet device.

SUMMARY OF THE INVENTION

The invention synthesizes the social network, electronic commerce (including performance based advertisement and electronic payment) and the mobile internet device (intelligence is achieved by utilizing advanced algorithm(s) and/or advanced microprocessor design(s) for the mobile internet device).

Synthesized social electronic commerce further dynamically integrates stored information, real time information, information/data/image(s) from the object/array of objects (where the object can be coupled with a wireless (or radio) transmitter and/or a sensor) and the unified algorithm (the unified algorithm includes a software agent, a fuzzy logic algorithm, a predictive algorithm, an intelligence rendering algorithm and a self-learning (including relearning) algorithm).

BRIEF DESCRIPTION OF THE FIGURES

FIGS. 1(A and B) illustrates an integrated application flow chart of a social wallet, according to one embodiment of the present invention.

FIGS. 2(A, B, C, D, E, F, G and H) illustrates a method flow chart of integration of the social wallet, electronic commerce and performance based advertisement according to one embodiment of the present invention.

FIG. 3A illustrates a block diagram of a social wallet electronic module, according to one embodiment of the present invention.

FIGS. 3B and 3C illustrate a block diagram of an application of a biosensor (as a sensor) of the social wallet electronic module, according to one embodiment of the present invention.

FIGS. 3D, 3E and 3F illustrate cross-section diagrams of various configurations of a solar cell (an electrical power providing component) of the social wallet electronic module and/or a mobile internet device, according to one embodiment of the present invention.

FIG. 3G illustrates a healthcare (as a virtual doctor) related application of the social wallet electronic module, according to one embodiment of the present invention.

FIG. 3H illustrates a consumer related application of the social wallet electronic module, according to one embodiment of the present invention.

FIG. 4 illustrates a block diagram of an object, according to one embodiment of the present invention.

FIG. 5A illustrates a block diagram of the mobile internet device, according to one embodiment of the present invention.

FIG. 5B illustrates a cross-section of the display component of the mobile internet device, according to one embodiment of the present invention.

FIG. 5C illustrates a cross-section of a micro-electromechanical systems (MEMS) micro shutter, monolithically integrated with an array of thin-film transistors (TFTs), according to one embodiment of the present invention.

FIG. 5D illustrates a cross-section of the display component integrated with the solar cell of the mobile internet device, according to one embodiment of the present invention.

FIGS. 5E and 5F illustrate cross-sections of the display component of the mobile internet device, according to one embodiment of the present invention.

FIG. 6 illustrates a block diagram of a sketch pad electronic module, according to one embodiment of the present invention.

FIG. 7 illustrates a block diagram of the sketch pad electronic module, according to one embodiment of the present invention.

FIG. 8A illustrates a block diagram of a personal awareness assistant miniature electronic module, according to one embodiment of the present invention.

FIG. 8B illustrates an application of the personal awareness assistant miniature electronic module, according to one embodiment of the present invention.

FIG. 9 illustrates a block diagram of a first system-on-chip for the mobile internet device, according to one embodiment of the present invention.

FIG. 10 illustrates a configuration of a nano-transistor, according to one embodiment of the present invention.

FIG. 11 illustrates a block diagram of a second system-on-chip (where a microprocessor is based on nano-transistors) for the mobile internet device, according to another embodiment of the present invention.

FIG. 12 illustrates a block diagram configuration of a memristor (or phase change material based switching element), according to one embodiment of the present invention.

FIG. 13 illustrates a block diagram of a third system-on-chip, (where a microprocessor is based on memristors (or the phase change material based switching elements)) for the mobile internet device, according to one embodiment of the present invention.

FIG. 14 illustrates a block diagram configuration of a memristor (or the phase change material based switching elements) with pre-neurons and post-neurons.

FIG. 15 illustrates a block diagram of a fourth system-on-chip (where a microprocessor is based on a neural network) for the mobile internet device, according to another embodiment of the present invention.

FIG. 16 illustrates a block diagram configuration of the memristor (or the phase change material based switching elements) with pre-neurons, post-neurons and nano-transistors, according to one embodiment of the present invention.

FIG. 17 illustrates a block diagram of a fifth system-on-chip (where a microprocessor is based on a neural network and nano-transistors) for the mobile internet device, according to another embodiment of the present invention.

FIGS. 18(A, B and C) illustrates process steps for integrating one or two two-dimensional crystals on a semiconductor substrate, according to one embodiment of the present invention.

FIG. 19 illustrates a block diagram of an attachment of the above system-on-chip on a printed circuit board, according to one embodiment of the present invention.

FIGS. 20(A, B and C) illustrates a block diagram of a cooling module for the above system-on-chip on the printed circuit board, according to one embodiment of the present invention.

FIGS. 21(A, B and C) illustrates a block diagram of an interconnection between the above system-on-chips (via wavelength division multiplexing) on the printed circuit board, according to one embodiment of the present invention.

FIG. 21D illustrates a cross section of a vertical cavity surface emitting laser, monolithically integrated with a modulator, according to one embodiment of the present invention.

DETAILED DESCRIPTION OF THE INVENTION

FIG. 1A illustrates an integrated application flow chart of a social wallet 100. The social wallet 100 can be a social networking web portal and it can typically reside at a cloud based secure server. The social wallet 100 can connect/access stored information from a data storage (preferably a cloud based secure data storage) component(s) 120, can connect/access with information (preferably real time information) from an information source(s) 140, can connect with a user(s) 160, can connect with a merchant(s) 180, can connect with a deposit account(s) 200, can connect with a payment account(s) 220, can connect with an object/array of objects 240, can connect with a node(s) 260, can connect with a social wallet electronic module(s) 280, can connect with the mobile internet appliance(s) 300. Furthermore, the social wallet 100 can connect/access with a unified algorithm 320.

The unified algorithm 320 can consist of a software agent 340, a fuzzy logic algorithm 360, a predictive algorithm 380, an intelligence rendering algorithm 400 and a self-learning (including relearning) algorithm 420.

Furthermore, the social wallet 100 can connect with a location measurement component of the mobile internet appliance(s) 300 and an electronic display, where the electronic display can be embedded with the object/array of objects 240 and/or near-field communication tags and/or one-dimensional (1-D)/two-dimensional (2-D) quick response (QR) codes.

The social wallet 100 can act as an ultimate integrator (e.g., a Trusted Service Manager (TSM) of many needs of the user 160, connecting with other users 160 for various information and needs, transferring information between users 160, securely transferring money to the deposit account 220 (e.g., a bank), securely transferring money to the payment account 220 (e.g., a bill payment account), securely transferring money (e.g., a microloan) between users 160.

FIG. 1B illustrates steps from 4001 to 4025. In step 4001, the social wallet 100 can connect/access stored information from the data storage (preferably the cloud based secure data storage) component(s) 120. In step 4002, the social wallet 100 can connect/access to the information source (preferably real time information) 140.

In step 4003, the social wallet 100 can connect to the user 160 via a profile. In step 4004, the social wallet 100 can connect to the user 160 via an online/offline message. In step 4005, the social wallet 100 can connect to the user 160 via a chat message. In step 4006, the social wallet 100 can connect to the user 160 via a broadcast message. In step 4007, the social wallet 100 can connect to the user 160 via a like/dislike vote. In step 4008, the social wallet 100 can connect to the other users 160 for a collaborative purchase of a product and/or service.

In step 4009, the social wallet 100 can connect to the merchant 180 via a profile. In step 4010, the social wallet 100 can connect to the merchant 180 via online/offline message. In step 4011, the social wallet 100 can connect to the merchant 180 via chat message. In step 4012, the social wallet 100 can connect to the merchant 180 via broadcast message. In step 4013, the social wallet 100 can connect to the merchant 180 via bid. In step 4014, the social wallet 100 can connect to the merchant 180 via bid in real time.

In step 4015, the user 160 can deposit money (electronic scan of a money order and/or a check) and/or legally approved electronic cash (e.g., bitcoins, digital gold currency and webmoney with traceable serial numbers) to the deposit account 200 via the social wallet 100. In step 4016, the user 160 can withdraw money from the deposit account 200 via the social wallet 100.

In step 4017, the user 160 can pay money to a payment account 220 via the social wallet 100. In step 4018, the user 160 can transfer/consolidate many payment accounts to the payment account 220 via the social wallet 100.

In step 4019, the user 160 can transfer money (e.g., a microloan) to other users 160 via the social wallet 100.

In step 4020, the social wallet 100 can communicate with the object 240.

Furthermore, the object 240, near-field communication tags and/or one-dimensional/two-dimensional quick response codes can be embedded on an electronic display (e.g. a smart poster).

Such communication with the objects 240 and/or near-field communication tags and/or one-dimensional/two-dimensional quick response codes can generate loyalty points in real time and can create personalized customer loyalty program, when they are connected with the social wallet 100.

In step 4021, the social wallet 100 can communicate with the node 260. Furthermore, the node 260 can communicate with the object/array of objects 240.

In step 4022, the social wallet 100 can communicate with the social wallet electronic module 280.

In step 4023, the social wallet 100 can communicate with the mobile internet device 300.

In step 4024, the social wallet 100 can communicate with the unified algorithm 320. The unified algorithm 320 can consist of a software agent 340, a fuzzy logic algorithm 360, a predictive algorithm 380, an intelligence rendering algorithm 400 and a self-learning (including relearning) algorithm 420. In step 4025, the software agent 340, the fuzzy logic algorithm 360, the predictive algorithm 380, the intelligence rendering algorithm 400 and the self-learning (including relearning) algorithm 420 and can communicate with each algorithm.

The intelligent rendering algorithm 400 can include algorithms such as: artificial intelligence, data interpretation, data mining, machine vision, natural language processing, neural networks, pattern recognition and reasoning modeling.

FIGS. 2(A, B, C, D, E, F and G) illustrates a method flow chart of integration of the social wallet (the social networking web portal) 100 and electronic commerce in the following steps:

In step 4026, the user 160 can log into the social wallet 100. In step 4027, the user 160 can set a privacy control in the social wallet 100. In step 4028, the user 160 can input his/her profile (e.g., gender, age group, income range, zip code, family members/friends' contacts) in the social wallet 100.

In step 4029, the unified algorithm 320 in the social wallet 100 can estimate the personal score of the user 160 by analyzing the profile, message history, chat history and data patterns (including purchase patterns). In step 4030, the unified algorithm 320 in the social wallet 100 can set the personal score of the user 160. The personal score of the user 160 can vary with time. In step 4031, the social wallet 100 can record the personal score of the user 160 over time.

In step 4032, the user 160 can authenticate in the social wallet 100, utilizing multi-level passwords and personalized questions. In step 4033, the user 160 can authenticate in the social wallet 100, by placing the social wallet electronic module 280, at proximity to a near-field communication terminal or by placing the mobile internet device 300, at proximity to a near-field communication terminal, where the mobile internet device 300 also integrates the social wallet electronic module 280.

In step 4034, the user 160 can also link the information about the product and/or service in the social wallet 100.

Alternatively, in step 4035, the user 160 can write a wanted ad for the product and/or service in the social wallet 100.

In step 4036, the unified algorithm 320 in the social wallet 100 can determine the location of the user 160 in real time by communicating with a location measurement component/miniature electronic module 1440 of the mobile internet device 300 of the user 160.

In step 4037, the unified algorithm 320 (in particular the software agent 340) in the social wallet 100 can send out queries to the location specific merchants 180 for the product and/or service, wanted by the user 160. If no offers from the location specific merchants 180 are found, then in step 4038, the unified algorithm 320 can send out queries to the location specific merchants in an increment of some distance (e.g., 20 Km) from the current location of the user 160 in order to secure the product and/or service, wanted by the user 160.

In step 4039, the unified algorithm in the social wallet 100 can forward the offers (e.g., in the form of a text/e-mail link/picture mail/video mail) from the merchants 180 to the mobile internet device 300 of the user 160, in real time (preferably via the user 160's profile in the social wallet 100).

In step 4040, the user 160 can optionally share the offers from the merchants 180 with the mobile internet devices 300 of other users, who are connected with the profile of the user 160, in real time (preferably via the other users' profiles in the social wallet 100).

In step 4041, other users connected with the profile of the user 160 vote for like/dislike vote—a quorum sensing. In step 4042, the user 160 can connect with another user for a collaborative purchase.

In step 4043, the unified algorithm 320 in the social wallet 100 can input the result of the like/dislike vote, in real time. In step 4044, the unified algorithm 320 in the social wallet 100 can estimate a merchant score of the merchants 180 by analyzing many like/dislike votes. The merchant score of the merchant 180 can vary over time. In step 4045, the social wallet 100 can record the merchant score. In step 4046, the social wallet 100 can display the merchant score of the merchant 180.

Furthermore, in step 4047, if the estimated personal score of the user 160 exceeds a certain pre-determined value set by the social wallet 100, then in step 4048, the unified algorithm 320 (in particular the fuzzy logic algorithm 360) in the social wallet 100 can determine other relevant products and/or services for the user 160. In step 4049, the social wallet 100 can send a coupon(s) (e.g., in the form of a text/e-mail link/picture mail/video mail) for other relevant products and/or services from the merchants 180 to the mobile internet device 300 of the user 160, in real time. In step 4050, the user 160 can share the coupon(s) with other users by simply forwarding the coupon(s) to the other users' mobile internet devices 300, in real time (preferably via the other users' profiles in the social wallet 100).

In step 4051, the user 160 can pay for the product and/or service via the social wallet 100, or by the social wallet electronic module 280, or by the mobile internet device 300.

Furthermore, in step 4052, the unified algorithm 320 (in particular the predictive algorithm 380) in the social wallet 100 can initially determine a set of relevant users for a targeted advertisement for a specified product and/or service.

In step 4053, the unified algorithm 320 in the social wallet 100 can send a coupon(s) (e.g., in the form of a text/e-mail link/picture mail/video mail) related to the specified product and/or service from merchants 180 to the profiles of the above set of relevant users.

In step 4054, the above set of relevant users can share coupon(s) (e.g., in the form of a text/e-mail link/picture mail/video mail) related to the specified product and/or service from merchants 180 with the other users' mobile internet devices 300, in real time (preferably via the other users' profiles in the social wallet 100).

If a targeted advertisement campaign does not receive responses greater than at a pre determined % (e.g., 10%), then in step 4055, the unified algorithm 320 (in particular the predictive algorithm 380, the intelligence rendering algorithm 400 and the self-learning (including relearning) algorithm 420) in the social wallet 100 can iterate (fine-tune) to find another set of relevant users for the targeted advertisement, until the targeted advertisement would be concluded successful to stop, when the targeted advertisement campaign receives responses greater than at the pre-determined % (e.g., 10%).

FIG. 2G illustrates how the social wallet electronic module 280 and/or mobile internet device 300 can communicate symmetrically with the social wallet 100 utilizing a controller, a user interface layer, a user profile management layer, an encryption management layer, a protocol management layer and a communication management layer.

A Trusted Service Manager can consolidate/integrate/simplify various services with service providers (e.g., banks, phone companies and other service providers).

FIG. 2H illustrates how the social wallet 100 can function as the Trusted Service Manager to enable social electronic commerce utilizing the social wallet electronic module 280 and/or the mobile internet device 300. The Trusted Service Manager can be coupled with various service providers such as banks, phone companies and service providers.

FIG. 3A illustrates a block diagram of a social wallet electronic module 280 (preferably in a small form factor e.g., a SD/mini SD).

An external universal serial bus port 440 can connect with a universal serial bus (USB) connector 460. The universal serial bus connector 460 can be electrically coupled with a universal serial bus interface 480. The universal serial bus interface 480 can be electrically coupled with a computer readable medium (CRM) interface 500.

The computer readable medium interface 500 can be electrically coupled with a solid state non-volatile (e.g., a flash/memristor based ReRAM) storage/memory 520 to store information. The solid state non-volatile storage/memory 520 can be partitioned to have both a private password protected storage/memory section (520-A) and a publicly viewable storage/memory section (520-B).

Furthermore, the solid state non-volatile memory 520 can store legally approved electronic cash (e.g., bitcoins, digital gold currency and webmoney with traceable serial numbers).

Both the universal serial bus interface 480 and the computer readable medium interface 500 can be electrically coupled with a microcontroller 540.

A biometric (e.g., finger print/retinal scan) sensor miniature electronic module 560 (an interface 580 and a component 600) can be electrically coupled with the microcontroller 540. The biometric sensor miniature electronic module 560 can enhance the security of the social wallet electronic module 280 by matching the stored biometric scan and instant biometric scan at a point of presence or at a point of use.

A near-field communication (NFC) miniature electronic module 620 (an interface 640 and a component 660) can be electrically coupled with the microcontroller 540. Near-field communication is a close proximity range 13.56 MHz wireless (or radio) protocol.

Near-field communication has two key components: an initiator and a target. The initiator actively generates an RF field that can electrically power a passive target without a battery.

A near-field communication tag contains simple data to perform a task (e.g., paying for a product or service and exchanging data between users). A near-field communication tag can securely store data (e.g., a personal identification number, debit/credit card information, loyalty card information, health records, physical access information, logical access information and digital rights access for local digital rights storage). But the near-field communication tag can also be re-writeable.

A Wibree (a low power-short range wireless (or radio) protocol) miniature electronic module 680 (an interface 700 and a component 720) can be electrically coupled with the microcontroller 540.

A DASH7 (a low power-moderate range wireless (or radio) protocol) miniature electronic module 740 (an interface 760 and a component 780) can be electrically coupled with the microcontroller 540. DASH7's electrical power requirements are about 10% of its next closest competitor (IEEE 802.15.4) and an even smaller fraction of WiFi and Bluetooth. With DASH7 miniature electronic module 720, the user 160 passing by a restaurant at a low velocity (e.g., about 5 mph) could simply click a "get info" button to seek a customer review of the restaurant, before the user 160 decides to eat at the restaurant or not.

A Bluetooth miniature electronic module 800 (an interface 820 and a component 840) can be electrically coupled with the microcontroller 540 to transmit and/or receive data.

A WiFi miniature electronic module 860 (an interface 880 and a component 900) can be electrically coupled with the microcontroller 540 to transmit and/or receive data.

An ultra wideband miniature electronic module 920 (an interface 940 and a component 960) can be electrically coupled with the microcontroller 540 to transmit and/or receive a vast quantity of data (e.g., a movie) in a short period of time.

A 60 GHz millimeter wave miniature electronic module 980 (an interface 1000 and a component 1020) can be electrically coupled with the microcontroller 540 to transmit and/or receive a vast quantity of data (e.g., a movie) in a short period of time. The 60 GHz millimeter wave miniature electronic module 980 can enable applications such as (a) wireless docking and (b) distributed storage.

A software-defined radio 1040 can be fabricated/constructed by integrating the tunable antenna 1060, a carbon nanotube tunable filter 1080 and an analog to digital converter 1100.

A tunable antenna 1060 can tune in between 2 GHz and 3 GHz by utilizing a carbon nanotube. The tunable antenna 1060 can merge/integrate many antennas into one single antenna.

The software-defined radio 1040 and tunable antenna 1060 can be electrically coupled with the microcontroller 540.

Additionally, a sensor (e.g., a wireless sensor-radio frequency identification (RFID)) 1120 can be electrically coupled with the microcontroller 540.

Furthermore, a line-of-sight optical transceiver 1140 (integrating an array of multi-color light source modulators 1160, an array of photodiodes 1180, two (2) waveguide combiner/decombiners 1200 and two (2) lenses 1220) can be electrically coupled with the microcontroller 540. The optical transceiver 1140 can transmit and/or receive a vast quantity of data (e.g., a movie) in a short period of time.

Additionally, an electrical power provider component (a thick-film/thin-film battery/solar cell/micro fuel-cell/supercapacitor) 1240 can be electrically coupled with the microcontroller 540.

Furthermore, the microcontroller 540 can be replaced by a high performance microprocessor 1360.

Furthermore the sensor 1120 can be a biosensor. FIGS. 3B and 3C are described in Tables-1 and Table-2 below:

TABLE 1

| FIG. 3B Legend | Description |
| --- | --- |
| 1120-A | Silicon Nanowire |
| 1120-A1 | Lipid Layer |
| 1120-B | Insulator (e.g., Silicon Dioxide) |
| 1120-C | Gate (e.g., Silicon Substrate) |
| 1120-D | Source Metal |
| 1120-E | Drain Metal |
| 1120-F | Receptor (e.g., Antibody or Aptamer) |
| 1120-G | Biomarker Protein |
| 1120-H | Nanobattery |
| 1120-I | Nanotransmitter |
| 1120-J | Nanotube (e.g., Carbon Nanotube) |
| 1120-K | Negative Electrode |
| 1120-L | Positive Electrode |

TABLE 2

| FIG. 3C Legend | Description |
| --- | --- |
| 1120-A2 | Chitosan |
| 1120-B | Insulator (e.g., Silicon Dioxide) |
| 1120-C | Gate (e.g., Silicon Substrate) |
| 1120-D | Source Metal |
| 1120-E | Drain Metal |
| 1120-F | Receptor (e.g., Antibody or Aptamer) |
| 1120-G | Biomarker Protein |
| 1120-H | Nanobattery |
| 1120-I | Nanotransmitter |
| 1120-J | Nanotube (e.g., Carbon Nanotube) |

TABLE 2-continued

| FIG. 3C Legend | Description |
| --- | --- |
| 1120-K | Negative Electrode |
| 1120-L | Positive Electrode |

FIG. 3B illustrates an application of the biosensor 1120, which can be integrated with the social wallet electronic module 280. In 1120, a silicon nanowire field effect transistor (FET), a source is identified by S, a drain is identified by D and a gate is identified by G. Furthermore, the silicon nanowire can be coated with a lipid layer and integrated with receptors on the lipid layer. The receptors can chemically bind with a biomarker protein (e.g., a disease biomarker protein)—thus giving rise to electrical signals (due to changes in the electrical properties of the silicon nanowire), further transmitted by a nanotube (e.g., a carbon nanotube) based wireless (or radio) transmitter. The nanotube based wireless (or radio) transmitter can be electrically powered with a nanobattery.

FIG. 3C illustrates a disease detection application of the biosensor 1120, which can be integrated with the social wallet electronic module 280. In 1120, chitosan proton (ionic) field effect transistor ($H^+$ FET), a source is identified by S, a drain is identified by D and a gate is identified by G. Furthermore, chitosan can be integrated with receptors. The receptors can chemically bind with a biomarker protein (e.g., a disease biomarker protein)—thus giving rise to electrical signals (due to changes in the electrical properties of chitosan), further transmitted by a nanotube (e.g., a carbon nanotube) based wireless (or radio) transmitter. The nanotube based wireless (or radio) transmitter can be electrically powered with a nanobattery.

Furthermore, the biosensor 1120 can be integrated with the near-field communication miniature electronic module 620 on a human body to enable smart biosensor, which can transmit vital health data to a near-field communication terminal.

FIG. 3D illustrates a solar cell 1240-A as an electrical power provider component. About 2 micron thick meso-porous $TiO_2$ thin-film 1240-D can be coated with nanocrystals/nanoshells 1240-E. The nano crystals/nanoshells 1240-E can cage/encapsulate light-absorbing organic dye molecules (e.g., porphyrins and/or phthalocyanines) 1240-F. Furthermore, the nanocrystals/nanoshells 1240-E can contain another specific molecule 1240-G for energy transfer upon excitation.

The nanocrystals/nanoshells 1240-E can be also varied in diameter to have an absorption over wider wavelength range in order for the solar cell 1240-A to be more efficient (for light to electricity conversion).

Furthermore, the solar cell 1240-A could be made more efficient (for light to electricity conversion) with an addition of an array of nanotubes (e.g., carbon or boron nitride nanotubes) 1240-H.

The meso-porous TiO2 thin-film 1240-D can be sandwiched between two electrodes: indium tin oxide transparent front electrode 1240-J and back metal (e.g., aluminum, silver or platinum) electrode 1240-C.

Furthermore, the back metal electrode 1240-C can be fabricated/constructed with nanocorrugated plasmonic reflectors to trap more residual light inside the solar cell 1240-A.

The meso-porous $TiO_2$ thin-film 1240-D can be immersed within a liquid ionic electrolyte solution 1240-I.

FIG. 3E illustrates a solar cell 1240-A as an electrical power provider component. Triple junction semiconductor epitaxial layers 1240-P can be purchased from Microlink Devices. The critical element of this embodiment is (a) chemically separating (by selectively etching 50 nanometers thick AlAs layer in hydrofluoric (HF) acid), (b) lifting (by covering the patterned front device side with a black wax) triple junction semiconductor epitaxial layers 1240-P, all other relevant layers (such as GaAs layer 1240-M and InGaAlP layer 1240-N), p-metallization 1240-R and n-metallization 1240-S, (c) bonding onto the glass substrate 1240-B with an adhesion layer 1240-L and (d) finally dissolving the black wax in trichloroethylene (TCE).

FIG. 3F illustrates a cross-section of a solar cell 1240-A as the electrical power provider component. The critical element of this embodiment is (a) chemically separating (by selectively etching 50 nanometers thick AlAs layer in hydrofluoric acid), (b) lifting (by covering the patterned front device side with a black wax) three-dimensional (3-D) quantum dot superlattice of InAs 1240-Q, all other relevant layers (such as GaAs layer 1240-M and InGaAlP layer 1240-N), p-metallization 1240-R and n-metallization 1240-S, (c) bonding onto the glass substrate 1240-B with an adhesion layer 1240-L and (d) finally dissolving the black wax in trichloroethylene.

FIG. 3G illustrates a healthcare related application of the social wallet electronic module 280: how the social wallet electronic module 280 can be utilized to obtain a healthcare related advice from a healthcare expert system (a virtual doctor) at a cloud server. The social wallet electronic module 280 can be integrated with a biosensor. In step 4056, the social wallet electronic module 280 transmits wireless (or radio) network settings to the cloud based healthcare expert system (the virtual doctor) 100A. In step 4057, the social wallet electronic module 280 establishes wireless (or radio) connection with the cloud based healthcare expert system (the virtual doctor) 100A. In step 4058, the social wallet electronic module 280 establishes security verification with the cloud based healthcare expert system (the virtual doctor) 100A. In step 4059, the social wallet electronic module 280 transfers the user's health related data to the cloud based healthcare expert system (the virtual doctor) 100A. In step 4060, the social wallet electronic module 280 receives an expert healthcare advice from the cloud based healthcare expert system (the virtual doctor) 100A. In step 4061, the user 160 pays by the social wallet electronic module 280 for the expert advice received from the cloud based healthcare expert system (the virtual doctor) 100A.

FIG. 3H illustrates a consumer related application of the social wallet electronic module 280: how the social wallet electronic module 280 can be utilized to obtain a movie from a cloud based movie storage system 100B. In step 4056, the social wallet electronic module 280 transmits wireless (or radio) network setting(s) to the cloud based movie storage system 100B. In step 4057, the social wallet electronic module 280 establishes wireless (or radio) connection with the cloud based movie storage system 100B. In step 4058, the social wallet electronic module 280 establishes security verification with the cloud based movie storage system 100B. In step 4060, the social wallet electronic module 280 receives a movie from the cloud based movie storage system 100B. In step 4061, the user 160 pays for the movie received from the cloud based movie storage system 100B by the social wallet electronic module 280.

Alternatively, a movie storage system can be located at widely distributed (and conveniently located) kiosks instead of a cloud based movie storage system 100B.

FIG. 4 illustrates a block diagram of the object 240. The object 240 has an ultra-low power consumption and miniature medium performance microprocessor (e.g., Ambiq Micro or InAs-on-Insulator based microprocessor or a memristor) 1260, which can be electrically coupled with: (a) a sensor (e.g., a wireless sensor-radio frequency identification) 1120, (b) an optional IP/micro IP/light weight IP address 1280, (c) a miniature memory/storage (e.g., a memristor) 1300, (d) an embedded tiny operating algorithm/executable set of instructions 1320 (e.g., Tiny OS), (e) a low power "object-specific" miniature wireless (or radio) transmitter (e.g., a radio frequency identification and/or Wibree and/or Bluetooth and/or WiFi and/or near-field communication and/or DASH7) with a miniature antenna 1340 and (f) an "object-specific" miniature electrical power provider component 1240-T (which can be the solar cell 1240-A in a miniature form).

Furthermore, the object 240 can also be a biological object on or within (e.g., implanted) a human body.

The object 240 can utilize semiconductor fabrication, micro-electromechanical systems fabrication, plastic electronics fabrication, printed electronics fabrication, multichip module fabrication (packaging), three-dimensional fabrication (packaging) and microfluidic fabrication.

Furthermore the object 240 can have an outer external case.

The array of objects 240 can connect to the node (e.g., a node with an internet connection) 260. The node 260 can map, sense, measure, collect, aggregate, compare information collected from the array of objects 240. The node 260 can share/communicate information with the social wallet 100 and/or electronic social wallet electronic module 280 and/or mobile internet device 300.

Furthermore the electronic social wallet electronic module 280 and/or mobile internet device 300 can proximity contact or physically contact with the object 240 to communicate for relevant information.

FIG. 5A illustrates a block diagram of the mobile internet device 300. The mobile internet device 300 is about 125 mm long, 75 mm wide and 20 mm thick. It has the high performance microprocessor (e.g., Intel's x86 based Medfield) 1360, which can be electrically coupled with (a) a social wallet electronic module 280, (b) a general data storage electronic module 520-C, (c) an IP/micro IP/light weight IP address 1280, (d) a lab-on-chip electronic module (a biological diagnostics electronic module) 1360, (e) an embedded operating algorithm 1380 stored in the general data storage electronic module 520-C, (f) an internet security algorithm (internet firewall/spyware/user-specified security control and authentication) 1400, (g) a one-dimensional/two-dimensional barcodes/quick response codes reader 1420, (h) a miniature wireless (or radio) electronic module (e.g., radio frequency identification/Bluetooth/WiFi/global positioning system with antenna(s)) 1440 for indoor/outdoor location measurement, (i) an electronic compass 1460, (j) two (2) cameras (a 180 degree rotating camera is preferred, instead of two cameras—one for video chat and one for photo taking) 1480, (k) a video conferencing (integrated with a dynamic video compression module—which could be either an electronic module and/or an algorithm) system-on-chip 1500, (l) a display component 1520, (m) a microprojector 1540, (n) a sketch pad (with a write/erase option) electronic module 1560, which includes a sketch pad-specific miniature electronic module 1560-A with a stylus 1580, (o) a communication wireless (or radio) transceiver electronic module (e.g., WiMax/LTE) with antenna(s) 1600, (p) a personal awareness assistant miniature electronic module 1620, (q) a voice-to-text-to-voice conversion algorithm 1640 and (r) an algorithm 1660.

A multi-touch high definition liquid crystal display (integrated with an array of thin-film transistors on indium gallium zinc oxide) can be utilized as a display component 1520.

Organic light emitting (red, green and blue) diodes driven by an array of organic thin-film transistor on an organic substrate (e.g., plastic) can also be utilized as a rolled up/stretchable display component 1520. The rolled up/stretchable display component 1520 can minimize a display size related distinction between a portable computer and the mobile internet device 300.

Furthermore, a display component 1520 can enable a dual-view to show entirely two separate scenes simultaneously.

Furthermore, the algorithm 1660 includes: (a) a physical search algorithm, (b) an algorithm-as-a-service, (c) an intelligent rendering algorithm (e.g., artificial intelligence, behavior modeling, data interpretation, data mining, fuzzy logic, machine vision, natural language processing, neural networks, pattern recognition and reasoning modeling) and (d) a self-learning (including relearning) algorithm.

In the context of the mobile internet device 300, data can be compared with respect to a set of parameters to learn or relearn continuously by analyzing patterns of data, where patterns of data can consist/utilize/couple with the algorithm 1660.

The algorithm 1660 of the mobile internet device 300 includes the intelligent rendering algorithm (e.g., artificial intelligence, behavior modeling, data interpretation, data mining, fuzzy logic, machine vision, natural language processing, neural networks, pattern recognition and reasoning modeling).

In the context of the social wallet 100, data can be compared with respect to a set of parameters to learn or relearn continuously by analyzing patterns of data, where patterns of data can consist/utilize/couple with the fuzzy logic algorithm 360, the intelligence rendering algorithm 400 and the self-learning (including relearning) algorithm 420.

Furthermore, this continually learned analysis along with a predictive algorithm 380 can enable the social wallet 100 to identify a set of users with particular parameters for a targeted advertisement.

The antenna for the communication wireless (or radio) transceiver 1600 of the mobile internet device 300 can be fabricated/constructed from metamaterial. Metamaterial is a material of designer crystal structure combining two materials (e.g., lead selenide and iron oxide).

Furthermore the antenna can be integrated with/onto an outer external case of the mobile internet device 300.

The outer external case of the mobile internet device 300 can be fabricated/constructed from a nano-engineered aluminum/magnesium alloy, a liquid metal alloy and glass.

The outer external case of the mobile internet device 300 can also be fabricated/constructed from carbon fiber embedded with plastic. Carbon fibers can be inserted into an injection mold of a plastic film and bonded to the molten injection mold of the plastic film, thereby forming a composite material of carbon fibers and plastic film.

FIG. 5B illustrates a cross-section of a display component 1520 of the mobile internet device, which utilizes highly efficient quantum dot light emitting diodes 1520-A (red, green and blue) incident at an angle with respect to the lower glass substrate 1520-B. The lower glass substrate 1520-B has built-in corrugations and waveguides to enable reflection of incident light from the quantum dot light emitting diodes 1520-A.

Table-3 below describes subcomponents required to fabricate/construct the display component 1520. The critical subcomponents are micro-electromechanical systems micro shutters, which are monolithically integrated with an array of thin-film transistors (e.g., fabricated/constructed on zinc oxide or zinc-indium-tin oxide or graphene oxide).

This can enable an efficient high brightness display component 1520 at lower electrical power consumption, eliminating two (2) polarizer filter films, color filter and liquid crystal. This is substantially compatible with standard display component manufacturing methods/processes.

TABLE 3

| FIG. 5B Legend | Description |
|---|---|
| 1520-A | Quantum Dot Light Emitting Diodes (Red, Green & Blue) |
| 1520-B | Lower Glass Substrate With Built-In Corrugations & Waveguides |
| 1520-C | Array Of Transparent Lower Pixel Electrodes |
| 1520-D | Array Of Thin-Film Transistors |
| 1520-E | Scanning Transparent Electrodes |
| 1520-F | Signal Transparent Electrodes |
| 1520-G | Micro-Electromechanical Systems Micro Shutters Monolithically Integrated With A Thin-Film Transistor |
| 1520-H | Monolithic Integration Of 1520-D, 1520-E, 1520-F & 1520-G |
| 1520-I | Transparent Upper Common Electrode |
| 1520-J | Upper Glass Substrate |

Furthermore, a quantum dot white light emitting diode (with a specific thin-film color filter (to transmit only optically filtered red or green or blue light), preferably located below the upper glass substrate) can be used instead of a quantum dot red light emitting diode, a quantum dot green light emitting diode and a quantum dot blue light emitting diode.

The thin-film transistor 1520-D located at each pixel can control an image at each pixel of the display component 1520. However, the thin-film transistor 1520-D can also have a light sensing circuitry to sense the light reaching the pixel of the display component 1520 from its surroundings, enabling a possibility of new user experience with the display component 1520.

FIG. 5C illustrates 1520-H: a micro-electromechanical systems micro shutter 1520-G, which can be monolithically integrated with the array of thin-film transistors 1520-D (e.g., fabricated/constructed on zinc oxide or zinc-indium-tin oxide or graphene oxide).

Table-4 below describes subcomponents required to fabricate/construct the micro-electromechanical systems micro shutter 1520-G, which can be monolithically integrated with the array of thin-film transistors 1520-D (e.g., fabricated/constructed on zinc oxide or zinc-indium-tin oxide or graphene oxide).

TABLE 4

| FIG. 5C Legend | Description |
|---|---|
| 1520-K | Thin-Film |
| 1520-L | Gate Dielectric |
| 1520-G | Micro Shutter |
| 1520-N | Source Electrode Or Drain Electrode |
| 1520-M | Actuation Electrode |
| 1520-O | Release Layer |

FIG. 5D illustrates a cross-section of a display component 1520-T integrated with the solar cell 1240-A.

FIG. 5E illustrates a cross-section of another enabling configuration of the display component 1520 of the mobile internet device 300. Along with the array of thin-film transistors 1520-D, the critical element of this configuration is lifted semiconductor quantum-wells layers 1520-P on a glass substrate (e.g. the glass substrate 1240-B). Furthermore, the semiconductor quantum-wells layers 1520-P have both p-metal and n-metal contacts.

The semiconductor quantum-well layers 1520-P can be electrically excited by current from a battery. The released energy can be non-radiatively transferred to nanocrystal quantum dots (of various diameters/sizes) 1520-Q to produce red, green and blue light from an adjacent layer of nanocrystal quantum dots 1520-Q to enable an efficient color display component 1520.

FIG. 5F illustrates a cross-section of another enabling configuration of the display component 1520 of the mobile internet device 300. Along with the array of thin-film transistors 1520-D, the critical element of this configuration is epitaxially lifted semiconductor quantum-wells layers 1520-P on a glass substrate (e.g., the glass substrate 1240-B). Furthermore the semiconductor quantum-wells layers 1520-P have both p-metal and n-metal contacts.

The semiconductor quantum-well layers 1520-P can be electrically excited by current from a battery. The released energy can be non-radiatively transferred to uniformly sized nanocrystal quantum dots 1520-R to produce white light emission from an adjacent layer of uniformly sized nanocrystal quantum dots 1520-R. The white light can be filtered by an array of thin-film color filters 1520-S to enable an efficient color display component 1520.

FIG. 6 illustrates a block diagram of the sketch pad (with write/erase options) electronic module 1560 with the stylus 1580. The sketch pad electronic module 1560 is a multilayer device, having a transparent (e.g., indium tin oxide or graphene) input matrix 1680, below the transparent input matrix 1680, there is the display component (e.g., liquid crystal or graphene based display component) 1520 and below which, there is an electronic (scan, drive and display memory) circuitry 1700.

The stylus 1580 can be formed in the shape of a pencil from silicon rubber impregnated with metal particles.

As the stylus 1580 writes over the transparent input matrix 1680, it can capacitively couple with the transparent input matrix 1680. Thus, if there is a change in the capacitance, it can be sensed by the electronic circuitry 1700. The electronic circuitry 1700 can be electrically coupled with a switch 1720. Utilizing the switch 1720, the sketch pad electronic module 1560 can be operated in both write and erase modes.

FIG. 7 illustrates a block diagram of the sketch pad electronic module 1560, where the electrical coupling between the transparent input matrix 1680, display component 1520, electronic circuitry 1700 and switch 1720 are described. Furthermore, a hand-writing recognition algorithm and/or a pattern recognition algorithm 1740 can enhance the performance of the sketch pad electronic module 1560.

FIG. 8A illustrates a block diagram of the personal awareness assistant miniature electronic module 1620, which integrates: a storage/memory 520 (however, the storage/memory 520 can also be replaced by the general storage electronic module 520-C), a sensor 1120, a light source modulator 1160, a medium performance microprocessor 1260, a camera 1480, a voice-to-text-to-voice conversion algorithm 1640, two (2) microphones 1760, a scrolling audio recording buffer 1780 and a voice recognition algorithm 1800.

The personal awareness assistant miniature electronic module 1620 can be always on. It can passively listen to what the user 160 says and can respond to particular contexts and situations. For example: the user 160 can hear about a product and the user 160 can create a reminder by speaking to the personal awareness assistant miniature electronic module 1620. The user 160 can transmit that information from the personal awareness assistant miniature electronic module 1620 to the social wallet 100 via the electronic social wallet electronic module 280 and/or mobile internet device 300 for further processing and/or fulfillment. After processing the information from the personal awareness assistant miniature electronic module 1620, the social wallet 100 can then deliver real time location based coupon(s) to the mobile internet device 300, by measuring the user's 160 location information by utilizing the indoor/outdoor location measurement miniature electronic module 1440 of the mobile internet device 300.

Optionally the personal awareness assistant miniature electronic module 1620 can be standalone miniature electronic module (but it can be pluggable to the mobile internet device 300).

For example, when the user 160 is introduced to someone, the personal awareness assistant miniature electronic module 1620 can automatically recognize and may take a low-resolution photo. Once, the mobile internet device 300 collects the information, it can automatically categorize the information into a pre-designated database with audio, digital image, time/date stamp and global position system location. Because the data is stored contextually, information retrieval can be straightforward. In response to a simple voice command inquiry such as "whom did I meet on Apr. 15, 2009 at 12 PM"? the personal awareness assistant miniature electronic module 1620 can bring up the appropriate information about that specific person. Thus, the mobile internet appliance is context-aware.

Furthermore, the voice recognition algorithm 1800 can enhance the capability of the personal awareness assistant miniature electronic module 1620.

Additionally, a face recognition algorithm can enhance the capability of the personal awareness assistant miniature electronic module 1620.

FIG. 8B illustrates an application of the personal awareness assistant miniature electronic module 1620 of the mobile internet device 300. In step 4062, the user finds a product (e.g., on a radio news). In step 4063, the personal awareness assistant miniature electronic module 1620 records that product information with the user's consent. In step 4064, the personal awareness assistant miniature electronic module 1620 transmits the product information to the social wallet 100. In step 4065, the social wallet 100 acknowledges the received (product) information from the personal awareness assistant miniature electronic module 1620. In step 4066, the social wallet 100 processes the received (product) information from the personal awareness assistant miniature electronic module 1620. In step 4067, the social wallet 100 determines the location of the mobile internet device 300 in real time. In step 4068, the social wallet 100 determines the local stores, where the product can be found. In step 4069, the social wallet 100 directs (turn by turn) the mobile internet device 300 in real time regarding the location of a specific or closest store, where the product can be found. In step 4070, the user pays for the product by the mobile internet device 300 (the mobile internet device 300 can be integrated with the social wallet electronic module 280). Furthermore, the social wallet electronic module 280 can be integrated with a near-field communication miniature electronic module 620.

As the social wallet 100 can learn or relearn the user's preferences, the unified algorithm 320 can render intelligence based on the user's preferences, utilizing the intelligence rendering algorithm 400 and the self-learning (including relearning) algorithm 420.

Similarly, the mobile internet device 300 can also learn or relearn the user's preferences utilizing the algorithm 1660. The algorithm 1660 includes: (a) a physical search algorithm, (b) an algorithm-as-a-service, (c) an intelligent rendering algorithm (e.g., artificial intelligence, behavior modeling, data interpretation, data mining, fuzzy logic, machine vision, natural language processing, neural networks, pattern recognition and reasoning modeling) and (d) a self-learning (including relearning) algorithm.

As the personal awareness assistant miniature electronic module 1620 is context-aware, thus the mobile internet device 300 can also be context-aware.

FIG. 9 illustrates a block diagram of a first system-on-chip 1820-A, integrating a microprocessor 1360, a graphics processor unit (GPU) 1360-A and an internet security algorithm 1400.

FIG. 10 illustrates a block diagram configuration of a nano-transistor 1840-A. A lower nanowire array of switchable active material (e.g., silicon or germanium) 1840-B sandwiched between contacts (e.g., nickel silicide for silicon or nickel germanide for germanium) 1840-C can be fabricated/constructed. An upper array of gate metal 1840-D enclosed within an insulating shell 1840-E can be fabricated/constructed. Voltage applied via the gate metal 1840-D can switch the active material 1840-B from an off state to an on state.

FIG. 11 illustrates a block diagram configuration of a second system-on-chip 1820-B, which integrates a microprocessor 1360-B, (where the microprocessor 1360-B is based on nano-transistors 1840-A), a graphics processor unit 1360-A and the internet security algorithm 1400.

Molybdenite (MoS$_2$) is a two-dimensional crystal with a natural bandgap. It is suitable for production of digital integrated circuits. A reduction in bandgap and/or increase in mobility of molybdenite can be achieved by an addition of lithium (Li) ions.

Graphene is also a two-dimensional crystal with a higher carrier mobility, as well as lower noise. It has the ideal properties to be an excellent component of integrated circuits. Graphene epitaxially grown on silicon carbide (SiC) can be suitable for production of integrated circuits.

Graphene variant called graphane, in which hydrogen atoms are attached to the carbon lattice in insulating layers.

Graphyne is a one-atom-thick sheets of carbon that resembles graphene, except its 2D framework of atomic bonds, which contains triple bonds in addition to double bonds. Graphyne has a graphene-like electronic structure resulting in effectively massless electrons due to Dirac Cones. All electrons are travelling at roughly the same speed (about 0.3 percent of the speed of light). This uniformity leads to conductivity greater than copper. Graphyne has a capability of self-modulating its electronic properties, which means that it could be used as a semiconductor practically as-is, without requiring any non-carbon dopant atoms to be added as a source of electrons, as non-carbon dopants may be required for graphene. Furthermore, graphyne crystal structures allow electrons to flow in just one direction.

A first lower parallel array of nanoscaled metal (platinum) wires can be fabricated/constructed onto a substrate. A titanium oxide-titanium dioxide thin film can be deposited on the first lower parallel array of nanoscaled metal wires. A second upper parallel array of nanoscaled metal (platinum) wires can be fabricated/constructed on top of the titanium oxide-titanium dioxide thin film. The second upper parallel array is typically fabricated/constructed perpendicular to the first lower parallel array.

A memristor of a titanium oxide-titanium dioxide oxide junction, can be formed when the first lower parallel array of nanoscaled metal (platinum) wires cross the second upper parallel array nanoscaled metal (platinum) wires. Memristor is about 50 microns×50 microns in size. Memristor is a two-terminal nanoscaled non-linear passive switching element, whose resistance changes depending on the amount, direction and duration of voltage applied on it. But whatever its past state or resistance was, it freezes at that state, until another voltage is applied to change it. It has a variable resistance and can retain the resistance even when the power is switched off. It is similar to a transistor, used to store data in flash memory. Since memristor is a two-terminal nanoscaled passive switching element, therefore it can be built on top of transistors to electrically power it up.

Phase-change memory (e.g., germanium-antimony-tellurium) has been used in optical information technologies (e.g., DVD) and non-volatile memory applications. Furthermore, a phase-change memory material based switching element can be used instead of a memristor. Phase-change memory material based switching element exploits a unique switching behavior of phase-change material between amorphous (high resistivity) and crystalline (low resistivity) material states with the application of electrical pulses by titanium nitride top electrode and titanium nitride-tungsten bottom electrode to generate the required joule heating for a phase transformation.

Furthermore, a dense local network of switching elements 1840 (e.g., based on memristor and/or phase-change memory material based switching elements) can be monolithically integrated with transistors fabricated/constructed on a semiconductor (e.g., silicon or germanium or silicon-germanium), and/or nano-transistors fabricated/constructed on a semiconductor (e.g., silicon or germanium or silicon-germanium) and/or transistors fabricated/constructed on two-dimensional crystal.

FIG. 12 illustrates a switching element 1840 based on memristor and/or phase-change memory material.

Thus, transistors (fabricated/constructed on a semiconductor and/or two-dimensional crystal) with integrated switching elements 1840 can be utilized to fabricate/construct a reconfigurable (and with lower electrical power consumption) advanced microprocessor 1360-C.

FIG. 13 illustrates a block diagram configuration of a third system-on-chip 1820-C, which integrates an advanced microprocessor 1360-C, a graphics processor unit 1360-A and the internet security algorithm 1400.

In a human brain, neurons are connected to each other through programmable junctions called synapses. The synaptic weight modulates how signals are transmitted between neurons and can in turn be precisely adjusted by an ionic flow through the synapse.

The switching element 1840 is a non-linear resistive device with an inherent memory and it is similar to a synapse. They are both two-terminal devices whose conductance can be modulated by an external stimulus with the ability to store (memorize) the new information. The switching element 1840 can bring data close to computation without a lot of electrical power consumption, as a biological neural system does.

FIG. 14 illustrates an embodiment of neural network microprocessor 1360-D. 1360-D integrates switching element 1840 based synapses, complementary metal-oxide semiconductor (CMOS) pre-neurons 1860 (fabricated/constructed on a semiconductor and/or two-dimensional crystal) and complementary metal-oxide semiconductor post neurons 1880 (fabricated/constructed on a semiconductor and/or two-dimensional crystal).

FIG. 15 illustrates a block diagram configuration of a fourth system-on-chip 1820-D, which integrates an advanced microprocessor (based on a neural network) 1360-D, a graphics processor unit 1360-A and the internet security algorithm 1400.

FIG. 16 illustrates another embodiment of an advanced microprocessor 1360-E (based on a neural network and nano-transistors 1840-A). 1360-E integrates switching element 1840 based synapses, complementary metal-oxide semiconductor pre-neurons 1860 (fabricated/constructed on a semiconductor and/or two-dimensional crystal), complementary metal-oxide semiconductor post neurons 1880 (fabricated/constructed on a semiconductor and/or two-dimensional crystal) and nano-transistors 1840-A.

FIG. 17 illustrates a block diagram configuration of a fifth system-on-chip 1820-E, which integrates an advanced microprocessor (based on a neural network and nano-transistors 1840-A) 1360-E, a graphics processor unit 1360-A and the internet security algorithm 1400.

Furthermore, the advanced microprocessors 1360-D and 1360-E can have Cog Ex machines as an operating algorithm/system.

FIGS. 18(A, B and C) illustrate a block diagram of process flow for integrating two (2) two-dimensional crystals on an insulator on a semiconductor substrate (e.g., silicon or germanium or silicon-germanium). Graphene/graphane/graphyne is grown on a substrate X (e.g., Graphene can be epitaxially grown on silicon carbide substrate).

Graphene/graphane/graphyne can be patterned with photoresist and reactive ion beam (RIE) etch processes. Graphene/graphane/graphyne can be bonded and detached by PDMS onto an insulator on a semiconductor substrate. Thus, the above semiconductor fabrication process/method enables integration of one or more two-dimensional crystals on an insulator on a semiconductor substrate for further circuit fabrication.

For efficient thermal management of the system-on-chip 1820-A/B/C/D/E for the mobile internet device 300, thermal resistance must be minimized at all material interfaces and materials with closely matching thermal expansion coefficients must be used.

FIG. 19 illustrates that the circuit side of the system-on-chip 1820-A/B/C/D/E can be flip-attached or flip-bonded on an array of thermoelectric film (both n-type and p-type) 1920 with a built-in nano-structured surface 1900 for active cooling.

About ten times (10×) heat transfer can be realized by creating a nano-structured surface (e.g., zinc oxide nano-structure surface) 1900 on the thermoelectric film 1920.

However, significant thermoelectric efficiency can be gained by fabricating a quantum wire/quantum dot based thermoelectric film 1920, transitioning from a two-dimensional superlattice.

Furthermore, the thermoelectric film can be attached or bonded on a thermal pillar 1940. The thermal pillar 1940 is about 250 micron in diameter and 50 micron in height. The thermal pillar (e.g., copper material) 1940 can be attached or bonded on a thermal via 1960 on a printed circuit board 1980 with a cooling module 2000.

FIG. 20A illustrates a cooling module 2000, which can be attached or bonded with the printed circuit board 1980 to disperse the heat from the system-on-chip 1820-A/B/C/D/E. The cooling module 2000 consists of an array of mini cooling modules 2000-A.

FIG. 20B illustrates a mini cooling module 2000-A. The mini cooling module 2000-A has an array of negative voltage biased tips (e.g., tips fabricated/constructed from boron nanotube/carbon nanotube/amorphous diamond/tungsten) 2020, which is placed just below a hole (e.g., about 100 micron in diameter) 2040 of positive voltage biased surface (e.g., tungsten/two-dimensional crystal material (e.g., graphene)) 2060. Electrons emitted from the negative voltage biased array of tips 2020 can escape through the hole 2040 and ionize the gas molecules within the boundaries of the heat sink (e.g., the heat sink can be fabricated/constructed from materials such as aluminum/silicon/copper/carbon nanotube-copper composite/two-dimensional crystal material (e.g., graphene)/diamond) 2080. By switching the voltage polarity of the heat sink 2080, a moving ionized gas cloud can disperse the heat from the printed circuit board 1980.

However, it is desirable that an array of tips 2020 emits electrons at a much lower voltage (e.g., 10 volts).

FIG. 20C illustrates an array of nano-sized tungsten tips 2020, which can be fabricated/constructed on tungsten substrate 2040-A. The array of nano-sized tungsten tips 2020 can be surrounded by an insulator 2040-B. The array of nano-sized tungsten tips 2020 can be decorated with a monolayer of material 2020-A (e.g., diamond, deposited by low temperature electron cyclotron resonance chemical vapor deposition ECR-CVD or gold deposited by RF magnetron sputtering) to enable electrons to emit at a much lower voltage (e.g., at 10 volts) through the hole 2040, where the hole 2040 can be fabricated/constructed from tungsten material.

To achieve faster connectivity between the system-on-chips 1820-A/B/C/D/E, an optical interconnection is preferable than an electrical interconnection.

FIG. 21A illustrates a block diagram of an interconnection between the system-on-chips 1820-A/B/C/D/E (via optics) on the printed circuit board 1980.

Table-5 below describes subcomponents required to fabricate/construct the interconnection between the system-on-chips 1820-A/B/C/D/E (via optics) on a printed circuit board 1980.

TABLE 5

| FIG. 21A Legend | Description |
| --- | --- |
| 1820-A/B/C/D/E | System-On-Chip |
| 2100 | Complementary Metal-Oxide Semiconductor Serializer |
| 2120 | Complementary Metal-Oxide Semiconductor Driver |
| 2140 | Directly Modulated Vertical Cavity Laser |
| 2140-A | Vertical Cavity Laser Integrated With E-O Modulator |
| 2160 | Silicon On-Insulator (SOI) Two-Dimensional Photonic Crystal Wavelength Division Multiplexer |
| 2180 | Silicon-On-Insulator Waveguide |
| 2200 | Silicon On-Insulator Reconfigurable Optical Switch |
| 2220 | Silicon On-Insulator Two-Dimensional Photonic Crystal Wavelength Division Demultiplexer |
| 2240 | Photo Detector |

TABLE 5-continued

| FIG. 21A Legend | Description |
|---|---|
| 2260 | Complementary Metal-Oxide Semiconductor Amplifier |
| 2280 | Complementary Metal-Oxide Semiconductor Deserializer |
| 1820-A/B/C/D/E | System-On-Chip |

Electrical outputs from a system-on-chip (e.g., 1820-A/B/C/D/E) are serialized by a complementary metal-oxide semiconductor serializer 2100. The outputs of a complementary metal-oxide semiconductor serializer 2100 can be utilized as the inputs to an array of complementary metal-oxide semiconductor drivers 2120. Correspondingly, the array of complementary metal-oxide semiconductor drivers 2120 can activate an array of directly modulated (in intensity) vertical cavity surface emitting lasers 2140 or an array of vertical cavity surface emitting lasers, which are monolithically integrated electro-optic modulators 2140-A.

The modulated wavelength of the directly modulated vertical cavity surface emitting laser 2140 or vertical cavity surface emitting lasers with monolithically integrated electro-optic modulators 2140-A can be combined on wavelengths (or colors) by a silicon-on-insulator two-dimensional photonic crystal wavelength division multiplexer 2160.

The wavelengths (or colors) can be propagated by a silicon-on-insulator waveguide 2180 and if necessary, can be reconfigured by a silicon-on-insulator reconfigurable optical switch 2200.

The outputs of a silicon-on-insulator waveguide 2180 or silicon-on-insulator reconfigurable optical switch 2200 can be decombined on wavelengths (or colors) by a silicon-on-insulator two-dimensional photonic crystal wavelength division demultiplexer 2220.

Furthermore, the wavelengths (or colors) outputs (of a silicon-on-insulator two-dimensional photonic crystal wavelength division demultiplexer 2220) can be received by an array of photodetectors (e.g., P-i-N photodetectors) 2240, an array of complementary metal-oxide semiconductors amplifiers 2260, then as electrical inputs to a complementary metal-oxide semiconductor deserializer 2280 and finally as electrical inputs to another system-on-chip (e.g., 1820-A/B/C/D/E).

FIG. 21B illustrates details of the silicon-on-insulator waveguide 2180, silicon-on-insulator vertical coupler gratings 2300 and the directly modulated vertical cavity surface emitting laser 2140 or the vertical cavity surface emitting lasers with monolithically integrated electro-optic modulator 2140-A.

The shape of the silicon-on-insulator waveguide 2180 (fabricated/constructed on oxide buffer layer 2320 on silicon substrate 2340) can be adiabatically tapered in at proximity of the silicon-on-insulator vertical coupler gratings 2300. The silicon-on-insulator vertical coupler gratings 2300 can be shaped linear or curved.

FIG. 21C illustrates details of the silicon-on-insulator waveguide 2180 silicon-on-insulator vertical coupler gratings 2300 and the photodiode 2240. The shape of the silicon-on-insulator waveguide 2180 (fabricated/constructed on the oxide buffer layer 2320 on the silicon substrate 2340) can be adiabatically tapered at proximity of the silicon-on-insulator vertical coupler gratings 2300. The silicon-on-insulator vertical coupler gratings 2300 can be shaped linear or curved.

Furthermore, the silicon-on-insulator two-dimensional photonic crystal wavelength division multiplexer 2160, silicon-on-insulator waveguide 2180, silicon-on-insulator reconfigurable optical switch 2200 and silicon-on-insulator two-dimensional photonic crystal wavelength division demultiplexer 2220, can be embedded within an etched area of polymers layers of the printed circuit board 1980. An optical mode match between the silicon-on-insulator waveguide 2180 and a polymer waveguide (utilizing a polymer layer of the printed circuit board 1980) can be fabricated/constructed. Also, the etched area can be buried within the printed circuit board 1980. Alternatively, the polymer (e.g., polyimide material) waveguide of the printed circuit board 1980 can be utilized instead of the silicon-on-insulator waveguide 2180.

FIG. 21D illustrates a cross section of 2140-A: a vertical cavity surface emitting laser, which can be monolithically integrated with an electro-optic modulator. Similarly, microelectromechanical systems tunable vertical cavity surface emitting laser (preferably a quantum dot vertical cavity surface emitting laser) can also be monolithically integrated with the electro-optic modulator.

The above disclosed descriptions are only the most preferred embodiments of the present invention. However, they are not intended to be limited to the most preferred embodiments of the present invention. Numerous variations and/or modifications are possible within the scope of the present invention.

We claim:

1. A computer implemented method comprising:
   (a) accessing, by a mobile internet device of a first user, via a wired or a wireless network, a web portal enabled by a learning or relearning computer, wherein the web portal comprises: at least a first user profile associated with the first user and a second user profile associated with a second user,
   wherein the learning or relearning computer is one or more cloud computers, or premise computers, or mobile computers,
   wherein the learning or relearning computer comprises: one or more first microprocessors, or one or more neural network based microprocessors, executing computer readable instructions and one or more machine learning algorithms, stored on a non-transitory computer readable medium to implement the web portal,
   wherein the mobile internet device of the first user comprises: a wired connector or a wireless transceiver,
   wherein the mobile internet device of the first user is physically, or wirelessly communicatively coupled to a social wallet electronic module of the first user,
   wherein the social wallet electronic module of the first user comprises: a second microprocessor, or a microcontroller,
   wherein the social wallet electronic module of the first user further comprises: a near-field communication component and a biometric sensor,
   wherein the mobile internet device of the first user accessing the web portal,
   wherein the said accessing the web portal comprises:
   obtaining a first biometric scan of the first user from the biometric sensor of the social wallet electronic module of the first user,
   storing the first biometric scan of the first user,
   obtaining a second biometric scan of the first user from the biometric sensor of the social wallet electronic module of the first user, wherein the second biometric scan of the first user is a current biometric scan of the first user,
comparing the first biometric scan of the first user with the second biometric scan of the first user to authenticate the first user, or the social wallet electronic module of the first user;
(b) in response to at least (a), listing or linking, by the first user, a product or a service for purchase on the first user profile in the web portal;
(c) in response to at least (a) and (b), automatically determining, by the web portal, that the first user is interested in purchasing the product or the service;
(d) in response to at least (a), (b) and (c), automatically determining, by the web portal, a near real time location of the first user,
wherein the near real time location of the first user is detected by a location measurement module of the mobile internet device of the first user,
wherein the location measurement module is selected from a group consisting of: an RFID module, a Bluetooth module, a WiFi module and a GPS module;
(e) in response to at least (a), (b), (c) and (d), automatically querying, by the web portal, queried sellers offering to sell the product or the service, automatically selecting one of the queried sellers, as a selected seller of the product or the service to purchase the product or the service, based on a distance from the near real time location of the first user, automatically connecting the first user with the selected seller;
(f) in response to at least (a), (b), (c), (d) and (e), automatically forwarding, by the web portal, to the mobile internet device of the first user, in near real time, one or more sale offers to purchase the product or the service, from the selected seller;
(g) in response to at least (a), (b), (c), (d), (e) and (f), automatically accepting, by the web portal, like votes and dislike votes for the queried seller from the first user, the second user and a plurality of third users, automatically determining, a number of the like votes and a number of the dislike votes,
automatically determining, a seller score for the queried seller, based on the number of the like votes and the number of the dislike votes,
automatically displaying, the seller score for the queried seller;
(h) in response to at least (a), (b), (c), (d), (e), (f) and (g), automatically sending, by the web portal, to the mobile internet device of the first user, a coupon for purchasing an additional product or service from the queried sellers; and
(i) in response to at least (a), (b), (c), (d), (e), (f), (g) and (h), automatically accepting, by the web portal, payment by the first user for the product or the service, using the web portal, or the first user profile, or the near-field communication component of the social wallet electronic module of the first user, based on one or more forwarded sale offers.

2. The method according to claim 1, wherein the web portal is receiving a first input data from the first user, the second user and the plurality of third users.

3. The method according to claim 1, wherein the web portal is receiving a second input data from one or more first sensors.

4. The method according to claim 1, wherein the web portal is receiving a third input data from a near-field communication tag, or a QR code, or an object, wherein the object comprises: a second sensor and a wireless transmitter.

5. The method according to claim 1, further comprising: the first user paying for the product or the service by transferring a currency or a check from the first user to the selected seller, or to the second user or the plurality of third users.

6. A computer implemented method comprising:
(a) accessing, by a mobile internet device of a first user, via a wired or a wireless network, a web portal enabled by a learning or relearning computer,
wherein the web portal comprises: at least a first user profile associated with the first user and a second user profile associated with a second user,
wherein the learning or relearning computer is one or more cloud computers, or premise computers, or mobile computers,
wherein the learning or relearning computer comprises: one or more first microprocessors, or one or more neural network based microprocessors, executing computer readable instructions and one or more machine learning algorithms, stored on a non-transitory computer readable medium to implement the web portal,
wherein the mobile internet device of the first user comprises: a wired connector or a wireless transceiver,
wherein the mobile internet device of the first user is physically, or wirelessly communicatively coupled to a social wallet electronic module of the first user,
wherein the social wallet electronic module of the first user comprises: a second microprocessor, or a microcontroller,
wherein the social wallet electronic module of the first user further comprises: a near-field communication component and a biometric sensor,
wherein the social wallet electronic module of the first user further comprises: a radio frequency identification reader or an optical transceiver,
wherein the optical transceiver comprises: a light source and a photodetector,
wherein the mobile internet device of the first user accessing the web portal,
wherein the said accessing the web portal comprises:
obtaining a first biometric scan of the first user from the biometric sensor of the social wallet electronic module of the first user,
storing the first biometric scan of the first user,
obtaining a second biometric scan of the first user from the biometric sensor of the social wallet electronic module of the first user, wherein the second biometric scan of the first user is a current biometric scan of the first user,
comparing the first biometric scan of the first user with the second biometric scan of the first user to authenticate the first user, or the social wallet electronic module of the first user;
(b) in response to at least (a), listing or linking, by the first user, a product or a service for purchase on the first user profile in the web portal;
(c) in response to at least (a) and (b), automatically determining, by the web portal, that the first user is interested in purchasing the product or the service;
(d) in response to at least (a), (b) and (c), automatically determining, by the web portal, a near real time location of the first user, wherein the near real time location of the first user is detected by a location measurement module of the mobile internet device of the first user,
wherein the location measurement module is selected from a group consisting of: an RFID module, a Bluetooth module, a WiFi module and a GPS module;

(e) in response to at least (a), (b), (c) and (d), automatically querying, by the web portal, queried sellers offering to sell the product or the service, automatically selecting one of the queried sellers, as a selected seller of the product or the service to purchase the product or the service, based on a distance from the near real time location of the first user, automatically connecting the first user with the selected seller;

(f) in response to at least (a), (b), (c), (d) and (e), automatically forwarding, by the web portal, to the mobile internet device of the first user, in near real time, one or more sale offers to purchase the product or the service, from the selected seller;

(g) in response to at least (a), (b), (c), (d), (e) and (f), automatically accepting, by the web portal, like votes and dislike votes for the queried seller from the first user, the second user and a plurality of third users, automatically determining, a number of the like votes and a number of the dislike votes, automatically determining, a seller score for the queried seller, based on the number of the like votes and the number of the dislike votes, automatically displaying, the seller score for the queried seller;

(h) in response to at least (a), (b), (c), (d), (e), (f) and (g), automatically sending, by the web portal, to the mobile internet device of the first user, a coupon for purchasing an additional product or service from the queried sellers; and (i) in response to at least (a), (b), (c), (d), (e), (f), (g) and (h), automatically accepting, by the web portal, payment by the first user for the product or the service, using the web portal, or the first user profile, or the near-field communication component of the social wallet electronic module of the first user, based on one or more forwarded sale offers.

7. A system comprising:
a learning or relearning computer physically, or wirelessly communicatively coupled to a mobile internet device of a first user,
wherein the learning or relearning computer comprises: one or more first microprocessors, or one or more first neural network based microprocessors, executing computer readable instructions and one or more machine learning algorithms, stored on a non-transitory computer readable medium to implement a web portal,
wherein the web portal comprises: at least a first user profile associated with the first user and a second user profile associated with a second user,
wherein the mobile internet device of the first user comprises: a second microprocessor, or a second neural network based microprocessor, multi-touch display, or a stretchable display, or a quantum dot display, a camera, a wireless transceiver, a location measurement module,
wherein the location measurement module is selected from a group consisting of: an RFID module, a Bluetooth module, a WiFi module and a GPS module, a social wallet electronic module comprising: a biometric sensor and a near-field communication component,
wherein the non-transitory computer readable medium further stores computer-readable instructions, a first set of instructions, a second set of instructions, a third set of instructions, a fourth set of instructions, a fifth set of instructions, a sixth set of instructions, a seventh set of instructions, an eighth set of instructions and a ninth set of instructions,
wherein the second microprocessor, or the second neural network based microprocessor communicates with the non-transitory computer readable medium,
wherein the second microprocessor, or the second neural network based microprocessor is configured to execute, in communication with the non-transitory computer readable medium, (a) the first set of instructions to access, by the mobile internet device of the first user, via a wired or wireless network, the web portal enabled by the learning or relearning computer, wherein the said accessing the web portal comprises:
obtaining a first biometric scan of the first user from the biometric sensor of the social wallet electronic module of the first user,
storing the first biometric scan of the first user,
obtaining a second biometric scan of the first user from the biometric sensor of the social wallet electronic module of the first user, wherein the second biometric scan of the user is a current biometric scan of the first user,
comparing the first biometric scan of the first user with the second biometric scan of the first user to authenticate the first user or the social wallet electronic module of the first user;

(b) in response to at least (a), the second set of instructions to list or link, a product or a service for purchase on the first user profile in the web portal;

(c) in response to at least (a) and (b), the third set of instructions to automatically determine, by the web portal, that the first user is interested in purchasing the product or the service;

(d) in response to at least (a), (b) and (c), the fourth set of instructions to automatically determine, by the web portal, a near real-time location of the first user, wherein the near real-time location of the first user is detected by the location measurement module of the mobile internet device of the first user;

(e) in response to at least (a), (b), (c) and (d), the fifth set of instructions to automatically query, by the web portal, queried sellers offering to sell the product or the service, automatically to select one of the queried sellers as a selected seller of the product or the service to purchase the product or the service, based on a distance from the near real-time location of the first user, automatically to connect the first user with the selected seller;

(f) in response to at least (a), (b), (c), (d) and (e), the sixth set of instructions automatically to forward by the web portal, to the mobile internet device of the first user in near real-time, one or more sale offers to purchase the product or the service from the selected seller;

(g) in response to at least (a), (b), (c), (d), (e) and (f), the seventh set of instructions to automatically accept, by the web portal, like votes and dislike votes for the queried sellers from the first user, the second user and a plurality of third users, automatically to determine a number of the like votes and a number of the dislike votes, automatically to determine a seller score for the queried sellers, based on the number of the like votes and the number of the dislike votes, automatically to display the seller score of the queried sellers;

(h) in response to at least (a), (b), (c), (d), (e), (f) and (g), the eighth set of instructions to, automatically send, by the web portal, to the mobile internet device of the first user, a coupon for purchasing an additional product or service from one or more the queried sellers; and (i) in response to at least (a), (b), (c), (d), (e), (f), (g) and (h), the ninth set of instructions to, automatically accept, by the web portal, payment by the first user for the product or the service, using the web portal, or the first user profile, or the near-field communication component of the social wallet electronic module of the first user, based on one or more of the forwarded sale offers.

8. The system according to claim 7, wherein the mobile internet device is further receiving an input data from a first sensor, or a near-field communication tag, or a QR code, or an object for learning or relearning, wherein the object comprises: a second sensor and a first wireless transmitter.

9. The system according to claim 7, wherein the mobile internet device further comprises: an algorithm selected from the group consisting of: a fuzzy logic algorithm, an intelligence rendering algorithm and a self-learning algorithm.

10. The system according to claim 7, wherein the mobile internet device further comprises: a search algorithm for a physical item.

11. The system according to claim 7, wherein the mobile internet device further comprises: an algorithm selected from the group consisting of: a voice-to-text-to-voice conversion algorithm, a voice recognition algorithm, a handwriting recognition algorithm, a facial recognition algorithm and a biometric recognition algorithm.

12. The system according to claim 7, wherein the mobile internet device further comprises: a component selected from the group consisting of: a barcode reader and a RFID reader.

13. The system according to claim 7, wherein the mobile internet device further comprises: a component selected from the group consisting of: a DASH7 transceiver and a millimeter wave transceiver.

14. The system according to claim 7, wherein the mobile internet device further comprises: a component selected from the group consisting of: a software-defined radio and a tunable antenna.

15. The system according to claim 7, wherein the mobile internet device further comprises: a video compression module selected from the group consisting of: a video compression component and a video compression algorithm.

16. The system according to claim 7, wherein the mobile internet device further comprises: a sketch pad electronic module and a stylus, wherein the sketch pad electronic module comprises: an electronic circuitry for capacitive coupling, a transparent input matrix component and a write-erase switch.

17. The system according to claim 7, wherein the mobile internet device further comprises: a personal awareness assistant electronic module, wherein the personal awareness electronic module comprises: a microphone or an audio recorder.

18. The system according to claim 17, wherein the personal awareness assistant electronic module categorizes information or data received by the personal awareness assistant electronic module into a database.

19. The system according to claim 7, wherein the mobile internet device is further enabling a service by an object, or a biological object, wherein the object comprises: a second sensor and a first wireless transmitter, wherein the biological object comprises: a biosensor and a second wireless transmitter.

20. The system according to claim 7, wherein the mobile internet device is further sensor aware, or context aware.

* * * * *